United States Patent [19]
Bilgic

[11] Patent Number: 5,819,041
[45] Date of Patent: Oct. 6, 1998

[54] COMPUTER PROGRAM HAVING PLURALITY OF SUBTASKS FOR USE IN BASE STATION AND EACH SUBTASK CAPABLE OF BEING MODIFIED TO ALTER THE FUNCTIONALITY OF THE PROGRAM

[75] Inventor: Murat I. Bilgic, Colorado Springs, Colo.

[73] Assignee: Omnipoint Corporation, Bethesda, Md.

[21] Appl. No.: 823,026

[22] Filed: Mar. 20, 1997

[51] Int. Cl.$^6$ ...................................................... G06F 13/00
[52] U.S. Cl. ...................... 395/200.51; 395/677; 455/418
[58] Field of Search ................... 455/418, 419, 455/422, 435, 436, 437, 517; 395/200.51, 200.72, 670, 671, 672, 673, 677

[56] References Cited

U.S. PATENT DOCUMENTS

| | | | |
|---|---|---|---|
| 4,685,125 | 8/1987 | Zave ......................................... | 364/130 |
| 4,954,948 | 9/1990 | Hira et al. ................................. | 395/677 |
| 5,293,620 | 3/1994 | Barabash et al. ........................ | 395/672 |
| 5,416,779 | 5/1995 | Barnes et al. ............................ | 370/280 |
| 5,499,243 | 3/1996 | Hall ......................................... | 370/346 |

*Primary Examiner*—Moustafa M. Meky
*Attorney, Agent, or Firm*—Lyon & Lyon LLP

[57] ABSTRACT

A computer program for a base station in a wireless communication system to communicate on the system. The communication protocol embodied in the computer program enables the base station to help users of the communication system to acquire a channel on the base station, for communications with the base station. The communication protocol embodied in the computer program also enables the base station to register a user on the system. The communication protocol embodied in the computer program also enables the base station to page a user, and then establish a call link on the system for the user, for a call to the user. The communication protocol embodied in the computer program enables the base station to establish a call link on the system for a call initiated by the user. The communication protocol embodied in the computer program also allows the base station to accept a handover of an established call link on the communication system, from another base station in the system.

The computer program is comprised of a main controller task, an LPI task, and various other tasks, also called subtasks. The main controller task directs the various other tasks to perform discrete communication protocol functions for the base station. The LPI task is the base station's interface task with the backhaul interface.

20 Claims, 98 Drawing Sheets

(CONTINUED ON THE NEXT PAGE)

(CONTINUED ON THE NEXT PAGE)

COMPUTER PROGRAM HAVING PLURALITY OF SUBTASKS FOR USE IN BASE STATION AND EACH SUBTASK CAPABLE OF BEING MODIFIED TO ALTER THE FUNCTIONALITY OF THE PROGRAM

BACKGROUND OF THE INVENTION

1) Field of the Invention

The field of this invention pertains to communications and, more particularly, to a method for transferring information within a mobile communication system.

2) Description of the Related Art

Digital communication systems have become increasingly popular for many applications. One class of digital communication systems provides wireless data communication connections for stationary or mobile (e.g., handset) end users. Examples of such wireless mobile communication systems include public safety radio systems, cellular telephone systems, and personal communication systems (PCS). A wireless communication system may include a number of base stations for completing communication paths with the end users, or, as more generally denoted herein, mobile stations. The base stations may be connected to a network, either directly or via a switch.

In operation, signaling information is passed among various components of a communication system. Signaling information can comprise control messages relating to the operation of the communication system. An example of signaling information is a message from a mobile station to a base station indicating that the mobile station wishes to acquire a channel on the base station for use as a communication link within the communications system.

New features and functionalities are being added to wireless communication systems at an alarming rate. One of the problems associated with the addition of these new features and functionalities is the need to continuously modify the computer programs which handle the signals for utilizing these features and functionalities. It is time consuming and cumbersome to have to modify and recompile the entirety of a computer program that handles the transfer of messages and signals when only one function of the software is actually impacted by the new functionality.

It would therefore be advantageous to have a wireless communication system software program that facilitates the addition of new functionalities.

It would be advantageous to provide a mobile communication system with an improved communication protocol for handling communications by various base stations.

SUMMARY OF THE INVENTION

The present invention provides a computer program for use in a base station in a wireless communication system. The base station computer program is comprised of a main task and a plurality of independent other task, also referred to as subtasks. The main task activates each of the subtasks to perform a discrete communication function in the wireless communication system. Each of the subtasks in the base station computer program may only be activated by the main task. Thus, subtasks of this computer program do not activate each other. In operation, only the main task and one subtask of the base station computer program are activated for a selected base station channel at any given time.

In the base station computer program, at least some of the subtasks are capable of notifying the physical layer of the base station that there is information to be transmitted from the base station. Also in the base station computer program, at least some of the subtasks are capable of being notified by the base station's physical layer that information has been received by the base station.

The base station computer program is designed so that each of the subtasks of the computer program may be modified to alter the functionality of the program without the need to modify any other subtask of the program.

BRIEF DESCRIPTION OF THE DRAWINGS

The various objects, features and advantages of the present invention may be better understood by examining the Detailed Description of the Preferred Embodiments found below, together with the appended figures, wherein.

DESCRIPTION OF THE PREFERRED EMBODIMENTS

Figure 1A:
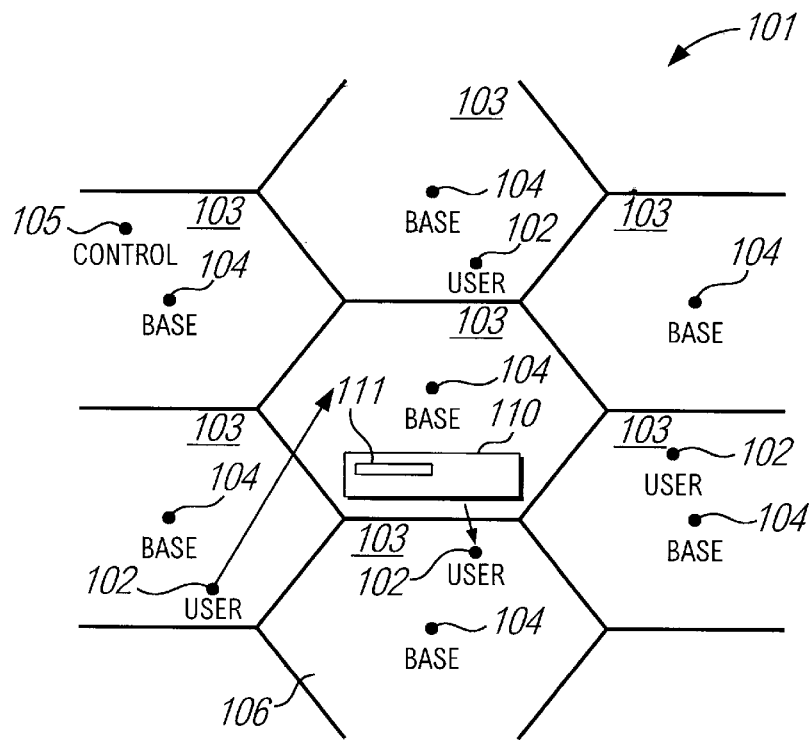
FIG. 1a is a diagram of a pattern of cells in a wireless communication system.

FIG. 1A is a diagram of a pattern of cells in a wireless communication system 101 for communication among a plurality of users, in this case, mobile stations 102. The wireless communication system 101 of FIG. 1A includes a plurality of cells 103, each with a base station 104, the base station typically located at the center of the cell 103. Each mobile station 102 and each base station 104 generally comprise both a receiver and a transmitter.

In a preferred embodiment, a base station controller 105 manages the resources of the communication system 101. In a preferred embodiment, the base station controller 105 is comprised of a switch and a mobility control platform. The base station controller 105 may assign the base station 104 transmitter and mobile station 102 transmitters in each cell 103 a spread-spectrum code for modulating radio signal communication in that cell 103. The resulting signal is generally spread across a bandwidth exceeding the bandwidth necessary to transmit the data, hence the term "spread spectrum."

Figure 1B:
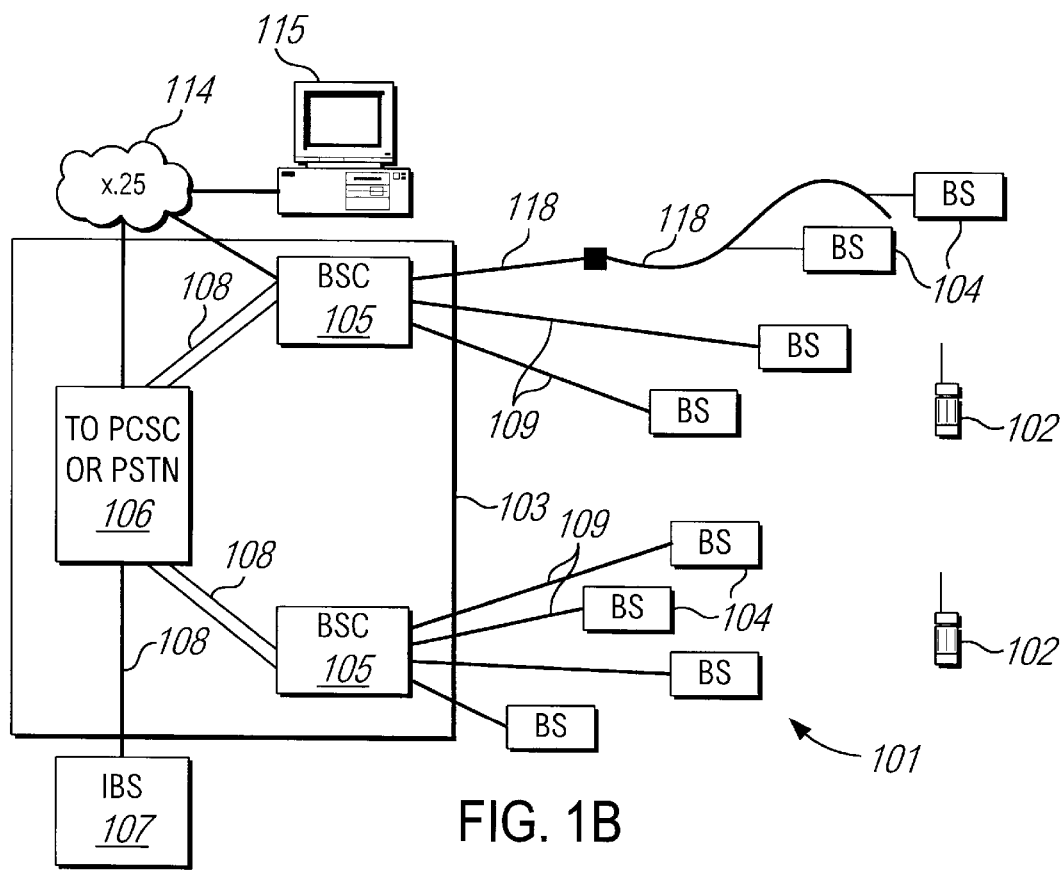
FIG. 1b is a block diagram of a communication system.

FIG. 1b is a block diagram of a communication system architecture utilized in a preferred embodiment of the present invention. The FIG. 1B communication system 101 comprises a plurality of base stations 104 for communicating with a plurality of mobile stations 102. The base stations and the mobile stations may operate in a personal communications system (PCS), such as may be authorized under rules prescribed by the Federal Communications Commission (FCC).

Each base station 104 may be coupled to a base station controller 105 by any of a variety of communication paths 109. The communication paths 109 may each comprise one or more communication links 118. Each communication link 118 may include a coaxial cable, a fiber optic cable, a digital radio link, or a telephone line.

Each base station controller 105 may also be connected to one or more networks 106, such as a public switched telephone network (PSTN) or a personal communication system switching center (PCSC). Each base station controller 105 is connected to a network 106 by means of one or more communication paths 108, each of which may include a coaxial cable, a fiber optic cable, a digital radio link, or a telephone line.

The FIG. 1B communication system 101 may also include one or more "intelligent" base stations 107 which connect directly to a network 106, without interfacing through a base station controller 105. The intelligent base station 107, therefore, incorporates the functions of the base station controller 105 for communicating with the network 106.

The base station controllers 105 and the network 106 collectively comprise a system controller 103. In operation, each base station 104 formats and transmits digital information to its respective base station controller 105, or directly to the network 106 in the case of an intelligent base station 107, and thus, to the system controller 103, on what is generally referred to herein as the backhaul interface.

Figure 2:
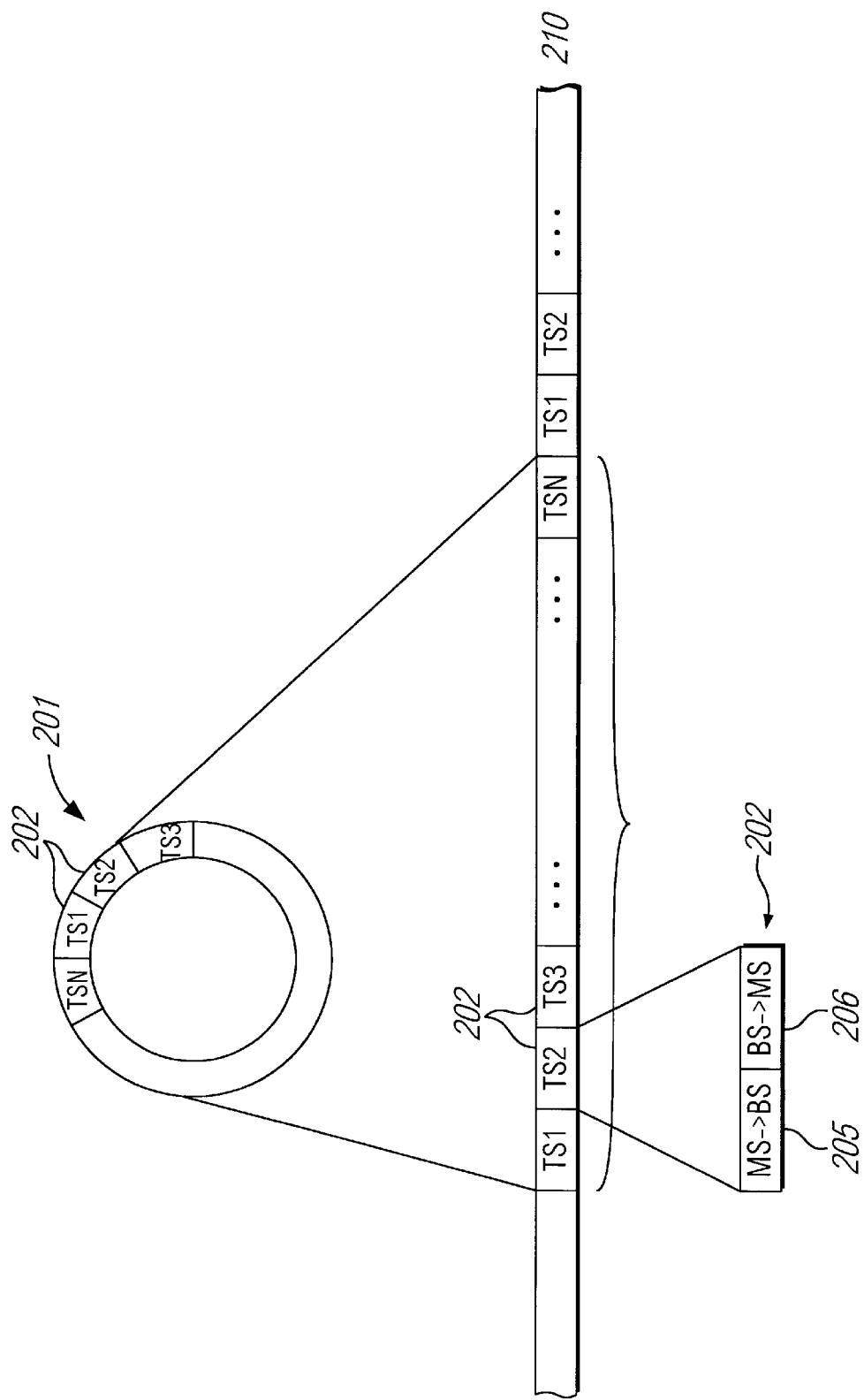
FIG. 2 is a diagram of a time frame divided into a plurality of time slots.

FIG. 2 is a diagram showing a timing structure for a particular TDMA system. According to the timing structure of FIG. 2, communication over time is broken into a continuous series of time frames 201. A single complete time frame 201 is shown along a time line 210 in FIG. 2. Similar time frames are assumed to precede and follow time frame 201 in a continuous pattern along time line 210.

Utilizing a Time Division Duplex (TDD) mode, each time frame 201 is divided into a plurality of time slots 202, numbered consecutively TS1, TS2, . . . TSN, each of which may support duplex communication with a mobile station 102. Time frame 201 may be thought of as a "polling loop" or a time loop, as depicted in FIG. 2, whereby mobile stations 102 are communicated with sequentially over the time frame 201 in a manner analogous to polling, each mobile station transmitting and receiving messages in a designated time slot 202.

In the FIG. 2 embodiment, each time slot 202 comprises a user portion 205, wherein a mobile station 102 transmits a mobile station-to-base station message to a base station 104, and a base portion 206, wherein a base station 104 transmits a base station-to-mobile station message. In a preferred embodiment, the first half of the TDMA/TDD time slot is allocated for the mobile station 102 transmit function and the second half of the TDMA/TDD time slot is allocated for the base station 104 transmit function (to the mobile stations 102).

A time slot 202, or time slots, over time frames 201 define a transmission channel. To provide a greater area of communications coverage, or to provide a greater user communication capacity in densely populated regions. Each transmission channel may further be defined by a distinct frequency channel, a distinct spread spectrum code, a distinct spatial direction, or some combination thereof.

In an exemplary TDMA communication system, time frames 201 are each 20 milliseconds in duration, with each time frame equally divided between sixteen full duplex time slots 202, or, alternatively, eight time slots, to support an extended range through increased guard times. In a preferred embodiment, each time slot 202 is 1.25 milliseconds long.

In some embodiments, a mobile station 102 may communicate in more than one time slot 202 in each time frame 201, supporting an increased data rate. Similarly, in some embodiments, a mobile station 102 may periodically skip time frames 201, communicating in some subset of all time frames 201 (e.g., every other time frame 201, or every fourth time frame 201), thereby supporting a reduced data rate.

Signaling messages, i.e., messages used for control traffic, are used to assist in the acquisition and maintenance of a channel for a mobile station 102 on a base station 104, as well as for registration processing, call establishment, maintenance, and cessation, and call "handover" processing, between base stations. Signaling messages are generally transparent to the mobile stations' end users. A signaling message may include a message type element located in a message field (i.e., a designated series of bits in a message). The message type element defines the format of the remainder of the message, and acts as a form of operation code for the destination unit (either mobile station 102, base station 104, base station controller 105, or network 106).

Bearer data (i.e., communication system 101 user traffic, also referred to as Traffic messages) comprises, in general, data which originates at a mobile station 102 end user and is passed through the communication system 101 to another mobile station 102 end user (e.g., voice messages).

The communication system 101 transfers information comprising signaling data and bearer data between a base station 104 and a mobile station 102 across an "O-Interface." In a preferred embodiment, the O-Interface is an over-the-air interface operating according to an over-the-air protocol with time division duplexing (TDD) and time division multiple access (TDMA) techniques. A preferred protocol for the O-Interface is shown in and described with respect to FIG. 2.

A base station 104 or a mobile station 102 may receive an erroneous message on the O-Interface. As used herein, an erroneous message is a message with a transmission error associated with it. In either the case of the mobile station or the base station, the transmission error may comprise a parity error, a hardware component transmission timeout error, or any other transmission error recognized by the respective base or mobile station's receiver hardware and/or software.

A base station 104 or a mobile station 102 may also receive an unexpected message on the O-Interface. As used herein, an unexpected message is a message that was received with no associated transmission error, but which is either an unknown message, or a known message the base station, or mobile station, respectively, did not expect at that time in the given protocol processing.

In a preferred embodiment, if a mobile station 102 or base station 104 receives an unexpected or erroneous message on the O-Interface, it will execute a "Leaky Bucket" process, or routine. In the Leaky Bucket process, the mobile station, or base station, adjusts a LeakyBucket(unexpected message) counter or a LeakyBucket(erroneous message) counter if it receives an unexpected message or an erroneous message respectively.

In the communication system 101, a mobile station 102 may register with a base station 104, to indicate its presence to the base station, and, thus, the communication system 101 generally, thereby gaining access to the communication system in order to be able to place and receive calls thereon. A mobile station accomplishes registration via a Registration protocol sequence. Mobile stations may also receive calls from others on the communication system 101, via the execution of a Call Terminate protocol sequence, and place calls to others (referred to herein as callees) on the communication system 101, via the execution of a Call Originate protocol sequence. A mobile station may also determine that its current call link has an insufficient signal quality, and attempt to "handover" its call to another base station in the communication system 101, via the execution of a Handover protocol sequence.

As used herein, a protocol sequence comprises one or more signaling messages transmitted between various components of the communication system 101 to accomplish a function. A protocol sequence may also comprise the establishment and use of timers, LeakyBucket counters, previously described, and other variables necessary to accomplish the protocol sequence processing. For example, the Register protocol sequence comprises signaling messages transmitted between a mobile station 102, a base station 104, and a base station controller 105 or network 106, as well as the establishment of timers and LeakyBucket counters by both the base station and the mobile station, to accomplish the function of registering the mobile station with the base station.

A mobile station 102 "communicates" with its end user through its user interface. Thus, when the end user places, or receives, a call on the communication system 101, the mobile station transmits bearer data to its end user and receives bearer data from its end user on its user interface. A mobile station also posts various "indications" to its user interface, to indicate the current status of a protocol sequence. For example, at the end of a Registration protocol sequence, the mobile station either posts a Registered indication 708, or a Service Unavailable/Registration Rejected indication 709 to its user interface, as depicted in FIG. 7B. In practice, the mobile station computer program passes information to its user interface, this information comprising the "indication" to be posted on the interface. Any particular indication posted to a mobile station's user interface may either be a display message, a tone, an LED signal, or any other signaling mechanism supported by the user interface.

As discussed herein, the base station transmits messages to the mobile station, and the mobile station transmits messages to the base station. In the base station computer program, the subtasks of the base station forward information, also called messages, to the base station physical layer 2115, depicted in FIG. 21. The base station physical layer then transmits the appropriate information, also called messages, on the O-Interface. The base station physical layer 2115 also receives information on the O-Interface, which it provides as messages to the base station computer program.

The base station physical layer 2115 consists of circuitry and hardware to act upon messages received from the base station computer program tasks, and, in response to those messages, transmit the appropriate information over the Over-the-Air Interface. The base station physical layer 2115 also consists of circuitry and hardware to act upon information received on the Over-the-Air Interface, and in response to this information, send appropriate messages to the base station computer program subtasks.

The hardware and circuitry associated with the base station physical layer 2115 includes a Digital Signal Processor (DSP) and a digital radio and transceiver.

As discussed herein, the base station 104 and the mobile station 102 are indicated as being in various states, depending on the current function (i.e., protocol processing) they are performing. For example, when a base station is sending general poll messages in a non-dedicated channel, it is said to be in the General Poll state 401, depicted in FIG. 4, also discussed as the BS_C(1) state 2205, depicted in FIG. 22b. These states are used for ease of description and categorization of protocol processing and are not meant to denote physical states that either the base or mobile stations assume.

Figure 18:
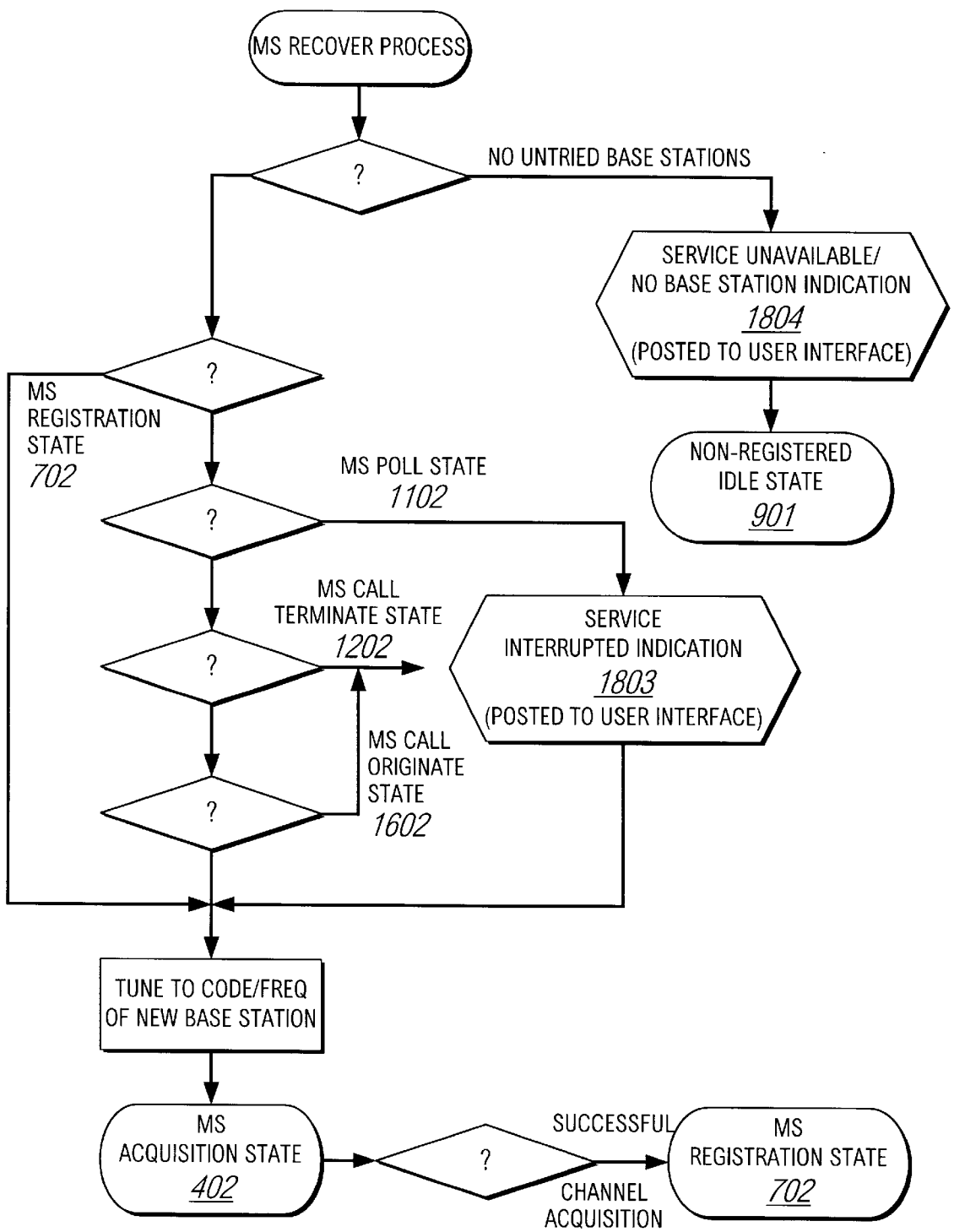
FIG. 18 is a diagram of the mobile station state processing and communication protocol when it fails to acquire a channel on, or loses synchronization with the, base station, and the mobile station was attempting to register, place a call, or receive a call with the base station.

Also as discussed herein, the base station 104 and the mobile station 102 are, at various times, noted as executing a "process." For example, if a mobile station fails to acquire a channel on a base station to Register with, on power on, it executes an MS Recover process, depicted in FIG. 18. A process is akin to a subroutine for a protocol sequence; it may be called from various points in any one protocol sequence, or even from various protocol sequences.

Figure 3A:
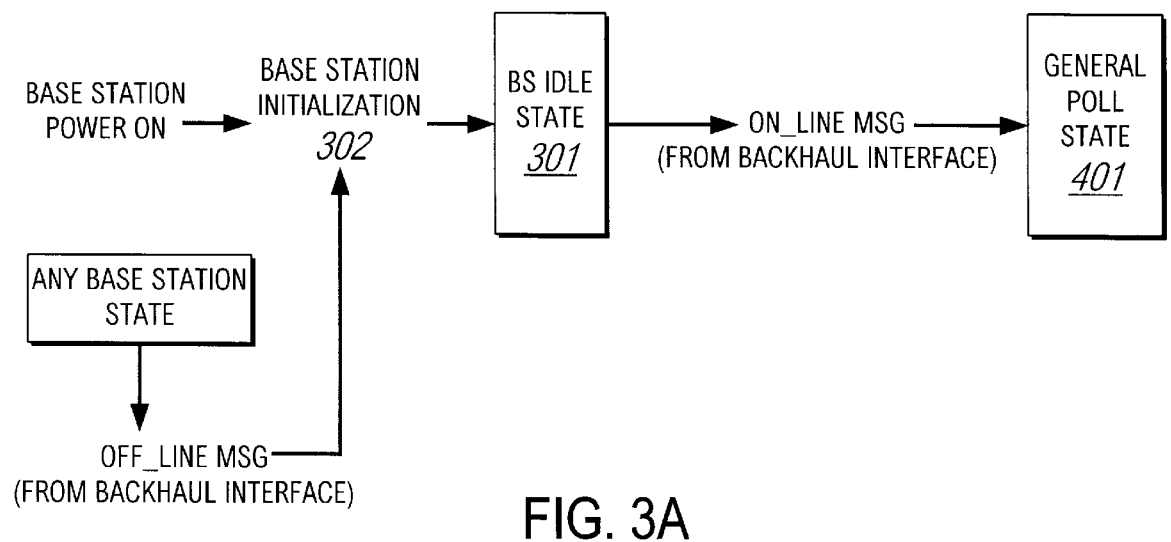
FIG. 3A is a diagram of a base station state processing on Power On and on receiving an On_Line and an Off_Line message.

FIG. 3A is a state diagram of the processing a base station 104 performs when it is first powered on. On power on, a base station performs a Base Station Initialization sequence 302, which includes, but is not limited to, the establishment and initialization of various databases, queues and variables used for communication processing and maintenance within the communication system 101. Once the Base Station Initialization sequence 302 is completed, the base station transitions to the BS Idle state 301. In the BS Idle state 301, the base station will not transmit messages to or receive and process messages from any mobile station 102. The base station remains in this BS Idle state 301 until it receives an On_Line message on the backhaul interface, from the system controller 103, indicating that the base station is to engage in communication processing with mobile stations.

While in any Base Station state, if a base station receives an Off_Line message on the backhaul interface, it transitions to the BS Idle state 301, as depicted in FIG. 3A. In a preferred embodiment, the base station performs the Base Station Initialization sequence 302, or a subset of the functions of this sequence 302, after receiving an Off_Line message, before it transitions to the BS Idle state 301.

Once a base station receives an On_Line message on the backhaul interface, it transitions to the General Poll state 401 for all its channels, as depicted in FIG. 3A. In the General Poll state 401, depicted in FIG. 4, for each of its currently unused (non-dedicated) channels, the base station transmits a CT_GPO (General Poll) message, one per time frame 202, on the O-Interface. The CT_GPO message of any channel is an invitation for any mobile station to seize the channel, and thereby acquire a communication link to the base station, and, thus, the communication system 101.

Figure 3B:
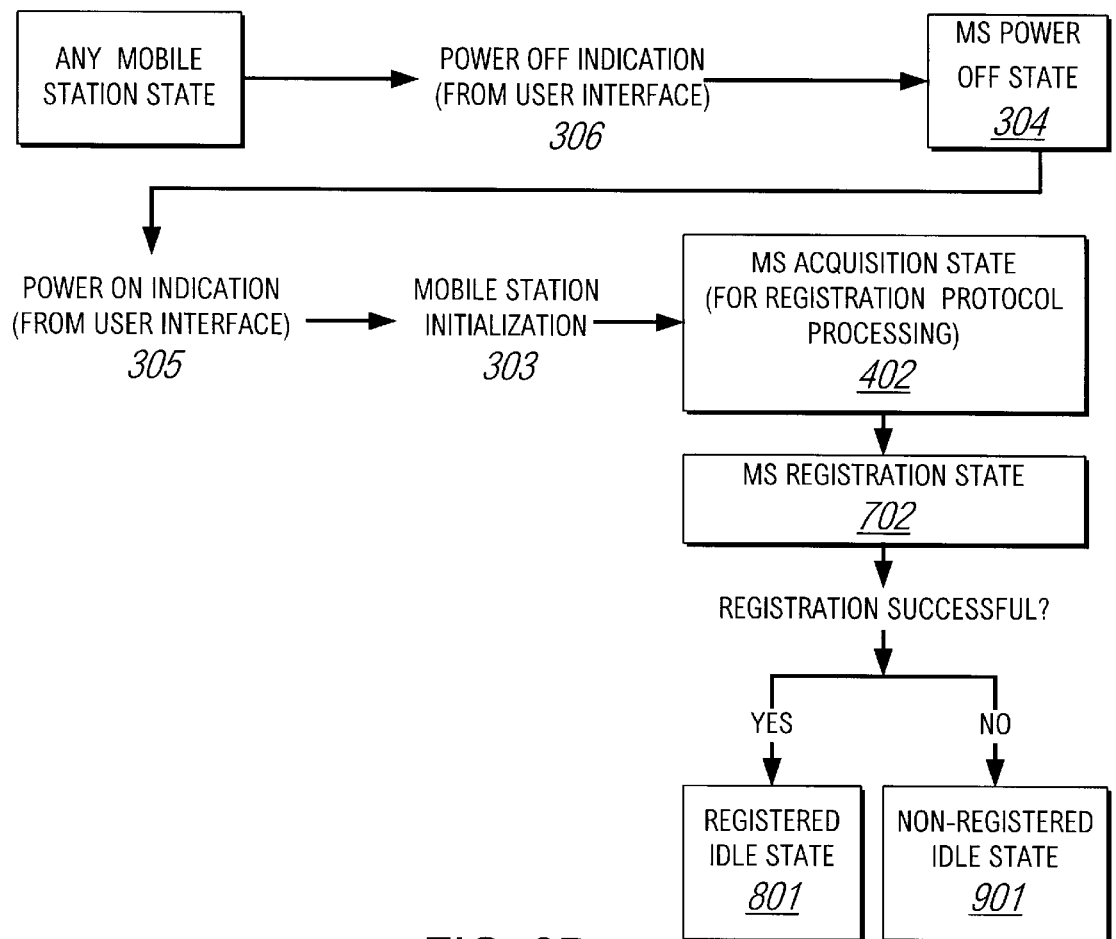
FIG. 3B is a diagram of a mobile station state processing on Power On and on Power Off.

FIG. 3B is a state diagram of the processing a mobile station 102 performs when it first powers on. Upon receiving a Power On indication 305 from its user interface, a mobile station performs a Mobile Station Initialization sequence 303, which includes, but is not limited to, the establishment and initialization of various databases, queues and variables used for communication functions within the communication system 101. In a preferred embodiment, the mobile station registers with a base station 104 each time the mobile station first powers on.

Figure 4:
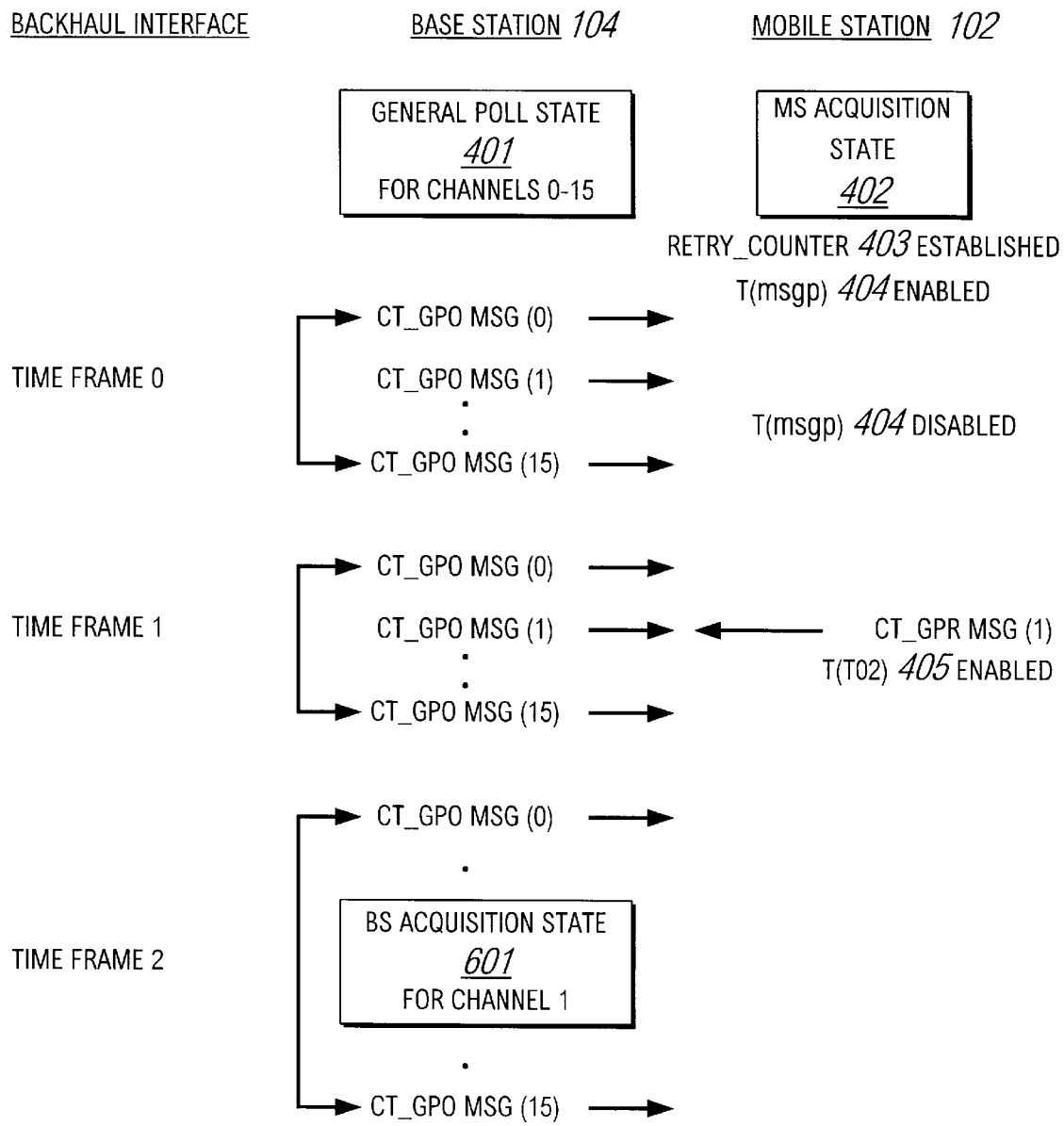
FIG. 4 is a diagram of a base station communication protocol for its non-dedicated channels, and a mobile station state processing for a channel acquisition attempt on the base station.
Figure 5:
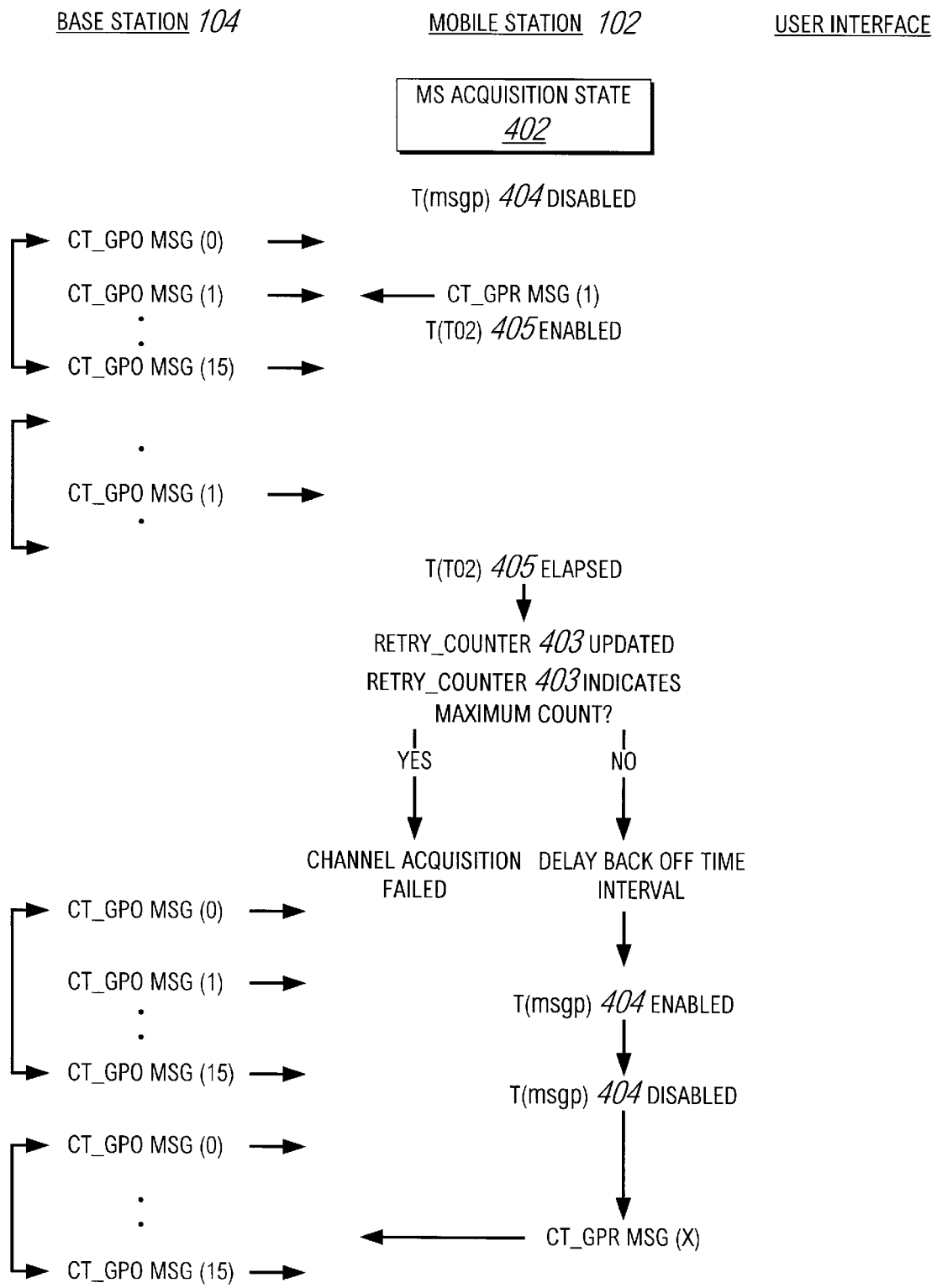
FIG. 5 is a diagram of a mobile station state processing when it fails to receive a valid response from the base station during a channel acquisition attempt.
Figure 6:
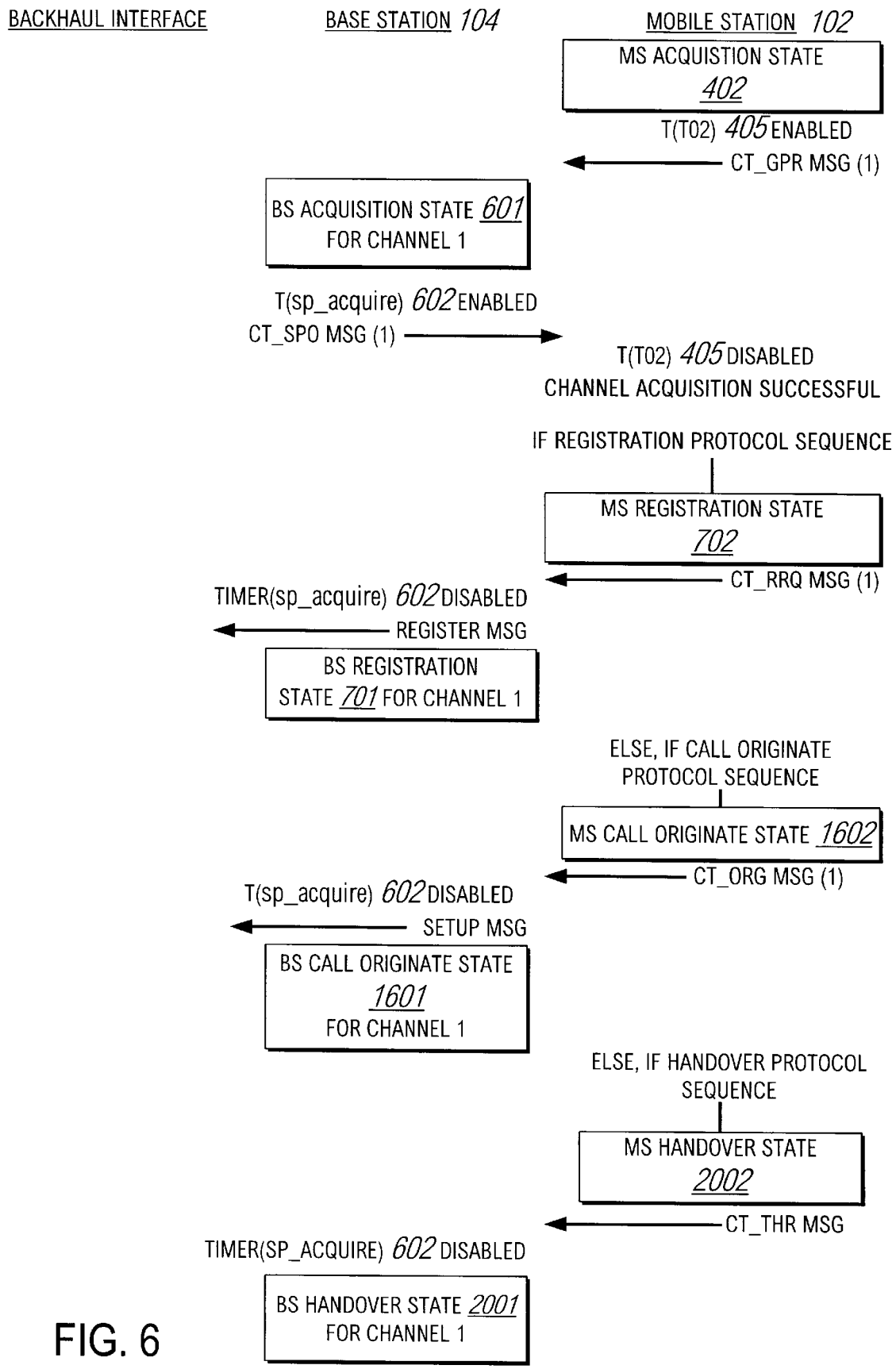
FIG. 6 is a diagram of a base station and a mobile station state processing and communication protocol for a successful channel acquisition by the mobile station on the base station.

In order to register, the mobile station first transitions to the MS Acquisition state 402, depicted in FIGS. 4–6, where it performs the Acquisition protocol sequence necessary to acquire a channel on a base station, for communication with the base station, and, thus, the communication system 101 in general. More generally, in each instance where a mobile station wishes to communicate within the communication system 101, i.e., for Registration, Call Originate, or Handover protocol sequence processing, the mobile station must first acquire a channel on a base station.

Figure 7A:
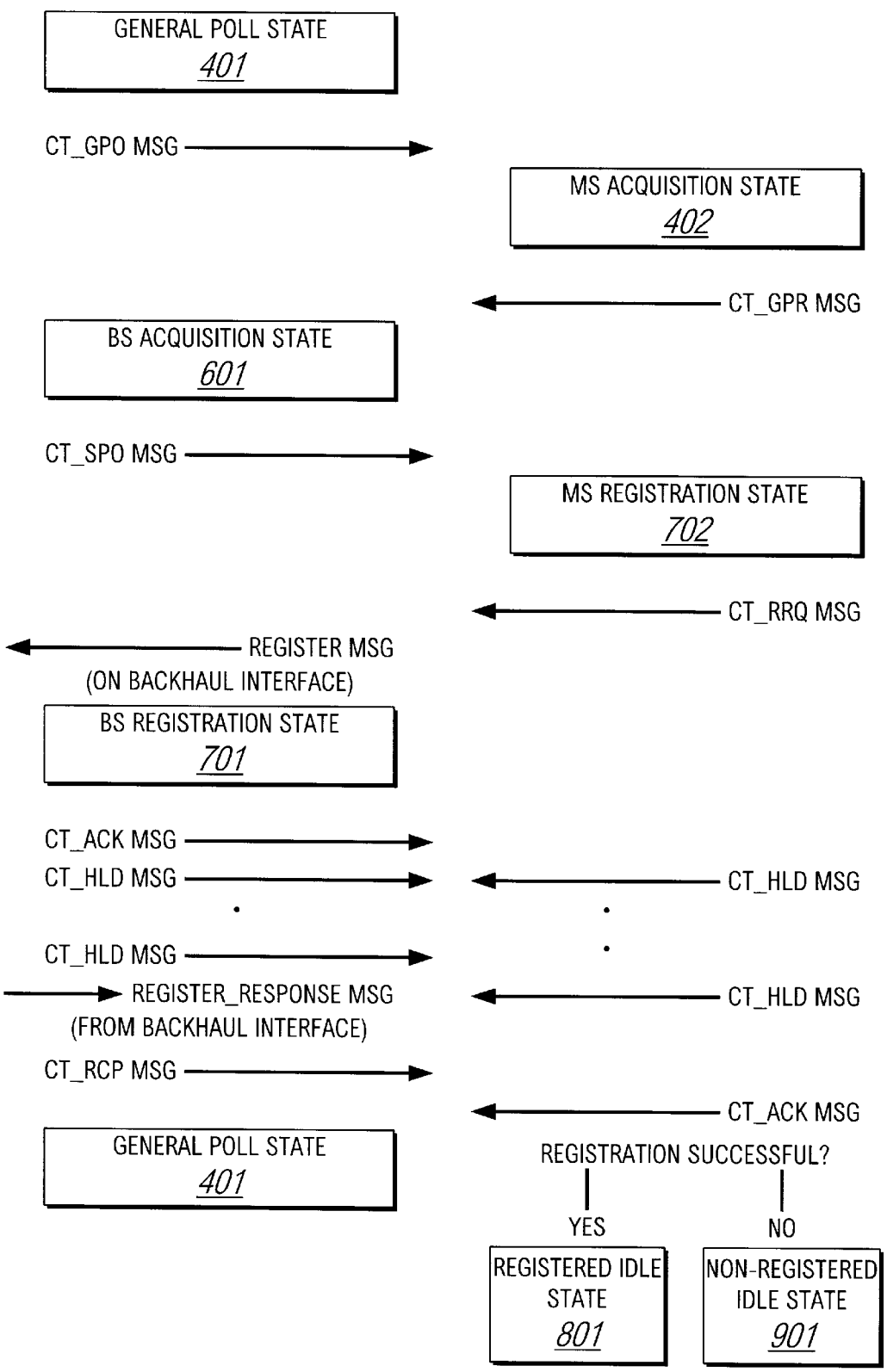
FIG. 7A is a diagram of a base station and a mobile station state processing and communication protocol for the registration of the mobile station on the base station.
Figures 1, 7B:
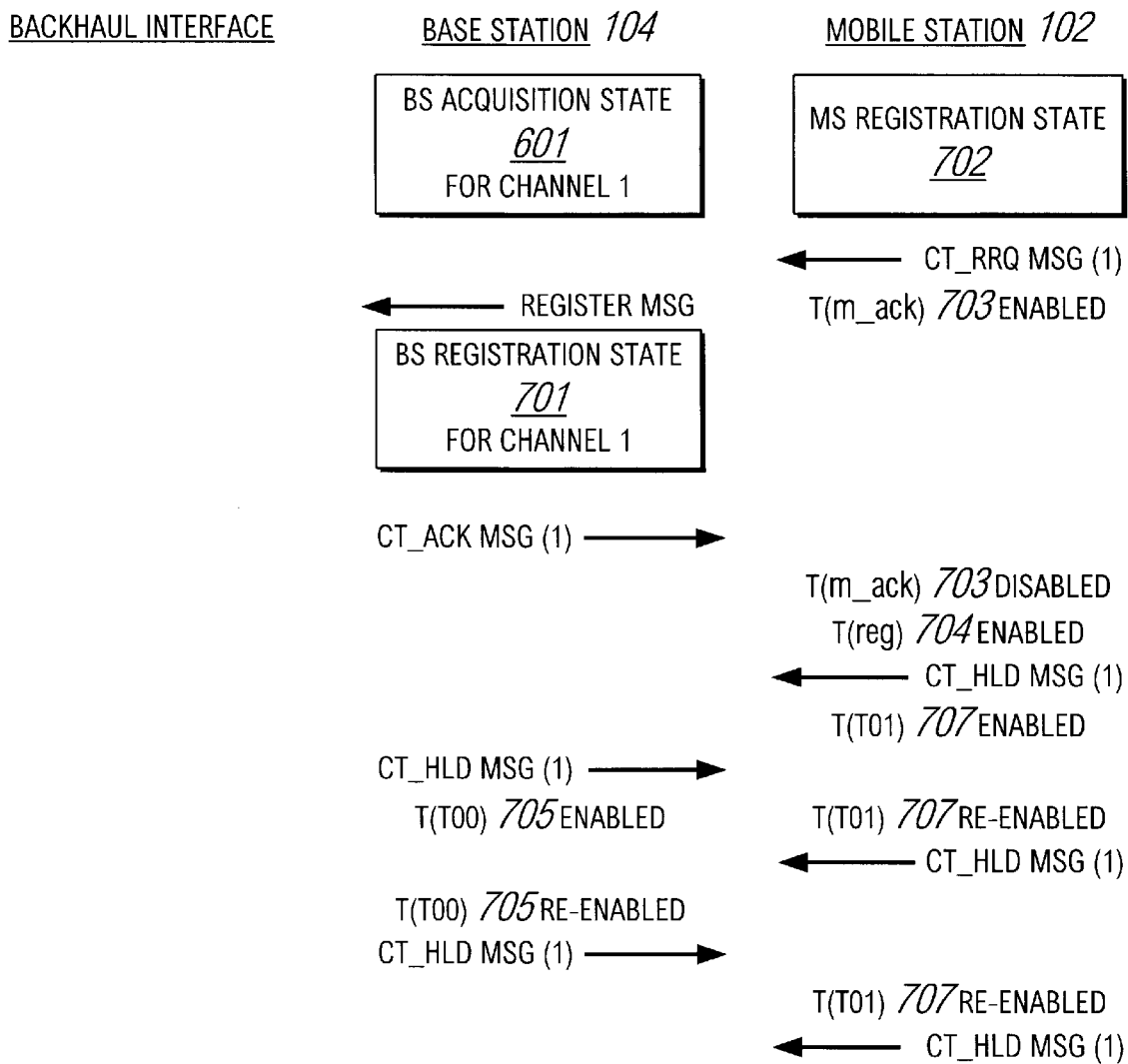
FIG. 7B is a diagram of a preferred embodiment communication protocol for a base station and a mobile station, for the registration of the mobile station on the base station.
Figures 2, 7B:
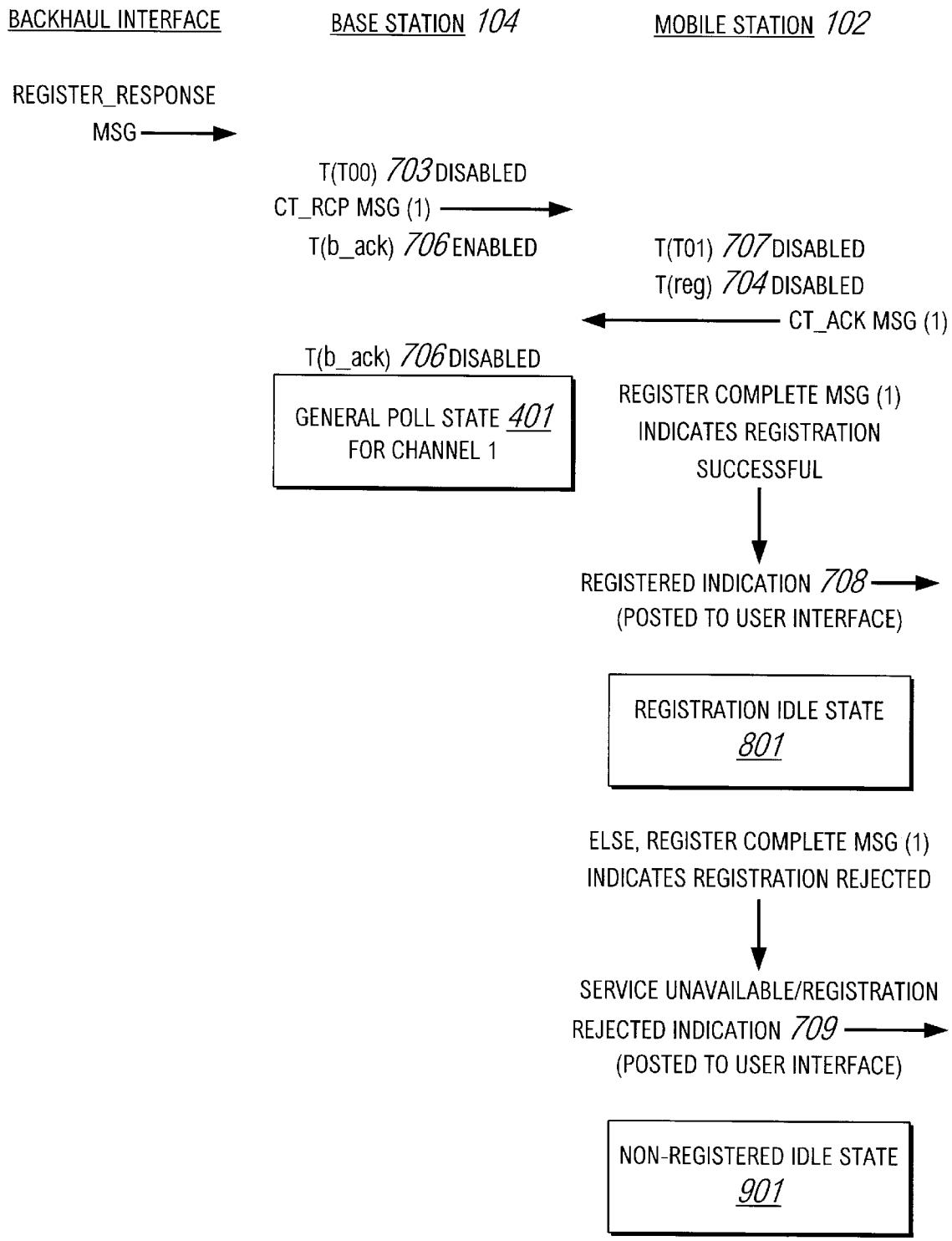

If, on power on, a mobile station successfully acquires a channel on a base station, it then transitions to the MS Registration state 702, depicted in FIG. 7A, where it performs the Registration protocol sequence, to register with the base station.

Figure 8:
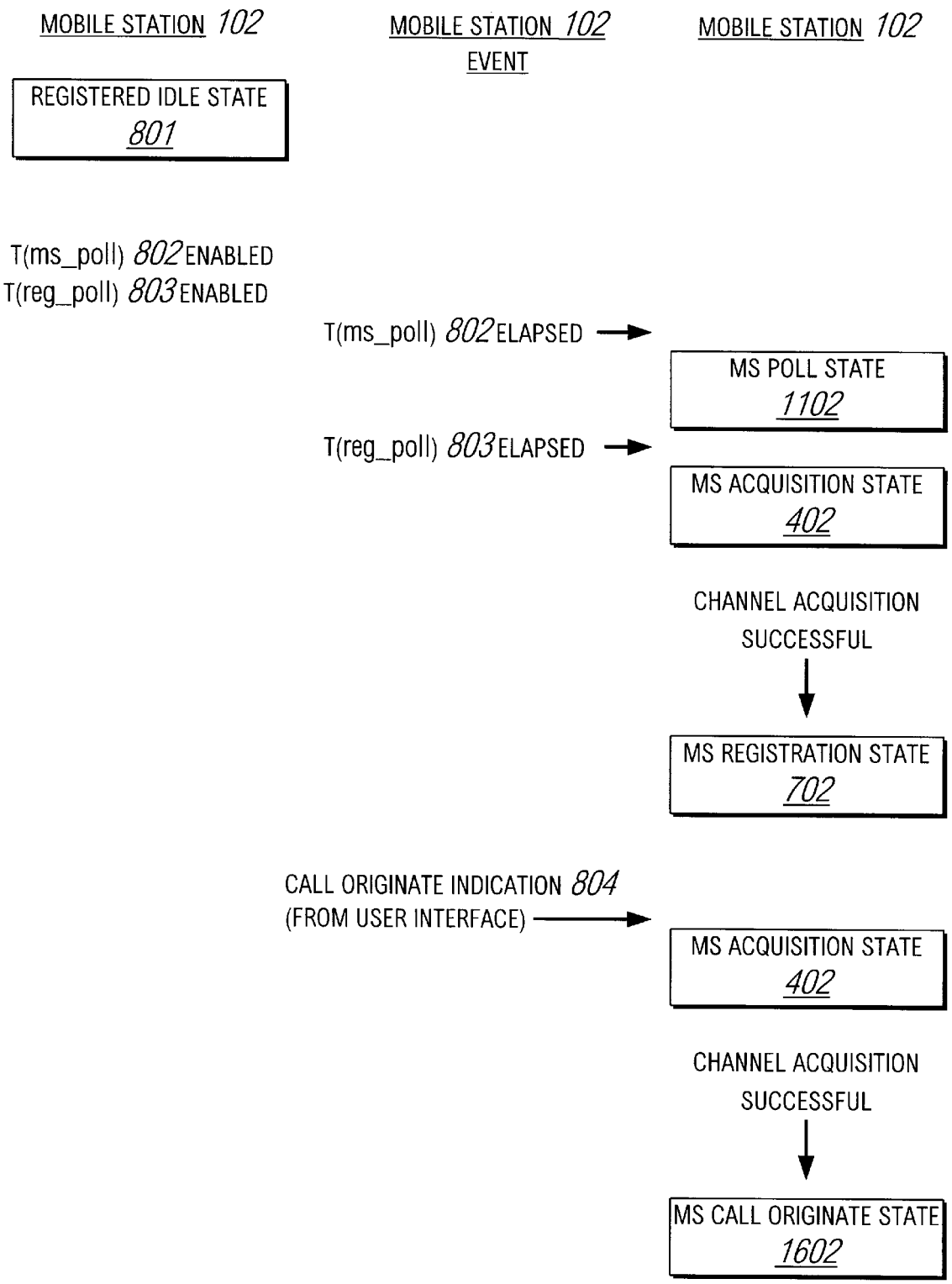
FIG. 8 is a diagram of the processing of a successfully registered mobile station in the idle state.

If the mobile station successfully registers with the base station, it transitions to the Registered Idle state 801, depicted in FIG. 8. In this state, the mobile station periodically re-registers with a base station and periodically polls the O-Interface, to see if there is a call on the communication system 101 pending for it. In the Registered Idle state 801, the mobile station can also place calls on the communication system 101, as requested by its end user, via its user interface.

Figure 9:
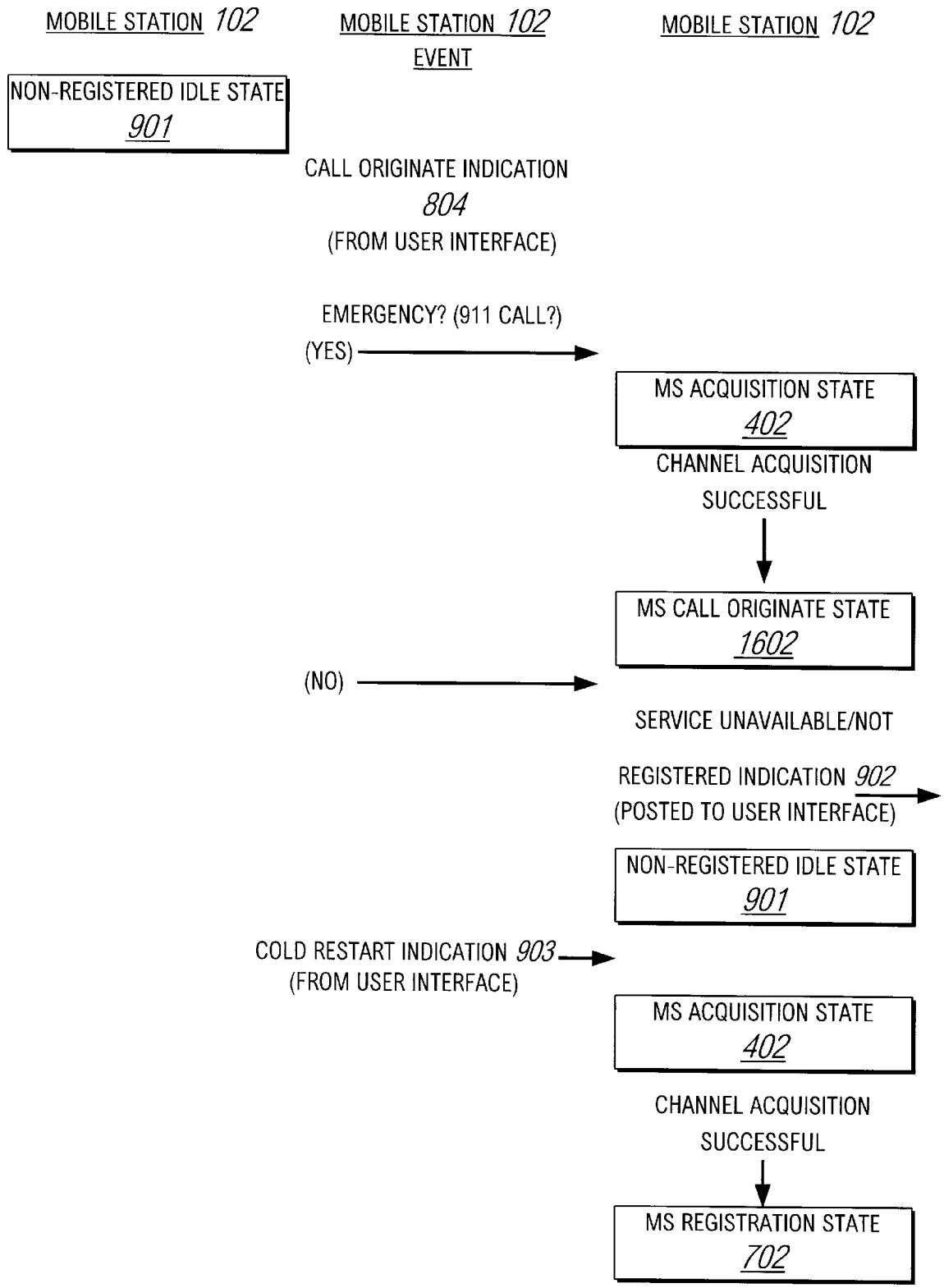
FIG. 9 is a diagram of the processing of an unsuccessfully registered mobile station in the idle state.

If mobile station is unsuccessful in registering with a base station after power on, it transitions to the Non-Registered Idle state 901, depicted in FIG. 9. In this state, the mobile station can place emergency (i.e., 911) calls on the communication system 101, and can also perform a cold restart (i.e., perform as if it had just been powered on), as requested by its end user, via its user interface.

As depicted in FIG. 3B, if a mobile station receives a Power Off indication 306 on its user interface while in any Mobile Station state, it transitions to the MS Power Off state 304. While in the MS Power Off state 304, the mobile station is idle, non-communicative with any base station, or the communication system 101 in general.

In the MS Acquisition state 402, depicted in FIG. 4, the mobile station establishes a Retry_Counter 403, which represents the maximum retry attempts the mobile station will make to acquire a channel on the base station it is currently tuned to. In a preferred embodiment, a mobile station is only tuned to the code/frequency of one base station transmission at any one time.

In a preferred embodiment of the MS Acquisition state 402, the mobile station also establishes its LeakyBucket counters, the LeakyBucket process previously described. In this state 402, the mobile station establishes a timer, T(msgp) 404, which represents the maximum time it will wait to receive a CT_GPO (General Poll) message from the base station before it deems its wait a retry. If the mobile station receives a CT_GPO message before T(msgp) 404 elapses, it disables T(msgp). If T(msgp) elapses, the mobile station updates Retry_Counter 403, re-establishes T(msgp), and then waits another T(msgp) time period to receive a CT_GPO message from the base station it is tuned to.

As previously described, for any base station channel not already acquired by a mobile station (i.e., a non-dedicated channel), the base station transmits a CT_GPO message in the channel's base portion 206 of each time frame 202, as shown in FIG. 4. When a mobile station wishes to acquire a channel, it responds to a CT_GPO message with a CT_GPR (General Poll Response) message transmitted in the channel's user portion 205 of a time frame. The mobile station then waits for a CT_SPO (Specific Poll) message for it from the base station. The CT_SPO message is an invitation for only the mobile station identified in the message to seize the channel.

In a normal Acquisition protocol sequence, depicted in FIG. 6, upon receiving a CT_GPR message on a non-dedicated channel from one mobile station, the base station dedicates the channel to the mobile station, and transitions to the BS Acquisition state 601 for that channel, where it then transmits a CT_SPO message to the mobile station.

In a preferred embodiment, a CT_SPO message received by a mobile station at this time indicates that it has successfully acquired a channel on the base station. In an alternative embodiment, the CT_SPO message may contain a message field which indicates to the mobile station whether or not it has acquired the channel. If the CT_SPO message in this alternative embodiment indicates the mobile station has not acquired the channel, the mobile station determines that the Acquisition protocol sequence with the base station it is currently tuned to has failed. Otherwise, if the CT_SPO message indicates the mobile station has acquired the channel, the mobile station proceeds as discussed below, and depicted in FIG. 6.

Should more than one mobile station respond to a CT_GPO (General Poll) message in a particular channel, the base station remains processing in the General Poll state 401 for that channel, continuing to transmit CT_GPO messages in each time frame of the channel. This base station processing is equivalent to a non-response to the mobile stations' CT_GPR (General Poll Response) messages.

In a preferred embodiment, the mobile station establishes a timer, T(T02) 405, for the maximum time it will wait for a CT_SPO message for it from the base station, once it has transmitted a CT_GPR message to the base station. If the mobile station receives a CT_SPO message for it before T(T02) 405 elapses, it disables T(T02). If, however, T(T02) elapses, the mobile station assumes there has been a channel acquisition collision with at least one other mobile station. In this situation, depicted in FIG. 5, the mobile station updates Retry_Counter 403 and then "backs off," for some time interval, before again attempting to seize a channel on the base station.

In a preferred embodiment, a mobile station presumes it has been involved in a channel acquisition collision if it fails to receive a CT_SPO message for it in the following time frame of the channel the mobile station transmitted its CT_GPR message in. Thus, T(T02) 405 preferably represents one time frame.

After a back off time interval elapses, the mobile station once again establishes timer T(msgp) 404, and then waits to receive a CT_GPO (General Poll) message from the base station.

Thus, as shown in FIG. 5, a mobile station continues processing in the MS Acquisition state 402 if it does not receive a CT_GPO message from the base station, or a valid response to its own CT_GPR (General Poll Response) message from the base station, until Retry_Counter 403 indicates a maximum retry count has been reached. If Retry_Counter indicates a maximum retry count, the mobile station determines the Acquisition protocol sequence with the base station it is currently tuned to has failed.

A base station remains in the General Poll state 401 for each non-dedicated channel, transmitting a CT_GPO message in each time frame of the channel, until it receives one CT_GPR message from a mobile station, as depicted in FIG. 4, until it receives a Page message on the backhaul interface, for a Paging protocol sequence, as discussed below, and depicted in FIG. 11, or until it receives an Off_Line message on the backhaul interface, as previously discussed, and depicted in FIG. 3A.

Once a base station receives a CT_GPR message in a non-dedicated channel from a mobile station, as depicted in FIG. 6, it transitions to the BS Acquisition state 601 for that channel, which it now designates "dedicated." In response to the CT_GPR message in exemplary non-dedicated channel 1, the base station 104 transmits one or more CT_SPO (Specific Poll) messages for the mobile station on this now dedicated channel 1.

From this point on, until such time as the dedicated channel is redesignated non-dedicated, the mobile station is said to have acquired the dedicated channel. The base station transmits to the mobile station in the base portion 206 of this channel, and the mobile station correspondingly transmits to the base station in the user portion 205 of this channel.

A base station can be in different states for its different channels, as shown in FIG. 4. For example, a base station can be in the BS Acquisition state 601 for channel 1, while it is in the General Poll state 401 for channels 0 and 2–15.

In a preferred embodiment of the BS Acquisition state 601, as depicted in FIG. 6, the base station establishes a timer, T(sp_acquire) 602, for the maximum time it will continue transmitting CT_SPO messages for the mobile station in a dedicated channel, waiting for a valid response from the mobile station. If the base station receives a valid mobile station response before T(sp_acquire) 602 elapses, it disables T(sp_acquire). If, however, T(sp_acquire) elapses, the base station redesignates the dedicated channel as non-dedicated, and transitions to the General Poll state 401 for the now non-dedicated channel.

As depicted in FIG. 6, if the base station receives a CT_RRQ (Register Request) message from the mobile station in response to the CT_SPO message(s), it transmits a Register message on the backhaul interface, to notify the system controller 103 that the mobile station requests to register with the base station. The base station then transitions to the BS Registration state 701 for the dedicated channel, depicted in FIG. 7A.

Figure 16A:
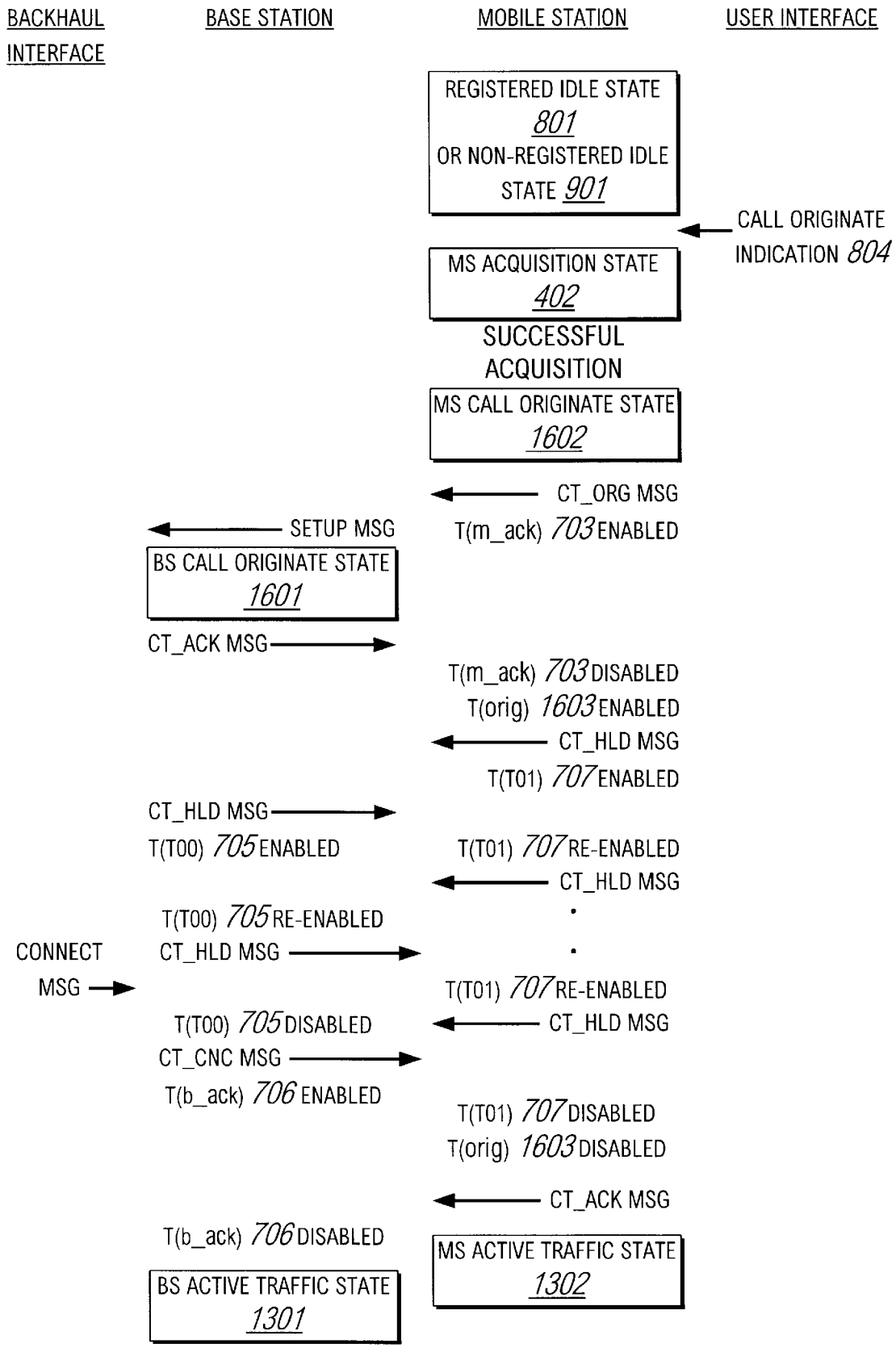
FIG. 16A is a diagram of a base station and a mobile station state processing and communication protocol when a mobile station end user initiates a call on the communication system.

If the base station receives a CT_ORG (Call Originate) message from the mobile station in response to the CT_SPO message(s), it transmits a Setup message on the backhaul interface, to notify the system controller 103 that the mobile station wishes to originate a call (i.e., call another) on the communication system 101. The base station then transitions to the BS Call Originate state 1601 for the dedicated channel, depicted in FIG. 16A.

Figure 20A:
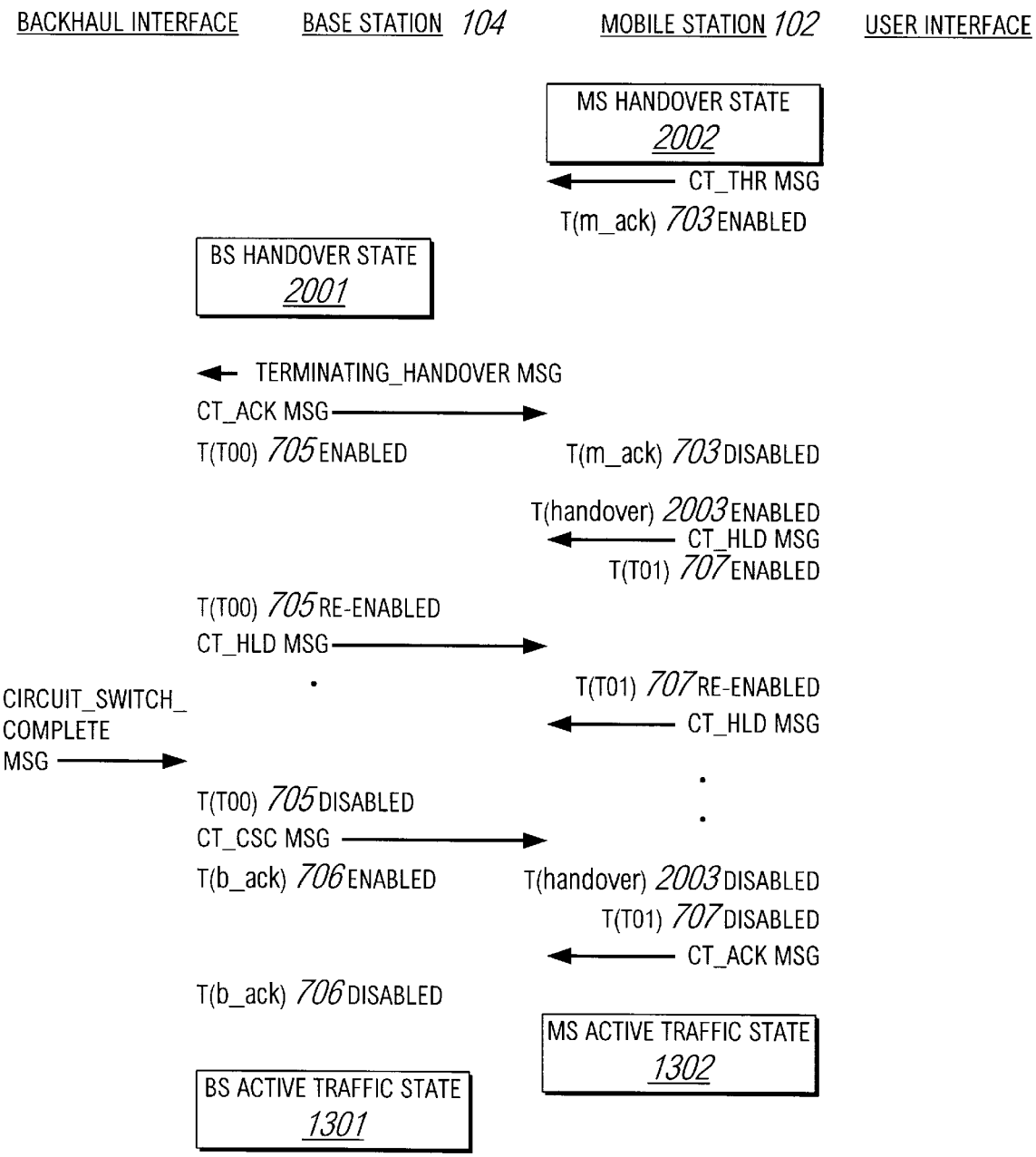
FIG. 20A is a diagram of a base station and a mobile station state processing and communication protocol when the mobile station successfully acquires a channel on the base station and wishes to handover its call to this base station.

If the base station receives a CT_THR (Terminating Handover Request) message from the mobile station in response to the CT_SPO message(s), it transitions to the BS Handover state 2001 for the dedicated channel, depicted in FIG. 20A.

In a preferred embodiment, as previously discussed, a mobile station registers with a base station when the mobile station first powers on, and periodically thereafter. In order to register, a mobile station must acquire a channel on a base station; thus, it transitions to the MS Acquisition state 402, previously described. If the mobile station is unsuccessful in acquiring a channel for the Registration protocol sequence on the base station it is currently tuned to, it executes the MS Recover process, depicted in FIG. 18.

In the MS Recover process, the mobile station checks its database to see if there is any untried base station 104 candidate it may attempt to acquire a channel on. If no, the mobile station transitions to the Non-Registered Idle state 901. In a preferred embodiment, before transitioning to the Non-Registered Idle state 901, the mobile station posts a Service Unavailable/No Base Station indication 1804 on its user interface. In this case, as the mobile station was attempting to acquire a channel on a base station to register with, the register attempt is now terminated.

If, however, the mobile station's database indicates there is at least one untried base station candidate it may yet attempt to acquire a channel on, it tunes to the code/frequency of one of the untried base stations' transmission. The mobile station, still processing in the MS Acquisition state 402, then attempts to acquire a channel on this new base station, to use to register with the new base station.

If a mobile station fails to acquire a channel on the base station it is initially tuned to, and if it then executes the MS Recover process, as when it is attempting to acquire a base station channel to then register with, it repeatedly executes the MS Recover process, until it either successfully acquires a channel on a base station, or there are no more base station candidates for it to attempt a channel acquisition on.

If a mobile station successfully acquires a channel in the MS Acquisition state 402 for a Registration protocol sequence, it then transitions to the MS Registration state 702, depicted in FIGS. 7A and 7B. In the MS Registration state 702, the mobile station transmits a CT_RRQ (Registration Request) message in the acquired dedicated channel. In a preferred embodiment, the mobile station then waits for a CT_ACK (Ack) message response from the base station, indicating the base station acknowledges the mobile station's request to register.

In a preferred embodiment, as depicted in FIG. 7B, the mobile station establishes a timer, T(m_ack) 703, for the maximum time it will wait for a CT_ACK message from the base station. If the mobile station receives the expected CT_ACK message before T(m_ack) 703 elapses, it disables T(m_ack), and then waits for a CT_RCP (Registration Complete) message from the base station, indicating the communication system 101's response to the mobile station's registration request. If, however, T(m_ack) 703 elapses, the mobile station presumes it is out of synchronization ("out of sync") with the base station, and executes an MS Resync process, depicted in FIG. 10A.

In the MS Resync process, the mobile station checks whether the base station is transmitting it a CT_SPO (Specific Poll) message. If the mobile station receives a CT_SPO message for it, it remains in the MS Registration state 702 and restarts the Registration protocol sequence anew, transmitting a new CT_RRQ (Registration Request) message to the base station. This new CT_RRQ message is both a registration request and an indication that the mobile station has resynced with the base station.

In a preferred embodiment, the mobile station enables a timer, T(resync) 1001, for the maximum time it will continue to check if the base station is transmitting it a CT_SPO message. If the mobile station receives a CT_SPO message for it before T(resync) 1001 elapses, it disables T(resync). If, however, T(resync) elapses, the mobile station determines that is has no communication with the base station, and executes the MS Recover process, previously discussed, and depicted in FIG. 18, where it determines if there is another base station it can acquire a channel on, and, thus, register with.

As previously discussed, and depicted in FIG. 7A, if a base station receives a CT_RRQ (Registration Request) message while processing in the BS Acquisition state 601 for a dedicated channel, it transmits a Register message on the backhaul interface. The base station then transitions to the BS Registration state 701, depicted in FIGS. 7A and 7B, to wait for a Register_Response message from the system controller 103, indicating the communication system 101's response to the mobile station's registration request. In a preferred embodiment, once the base station transitions to the BS Registration state 701, it transmits a CT_ACK message to the mobile station, acknowledging the mobile station's CT_RRQ message.

If the base station receives the expected Register_Response message on the backhaul interface, it transmits a CT_RCP (Registration Complete) message to the mobile station. In a preferred embodiment, the base station then waits for a CT_ACK message response from the mobile station.

In a preferred embodiment, upon receiving the expected CT_RCP message, the mobile station transmits a CT_ACK message to the base station, acknowledging the CT_RCP message. Then, if the CT_RCP message indicates that the registration was successful, the mobile station transitions to the Registered Idle state 801. In a preferred embodiment, as depicted in FIG. 7B, the mobile station posts a Registered indication 708 to its user interface, prior to transitioning to the Registered Idle state 801.

If, however, the CT_RCP message indicates that the registration was rejected, the mobile station transitions to the Non-Registered Idle state 901. In a preferred embodiment, as depicted in FIG. 7B, the mobile station posts a Service Unavailable/Registration Rejected indication 709 to its user interface, prior to transitioning to the Non-Registered Idle state 901.

Figure 7C:
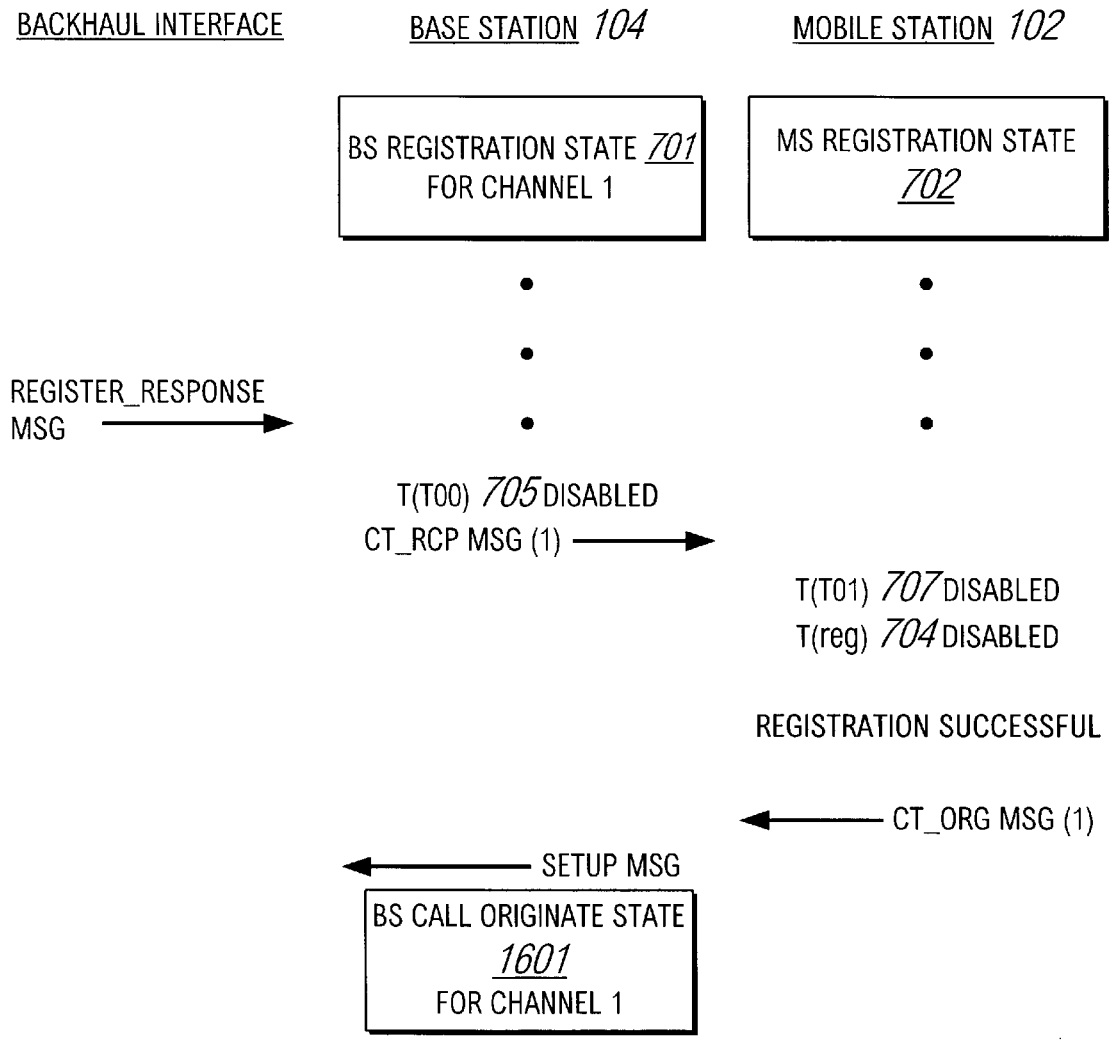
FIG. 7C is a diagram of an alternative embodiment communication protocol for a base station and a mobile station, on the successful registration of the mobile station on the base station.

In an alternative embodiment, as depicted in FIG. 7C, if the CT_RCP message transmitted from the base station indicates that the registration was successful, the mobile station may transmit a CT_ORG (Call Originate) message, in lieu of the CT_ACK message, to the base station. In this alternative embodiment, if the base station receives a CT_ORG message at this time, it transmits a Setup message on the backhaul interface, and then transitions to the BS Call Originate state 1601 for the dedicated channel, depicted in FIG. 16A.

As previously noted, in a preferred embodiment, the mobile station transmits a CT_ACK message to the base station in response to the CT_RCP message. Upon receiving this CT_ACK message, the base station redesignates the dedicated channel as non-dedicated, and transitions to the General Poll state 401 for the now non-dedicated channel.

Figure 17:
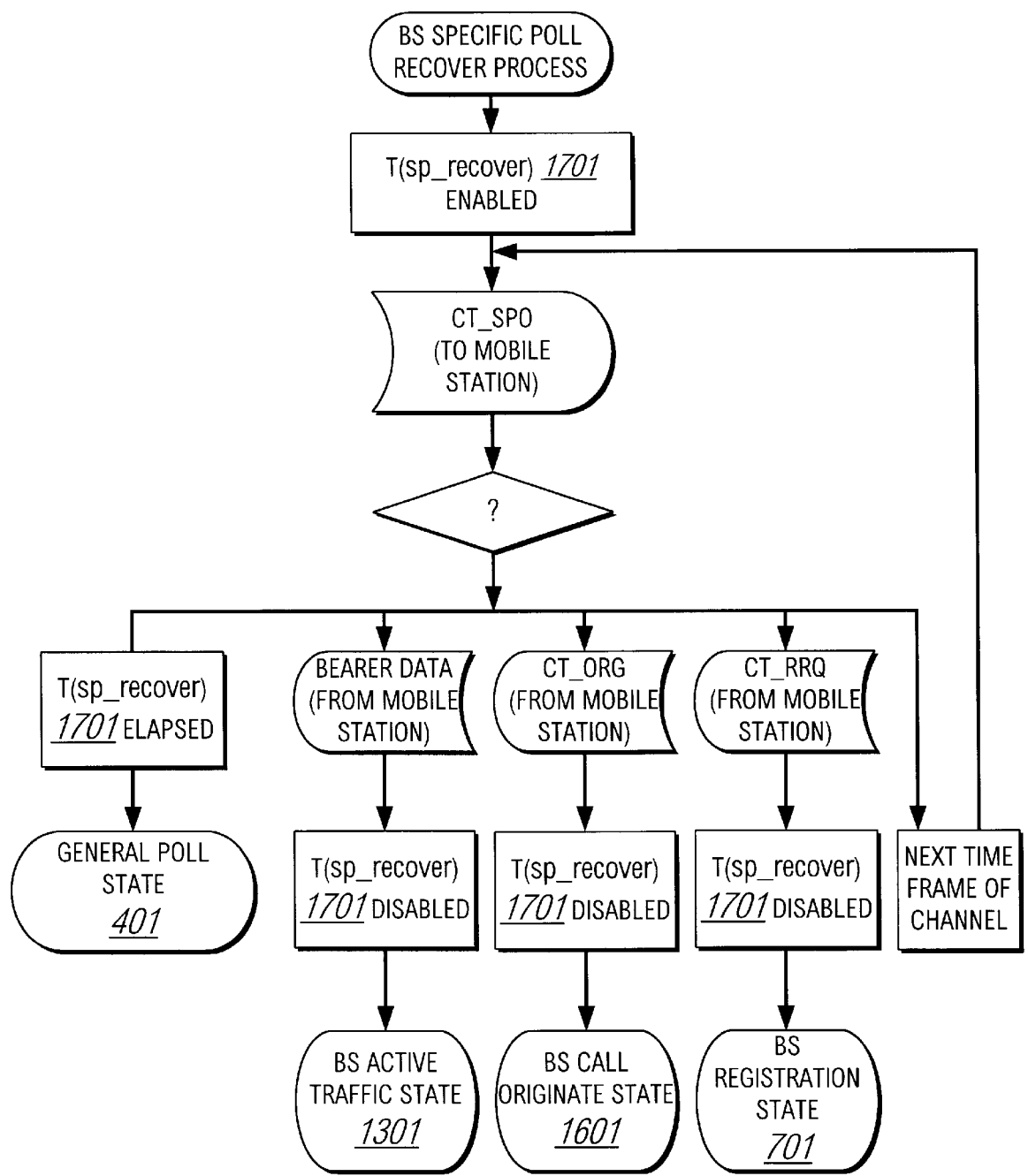
FIG. 17 is a diagram of the mobile station state processing and communication protocol for resynchronizing with a base station when the mobile station is attempting to register or place a call with the base station, or is already processing an established call with the base station.

In a preferred embodiment, the base station establishes a timer, T(b_ack) 706, for the maximum time it will wait for a CT_ACK message from the mobile station. If the base station receives the expected CT_ACK message before T(b_ack) 706 elapses, it disables T(b_ack). If, however, T(b_ack) elapses, the base station presumes it is out of sync with the mobile station, and executes a BS Specific Poll Recover process, depicted in FIG. 17.

In the BS Specific Poll Recover process, the base station transmits a CT_SPO (Specific Poll) message for the mobile station in each time frame of the channel, to provide the mobile station a message to resynchronize (resync) to. If the base station now receives a CT_RRQ (Registration Request) message from the mobile station, it remains in the BS Registration state 702 and begins the Registration protocol processing anew, transmitting a CT_ACK message to the mobile station in response to the mobile station's latest CT_RRQ message. This latest CT_RRQ message is both a request to register and an indication that the mobile station has resynced with the base station.

If the BS Specific Poll Recover process is executed in the BS Registration state 701 because T(b_ack) 706 elapsed, the base station has already received a Register_Response message from the system controller 103, in response to the mobile station's previous CT_RRQ message. Thus, if the base station resyncs with the mobile station at this time, and begins the Registration protocol sequence anew, once it transmits the CT_ACK message to the mobile station, it then transmits a CT_RCP (Registration Complete) message to the mobile station, in the next time frame of the channel, corresponding to the Register_Response message already received. The base station then resumes the normal Registration protocol sequence processing, waiting for a CT_ACK message response from the mobile station.

In a preferred embodiment, the base station enables a timer, T(sp_recover) 1701, for the maximum time it will transmit CT_SPO (Specific Poll) messages for the mobile station in the channel, one per time frame, and wait for a CT_RRQ message in return. If the base station receives a CT_RRQ message before T(sp_recover) 1701 elapses, it disables T(sp_recover). If, however, T(sp_recover) elapses, the base station redesignates the dedicated channel as non-dedicated, and transitions to the General Poll state 401 for the now non-dedicated channel.

In a preferred embodiment in the MS Registration state 702, the mobile station establishes a timer, T(reg) 704, for the maximum time it will wait for a CT_RCP (Registration Complete) message from the base station. If the mobile station receives a CT_RCP message before T(reg) 704 elapses, it disables T(reg). If, however, T(reg) elapses, the mobile station transitions to the Non-Registered Idle state 901. In a preferred embodiment, the mobile station posts a Service Unavailable/Network Not Responding indication 710 to its user interface, prior to transitioning to the Non-Registered Idle state 901.

In a preferred embodiment in the MS Registration state 702, as depicted in FIG. 7B, while the mobile station waits for a CT_RCP (Registration Complete) message, it transmits a CT_HLD (Hold) message to the base station in the user portion 205 of each time frame of the dedicated channel in which it has no other message to send to the base station. The base station, in its turn, while in the BS Registration state 701, waiting for a Register_Response message from the backhaul interface, transmits a CT_HLD message to the mobile station in the base portion 206 of each time frame of the dedicated channel in which it has no other message to send to the mobile station.

In a preferred embodiment, while the mobile station is in the MS Registration state 702, transmitting and receiving CT_HLD messages on the O-Interface, it establishes a timer, T(T01) 707, for the maximum time it will wait for a CT_HLD message. The mobile station re-establishes T(T01) 707 each time it receives an expected CT_HLD message, and disables T(T01) when it receives a CT_RCP message from the base station. If T(T01) elapses, the mobile station presumes it is out of sync with the base station, and executes the MS Resync process, described above, and depicted in FIG. 10A.

In a preferred embodiment, while the base station is in the BS Registration state 701 for a dedicated channel, transmitting and receiving CT_HLD messages on the O-Interface, it establishes a timer, T(T00) 705, for the maximum time it will wait for a CT_HLD message. The base station re-establishes T(T00) 705 each time it receives an expected CT_HLD message, and disables T(T00) when it receives a Register_Response message on the backhaul interface. If T(T00) elapses, the base station presumes it is out of sync with the mobile station, and executes the BS Specific Poll Recover process, described above, and depicted in FIG. 17.

While executing the BS Specific Poll Recover process at this time, the base station may, or may not, receive a Register_Response message on the backhaul interface. If the base station does not receive a Register_Response message at this time, and successfully resyncs with the mobile station, it begins processing from the start of the BS Registration state 701, transmitting a CT_ACK message response to the mobile station's latest CT_RRQ (Registration Request) message. This latest CT_RRQ is both a registration request and an indication that the mobile station has resynced with the base station.

If, however, the base station does receive a Register_Response message while executing the BS Specific Poll Recover process at this time, and it successfully resyncs with the mobile station, it transmits a CT_ACK message in response to the mobile station's latest CT_RRQ message. Then, in the next time frame of the channel, the base station transmits a CT_RCP (Registration Complete) message to the mobile station, corresponding to the Register_Response message. The base station then continues the normal Registration protocol sequence, waiting for a CT_ACK message response from the mobile station.

While the mobile station is in the MS Registration state 702, it may receive an unexpected or erroneous message (previously described) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, and continues processing in the MS Registration state 702 from that point. If, however, any Leaky-Bucket counter indicates a maximum error count, the mobile station executes the MS Resync process, described above, and depicted in FIG. 10A.

While in the BS Registration state 701 for a dedicated channel, the base station may also receive an unexpected or erroneous message (previously described) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, and continues processing in the BS Registration state 702 from that point. If, however, any LeakyBucket counter indicates a maximum error count, the mobile station executes the BS Specific Poll Recover process, described above, and depicted in FIG. 17.

While executing the BS Specific Poll Recover process at this time, the base station may, or may not, receive a Register_Response message on the backhaul interface. If the base station does not receive a Register_Response message at this time, and successfully resyncs with the mobile station, it begins processing from the start of the BS Registration state 701, transmitting a CT_ACK message response to the mobile station's latest CT_RRQ (Registration Request) message. This latest CT_RRQ is both a registration request and an indication that the mobile station has resynced with the base station.

If, however, the base station does receive a Register_Response message while executing the BS Specific Poll Recover process at this time, and it successfully resyncs with the mobile station, it transmits a CT_ACK message in response to the mobile station's latest CT_RRQ message. Then, in the next time frame of the channel, the base station transmits a CT_RCP (Registration Complete) message to the mobile station, corresponding to the Register$_{13}$ Response message. The base station then continues the normal Registration protocol sequence, waiting for a CT_ACK message response from the mobile station.

As previously described, once a mobile station successfully registers with a base station, it transitions to the Registered Idle state 801, depicted in FIG. 8. In the Registered Idle state 801, the mobile station establishes a timer, T(reg_poll) 803, for the periodic time, from transitioning to the Registered Idle state 801, that the mobile station will wait before re-registering with a base station. When T(reg_poll) 803 elapses, the mobile station first transitions to the MS Acquisition state 402, to process acquiring a channel on a base station, and then, if successful, transitions to the MS Registration state 702, to process the Registration protocol sequence.

In a preferred embodiment, in the Registered Idle state 801, the mobile station also establishes a timer, T(ms_poll) 802, for the periodic time, from transitioning to the Registered Idle state 801, that the mobile station will wait before checking to see if the communication system 101 is paging it, for a call; the Paging protocol sequence is discussed below and depicted in FIG. 11. When T(ms_poll) 802 elapses, the mobile station transitions to the MS Poll state 1102, where it checks whether a base station is sending it a CT_PPO (Paging Poll) message, indicating it is being paged.

While in the Registered Idle state 801, the mobile station may also receive a Call Originate indication 804 on its user interface, indicating its end user wishes to place a call on the communication system 101. Upon receiving a Call Originate indication 804, the mobile station first transitions to the MS Acquisition state 402, to process acquiring a channel on a base station. Then, if successful, the mobile station transitions to the MS Call Originate state 1602, depicted in FIG. 16A, where it processes the Call Originate protocol sequence for establishing a call link on the communication system 101.

In the Non-Registered Idle state 901, depicted in FIG. 9, the mobile station may also receive a Call Originate indication 804 on its user interface, indicating its end user wishes to place a call on the communication system 101. In a preferred embodiment, if it is an emergency call, i.e., a 911 call, the mobile station first transitions to the MS Acquisition state 402, to process acquiring a channel on a base station, and then, if successful, transitions to the MS Call Originate state 1602, depicted in FIG. 16A. If the call is not an emergency call, however, the mobile station remains in the Non-Registered Idle state 901. In a preferred embodiment, upon receiving a non-emergency call indication on its user interface at this time, the mobile station posts a Service Unavailable/Not Registered indication 902 on its user interface.

While in the Non-Registered Idle state 901, the mobile station may also receive a Cold Restart indication 903 on its user interface, indicating that the mobile station should attempt to re-register with a base station. Upon receiving this Cold Restart indication 903, the mobile station first transitions to the MS Acquisition state 402, to process acquiring a channel on a base station. Then, if successful, it transitions to the MS Registration state 702, to process the Registration protocol sequence.

Figure 11:
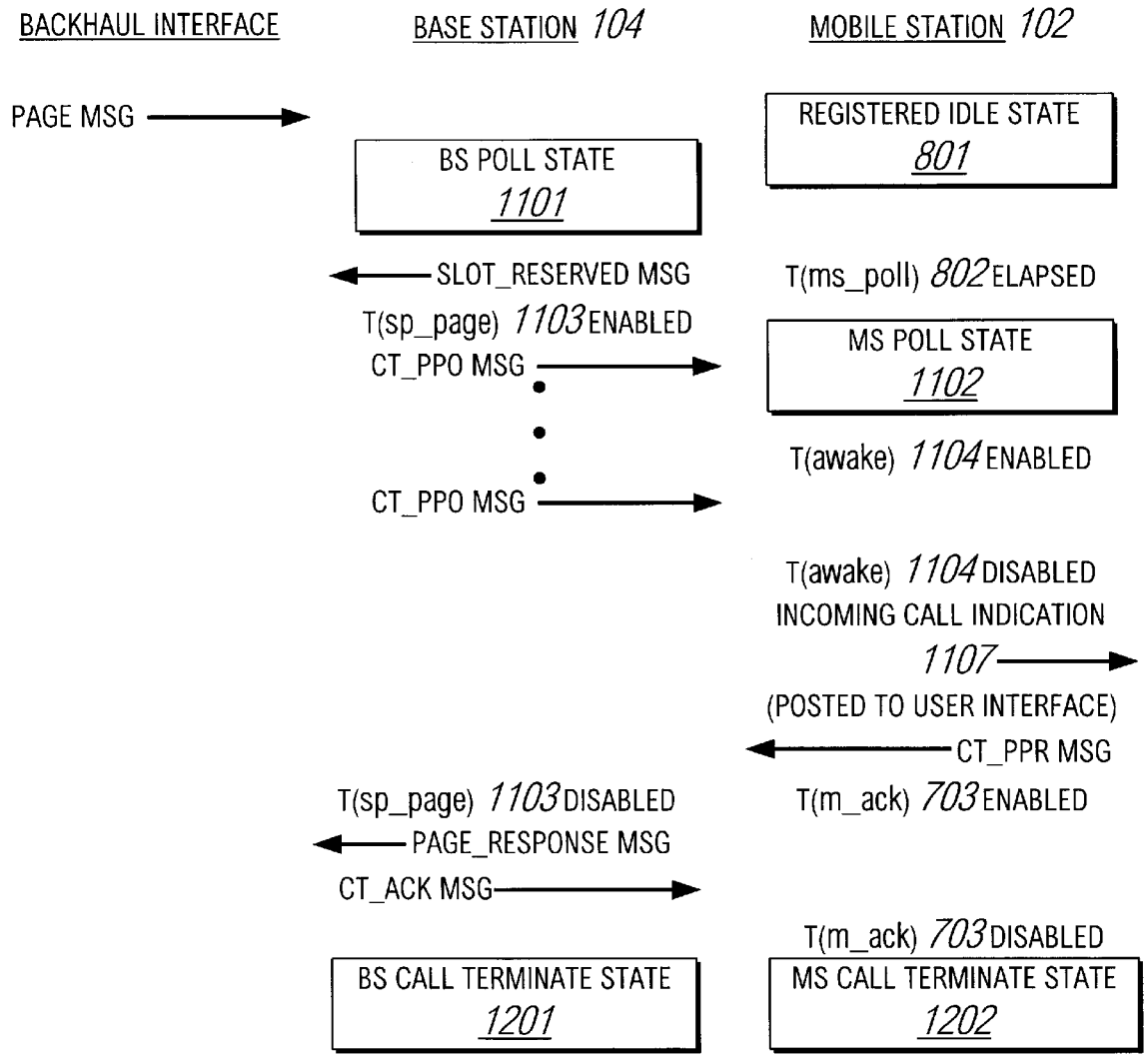
FIG. 11 is a diagram of a base station and a mobile station state processing and communication protocol for the paging of the mobile station for a call on the communication system.

A Paging protocol sequence, depicted in FIG. 11, is utilized by the communication system 101 when one mobile station wishes to place a call with another, or, alternatively, when the communication system 101 itself wishes to establish a call link with a mobile station. The base station transitions to the BS Poll state 1101 when it receives a Page message on the backhaul interface, indicating that the communication system 101 wishes to establish a call link with a designated mobile station. In the BS Poll state 1101, the base station dedicates a non-dedicated channel for the mobile station to be paged. The base station transmits a CT_PPO (Paging Poll) message for the mobile station in each time frame of the now dedicated channel, in effect, paging the mobile station, and waits for a CT_PPR (Paging Poll Response) message from the mobile station.

In a normal Paging protocol sequence, the designated mobile station responds to a CT_PPO message by transmitting a CT_PPR message to the base station. When the base station receives this CT_PPR message, it transmits a Page_Response message on the backhaul interface, indicating to the system controller 103 that the mobile station responded to the page. In a preferred embodiment, the base station also transmits a CT_ACK message to the mobile station, acknowledging the mobile station's CT_PPR message. The base station then transitions to the BS Call Terminate state 1201 for the dedicated channel, depicted in FIG. 12A.

In a preferred embodiment, while in the BS Poll state 1101 for a dedicated channel, the base station establishes a timer, T(sp_page) 1103, for the maximum time it will continue transmitting CT_PPO (Paging Poll) messages for the mobile station and waiting for a CT_PPR (Paging Poll Response) message in return. If the base station receives the expected CT_PPR message before T(sp_page) 1103 elapses, it disables T(sp_page). If, however, T(sp_page) elapses, the base station redesignates the dedicated channel as non-dedicated, and transitions to the General Poll state 401 for the now non-dedicated channel.

As previously described, once a mobile station transitions to the Registered Idle state 801, it periodically transitions to the MS Poll state 1102, as depicted in FIG. 8. In the MS Poll state 1102, depicted in FIG. 11, the mobile station polls the O-Interface to see if there is a CT_PPO (Paging Poll) message being transmitted to it. If the mobile station receives a CT_PPO message for it, it transmits a CT_PPR (Paging Poll Response) message to the base station. In a preferred embodiment, the mobile station posts an Incoming Call indication 1107 to its user interface and waits for a CT_ACK message response from the base station. When the mobile station receives this CT_ACK message, it transitions to the MS Call Terminate state 1202, depicted in FIG. 12A.

In a preferred embodiment, the mobile station establishes a timer, T(awake) 1104, for the maximum time it will continue to process in the MS Poll state 1102, polling for a CT_PPO message for it. If the mobile station receives a CT_PPO message for it before T(awake) 1104 elapses, it disables T(awake). If, however, T(awake) 1104 elapses, the mobile station transitions to the Registered Idle state 801.

Also in a preferred embodiment, the mobile station establishes a timer, T(m_ack) 703, for the maximum time it will wait for the expected CT_ACK message from the base station. If the mobile station receives a CT_ACK message before T(m_ack) 703 elapses, it disables T(m_ack), and, as previously discussed, transitions to the MS Call Terminate state 1202. If, however, T(m_ack) elapses, the mobile station executes a Lost Link Drop process, depicted in FIG. 10B.

In the Lost Link Drop process, the mobile station checks whether the base station is transmitting a CT_SPO (Specific Poll) message for it, which it users to resync to the base station with. If the mobile station receives a CT_SPO message for it at this time, it transitions to the Registered Idle state 801. In a preferred embodiment, the mobile station posts a Call Dropped indication 1106 to its user interface, prior to transitioning to the Registered Idle state 801. From the mobile station's perspective, the Paging protocol sequence is terminated at this time.

In a preferred embodiment, the mobile station enables a timer, T(resync) 1001, for the maximum time it will execute the Lost Link Drop process, checking whether the base station is transmitting it a CT_SPO message. If the mobile station receives a CT_SPO message for it before T(resync) 1001 elapses, it disables T(resync). If, however, T(resync) elapses, the mobile station determines that its service has been interrupted with the base station, and executes the MS Recover process, previously discussed in regards to the Registration protocol sequence, and depicted in FIG. 18. In a preferred embodiment in the MS Recover process during the Paging protocol sequence, the mobile station posts a Service Interrupted indication 1803 to its user interface, if its database indicates there is at least one untried base station candidate it may yet attempt to acquire a channel on, prior to transitioning to the MS Acquisition state 402.

Once the mobile station executes the MS Recover process while in the MS Poll state 1102, the Paging protocol sequence is terminated. From this point on, the mobile station attempts to acquire a channel on a base station which it can then use to register with the new base station. In essence, the mobile station now processes as if it has powered on, and must register with a base station, as previously described.

While the mobile station is in the MS Poll state 1102, it may receive an unexpected or erroneous message (previously described) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, in this case, the CT_PPR (Paging Poll Response) message, and continues to wait for a CT_ACK message response from the base station. If, however, any LeakyBucket counter indicates a maximum error count, the mobile station executes the Lost Link Drop process, previously described, and depicted in FIG. 10B.

Figures 1, 12A:
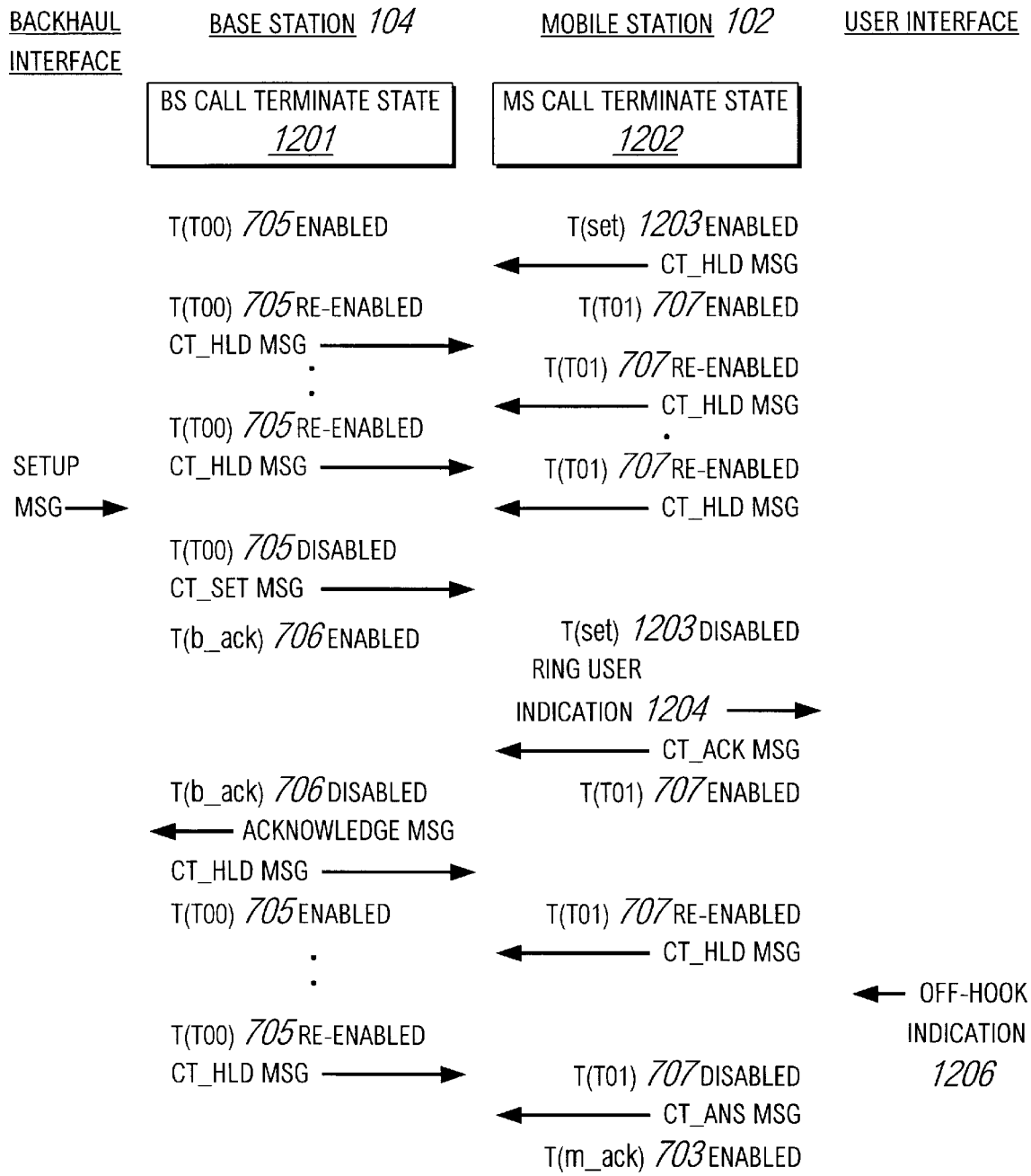
FIG. 12A is a diagram of a base station and a mobile station state processing and communication protocol for establishing a call link for the mobile station being called by another on the system.
Figures 2, 12A:
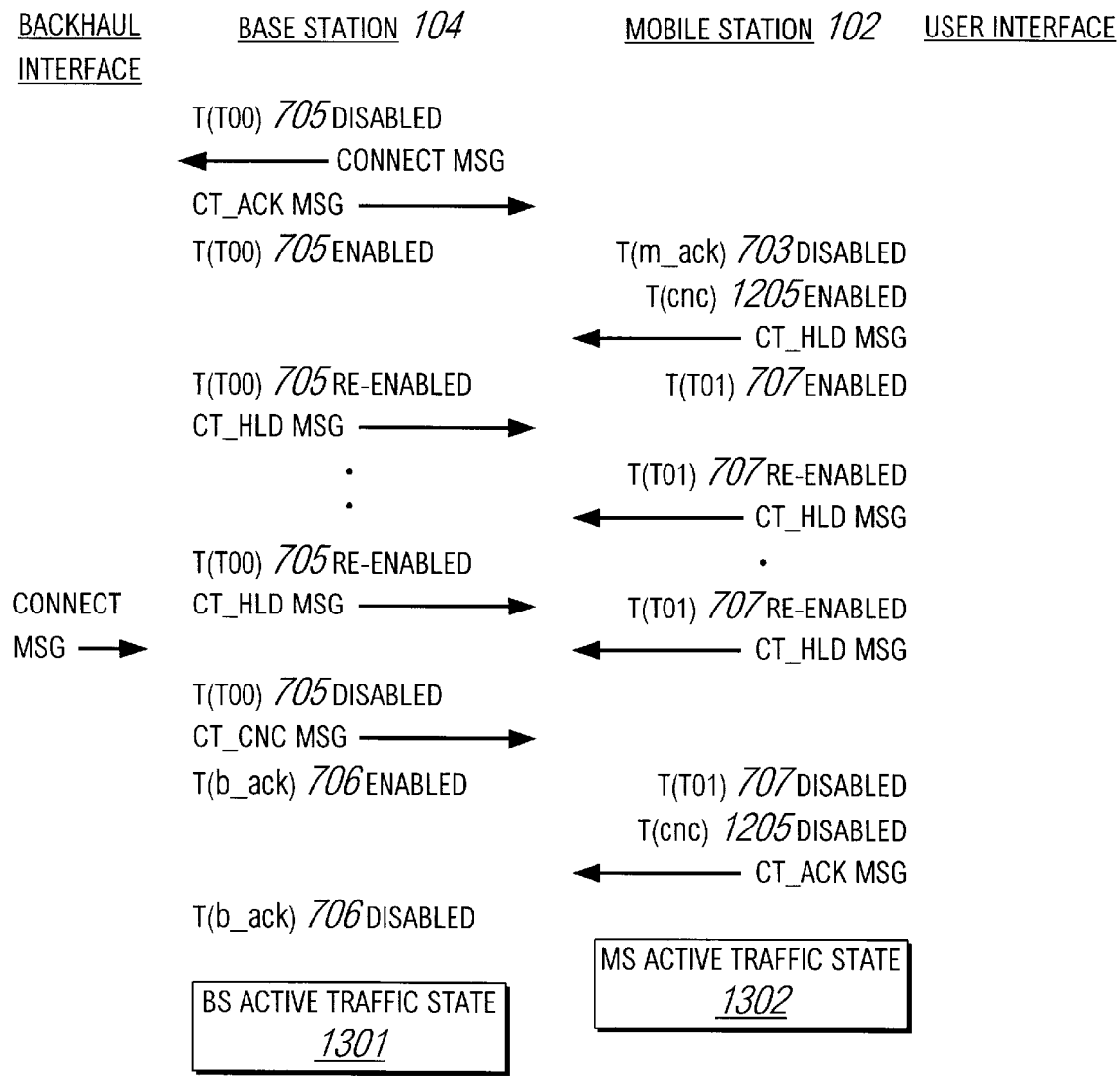

As previously described, once the base station successfully pages a mobile station, it transitions to the BS Call Terminate state 1201 for the dedicated channel, to process the Call Terminate protocol sequence for establishing a call link with the mobile station on the communication system 101. As depicted in FIG. 12A, in a normal Call Terminate protocol sequence, the base station receives a Setup message on the backhaul interface, in response to the Page_Response message it transmitted during the Paging protocol sequence, depicted in FIG. 11. The Setup message indicates that the communication system 101 is attempting to establish a call link between two, or more, mobile stations. The base station, on receiving this Setup message, transmits a CT_SET (Set) message to the mobile station, indicating that the mobile station should change the characteristics of its O-Interface service. The CT_SET message sent to the mobile station at this time also indicates that the mobile station should now ring its end user to pick up the phone. In a preferred embodiment, the base station then waits for a CT_ACK message response from the mobile station, indicating that the mobile station received the CT_SET message and is ringing its end user.

A mobile station processing the Call Terminate protocol sequence, for its part, once it transitions to the MS Call Terminate state 1202, waits for a CT_SET message from the base station. As depicted in FIG. 12A, in a preferred embodiment, the mobile station establishes a timer, T(set) 1203, for the maximum time it will wait for a CT_SET message. If the mobile station receives the expected CT_SET message before T(set) 1203 elapses, it disables T(set) and posts a Ring User indication 1204 on its user interface, to ring its end user, to notify him/her there is a call for them. The mobile station then waits for an Off-Hook indication 1206 from its user interface, indicating its end user picked up (i.e., answered) the phone. In a preferred embodiment, the mobile station also transmits a CT_ACK message to the base station, acknowledging the CT_SET message.

If T(set) 1203 elapses, the mobile station transitions to the Registered Idle state 801. In a preferred embodiment, the mobile station posts a Call Dropped indication 1106 to its user interface, prior to transitioning to the Registered Idle state 801.

As previously discussed, in a preferred embodiment, the mobile station transmits a CT_ACK message to the base station in response to the CT_SET message. For its part, when the base station receives this CT_ACK message, it transmits an Acknowledge message on the backhaul interface to the system controller 103, indicating that the mobile station received the CT_SET message and is ringing its end user. The base station then waits for a CT_ANS (Answer) message from the mobile station, indicating the mobile station's end user answered the phone.

Figure 12B:
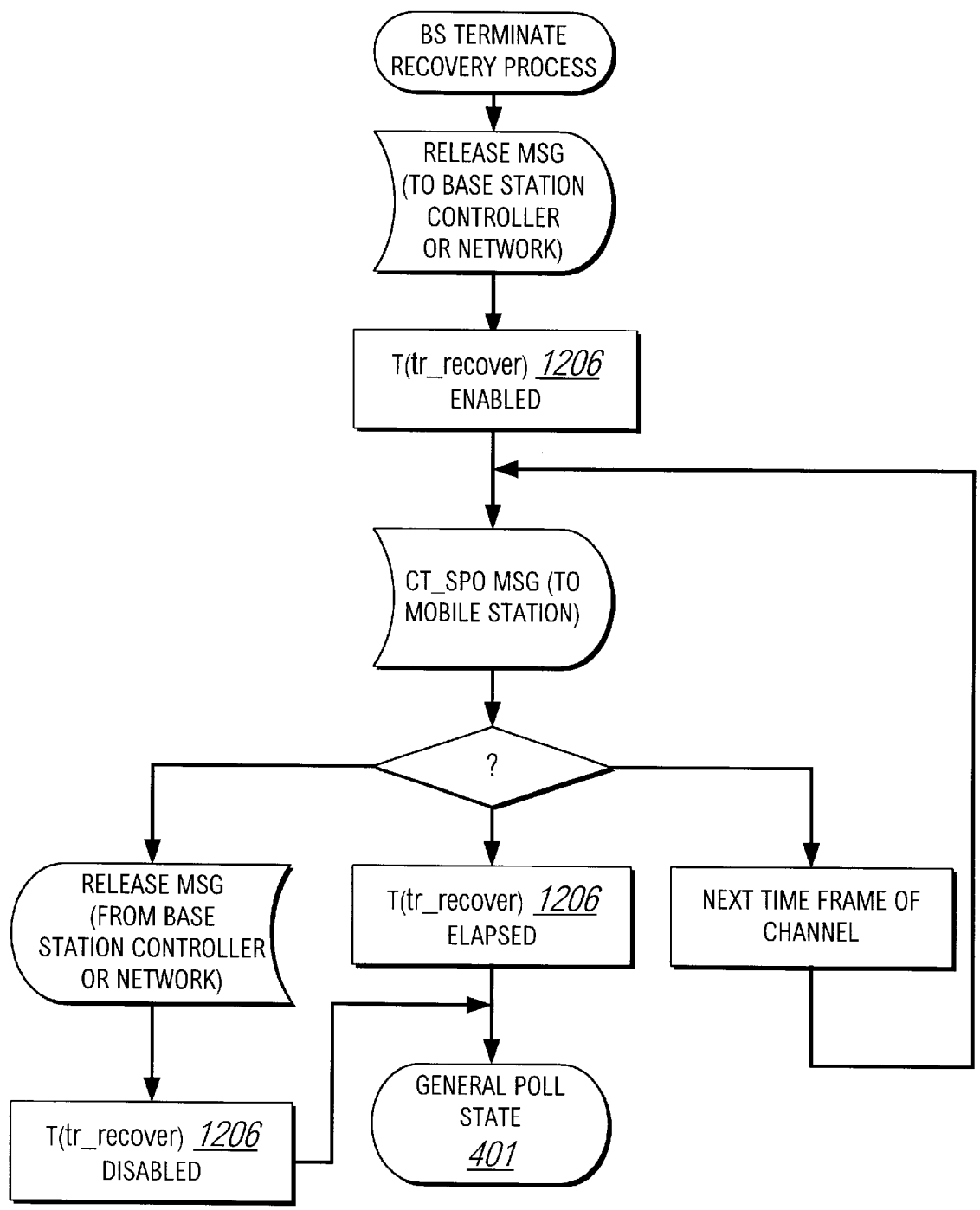
FIG. 12B is a diagram of a base station protocol processing when it loses synchronization with the mobile station it is attempting to establish a call link on the communication system for, for a call initiated by another on the system.

In a preferred embodiment, the base station establishes a timer, T(b_ack) 706, for the maximum time it will wait for a CT_ACK message from the mobile station. If the base station receives the expected CT_ACK message before T(b_ack) 706 elapses, it disables T(b_ack). If, however, T(b_ack) elapses, the base station presumes it is out of sync with the mobile station, and executes a BS Terminate Recovery process, depicted in FIG. 12B.

In the BS Terminate Recovery process, the base station transmits a Release message on the backhaul interface to the system controller 103, indicating it is releasing the dedicated channel, and, thus, ending the Call Terminate protocol sequence for the mobile station. The base station, also at this time, transmits a CT_SPO (Specific Poll) message for the mobile station in each time frame of the channel, to provide the mobile station a message to resync to it with. The base station establishes a timer, T(tr_recover) 1206, for the maximum time it will transmit CT_SPO messages for the mobile station in the channel, one per time frame. When T(tr_recover) 1206 elapses, the base station redesignates the dedicated channel as non-dedicated, and transitions to the General Poll state 401 for the now non-dedicated channel.

While executing the BS Terminate Recovery process in the BS Call Terminate state 1201, the base station may receive a Release message on the backhaul interface, indicating that the system controller 103 wishes the designated call link be terminated. Upon receiving a Release message at this time, the base station redesignates the dedicated channel as non-dedicated, disables T(tr_recover) 1206, and transitions to the General Poll state 401 for the now non-dedicated channel.

In a normal Call Terminate protocol sequence, once the mobile station receives an Off-Hook indication 1206 on its user interface, it transmits a CT_ANS (Answer message) to the base station. Upon receiving the CT_ANS message, the base station transmits a Connect message to the system controller 103. Both the CT_ANS message and the Connect message indicate that the mobile station end user answered the call. In a preferred embodiment, upon receiving the CT_ANS message, the base station transmits a CT_ACK message to the mobile station, acknowledging the CT_ANS message. The base station then begins to wait for a Connect message from the system controller 103, indicating the call link has been established on the communication system 101.

In a preferred embodiment, the mobile station, upon transmitting the CT_ANS message to the base station, establishes a timer, T(m_ack) 703, for the maximum time it will wait for a CT_ACK message response from the base station. If the mobile station receives the expected CT_ACK message before T(m_ack) 703 elapses, it disables T(m_ack), and then waits for a CT_CNC (Connection Complete) message from the base station, indicating the call link has been established on the communication system 101. If, however, T(m_ack) elapses, the mobile station presumes it is out of sync with the base station, and executes the Lost Link Drop process, depicted in FIG. 10B. In the Lost Link Drop process, as previously described in regards to the Paging protocol sequence, the mobile station checks whether the base station is transmitting it a CT_SPO (Specific Poll) message, which it uses to resync to the base station with. If the mobile station receives a CT_SPO message for it at this time, it transitions to the Registered Idle state 801. In a preferred embodiment, the mobile station posts a Call Dropped indication 1106 to its user interface, prior to transitioning to the Registered Idle state 801. From the mobile station's perspective, the Call Terminate protocol sequence is now terminated.

Figure 10A:
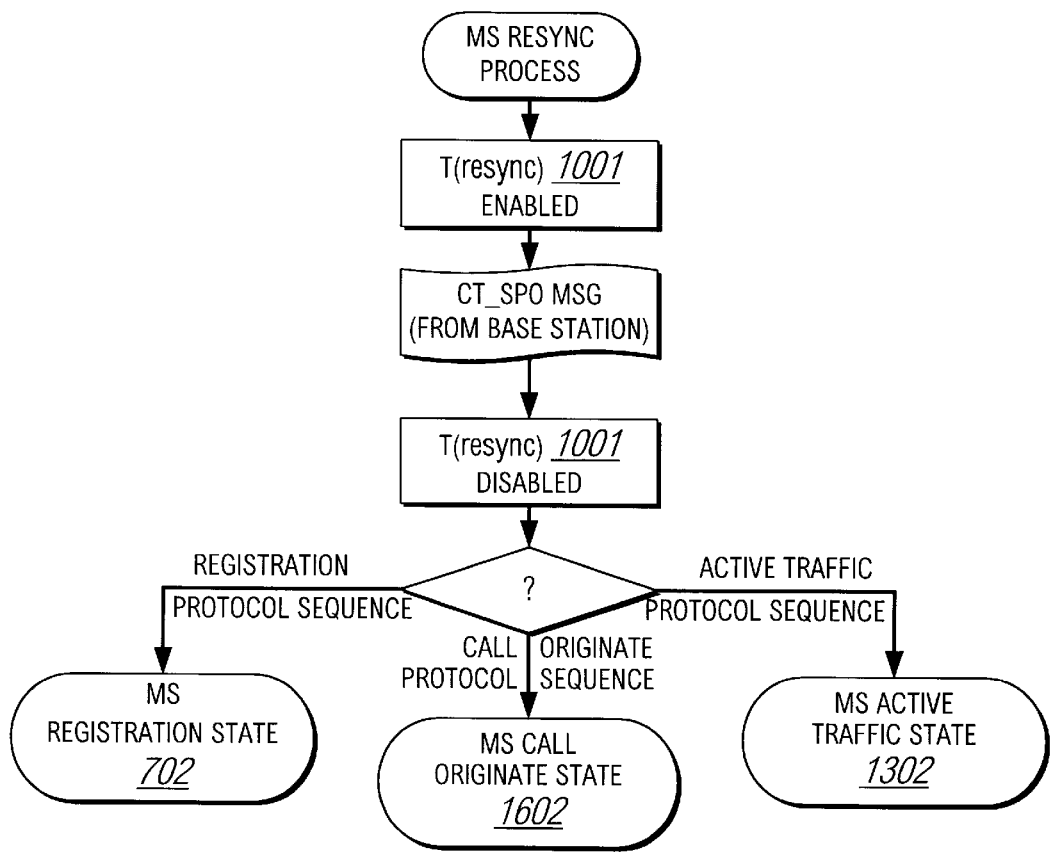
FIG. 10A is a diagram of a mobile station protocol processing for the successful resynchronization of the mobile station to the base station, where the mobile station then continues another protocol sequence with the base station.
Figure 10B:
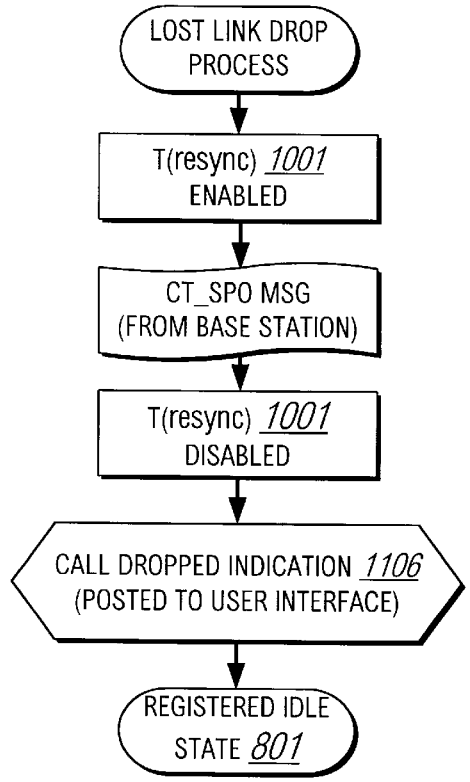
FIG. 10B is a diagram of a mobile station protocol processing for the successful resynchronization of the mobile station to the base station, where the mobile station then terminates any other protocol sequence with the base station.

In a preferred embodiment, as seen in FIG. 10B, the mobile station enables a timer, T(resync) 1001, for the maximum time it will execute the Lost Link Drop process, checking whether the base station is transmitting it a CT_SPO message. If the mobile station receives a CT_SPO message for it before T(resync) 1001 elapses, it disables T(resync). If, however, T(resync) elapses, the mobile station determines that its service has been interrupted with the base station, and executes the MS Recover process, previously described in regards to the Registration protocol sequence, and depicted in FIG. 18. In a preferred embodiment in the MS Recover process during the Call Terminate protocol sequence, the mobile station posts a Service Interrupted indication 1803 to its user interface, if its database indicates there is at least one untried base station candidate it may yet attempt to acquire a channel on, prior to transitioning to the MS Acquisition state 402.

Once the mobile station executes the MS Recover process while in the MS Terminate state 1202, the Call Terminate protocol sequence is terminated. From this point on, the mobile station attempts to acquire a channel on a base station which it can then use to register with the new base station. In essence, the mobile station now processes as if it has powered on and must register with a base station, as previously described.

In a preferred embodiment in the normal Call Terminate protocol sequence, once the mobile station receives the expected CT_ACK message, it establishes a timer, T(cnc) 1205, for the maximum time it will wait for a CT_CNC message from the base station. If the mobile station receives a CT_CNC message before T(cnc) 1205 elapses, it disables T(cnc), and transitions to the MS Active Traffic state 1302, where it processes the Active Traffic protocol sequence. In a preferred embodiment, the mobile station transmits a CT_ACK message to the base station, prior to transitioning to the MS Active Traffic state 1302, acknowledging the CT_CNC message.

If, however, T(cnc) 1205 elapses, the mobile station transitions to the Registered Idle state 801. In a preferred embodiment, the mobile station posts a Call Dropped indication 1106 to its user interface, prior to transitioning to the Registered Idle state 801.

Once a call link has been established on the communication system 101, the base station is sent a Connect message on the backhaul interface. In response to this Connect message, the base station transmits a CT_CNC (Connection Complete) message to the mobile station, indicating that a call link has been established, and actual bearer data may now be transmitted (i.e., the end user of the mobile station may now communicate with another on the communication system 101). In a preferred embodiment, the base station then waits for a CT_ACK message response from the mobile station. When the base station receives this CT_ACK message, it transitions to the BS Active Traffic state 1301 for the dedicated channel, where it processes the Active Traffic protocol sequence.

In a preferred embodiment, the base station establishes a timer, T(b_ack) 706, for the maximum time it will wait for a CT_ACK message from the mobile station. The base station disables T(b_ack) 706 if it receives the expected CT_ACK message. If T(b_ack) elapses, however, the base station presumes it is out of sync with the mobile station, and executes the BS Terminate Recovery process, previously discussed, and depicted in FIG. 12B.

As depicted in FIG. 12A, in a preferred embodiment in the BS Call Terminate state 1201, while waiting for a Setup message and a Connect message on the backhaul interface and a CT_ANS (Answer) message from the mobile station, the base station transmits a CT_HLD (Hold) message to the mobile station in each time frame of the dedicated channel in which it has no other message to transmit to the mobile station. The mobile station, for its part, while in the MS Call Terminate state 1202 waiting for a CT_SET (Set) message and a CT_CNC (Connection Complete) message from the base station and an Off-Hook indication 1206 on its user interface, transmits a CT_HLD message to the base station in each time frame of the dedicated channel in which it has no other message to transmit to the base station.

In a preferred embodiment, while the base station is in the BS Call Terminate state 1201, transmitting and receiving CT_HLD messages on the O-Interface, it establishes a timer, T(T00) 705, for the maximum time it will wait for a CT_HLD message. The base station re-establishes T(T00) 705 each time it receives an expected CT_HLD message, and disables T(T00) when it receives the Setup message, the CT_ANS message, and the Connect message, respectively. If T(T00) elapses, the base station presumes it is out of sync with the mobile station, and executes the BS Terminate Recovery process, previously discussed, and depicted in FIG. 12B.

In a preferred embodiment, while the mobile station is in the MS Call Terminate state 1202, transmitting and receiving CT_HLD messages on the O-Interface, it establishes a timer, T(T01) 707, for the maximum time it will wait for a CT_HLD message. The mobile station re-establishes T(T01) 707 each time it receives an expected CT_HLD message, and disables T(T01) when it receives the CT_SET message, the Off-Hook indication 1206, and the CT_CNC message, respectively. If T(T01) elapses, the mobile station presumes it is out of sync with the base station, and executes the Lost Link Drop process, previously described for the MS Call Terminate state 1202, and depicted in FIG. 10B.

While processing in the BS Call Terminate state 1201 for a dedicated channel, the base station may receive an unexpected or erroneous message (previously defined) on the O-Interface. In a preferred embodiment, if the base station receives either an unexpected or erroneous message at this time, it executes a Leaky Bucket process, as previously described. If no LeakyBucket counter indicates a maximum error count has been reached, the base station re-transmits the last message it transmitted to the mobile station, and continues processing the normal Call Terminate protocol sequence from that point. If, however, any LeakyBucket counter indicates a maximum error count, the base station executes the BS Terminate Recovery process, previously described, and depicted in FIG. 12B.

While processing in the MS Call Terminate state 1202, the mobile station may also receive an unexpected or erroneous message (previously defined) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, and continues processing the normal Call Terminate protocol sequence from that point. If, however, any LeakyBucket counter indicates a maximum error count, the mobile station executes the Lost Link Drop process, as previously described for the MS Call Terminate state 1202, and depicted in FIG. 10B.

While in the BS Call Terminate state 1201, processing the normal Call Terminate protocol sequence, the base station may receive a Release message on the backhaul interface, indicating that the system controller 103 wishes the designated call be terminated. Upon receiving a Release message at this time, the base station transitions to the BS System Call Release state 1501, discussed below, and depicted in FIG. 15.

Figure 15:
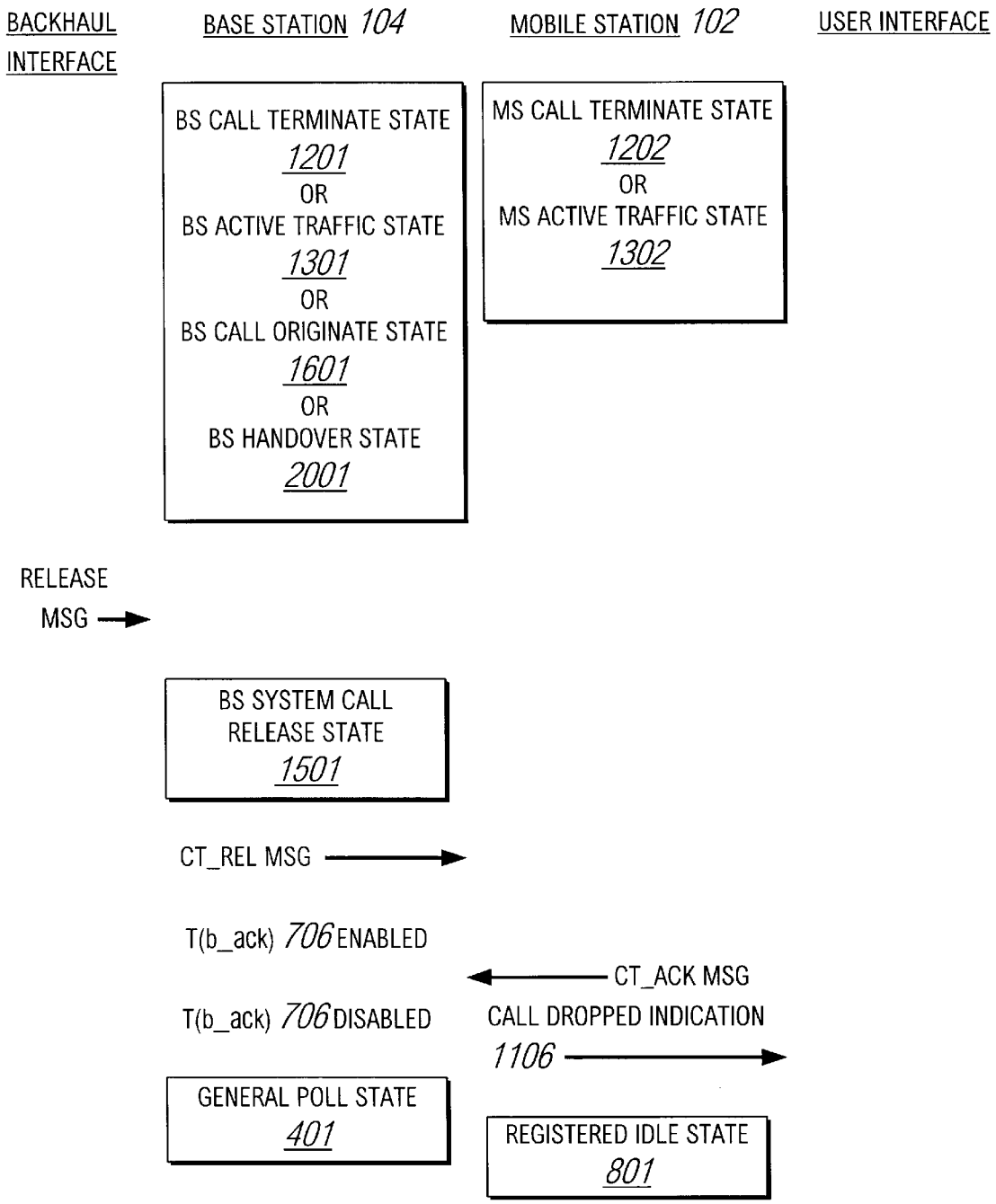
FIG. 15 is a diagram of a base station and a mobile station state processing and communication protocol when the communication system releases the mobile station's call link on the system.

While in the MS Call Terminate state 1202, the mobile station may receive a CT_REL (Release) message from the base station, indicating that the system controller 103 wishes its call be terminated. Upon receiving a CT_REL message at this time, the mobile station transitions to the Registered Idle state 801, as depicted in FIG. 15. In a preferred embodiment, the mobile station transmits a CT_ACK message to the base station, acknowledging the CT_REL message, and posts a Call Dropped indication 1106 on its user interface, prior to transitioning to the Registered Idle state 801.

Figure 14:
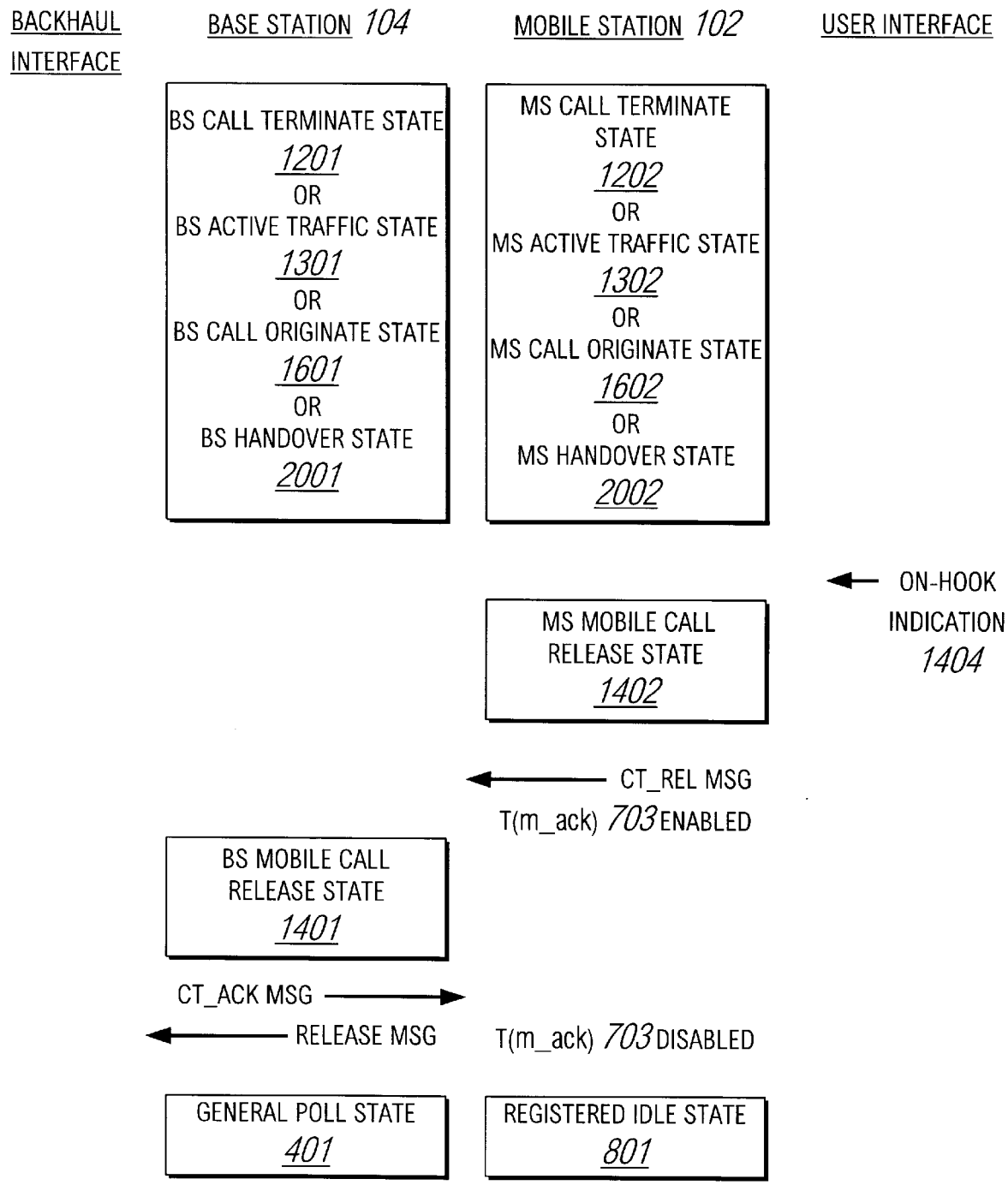
FIG. 14 is a diagram of a base station and a mobile station state processing and communication protocol when a mobile station's end user hangs up the phone.

While processing in the MS Call Terminate state 1202, the mobile station may receive an On-Hook indication 1404 on its user interface, indicating its end user terminated the call (i.e., hung up). Upon receiving an On-Hook indication 1404 at this time, the mobile station transitions to the MS Mobile Call Release state 1402, discussed below, and depicted in FIG. 14.

While processing in the BS Call Terminate state 1201, the base station may receive a CT_REL (Release) message on the O-Interface, indicating the mobile station's end user terminated the call. Upon receiving a CT_REL message at this time, the base station transitions to the BS Mobile Call Release state 1401, discussed below, and depicted in FIG. 14.

Once a call link has been established on the communication system 101, either through the Call Terminate protocol sequence, discussed above, or the Call Originate protocol sequence, discussed below, the base station transitions to the BS Active Traffic state 1301, depicted in FIG. 13A, and the mobile station transitions to the MS Active Traffic state 1302, also depicted in FIG. 13A.

In the BS Active Traffic state 1301, the base station receives bearer data in the user portion 205 of the time frames of the dedicated channel, from the mobile station, which it then transmits on the backhaul interface to the system controller 103. Also, in the BS Active Traffic state 1301, the base station receives bearer data on the backhaul interface, which it then transmits on the O-Interface to the mobile station in the base portion 206 of the time frames of the dedicated channel.

In the MS Active Traffic state 1302, the mobile station accepts bearer data from its user interface, which it then transmits on the O-Interface to the base station in the user portion 205 of the time frames of the dedicated channel. Also, in the MS Active Traffic state 1302, the mobile station receives bearer traffic from the base station in the base portion 206 of the time frames of the dedicated channel, which it then posts to its user interface.

Bearer data transmitted between a base station and a mobile station is organized into sequential data packets, in order that any one data packet can be transmitted in the base or user portion of a time frame.

Throughout the following discussion of the Active Traffic protocol sequence, an "original" base station is the base station the mobile station was processing the Active Traffic protocol sequence with when it tried to find another base station, to either gather statistics on, as discussed below regarding the Look Base process, or to acquire a channel on, for a Handover protocol sequence, also as discussed below.

While processing in the BS Active Traffic state 1301, the base station may receive an unexpected or erroneous message (previously described) on the O-Interface. In a preferred embodiment, if the base station receives an unexpected or erroneous message at this time, it executes a Leaky Bucket process, as previously described. If no LeakyBucket counter indicates a maximum error count has been reached, the base station continues processing the normal Active Traffic protocol sequence from that point, transmitting and receiving the next sequential data packets on the O-Interface. If, however, any LeakyBucket counter indicates a maximum error count, the base station executes a BS Specific Poll Recover process, depicted in FIG. 17.

In the BS Specific Poll Recover process, as previously discussed regarding the BS Registration state 701, the base station transmits a CT_SPO (Specific Poll) message for the mobile station in each time frame of the dedicated channel, to provide the mobile station a message to resync to. If the base station receives a data packet from the mobile station at this time, it resumes the normal Active Traffic protocol sequence, described above, from that point.

In a preferred embodiment, the base station enables a timer, T(sp_recover) 1701, for the maximum time it will transmit CT_SPO messages for the mobile station and wait for a data packet from the mobile station. If the base station receives a data packet from the mobile station before T(sp_recover) 1701 elapses, it disables T(sp_recover). If, however, T(sp_recover) elapses, the base station redesignates the dedicated channel as non-dedicated, and transitions to the General Poll state 401 for the now non-dedicated channel.

While executing the BS Specific Poll Recover process in the BS Active Traffic state 1301, the base station may receive a Release message transmitted on the backhaul interface, indicating the system controller 103 wishes the designated call link be terminated. Upon receiving a Release message at this time, the base station redesignates the dedicated channel as non-dedicated, disables Timer(sp_recover) 1701, and then transitions to the General Poll state 401 for the now non-dedicated channel.

While executing the normal Active Traffic protocol sequence in the BS Active Traffic state 1301, the base station may also receive a Release message on the backhaul interface. In this case, the base station transitions to the BS System Call Release state 1501, discussed below, and depicted in FIG. 15.

While in the MS Active Traffic state 1302, the mobile station may receive a CT_REL (Release) message from the base station, indicating that the system controller 103 wishes its call link be terminated. Upon receiving a CT_REL message at this time, the mobile station transitions to the Registered Idle state 801, as depicted in FIG. 15. In a preferred embodiment, the mobile station transmits a CT_ACK message to the base station, acknowledging the CT_REL message, and posts a Call Dropped indication 1106 on its user interface, prior to transitioning to the Registered Idle state 801.

While processing in the MS Active Traffic state 1302, the mobile station may also receive an On-Hook indication 1404 on its user interface, indicating its end user terminated the call. Upon receiving an On-Hook indication 1404 at this time, the mobile station transitions to the MS Mobile Call Release state 1402, discussed below, and depicted in FIG. 14.

While processing in the BS Active Traffic state 1301, the base station may receive a CT_REL (Release) message on the O-Interface, indicating the mobile station's end user terminated the call. Upon receiving a CT_REL message at this time, the base station transitions to the BS Mobile Call Release state 1401, discussed below, and depicted in FIG. 14.

While processing in the MS Active Traffic state 1302, the mobile station may receive an unexpected or erroneous message (previously described) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station continues processing the normal Active Traffic protocol sequence from that point, transmitting and receiving the next sequential data packets on the O-Interface. If, however, any LeakyBucket counter indicates a maximum error count, the mobile station determines its call link with the base station has failed, and, thus, checks its database to determine if there is an untried base station candidate it can attempt to acquire a channel on. If no, the mobile station performs the MS Resync process, depicted in FIG. 10A.

In the MS Resync process, as previously described in regards to the MS Registration state 702, the mobile station checks whether the base station is transmitting it a CT_SPO (Specific Poll) message. In a preferred embodiment, while executing the MS Resync process in the MS Active Traffic state 1302, the mobile station suspends transmitting and receiving bearer data on the O-Interface. If the mobile station receives a CT_SPO message for it at this time, it transmits the next sequential data packet to be output to the base station, and resumes the normal Active Traffic protocol sequence from this point.

In a preferred embodiment, the mobile station enables a timer, T(resync) 1001, for the maximum time it will execute the MS Resync process, checking whether the base station is transmitting it a CT_SPO message. If the mobile station receives a CT_SPO message for it before T(resync) 1001 elapses, it disables T(resync). If, however, T(resync) elapses, the mobile station transitions to the Non-Registered Idle state 901. In a preferred embodiment, the mobile station posts a Service Unavailable/No Base Station indication 1804 on its user interface, prior to transitioning to the Non-Registered Idle state 901.

Figure 13A:
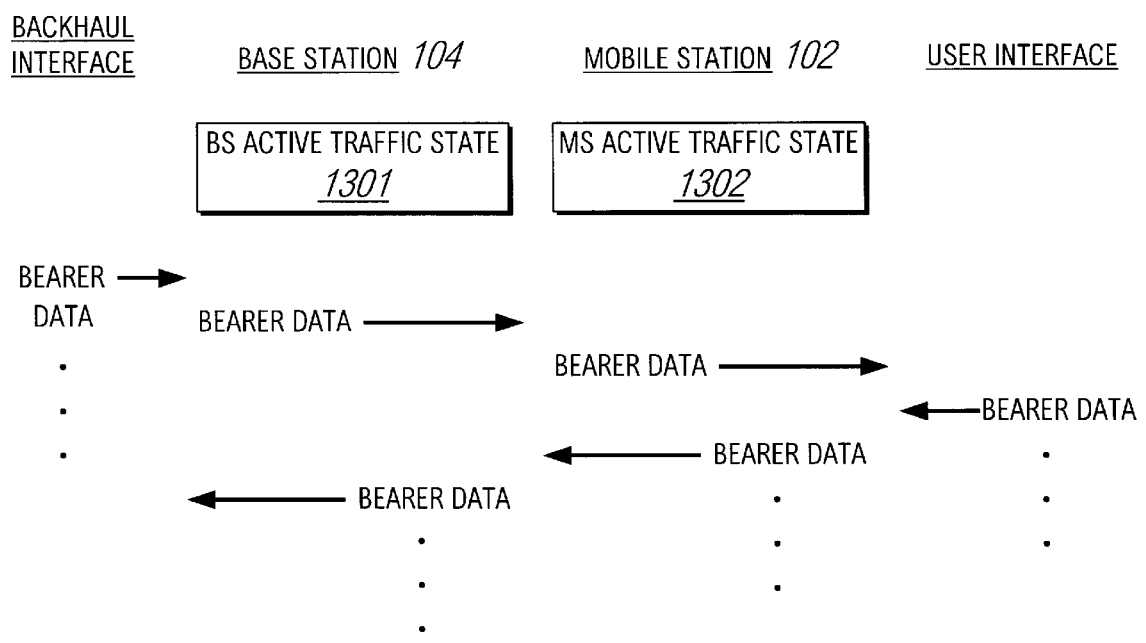
FIG. 13A is a diagram of a base station and a mobile station communication protocol for bearer data transmission.
Figure 13B:
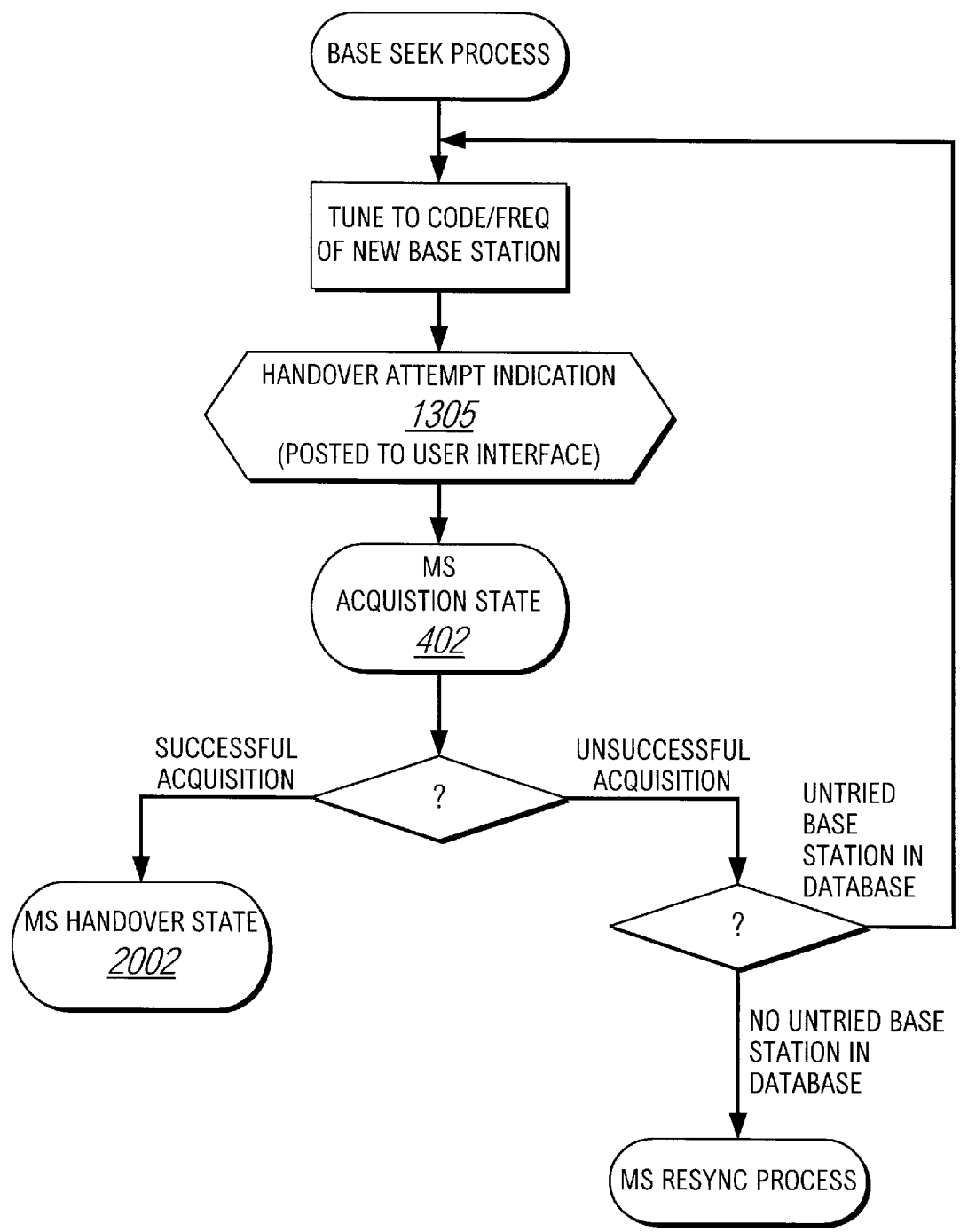
FIG. 13B is a diagram of a mobile station state processing when it determines to hand its current call over to another base station in the communication system.

If there is at least one untried base station candidate indicated in the mobile station's database that it can attempt to acquire a channel on, it executes a Base Seek process, depicted in FIG. 13B. In the Base Seek process, the mobile station tunes to the code/frequency of a new, untried base station's transmission. In a preferred embodiment, the mobile station prioritizes the base station candidates, based on their signal strength, frame error rate and channel availability, and now tunes to the untried base station candidate with the highest priority. The mobile station then transitions to the MS Acquisition state 402, to attempt to acquire a channel on this new base station, for a Handover protocol sequence. In a preferred embodiment, the mobile station posts a Handover Attempt indication 1305 on its user interface, and ceases transmitting or receiving bearer data to/from the original base station, prior to transitioning to the MS Acquisition state 402.

If the mobile station successfully acquires a channel on this new base station, it transitions to the MS Handover state 2002, discussed below, to process a Handover protocol sequence. If, however, the mobile station fails to acquire a channel on this new base station, it re-executes the Base Seek process in the MS Active Traffic state 1302, until it either successfully acquires a channel on a base station, or there are no base station candidates remaining for it to attempt an Acquisition protocol sequence with. If the mobile station acquires a channel on any new base station, as previously discussed, it transitions to the MS Handover state 2002. If, however, the mobile station fails to acquire a channel on any base station noted in its database, it executes the MS Resync process with the original base station, as previously discussed in regards to the MS Active Traffic state 1302, and depicted in FIG. 10A.

If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

Figure 19:
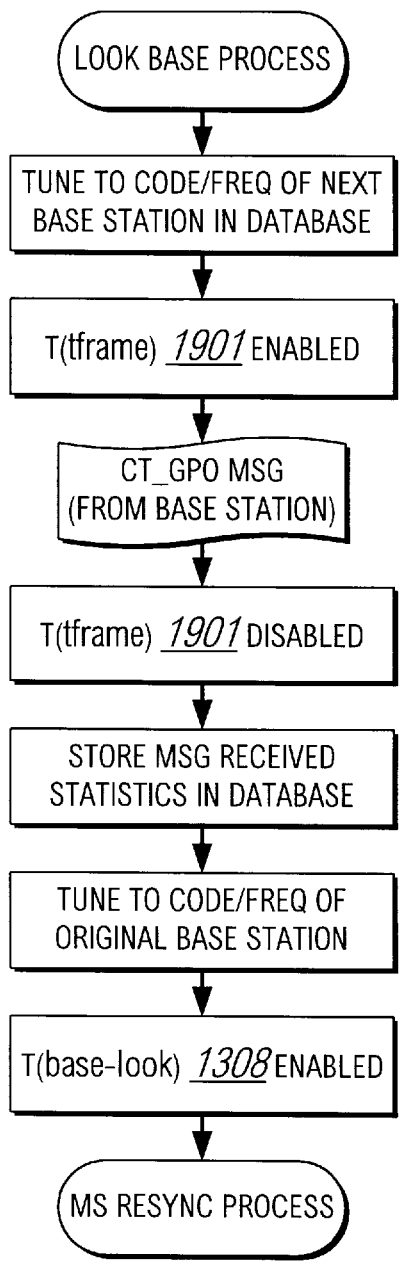
FIG. 19 is a diagram of the mobile station state processing when its call link quality falls below a first threshold during an established call protocol processing.

In the MS Active Traffic state 1302, while the mobile station is receiving bearer data from the base station, it measures the received signal quality of its call link. This value, along with the current frame error rate and other metrics, provides an indication of the call link quality. The mobile station uses two threshold values, Threshold Low 1306 and Threshold High 1307, each of which represents a call link quality level. While executing an Active Traffic protocol sequence with a particular base station, the first time the mobile station determines its call link quality has dropped below Threshold Low 1306, it executes a Look Base process, depicted in FIG. 19.

In the Look Base process, the mobile station checks its database and tunes to the code/frequency transmission of the next base station candidate indicated therein. The mobile station then waits to receive an error-free message from this new base station. In a preferred embodiment, the mobile station only looks for a CT_GPO (General Poll) message from the new base station, as CT_GPO messages are associated with the maximum signal strength a base station can transmit. Also in a preferred embodiment, while executing the Look Base process, the mobile station suspends processing the normal Active Traffic protocol sequence of receiving and transmitting bearer data on the O-Interface.

During the Look Base process, the mobile station establishes a timer, T(tframe) 1901, for the maximum time it will stay tuned to the new base station, looking for an error-free message transmitted from it. If the mobile station receives such an error-free message before T(tframe) 1901 elapses, it disables T(tframe), and records statistics regarding the signal strength, and other information contained in the received message, in its database. If the mobile station receives an error-free message, or, alternatively, T(tframe) elapses, it re-tunes to the code/frequency transmission of the original base station, and executes the MS Resync process, described above in regards to the MS Active Traffic state 1302, and depicted in FIG. 10A, to resync to the original base station, in order to resume the normal Active Traffic protocol sequence.

If the mobile station successfully resyncs with the original base station, it resumes the normal Active Traffic protocol sequence. If, however, the mobile station fails to resync with the original base station at this time, it checks its database to see if there is at least one untried base station candidate it may acquire a channel on, and, thus, resume its current call on. If yes, the mobile station executes the Base Seek process, previously described in regards to the MS Active Traffic state 1302, and depicted in FIG. 13B.

If there are no untried base station candidates it may acquire a channel on, or it subsequently fails to acquire a channel on any of the base stations indicated in its database, the mobile station executes the MS Resync process once again, with the original base station, as previously described in regards to the MS Active Traffic state 1302, and depicted in FIG. 10A.

If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

In the MS Active Traffic state 1302, processing the Active Traffic protocol sequence with a particular base station, each time the mobile station executes the Look Base process, and then successfully recovers the call link with the original base station, it establishes a timer, T(base_look) 1308, for the maximum time it will wait before it can execute the Look Base process again, for the particular call link.

Thereafter, when T(base_look) 1308 elapses, the mobile station checks to see if the current call link quality is above Threshold Low 1306. If no, the mobile station once again executes the Look Base process, previously described, and depicted in FIG. 19. If, however, the current call link quality is above Threshold Low 1306, the mobile station re-establishes T(base_look) and continues the normal Active Traffic protocol sequence.

If the mobile station's call link quality falls below Threshold High 1307, it checks its database to determine if there is an untried base station candidate it can attempt to acquire a channel on. If no, the mobile station executes the MS Resync process with the original base station, discussed above in regards to the MS Active Traffic state 1302, and depicted in FIG. 10A. If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

If, however, there is at least one untried base station candidate indicated in its database, the mobile station executes the Base Seek process, discussed above in regards to the MS Active Traffic state 1302, and depicted in FIG. 13B. At this time, the mobile station re-executes the Base Seek process until it either successfully acquires a channel on a base station, which it then processes the Handover protocol sequence with, discussed below, or until there are no base station candidates remaining for it to attempt a channel acquisition with. If the mobile station fails to acquire a channel on a base station at this time, it executes the MS Resync process, discussed above in regards to the MS Active Traffic state 1302, and depicted in FIG. 10A, with the original base station.

If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

As previously discussed, while in the Registered Idle state 801, the mobile station may receive a Call Originate indication 804 on its user interface, as depicted in FIG. 8, indicating its end user wishes to place a call on the communication system 101. Alternatively, while in the Non-Registered Idle state 901, the mobile station may receive a Call Originate indication 804 for an emergency (i.e., 911) call on its user interface, as depicted in FIG. 9, indicating its end user wishes to place an emergency call on the communication system 101. In either event, the mobile station first transitions to the MS Acquisition state 402, to acquire a channel on the base station it is currently tuned to, for a call link. If the mobile station successfully acquires a channel on this base station, it transitions to the MS Call Originate state 1602, depicted in FIG. 16A, to process the Call Originate protocol sequence.

If, however, the mobile station fails to acquire a channel on this base station, it determines that its service has been interrupted with the base station, and executes the MS Recover process, depicted in FIG. 18. In the MS Recover process, as previously described in regards to the Registration protocol sequence processing, the mobile station checks its database to see if there is any untried base station candidates it may attempt to acquire a channel on. If no, the mobile station transitions to the Non-Registered Idle state 901. In a preferred embodiment, before transitioning to the Non-Registered Idle state 901, the mobile station posts a Service Unavailable/No Base Station indication 1804 on its user interface. At this time, the mobile station stops trying to acquire a channel on a base station for its end user's current call request.

If, however, the mobile station's database indicates there is at least one untried base station candidate it may yet attempt to acquire a channel on, the mobile station tunes to the code/frequency of one of the untried base station's transmission. The mobile station then transitions to the MS Acquisition state 402, to attempt to acquire a channel on this new base station, which it can then use to Register with the new base station. At this time, the mobile station no longer tries to process its end user's current call request, and, is instead processing as if it just powered on and must register with a base station, as previously described. In a preferred embodiment, if the mobile station's database indicates there is a base station candidate it may attempt to acquire a channel on, the mobile station posts a Service Interrupted indication 1803 to its user interface, prior to transitioning to the MS Acquisition state 402.

If the mobile station fails in its attempt to acquire a channel on the base station it is initially tuned to, and if it then executes the MS Recover process, it will continue to re-execute the MS Recover process, until it either successfully acquires a channel on a base station, or there are no more base station candidates for it to attempt a channel acquisition on.

If the mobile station successfully acquires a channel on the base station it is currently tuned to, for its end user's call request, it transitions to the MS Call Originate state 1602. In the MS Call Originate state 1602, depicted in FIG. 16A, the mobile station transmits a CT_ORG (Call Originate) message to the base station, indicating it wishes to place a call on the communication system 101 with a designated callee. In a preferred embodiment, the mobile station then waits for a CT_ACK message response from the base station.

In a preferred embodiment, the mobile station establishes a timer, T(m_ack) 703, for the maximum time it will wait for a CT_ACK message. If the mobile station receives the expected CT_ACK message before T(m_ack) 703 elapses, it disables T(m_ack), and then waits for a CT_CNC (Connection Complete) message from the base station, indicating that the communication system 101 has established a call link between the mobile station and the callee. If, however, T(m_ack) elapses, the mobile station presumes it is out of sync with the base station, and executes the MS Resync process, depicted in FIG. 10A.

In the MS Resync process, as previously described in regards to the MS Registration state 702, the mobile station checks whether the base station is transmitting it a CT_SPO (Specific Poll) message. If the mobile station receives a CT_SPO message for it at this time, it remains in the MS Call Originate state 1602, and restarts the Call Originate protocol sequence from the beginning, transmitting a CT_ORG (Call Originate) message to the base station.

In a preferred embodiment, the mobile station enables a timer, T(resync) 1001, for the maximum time it will continue to poll the O-Interface for a CT_SPO message for it. If the mobile station receives a CT_SPO message for it before T(resync) 1001 elapses, it disables T(resync). If, however, T(resync) elapses, the mobile station determines its service has been interrupted with the base station, and executes the MS Recover process, previously discussed in regards to the Call Originate protocol sequence, and depicted in FIG. 18.

Once a base station receives a CT_ORG message from a mobile station assigned a dedicated channel, it transmits a Setup message on the backhaul interface to the system controller 103, indicating a call link is requested by a mobile station. The base station then transitions to the BS Call Originate state 1601, depicted in FIG. 16A, where it waits for a Connect message on the backhaul interface, indicating whether the callee answered the call and the communication system 101 established a call link for the call. In a preferred embodiment, upon transitioning to the BS Call Originate state 1601, the base station also transmits a CT_ACK message to the mobile station, acknowledging the CT_ORG message.

In a preferred embodiment in the MS Call Originate state 1602, the mobile station establishes a timer, T(orig) 1603, for the maximum time it will wait for a CT_CNC (Connection Complete) message from the base station. If the mobile station receives a CT_CNC message before T(orig) 1603 elapses, it disables T(orig). If, however, T(orig) elapses, the mobile station transitions to the Registered Idle state 801. In a preferred embodiment, prior to transitioning to the Registered Idle state 801, the mobile station posts a Service Unavailable/Network Not Responding indication 709 on its user interface.

In the normal Call Originate protocol sequence, once the base station receives a Connect message on the backhaul interface, it transmits a CT_CNC message to the mobile station. In a preferred embodiment, the base station then waits for a CT_ACK message response from the mobile station.

Upon receiving a CT_CNC message, the mobile station transitions to the MS Active Traffic state 1302, previously discussed, and depicted in FIG. 13A. In a preferred embodiment, the mobile station transmits a CT_ACK message to the base station, prior to transitioning to the MS Active Traffic state 1302, acknowledging the CT_CNC message. Once the base station receives this CT_ACK message, it transitions to the BS Active Traffic state 1301, previously discussed, and depicted in FIG. 13A. At this time, bearer data may now be transmitted through the communication system 101.

In a preferred embodiment, the base station establishes a timer, T(b_ack) 706 for the maximum time it will wait for a CT_ACK message response to its CT_CNC (Connection Complete) message. If the base station receives the expected CT_ACK message before T(b_ack) 706 elapses, it disables T(b_ack). If, however, T(b_ack) elapses, the base station presumes it is out of sync with the mobile station, and executes a BS Specific Poll Recover process, depicted in FIG. 17.

In the BS Specific Poll Recover process, as previously discussed in regards to the Registration protocol sequence, the base station transmits a CT_SPO (Specific Poll) message for the mobile station in the base portion 206 of the time frames of the channel, to provide the mobile station a message to resync to. If the base station receives a CT_ORG (Call Originate) message from the mobile station in response to a CT_SPO message, it begins the Call Originate protocol sequence anew, transmitting a CT_ACK message response to the mobile station. This latest CT_ORG message, along with being a call originate request, is an indication that the mobile station has resynced with the base station.

If the BS Specific Poll Recover process is executed because T(b_ack) 706 elapsed, the base station has already received a Connect message from the system controller 103, in response to the mobile station's previous CT_ORG message. Thus, if the base station resyncs with the mobile station at this time, and begins the Call Originate protocol sequence anew, it transmits a CT_ACK message to the mobile station, in response to this latest CT_ORG message. Then, the base station transmits a CT_CNC (Connection Complete) message in the next time frame of the channel to the mobile station, corresponding to the Connect message. The base station then resumes normal Call Originate protocol sequence processing, waiting for a CT_ACK message response from the mobile station.

In a preferred embodiment, the base station enables a timer, T(sp_recover) 1701, for the maximum time it will transmit CT_SPO messages for the mobile station in the channel, one per time frame, and wait for a CT_ORG message in return from the mobile station. If the base station receives a CT_ORG message before T(sp_recover) 1701 elapses, it disables T(sp_recover). If, however, T(sp_recover) elapses, the base station redesignates the dedicated channel as non-dedicated, and transitions to the General Poll state 401 for the now non-dedicated channel.

While executing the BS Specific Poll Recover process in the BS Call Originate state 1601, the base station may receive a Release message on the backhaul interface, indicating the system controller 103 wishes the designated call link be terminated. Upon receiving a Release message at this time, the base station redesignates the dedicated channel as non-dedicated, disables timer T(sp_recover) 1701, and transitions to the General Poll state 401 for the now non-dedicated channel.

While executing a normal Call Originate protocol sequence in the BS Call Originate state 1601, the base station may also receive a Release message on the backhaul interface. In this case, the base station transitions to the BS System Call Release state 1501, discussed below, and depicted in FIG. 15.

In a preferred embodiment in the MS Call Originate state 1602, while waiting for a CT_CNC (Connection Complete) message from the base station, the mobile station transmits a CT_HLD (Hold) message to the base station in the user portion 205 of each time frame of the dedicated channel in which it has no other message to transmit to the base station. The base station, in its turn, while processing in the BS Call Originate state 1601 waiting for a Connect message on its backhaul interface, transmits a CT_HLD message to the mobile station in the base portion 206 of each time frame of the dedicated channel in which it has no other message to transmit to the mobile station.

In a preferred embodiment, while the mobile station is in the MS Call Originate state 1602, transmitting and receiving CT_HLD messages on the O-Interface, it establishes a timer, T(T01) 707, for the maximum time it will wait for a CT_HLD message. The mobile station re-establishes T(T01) 707 each time it receives an expected CT_HLD message, and disables T(T01) when it receives a CT_CNC message from the base station. If T(T01) elapses, the mobile station presumes it is out of sync with the base station, and executes the MS Resync process, previously discussed in regards to the Call Originate protocol sequence, and depicted in FIG. 10A.

If the mobile station successfully resyncs with the base station in the MS Resync process at this time, recovering the call link, it remains in the MS Call Originate state 1602, and restarts processing from the beginning, transmitting a CT_ORG (Call Originate) message to the base station. If, however, the mobile station fails to successfully resync with the base station, it determines that its service has been interrupted with the base station, and executes the MS Recover process, previously discussed in regards to the Call Originate protocol sequence, and depicted in FIG. 18.

In a preferred embodiment, while the base station is in the BS Call Originate state 1601, transmitting and receiving CT_HLD messages on the O-Interface, it establishes a timer, T(T00) 705, for the maximum time it will wait for a CT_HLD message. The base station re-establishes T(T00) 705 each time it receives the expected CT_HLD message, and disables T(T00) when it receives a Connect message on the backhaul interface. If T(T00) elapses, the base station presumes it is out of sync with the mobile station, and executes the BS Specific Poll Recover process, discussed above in regards to the Call Originate protocol sequence, and depicted in FIG. 17.

While executing the BS Specific Poll Recover process at this time, the base station may, or may not, receive a Connect message on the backhaul interface, for the mobile station's prior CT_ORG message. If the base station does not receive a Connect message at this time, and successfully resyncs with the mobile station, it begins processing from the start of the BS Call Originate state 1601, transmitting a CT_ACK message response to the mobile station's latest CT_ORG message. This latest CT_ORG message is both a call originate request and an indication that the mobile station has resynced with the base station.

If, however, the base station does receive a Connect message while executing the BS Specific Poll Recover process at this time, and it successfully resyncs with the mobile station, it transmits a CT_ACK message response to the mobile station's latest CT_ORG message. Then, the base station transmits a CT_CNC (Connection Complete) message in the next frame of the channel to the mobile station, corresponding to the Connect message. The base station then continues in the normal Call Originate protocol sequence, waiting for a CT_ACK message response from the mobile station.

While processing in the BS Call Originate state 1601, the base station may receive an unexpected or erroneous message (previously described) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, and continues processing the normal Call Originate protocol sequence from that point. If, however, any LeakyBucket counter indicates a maximum error count, the base station executes the BS Specific Poll Recover process, as described above in regards to the Call Originate protocol sequence, and depicted in FIG. 17.

While executing the BS Specific Poll Recover process at this time, the base station may, or may not, receive a Connect message on the backhaul interface, or it may have already received a Connect message, for the mobile station's previous CT_ORG (Call Originate) message. If the base station does not receive a Connect message at this time, and has not previously received a Connect message for the current Call Originate protocol sequence, and it successfully resyncs with the mobile station, it begins processing from the start of the BS Call Originate state 1601, transmitting a CT_ACK message response to the mobile station's latest CT_ORG message.

If, however, the base station does receive a Connect message while executing the BS Specific Poll Recover process at this time, or it previously received a Connect message for the current Call Originate protocol sequence, and it successfully resyncs with the mobile station, it transmits a CT_ACK message response to the mobile station's latest CT_ORG message. Then, the base station transmits a CT_CNC (Connection Complete) message to the mobile station, corresponding to the Connect message. The base station then continues in the normal Call Originate protocol sequence, waiting for a CT_ACK message response from the mobile station.

While processing in the MS Call Originate state 1602, the mobile station may also receive an unexpected or erroneous message (previously described) on the O-Interface. In a preferred embodiment, if the mobile station receives an unexpected or erroneous message at this time, it executes a Leaky Bucket process, as previously described. If no Leaky-Bucket counter indicates a maximum error count has been reached, the mobile station re-transmits the last message it transmitted to the base station, and continues processing the normal Call Originate protocol sequence from that point. If any LeakyBucket counter indicates a maximum error count, the mobile station executes the MS Resync process, previously discussed in regards to the Call Originate protocol sequence, and depicted in FIG. 10A.

If the mobile station successfully resyncs with the base station at this time, recovering the call link, it remains in the MS Call Originate state 1602, and restarts processing from the beginning, transmitting a CT_ORG (Call Originate) message to the base station. If, however, the mobile station fails to successfully resync with the base station, it executes the MS Recover process, previously discussed in regards to the Call Originate protocol sequence, and depicted in FIG. 18.

Figure 16B:
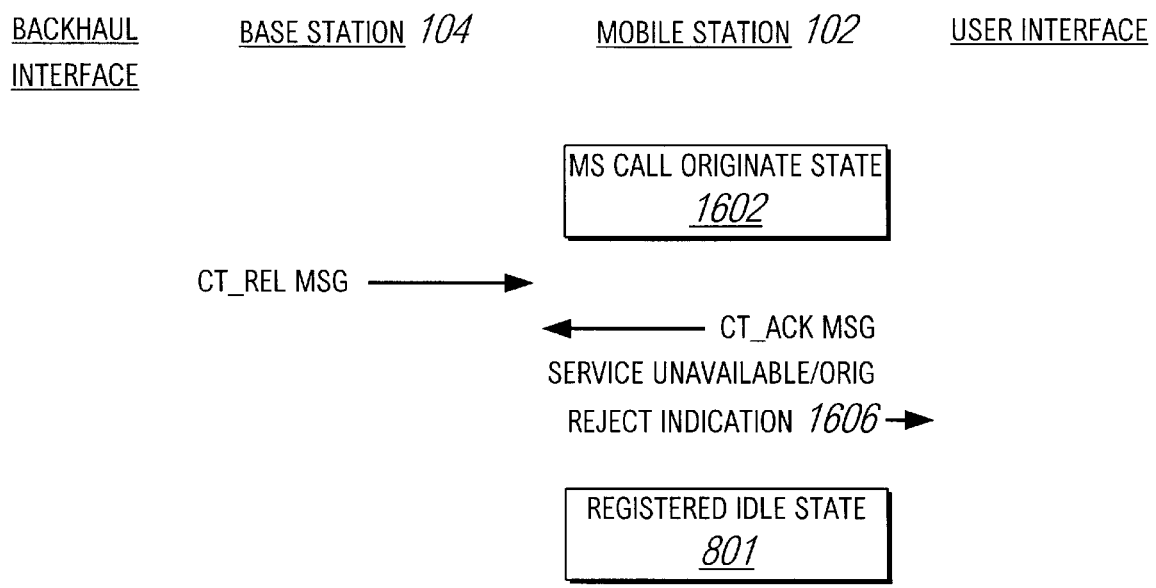
FIG. 16B is a diagram of the mobile station state processing and communication protocol when the communication system releases the call link currently being established for a call the mobile station's end user initiated.

While in the MS Call Originate state 1602, the mobile station may receive a CT_REL (Release) message on the O-Interface, indicating that the system controller 103 wishes to terminate its call. In response to this CT_REL message, as depicted in FIG. 16B, the mobile station transitions to the Registered Idle state 801. In a preferred embodiment, prior to transitioning to the Registered Idle state 801, the mobile station transmits a CT_ACK message to the base station, acknowledging the CT_REL message, and posts a Service Unavailable/Orig Reject indication 1606 to its user interface.

While in the MS Call Originate state 1602, the mobile station may also receive an On-Hook indication 1404 on its user interface, indicating its end user terminated the call. Upon receiving an On-Hook indication 1404 at this time, the mobile station transitions to the MS Mobile Call Release state 1402, discussed below, and depicted in FIG. 14.

While in the BS Call Originate state 1601, the base station may receive a CT_REL (Release) message on the O-Interface, indicating that the mobile station's end user terminated the call. Upon receiving a CT_REL message at this time, the base station transitions to the BS Mobile Call Release state 1401, discussed below, and depicted in FIG. 14.

As previously discussed, if the mobile station is in the MS Active Traffic state 1302 and it determines its call link quality is inadequate, it may attempt to find another base station it can continue its current call on. If the mobile station successfully acquires a channel on a new base station at this time, it transitions to the MS Handover state 2002, depicted in FIG. 20A, where it transmits a CT_THR (Terminating Handover Request) message to the new base station, indicating it wishes to handover its current call to this new base station. In a preferred embodiment, the mobile station then waits for a CT_ACK message response from the new base station.

If a base station receives a CT_THR message from a mobile station that has acquired a channel on it, it transitions to the BS Handover state 2001, depicted in FIG. 20A. In the BS Handover state 2001, the base station transmits a Terminating_Handover message on the backhaul interface to the system controller 103, indicating that the mobile station wishes to handover its call to this new base station.

In a preferred embodiment, the base station transmits a CT_ACK message to the mobile station, acknowledging the CT_THR (Terminating Handover Request) message. The base station then waits for a Circuit_Switch_Complete message on the backhaul interface, indicating the communication system 101 has established the call link for this base station to now handle the mobile station's call.

Once the mobile station receives the expected CT_ACK message, it then waits for a CT_CSC (Circuit Switch Complete) message from the base station, indicating that the Handover protocol sequence has been successful, and the mobile station has an established call link with the new base station.

In a preferred embodiment, the mobile station establishes a timer, T(m_ack) 703, for the maximum time it will wait for the CT_ACK message. If the mobile station receives the expected CT_ACK message before T(m_ack) 703 elapses, it disables T(m_ack). If, however, T(m_ack) elapses, the mobile station checks its database to determine if there is an untried base station candidate it can attempt to acquire a channel on. If no, the mobile station transitions to the Non-Registered Idle state 901. In a preferred embodiment, the mobile station posts a Service Unavailable/No Base Station indication 1804 on its user interface, prior to transitioning to the Non-Registered Idle state 901.

If there is at least one untried base station candidate indicated in its database, the mobile station executes the Base Seek process, depicted in FIG. 13B. In the Base Seek process, as previously discussed in regards to the MS Active Traffic state 1302, the mobile station tunes to the code/frequency of a new, untried base station's transmission. In a preferred embodiment, the mobile station prioritizes the base station candidates in its database, based on their signal strength, frame error rate, and channel availability, and now tunes to the untried base station candidate with the highest priority. The mobile station then transitions to the MS Acquisition state 402, to attempt to acquire a channel on this new base station, for a Handover protocol sequence. In a preferred embodiment, the mobile station posts a Handover Attempt indication 1305 to its user interface, prior to transitioning to the MS Acquisition state 402.

If the mobile station successfully acquires a channel on this new base station, it begins the MS Handover protocol sequence anew, transmitting a CT_THR (Terminating Handover Request) message to this new base station, and waiting for a CT_ACK message in response.

If, however, the mobile station fails to acquire a channel on this new base station, it re-executes the Base Seek process in the MS Handover state 2002, until it either successfully acquires a channel on a base station, or there are no base station candidates remaining for it to attempt a channel acquisition with. If the mobile station fails to acquire a channel on any base station, it executes the MS Resync process, depicted in FIG. 10A, with the base station it was processing the Active Traffic protocol sequence with, before it attempted the Handover protocol sequence (the "original" base station).

As previously discussed with regards to the MS Active Traffic state 1302, in the MS Resync process, the mobile station checks whether the base station is transmitting it a CT_SPO (Specific Poll) message. If the mobile station receives a CT_SPO message for it at this time, it transmits the next sequential data packet to be output to the base station, and re-transitions to the MS Active Traffic state 1302, depicted in FIG. 13A.

In a preferred embodiment, the mobile station enables a timer, T(resync) 1001, for the maximum time it will execute the MS Resync process, checking whether the original base station is transmitting it a CT_SPO message. If the mobile station receives a CT_SPO message for it before T(resync) 1001 elapses, it disables T(resync). If, however, T(resync) elapses, the mobile station transitions to the Non-Registered Idle state 901, depicted in FIG. 9. In a preferred embodiment, the mobile station posts a Service Unavailable/No Base Station indication 1804 on its user interface, prior to transitioning to the Non-Registered Idle state 901.

In the normal Handover Protocol sequence, when the base station receives the expected Circuit_Switch_Complete message on the backhaul interface, it transmits a CT_CSC (Circuit Switch Complete) message to the mobile station. In a preferred embodiment, the base station then waits for a CT_ACK message response from the mobile station.

In a preferred embodiment, after receiving the CT_ACK message response to its CT_THR (Terminating Handover Request) message, the mobile station establishes a timer, T(handover) 2003, for the maximum time it will wait for a CT_CSC message from the base station. If the mobile station receives a CT_CSC message before T(handover) 2003 elapses, it disables T(handover). If, however, T(handover) elapses, the mobile station processes as if T(m_ack) 703 elapsed in the MS Handover state 2002, as previously described.

In a preferred embodiment, once the mobile station receives the CT_CSC message, it transmits a CT_ACK message to the base station, acknowledging the CT_CSC message. The mobile station then transitions to the MS Active Traffic state 1302, and resumes transmitting and receiving bearer data on the O-Interface, now with the new base station.

Once the base station receives the CT_ACK message response to its CT_CSC message, it transitions to the BS Active Traffic state 1301, where it transmits and receives bearer data with the mobile station on the O-Interface, as well as transmitting and receiving bearer data on the backhaul interface, with the system controller 103.

Figure 20B:
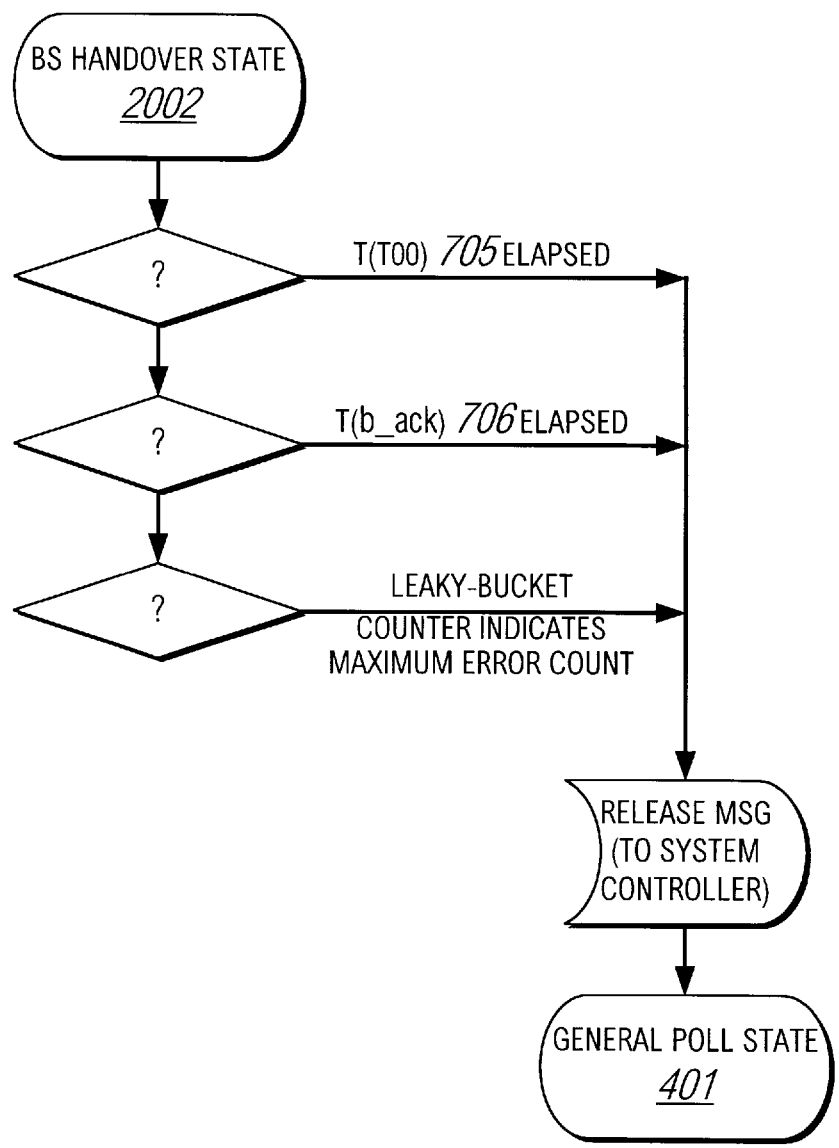
FIG. 20B is a diagram of a preferred embodiment base station state processing and communication protocol when it loses synchronization with a mobile station attempting to handover its call to it.

In a preferred embodiment, the base station establishes a timer, T(b_ack) 706, for the maximum time it will wait for a CT_ACK message response. If the base station receives the expected CT_ACK message before T(b_ack) 706 elapses, it disables T(b_ack). If, however, T(b_ack) elapses, the base station transmits a Release message on the backhaul interface, to notify the system controller 103 that the call link with the mobile station is terminated, as depicted in FIG. 20B. The base station then redesignates the dedicated channel as non-dedicated, and transitions to the General Poll state 401 for the now non-dedicated channel.

In a preferred embodiment in the MS Handover state 2002, while waiting for a CT_CSC (Circuit Switch Complete) message, the mobile station transmits a CT_HLD (Hold) message to the base station in the user portion 205 of each time frame of the dedicated channel in which it has no other message to transmit to the base station. The base station, for its part, while processing in the BS Handover state 2001, waiting for a Circuit_Switch_Complete message, transmits a CT_HLD message to the mobile station in the base portion 206 of each time frame of the dedicated channel in which it has no other message to transmit to the mobile station.

In a preferred embodiment, while the mobile station is in the MS Handover state 2002, transmitting and receiving CT_HLD messages on the O-Interface, it establishes a timer, T(T01) 707, for the maximum time it will wait for a CT_HLD message. The mobile station re-establishes T(T01) 707 each time it receives the expected CT_HLD message, and disables T(T01) when it receives a CT_CSC (Circuit Switch Complete) message from the base station. If T(T01) elapses, the mobile station processes as if T(m_ack) 703 elapsed in the MS Handover state 2002, as previously described.

In a preferred embodiment, while the base station is in the BS Handover state 2001, transmitting and receiving CT_HLD messages on the O-Interface, it establishes a timer, T(T00) 705, for the maximum time it will wait for a CT_HLD message. The base station re-establishes T(T00) 705 each time it receives the expected CT_HLD message, and disables T(T00) when it receives a Circuit_Switch_Complete message on the backhaul interface. If T(T00) elapses, the base station transmits a Release message, as depicted in FIG. 20B, on the backhaul interface, indicating its call link with the mobile station is terminated. The base station then redesignates the dedicated channel as non-dedicated, and transitions to the General Poll state 401 for the now non-dedicated channel.

While processing in the BS Handover state 2001 for a dedicated channel, the base station may receive an unexpected or erroneous message (previously defined) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, and continues processing the Handover protocol sequence from that point. If, however, any LeakyBucket counter indicates a maximum error count, the base station transmits a Release message, as depicted in FIG. 20B, on the backhaul interface, indicating its call link with the mobile station is terminated. The base station then redesignates the dedicated channel as non-dedicated, and transitions to the General Poll state 401 for the now non-dedicated channel.

While processing in the MS Handover state 2002, the mobile station may also receive an unexpected or an erroneous message (previously defined) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, and continues processing the Handover protocol sequence from that point. If, however, any LeakyBucket counter indicates a maximum error count, the mobile station processes as if T(m_ack) 703 elapsed in the MS Handover state 2002, as previously described.

While in the BS Handover state 2001, the base station may receive a Release message on the backhaul interface, indicating that the system controller 103 wishes the designated call link be terminated. The base station, upon receiving a Release message at this time, transitions to the BS System Call Release state 1501, described below, and depicted in FIG. 15.

While in the MS Handover state 2002, the mobile station may receive a CT_REL (Release) message from the base station, indicating that the system controller 103 wishes its call link with the current base station be terminated. The mobile station, upon receiving a CT_REL message at this time, processes as if T(m_ack) 703 elapsed in the MS Handover state 2002, as previously described. In a preferred embodiment, the mobile station transmits a CT_ACK message to the base station, acknowledging the CT_REL message.

While in the MS Handover state 2002, the mobile station may receive an On-Hook 1404 indication on its user interface, indicating its end user terminated the call. Upon receiving an On-Hook indication 1404 at this time, the mobile station transitions to the MS Mobile Call Release state 1402, described below, and depicted in FIG. 14.

While processing in the BS Handover state 2001, the base station may receive a CT_REL (Release) message on the O-Interface, indicating the mobile station's end user terminated the call. Upon receiving a CT_REL message at this time, the base station transitions to the BS Mobile Call Release state 1401, described below, and depicted in FIG. 14.

As previously discussed, while in the MS Call Terminate state 1202, the MS Active Traffic state 1302, the MS Call Originate state 1602, or the MS Handover state 2002, the mobile station may receive an On-Hook indication 1404 on its user interface, indicating its end user terminated the call. The mobile station then transitions to the MS Mobile Call Release state 1402, depicted in FIG. 14. In the MS Mobile Call Release state 1402, the mobile station transmits a CT_REL (Release) message to the base station, indicating it is releasing the call link on the communication system 101. In a preferred embodiment, the mobile station also establishes a timer, T(m_ack) 703, for the maximum time it will wait for a CT_ACK message response from the base station. If the mobile station receives the expected CT_ACK message before T(m_ack) 703 elapses, it disables T(m_ack) and transitions to the Registered Idle state 801. If T(m_ack) elapses, the mobile station also transitions to the Registered Idle state 801.

While the mobile station is in the MS Mobile Call Release state 1402, it may receive an unexpected or erroneous message (previously described) on the O-Interface. In a preferred embodiment, if the mobile station receives an unexpected or erroneous message at this time, it executes a Leaky Bucket process, as previously described. If any LeakyBucket counter indicates a maximum error count has been reached, the mobile station transitions to the Registered Idle state 801. If no LeakyBucket counter indicates a maximum error count, the mobile station re-transmits the last message it transmitted on the O-Interface, in this case, the CT_REL (Release) message, and continues processing in the MS Mobile Call Release state 1402, waiting for a CT_ACK message response from the base station.

As previously discussed, while in the BS Call Terminate state 1201, the BS Active Traffic state 1301, the BS Call Originate state 1601, or the BS Handover state 2001 for a dedicated channel, the base station may receive a CT_REL (Release) message on the O-Interface, indicating the mobile station end user terminated the call. Upon receiving a CT_REL message at one of these times, the base station transitions to the BS Mobile Call Release state 1401 for the dedicated channel, depicted in FIG. 14. In the BS Mobile Call Release state 1401, the base station transmits a Release message on the backhaul interface, notifying the communication system 101 that the mobile station end user terminated the call, and, thus, is relinquishing the call link. In a preferred embodiment, the base station also transmits a CT_ACK message to the mobile station, acknowledging the CT_REL message. The base station redesignates the dedicated channel as non-dedicated, and then transitions to the General Poll state 401 for the now non-dedicated channel.

Also as previously discussed, while in the BS Call Terminate state 1201, the BS Active Traffic state 1301, the BS Call Originate state 1601, or the BS Handover state 2001 for a dedicated channel, the base station may receive a Release message on the backhaul interface, indicating that the system controller 103 wishes a designated call be terminated. Upon receiving a Release message at one of these times, the base station transitions to the BS System Call Release state 1501 for the dedicated channel, depicted in FIG. 15, where it transmits a CT_REL (Release) message to the mobile station, indicating that the mobile station's call link is terminated. The base station redesignates the dedicated channel as non-dedicated, and then transitions to the General Poll state 401 for the now non-dedicated channel.

In a preferred embodiment in the BS System Call Release state 1501, the base station establishes a timer, T(b_ack) 706, for the maximum time it will wait for a CT_ACK message response to its CT_REL message from the mobile station. If the base station receives the expected CT_ACK message, or T(b_ack) 706 elapses, the base station redesignates the dedicated channel as non-dedicated, and transitions to the General Poll state 401 for the now non-dedicated channel. If the base station receives the CT_ACK message before T(b_ack) elapses, it disables T(b_ack) prior to transitioning to the General Poll state 401.

While processing in the BS System Call Release state 1501 for a dedicated channel, the base station may receive an unexpected or erroneous message (previously defined) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, in this case, the CT_REL (Release) message, and continues to process in the BS System Call Release state 1501, waiting for a CT_ACK message response. If, however, any Leaky-Bucket counter indicates a maximum error count, the base station redesignates the dedicated channel as non-dedicated, and then transitions to the General Poll state 401 for the now non-dedicated channel.

The following is a description of a presently preferred computer program to operate on a base station, in accordance with the invention disclosed herein. Information about an exemplary base station computer program may be found in pending U.S. Application Attorney Docket No. 224/020, filed Mar. 20, 1997 in the name of Murat Bilgic, Ph.D., entitled "Communication Control for a User of a Central Communication Center," which is hereby incorporated by reference as if fully set forth herein.

Figure 21:
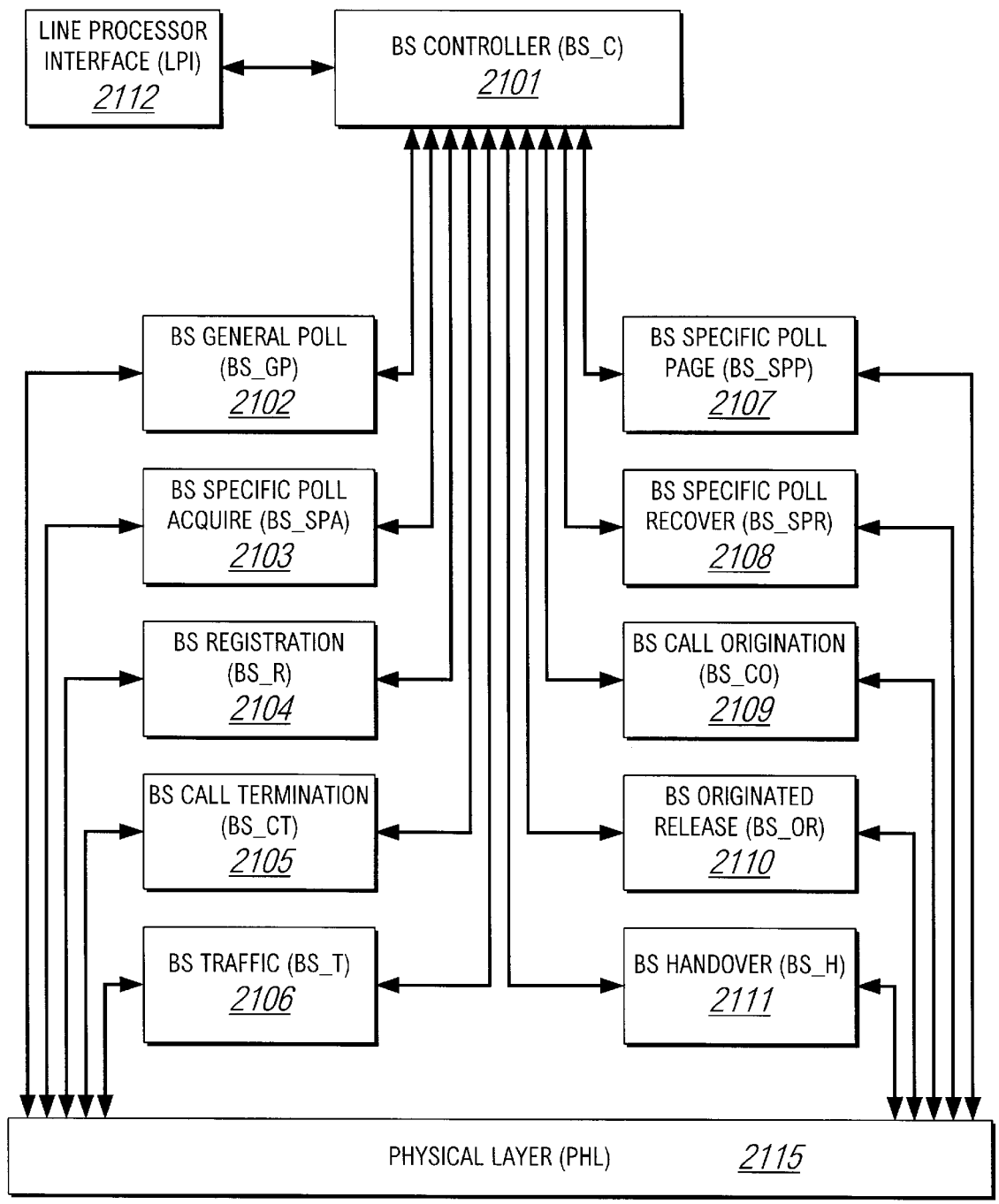
FIG. 21 is a diagram of the tasks comprising the BS software.

FIG. 21 is a diagram of the tasks comprising the base station computer program (the "BS software"). The BS Controller (BS_C) 2101 is the main task. The other base station software tasks include the BS General Poll (BS_GP) task 2102, the BS Specific Poll Acquire (BS_SPA) task 2103, the BS Registration (BS_R) task 2104, the BS Call Termination (BS_CT) task 2105, the BS Traffic (BS_T) task 2106, the BS Specific Poll Page (BS_SPP) task 2107, the BS Specific Poll Recover (BS_SPR) task 2108, the BS Call Origination (BS_CO) task 2109, the BS Originated Release (BS_OR) task 2110, and the BS Handover (BS_H) task 2111. The base station software is also comprised of a Line Processor Interface (LPI) task, for managing the base station's channels, and handling the input and output of messages to/from the base station on the backhaul interface.

Each task is depicted, for ease of description, as processing for one base station channel. In a preferred embodiment, each task, and each state in each task, can handle the processing for up to 16 base station channels.

Figure 22A:
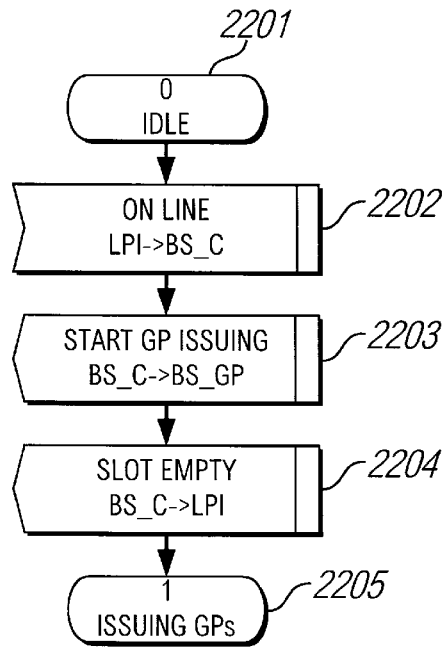
FIG. 22a–22w are state diagrams of all the states in the BS software Controller (BS_C) task.

The BS_C task 2101 begins in the BS_C(0) ("Idle") state 2201, depicted in FIG. 22a. When Idle, the BS software does not perform any communication functions on the O-Interface. When the BS_C 2101 task receives an On Line message 2202 from the LPI task 2112, discussed below, the BS_C task 2101 activates the BS_GP task 2102, depicted in FIG. 23, by sending it a Start GP Issuing message 2203 for the channel indicated in the On Line message. This On Line message is a wake up call to BS_C task 2101 to begin communication processing on the O-Interface, on the indicated channel. The BS_C task 2101, also at this time, sends a Slot Empty message 2204 for the channel to the LPI task, indicating the channel is non-dedicated (i.e., unused). The BS_C task 2101 then transitions to the BS_C(1) state 2205 for the channel, depicted in FIG. 22b.

While in any BS_C task 2101 state but the BS_C(0) state 2201, the LPI task 2112 may send the BS_C task an Off Line message 2206 for a channel. Upon receiving an Off Line message 2206 for a channel, the BS_C task 2101 notifies the task currently executing for the channel to terminate its processing. The BS software then transitions to the BS_C(0) state 2201 for the channel, previously discussed, and depicted in FIG. 22a.

Figures 1, 23:
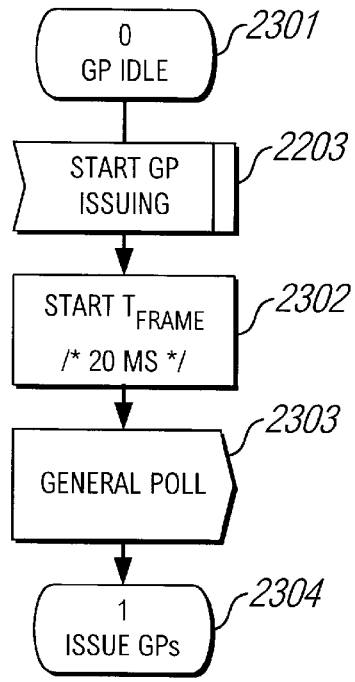
FIG. 23 is a state diagram of the BS software General Poll (BS_GP) task.
Figures 2, 23:
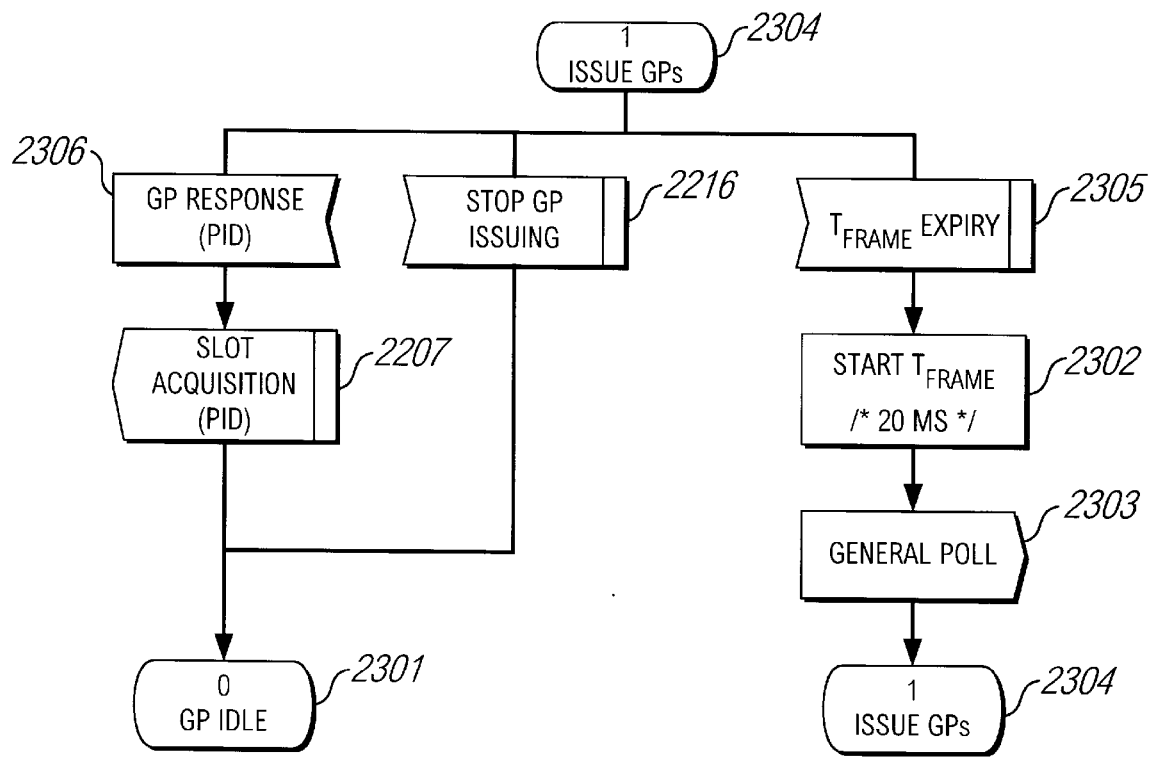

The BS_GP task 2102, depicted in FIG. 23, processes the transmission of a General Poll message in each time frame of the base station's currently unused (i.e., non-dedicated) channel. The General Poll message of any channel is an invitation for any mobile station to seize the channel, and thereby acquire a communication link to the base station, and, thus, the communication system 101. The BS_GP task 2102 is activated from the BS_GP(0) ("Idle") state 2301 for a channel when the BS_C task 2101 sends it a Start GP Issuing message 2203 for the channel. The BS_GP task 2102 enables a timer T(frame) 2302 and transmits a General Poll message 2303 on the O-Interface. In a preferred embodiment, the timer T(frame) is set for a 20-millisecond duration. The BS_GP task 2102 then transitions to the BS_GP(1) state 2304. When T(frame) expires 2305 in the BS_GP(1) state 2304, the BS_GP task 2102 re-enables T(frame) 2302 and, again, transmits a General Poll message 2303 on the O-Interface.

While in the BS_GP(1) state 2304, the base station may receive a GP Response message 2306 from a mobile station. On the receipt of this GP Response message, the BS_GP task 2102 sends the BS_C task 2101 a Slot Acquisition message 2207 and terminates processing for the channel, re-transitioning to the BS GP(0) state 2301.

While in the BS_C(1) state 2205 for a channel, the BS_C task 2101 may receive an Off Line message 2206 for the channel. The BS_C task then sends the BS_GP task 2102 a Stop GP Issuing message 2216, and then transitions to the BS_C(0) state 2201 for the channel.

On receiving a Stop GP Issuing message 2116 from the BS_C 2101 task, the BS_GP task terminates processing for the channel, re-transitioning to the BS_GP(0) state 2301.

As previously described, for any base station channel not already acquired by a mobile station (i.e., a non-dedicated channel), the BS_GP task 2102 transmits a General Poll message 2303 in the channel's base portion 206 of each time frame 202. When a mobile station wishes to acquire a channel, it responds to a General Poll message with a GP Response (General Poll Response) message.

Figure 22B:
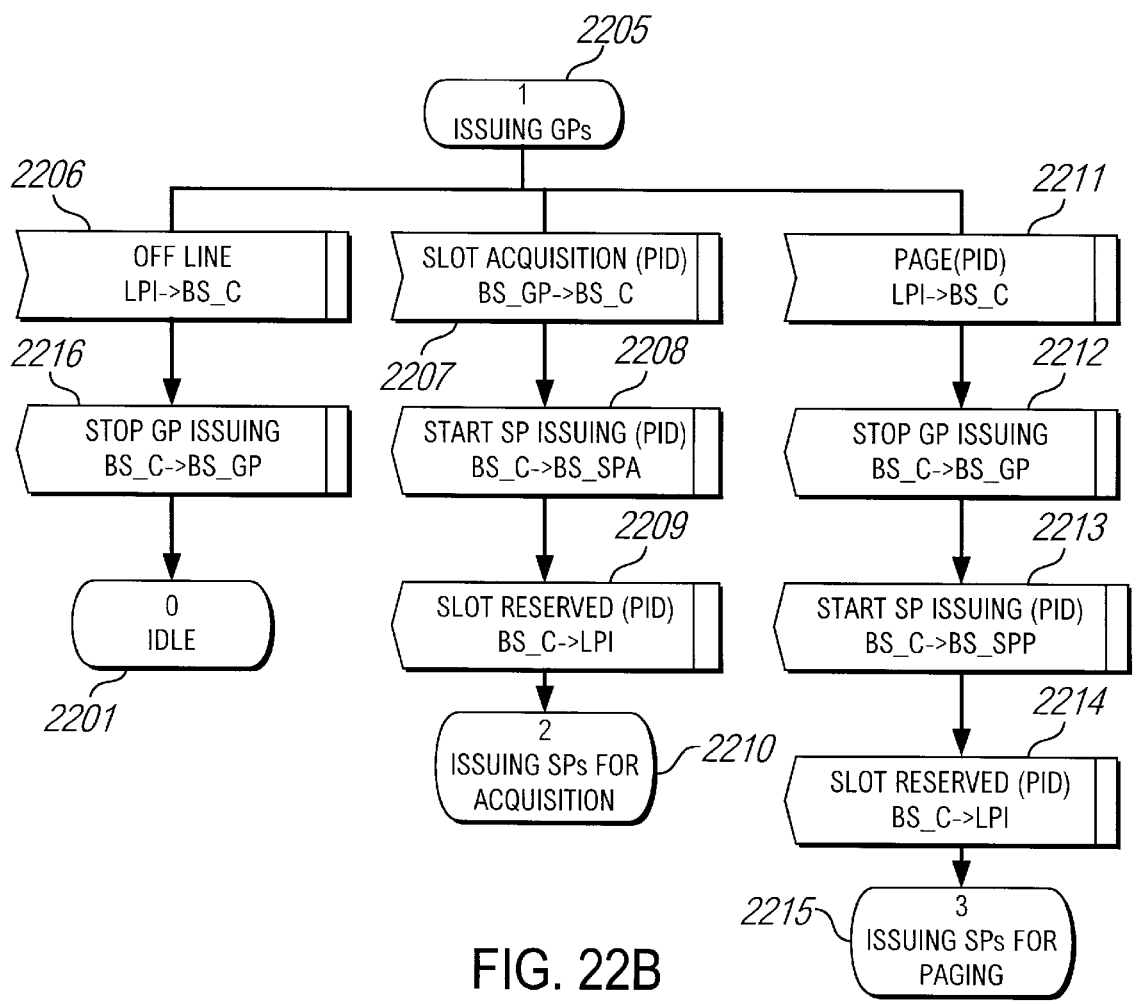
Figures 1, 24:
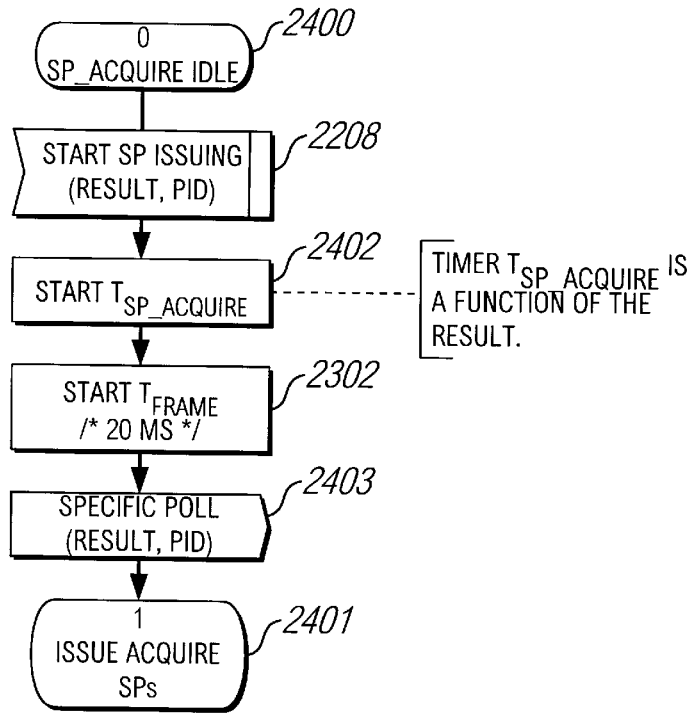
FIG. 24 is a state diagram of the BS software Specific Poll (BS_SPA) task.
Figures 2, 24:
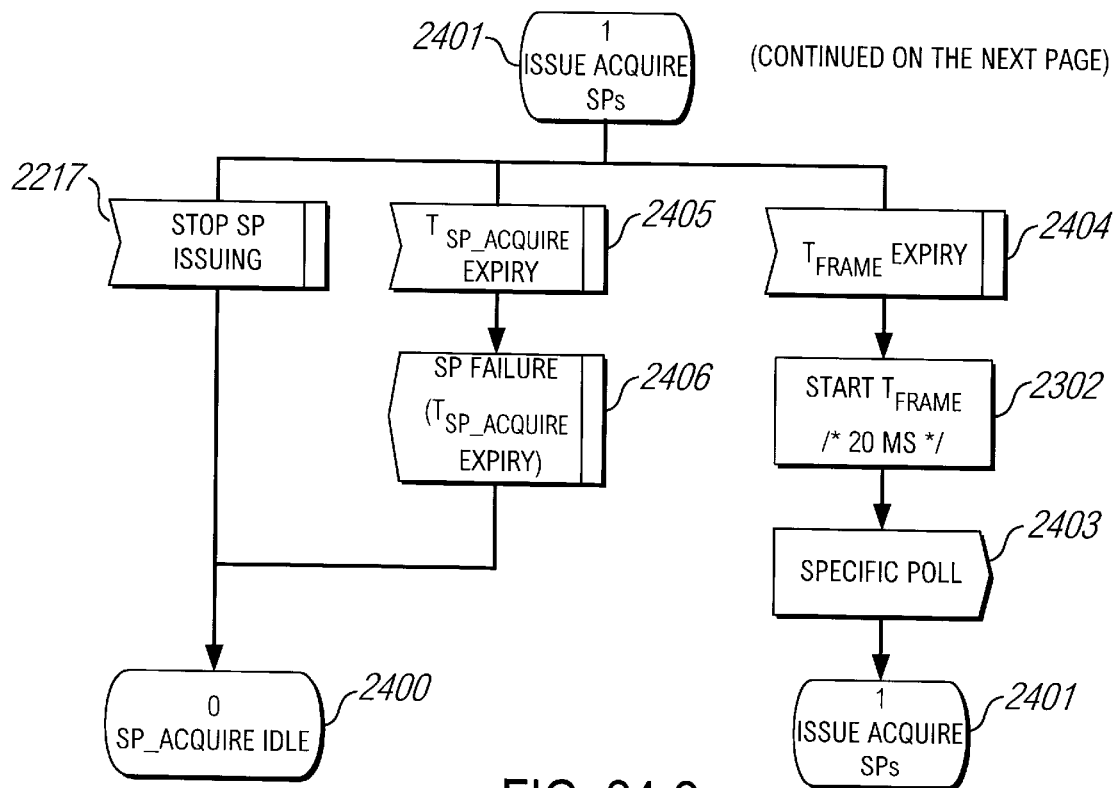
Figures 3, 24:
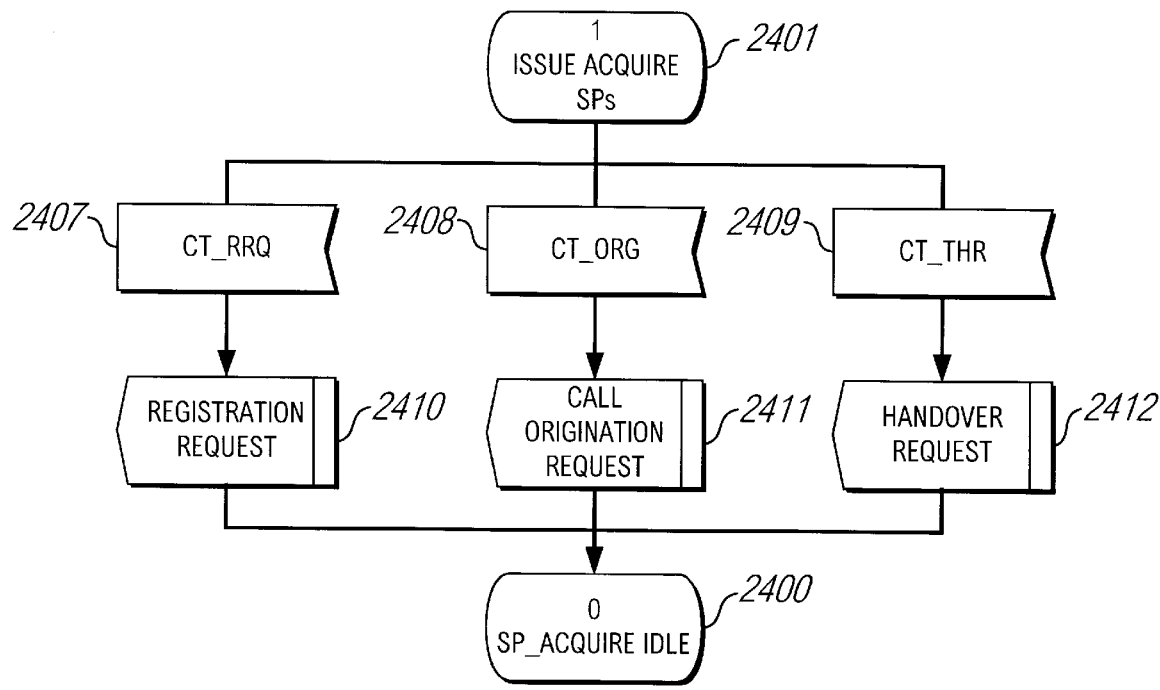

While in the BS_C(1) state 2205, depicted in FIG. 22b, the BS_C task 2101, upon receiving a Slot Acquisition message 2207 from the BS_GP task 2102, activates the BS_SPA task 2103, depicted in FIG. 24, for the channel, by sending it a Start SP Issuing message 2208. The BS_C task 2101 also sends the LPI task 2112 a Slot Reserved message 2209 for the channel. The BS_C task 2101 then transitions to the BS_C(2) state 2210, depicted in FIG. 22c, for the channel.

The BS_SPA task 2103 is activated from the BS_SPA(0) ("Idle") state 2400 for a channel when the BS_C task 2101 sends it a Start SP Issuing message 2208. The BS_SPA task 2103 transmits one or more Specific Poll messages 2403 for the mobile station that is attempting to acquire the channel. A Specific Poll message is an indication to the mobile station that it can acquire the channel on the base station. The BS_SPA task 2103, when activated, enables a timer T(frame) 2302, and transmits a Specific Poll message 2403 to the mobile station. Whenever T(frame) expires 2404, in the BS_SPA(1) state 2401, the BS_SPA task 2103 re-enables T(frame) 2302, and transmits another Specific Poll message 2403 for the mobile station. In a preferred embodiment, T(frame) is a 20-millisecond timer.

The BS_SPA task 2103 also enables a timer T(sp_acquire) 2402, for the maximum time it will continue executing for the channel, transmitting Specific Poll messages to the mobile station, and waiting for a valid mobile station response. If T(sp_acquire) expires 2405, in the BS_SPA(1) state 2401, the BS_SPA task 2103 sends the BS_C task 2101 an SP Failure (T(sp_acquire) Expiry) message 2406, and terminates processing for the channel, re-transitioning to the BS_SPA(0) state 2400.

Figures 1, 22C:
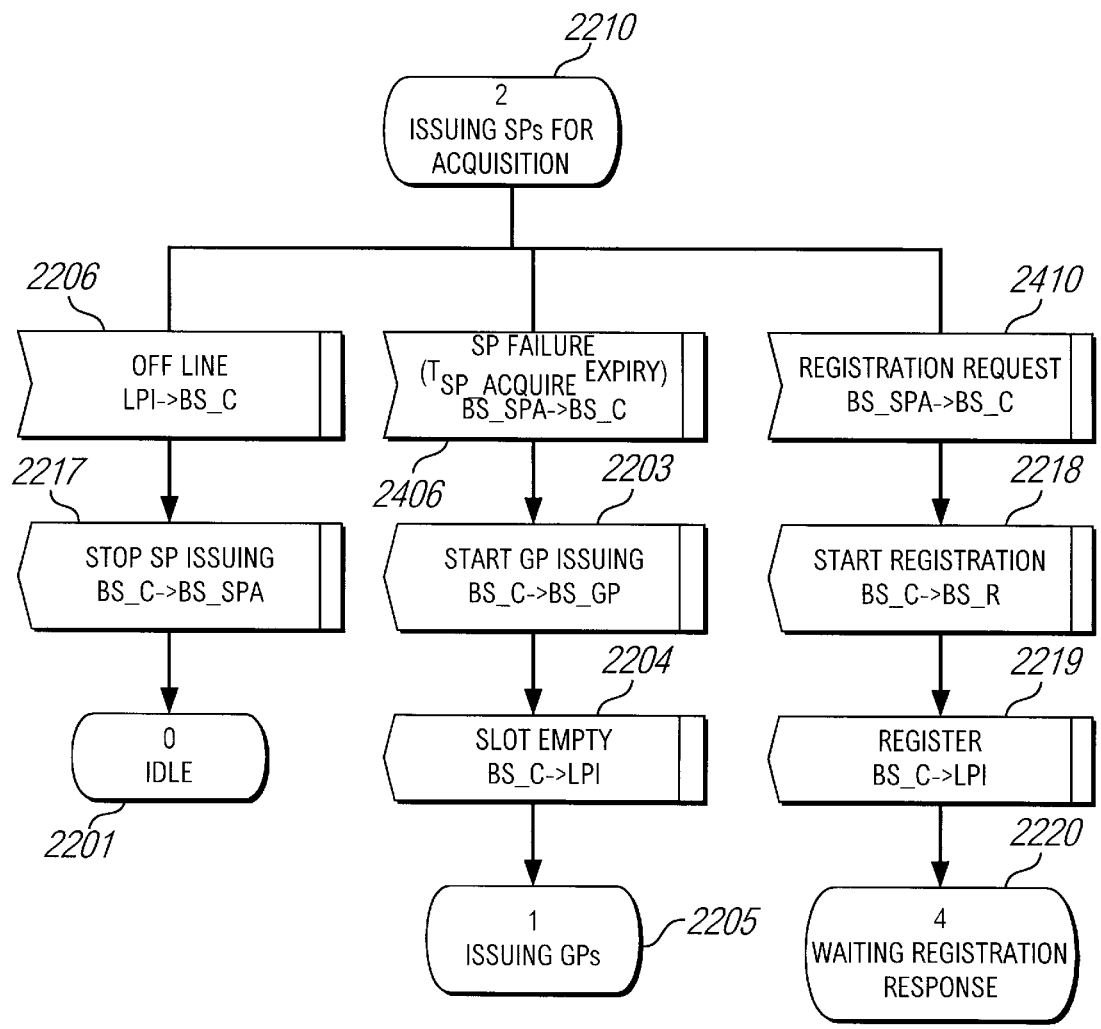
Figures 2, 22C:
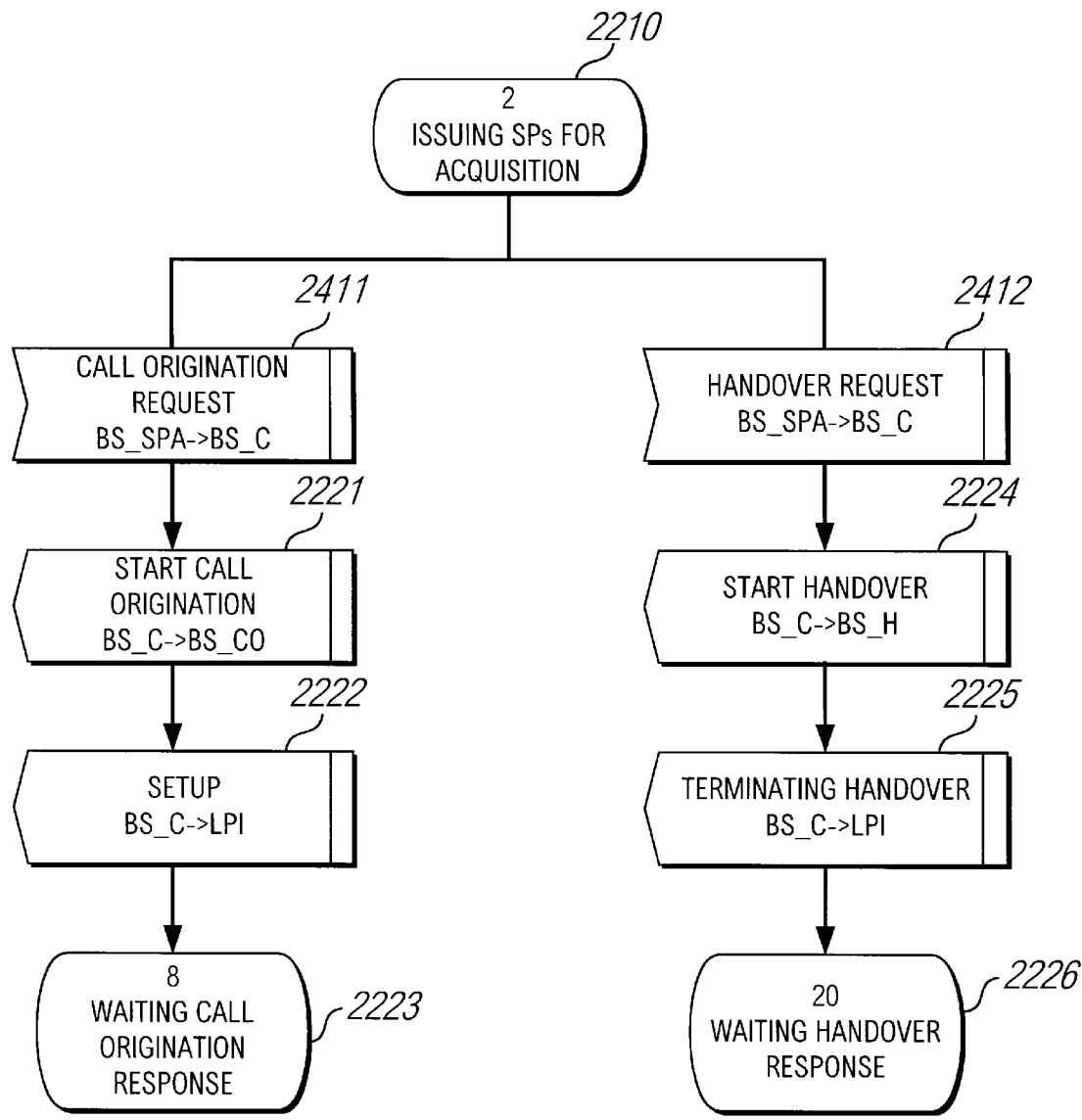

In the BS_C(2) state 2210, depicted in FIG. 22c, while the BS_SPA task 2103 is activated for a channel, if the BS_C task 2101 receives an SP Failure (T(sp_acquire) Expiry) message 2406 from the BS_SPA task 2103, it activates the BS_GP task 2102, previously described, and depicted in FIG. 23, by sending it a Start GP Issuing message 2203 for the channel. The BS_C task also at this time sends a Slot Empty message 2204 for the channel to the LPI task. The BS_C task 2101 then transitions to the BS_C(1) state 2205, depicted in FIG. 22b, for the channel.

In the BS_C(2) state 2210, if the BS_C task 2101 receives an Off Line message 2206 for the channel from the LPI task 2112, it sends the BS_SPA task 2103 tan Stop SP Issuing message 2217 for the channel, and transitions to the BS C(0) state 2201 for the channel, previously described, and depicted in FIG. 22a. The BS_SPA task 2103, for its part, upon receiving a Stop SP Issuing message 2217 from the BS_C task 2101, terminates processing for the channel, re-transitioning to the BS_SPA(0) state 2400.

If the base station receives a CT_RRQ (Registration Request) message 2407 from the mobile station, in response to its Specific Poll message transmissions to the mobile station, the BS_SPA task 2103 sends the BS_C task 2101 a Registration Request message 2410, and then terminates processing for the channel, re-transitioning to the BS_SPA (0) state 2400.

If the base station receives a CT_ORG (Call Originate) message 2408 from the mobile station, in response to its Specific Poll message transmissions to the mobile station, the BS_SPA task 2103 sends the BS_C task 2101 a Call Origination Request message 2411, and then terminates processing for the channel, re-transitioning to the BS_SPA (0) state 2400.

If the base station receives a CT_THR (Terminating Handover Request) message 2409 from the mobile station, in response to its Specific Poll message transmissions to the mobile station, the BS_SPA task 2103 sends the BS_C task 2101 a Handover Request message 2412, and then terminates processing for the channel, re-transitioning to the BS_SPA(0) state 2400.

Figures 1, 25:
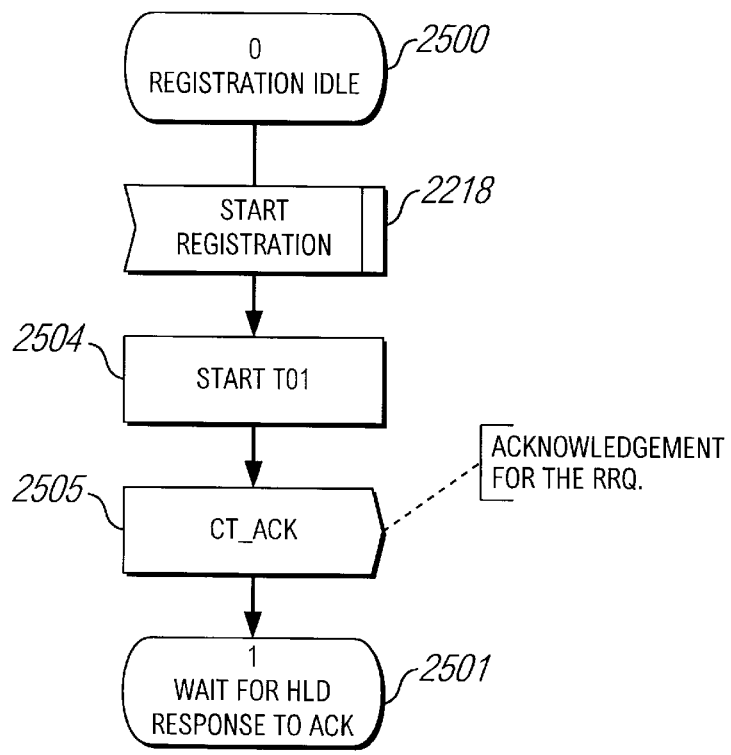
FIG. 25 is a state diagram of the BS software Registration (BS_R) task.
Figures 2, 25:
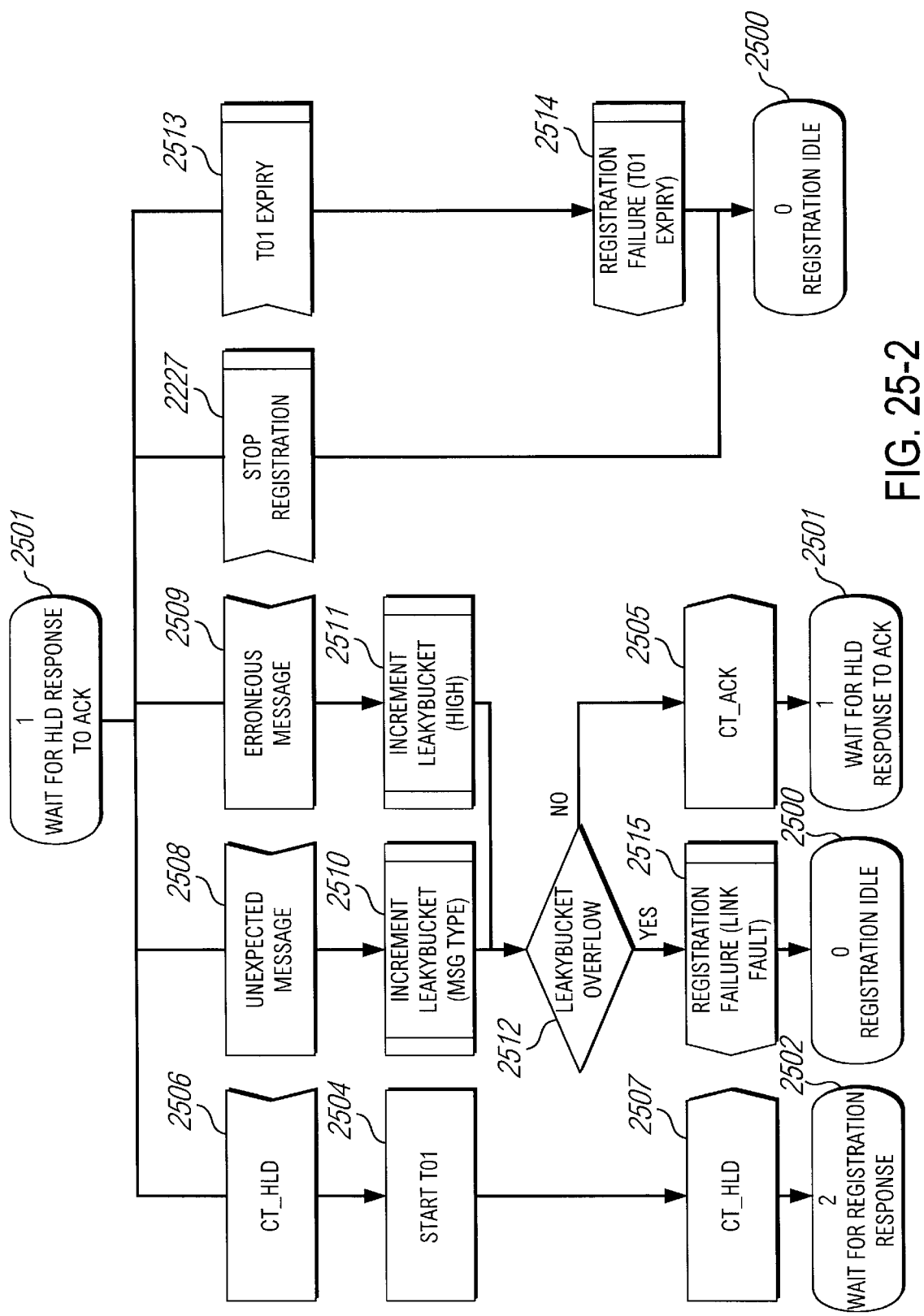
Figures 3, 25:
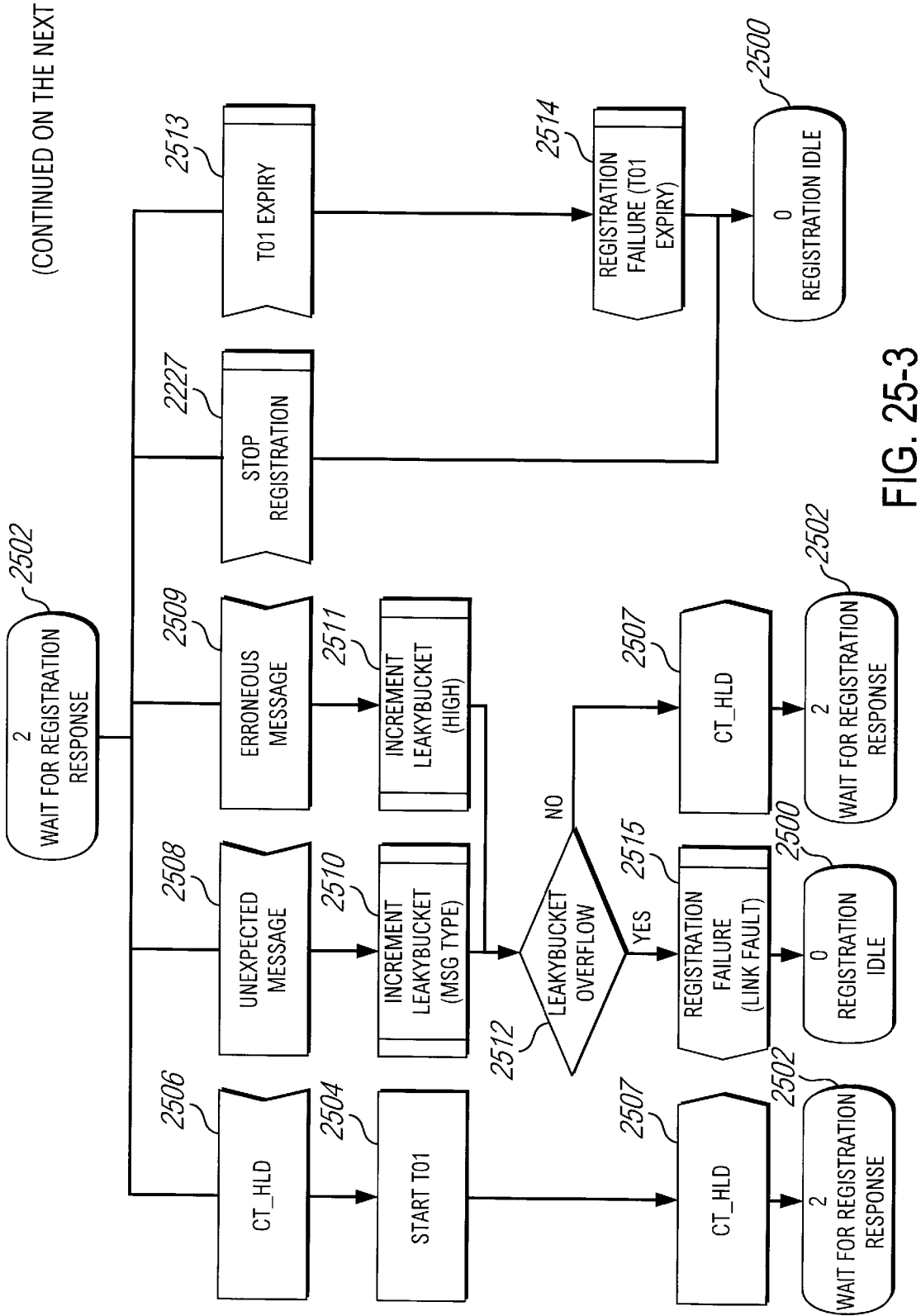
Figures 4, 25:
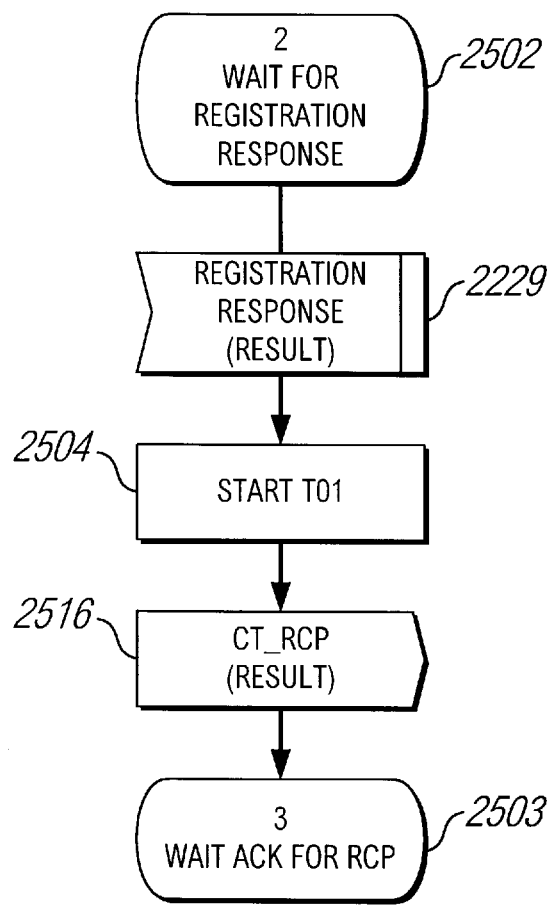
Figures 5, 25:
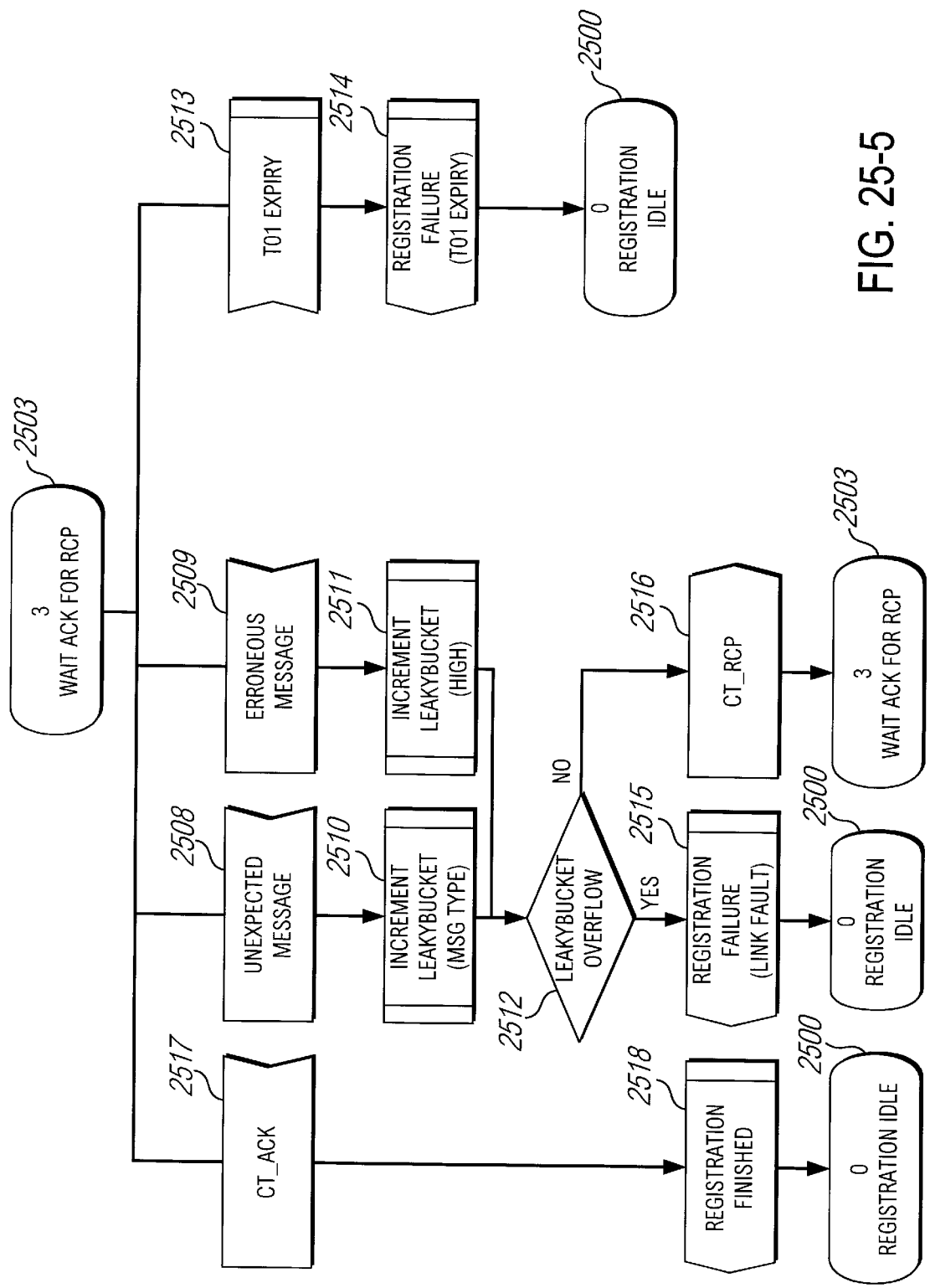

In the BS_C(2) state 2210, depicted in FIG. 22c, if the BS_C task 2101 receives a Registration Request message 2410 from the BS_SPA task 2103, it activates the BS_R task 2104 for the channel, depicted in FIG. 25, sending it a Start Registration message 2218. The BS_C task 2101 also sends the LPI task 2112 a Register message 2219 to transmit on the backhaul interface, to inform the system controller 103 of the mobile station's registration request. The BS_C task 2101 then transitions to the BS C(4) state 2220 for the channel, depicted in FIG. 22d.

Figures 1, 26:
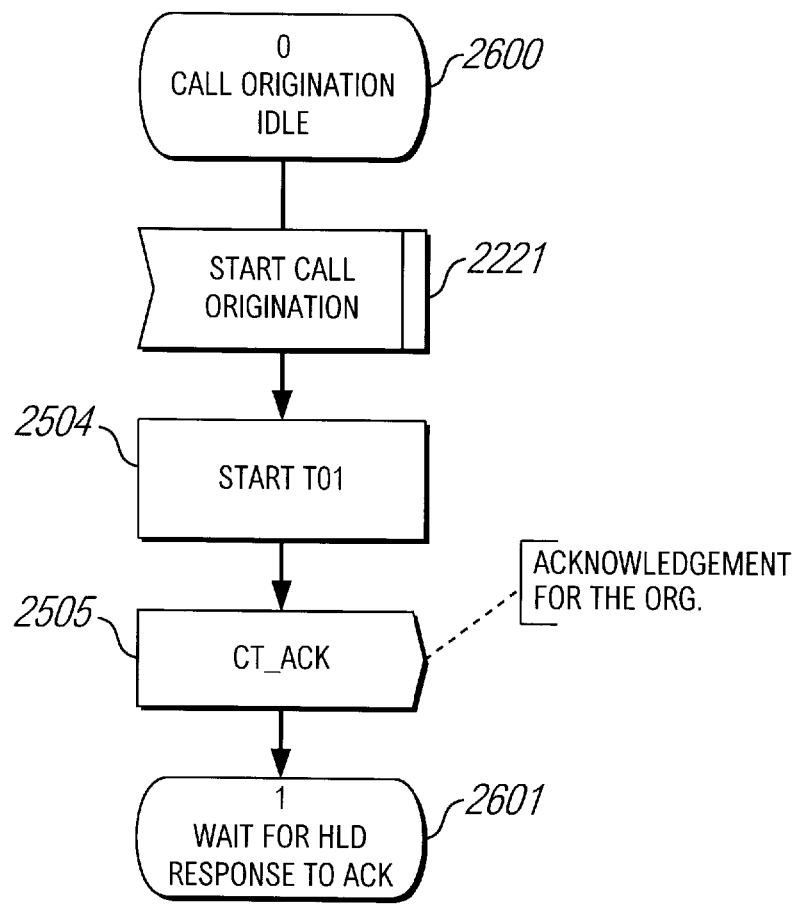
FIG. 26 is a state diagram of the BS software Call Origination (BS_CO) task.
Figures 2, 26:
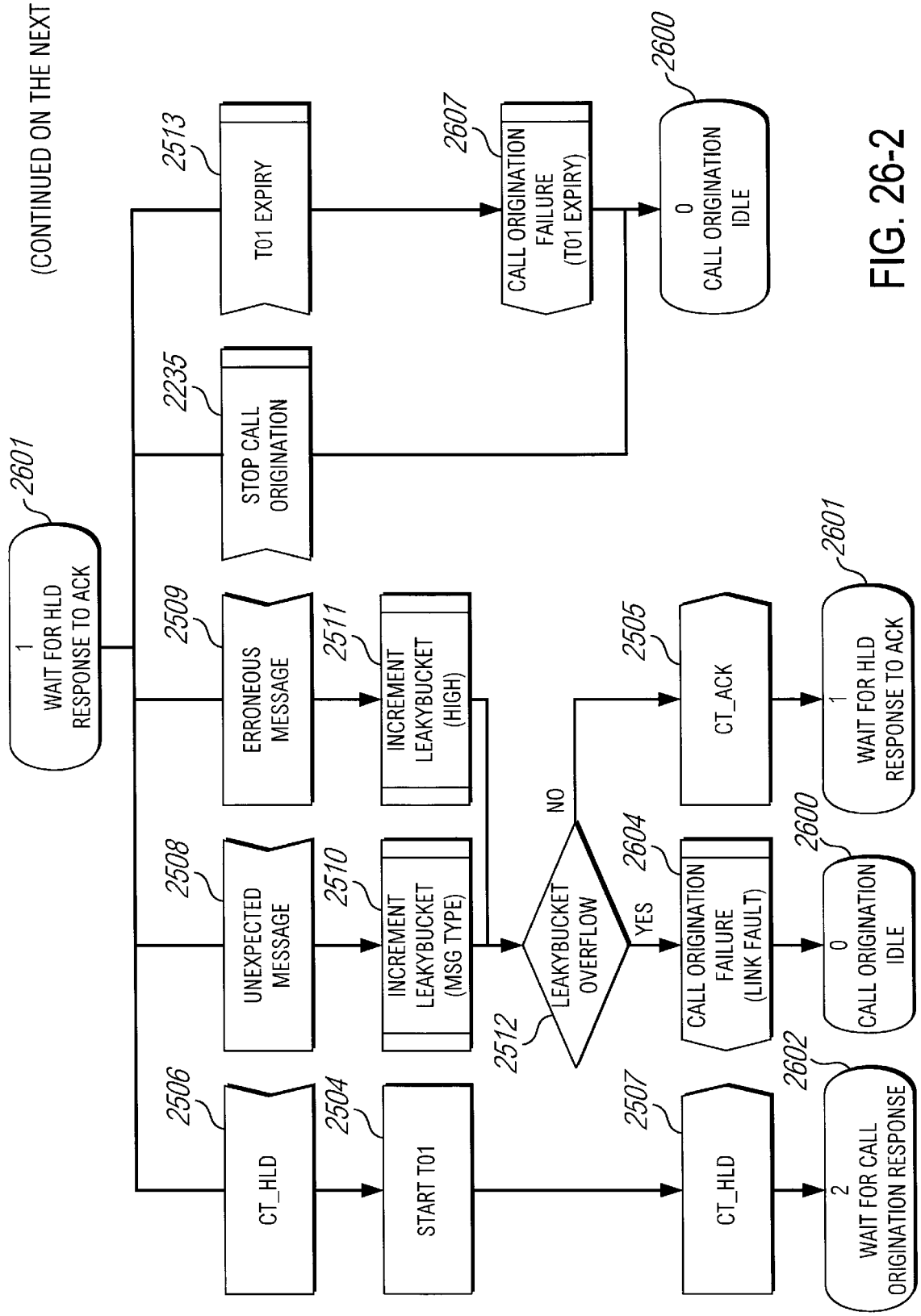
Figures 3, 26:
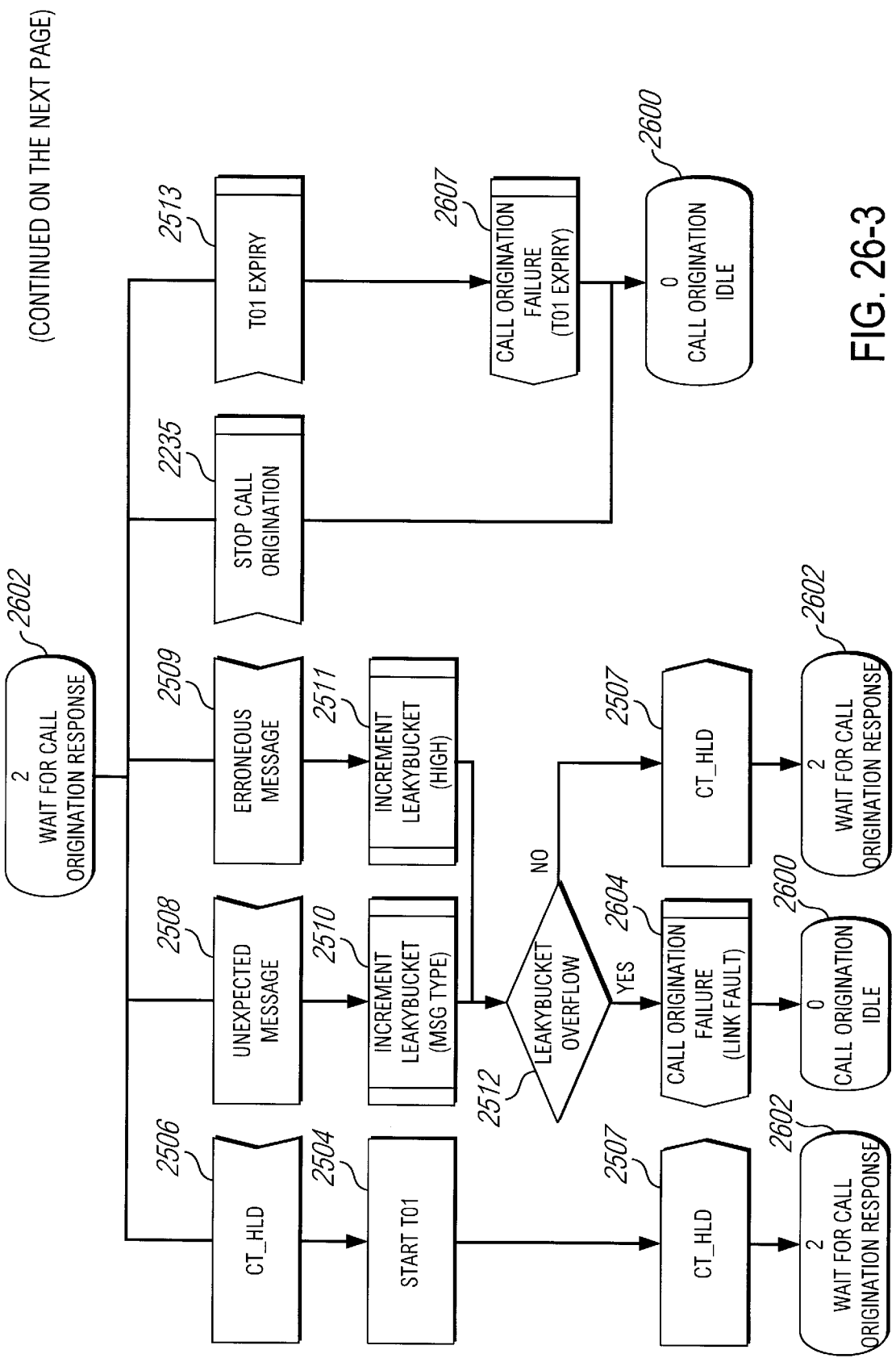
Figures 4, 26:
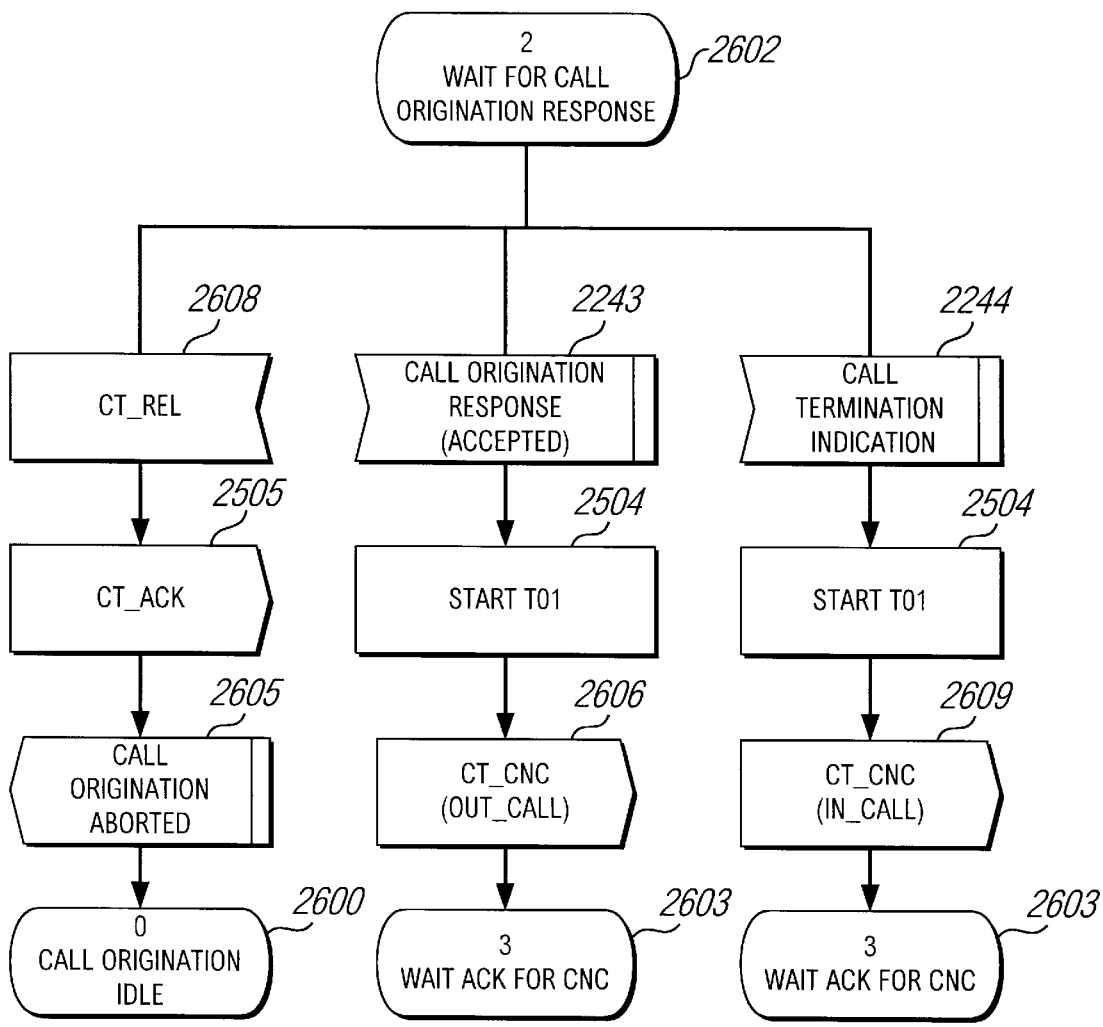
Figures 5, 26:
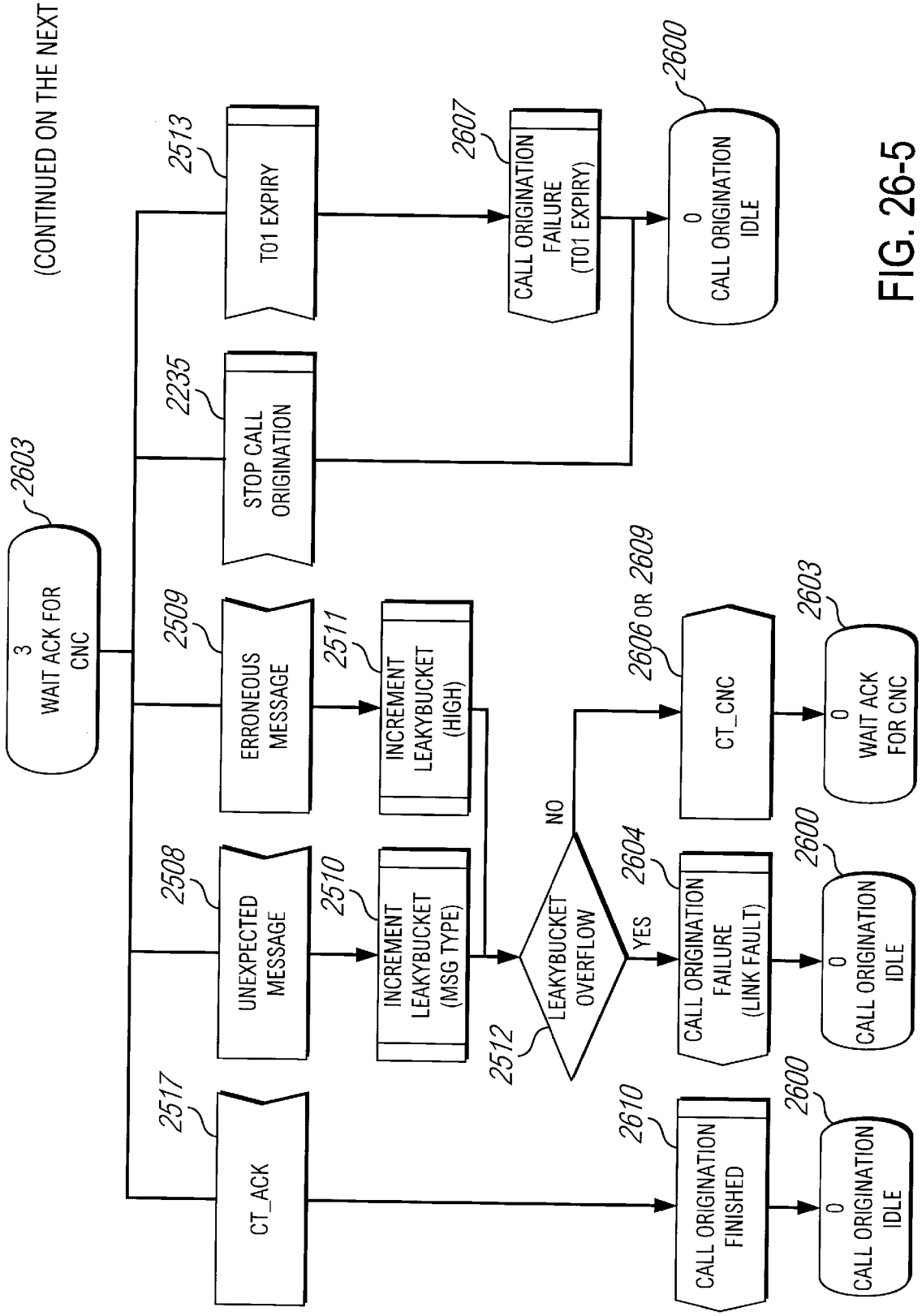
Figures 6, 26:
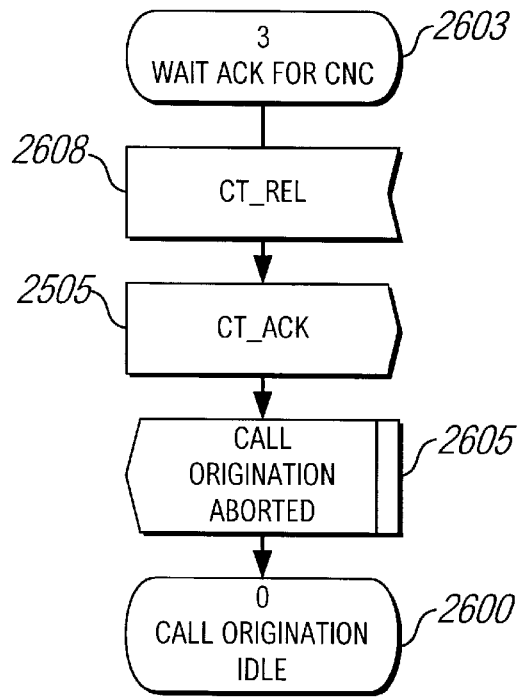

In the BS C(2) state 2210, if the BS_C task 2101 receives a Call Origination Request message 2411 from the BS_SPA task 2103, it activates the BS_CO task 2109 for the channel, depicted in FIG. 26, by sending it a Start Call Origination message 2221. The BS_C task 2101 also sends the LPI task 2112 a Setup message 2222 to transmit on the backhaul interface. The BS_C task 2101 then transitions to the BS_C(8) state 2223 for the channel, depicted in FIG. 22h.

Figures 1, 27:
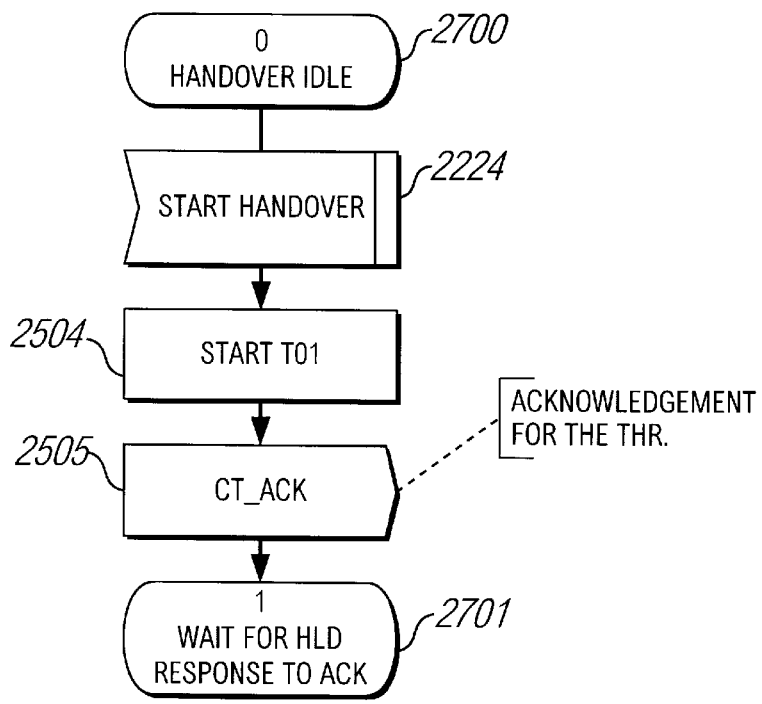
FIG. 27 is a state diagram of the BS software Handover (BS_H) task.
Figures 2, 27:
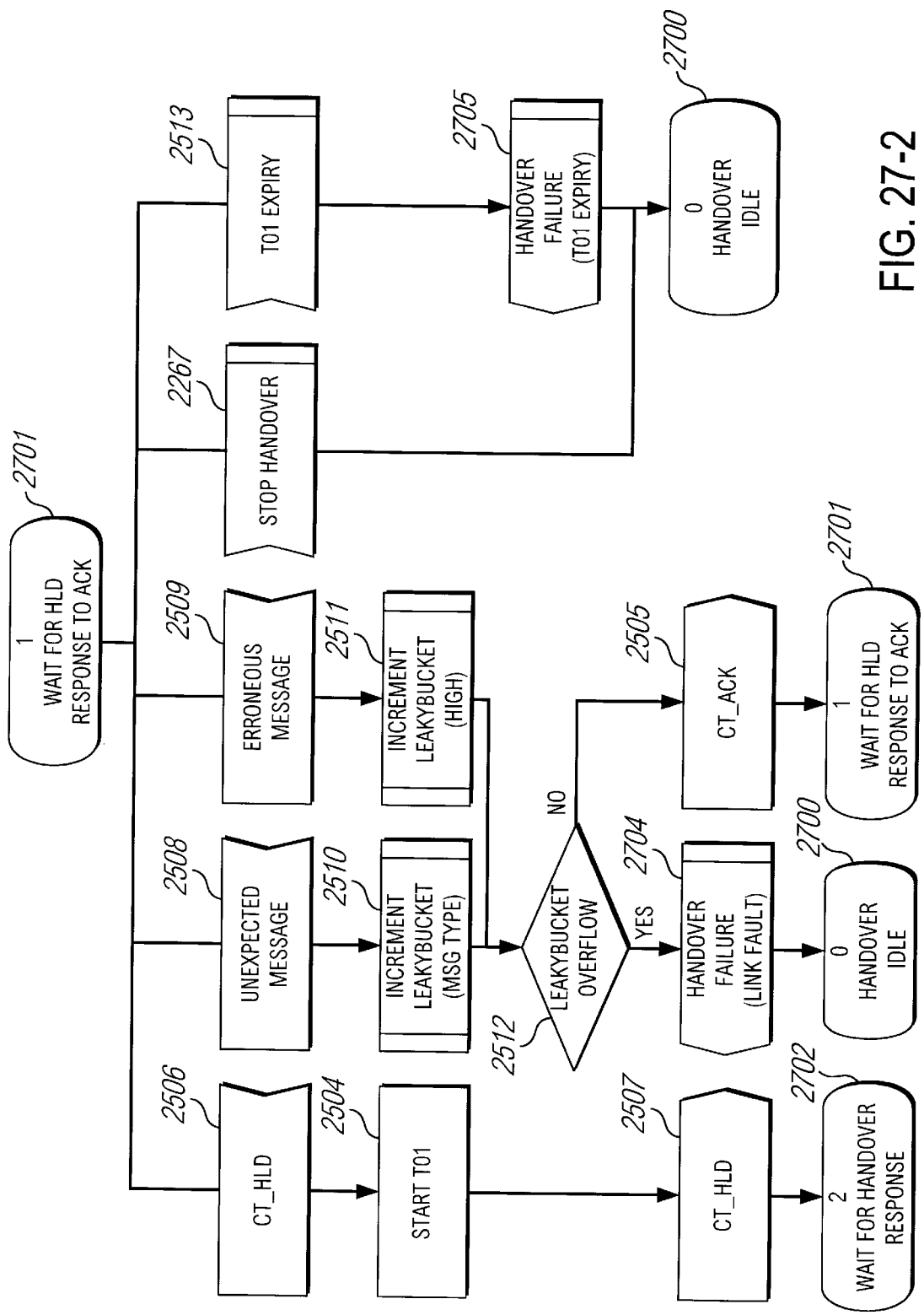
Figures 3, 27:
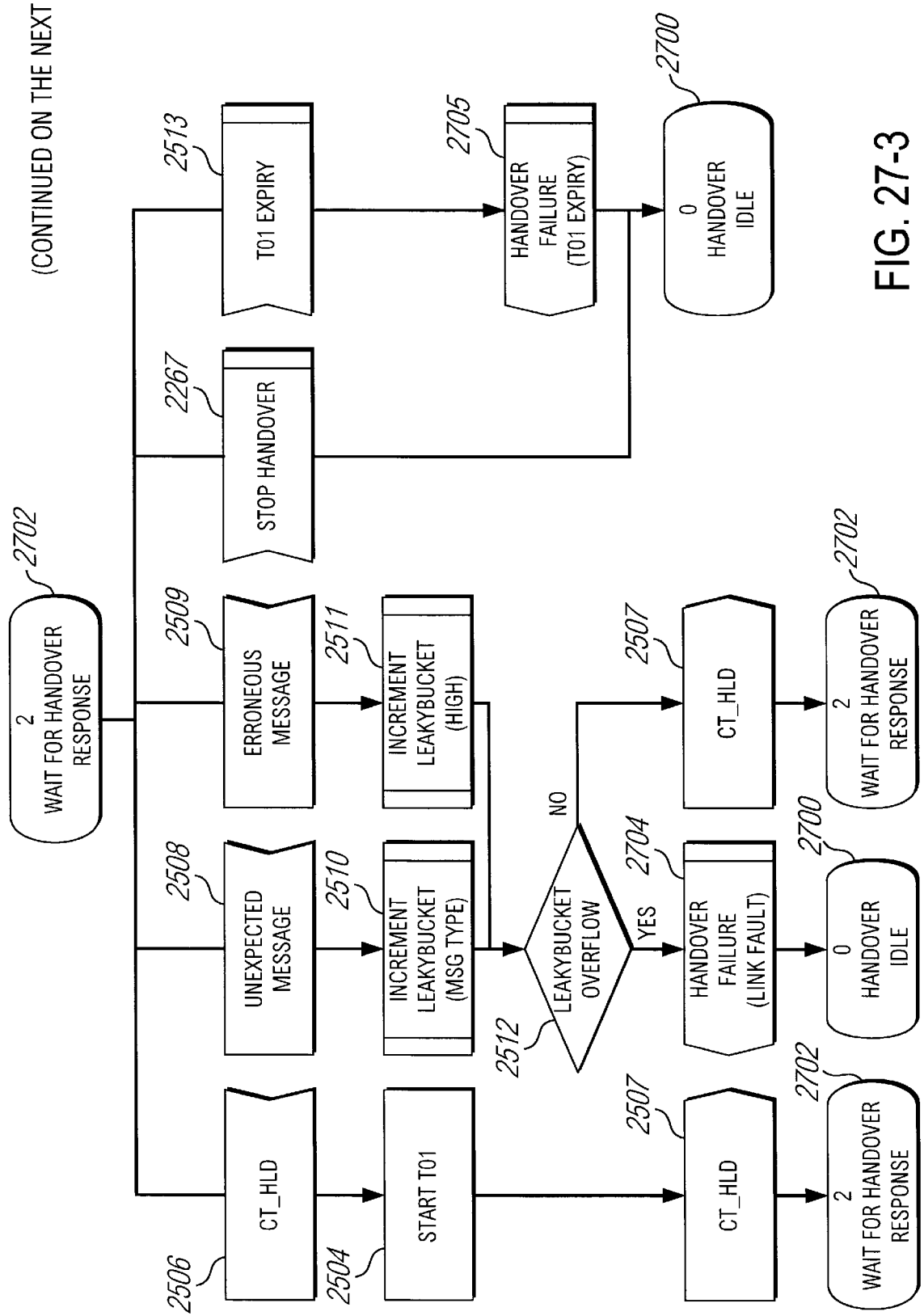
Figures 4, 27:
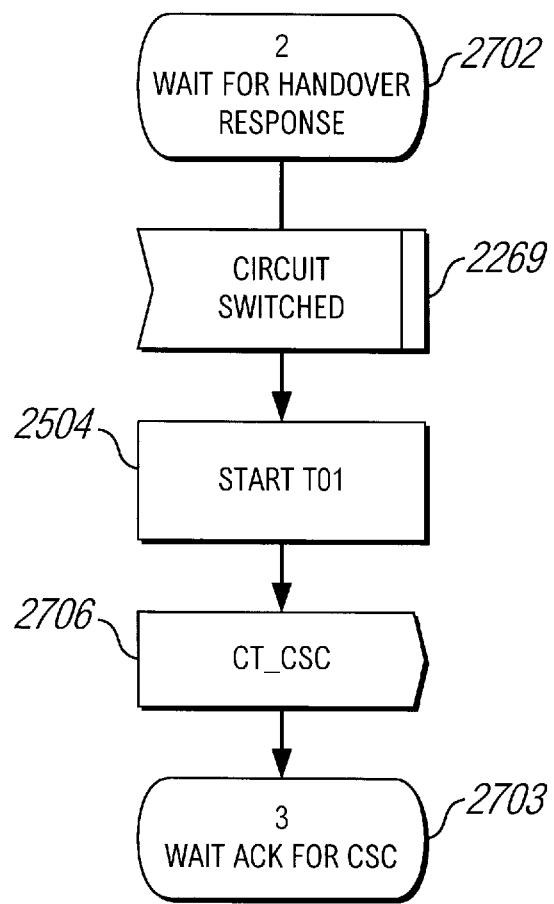
Figures 5, 27:
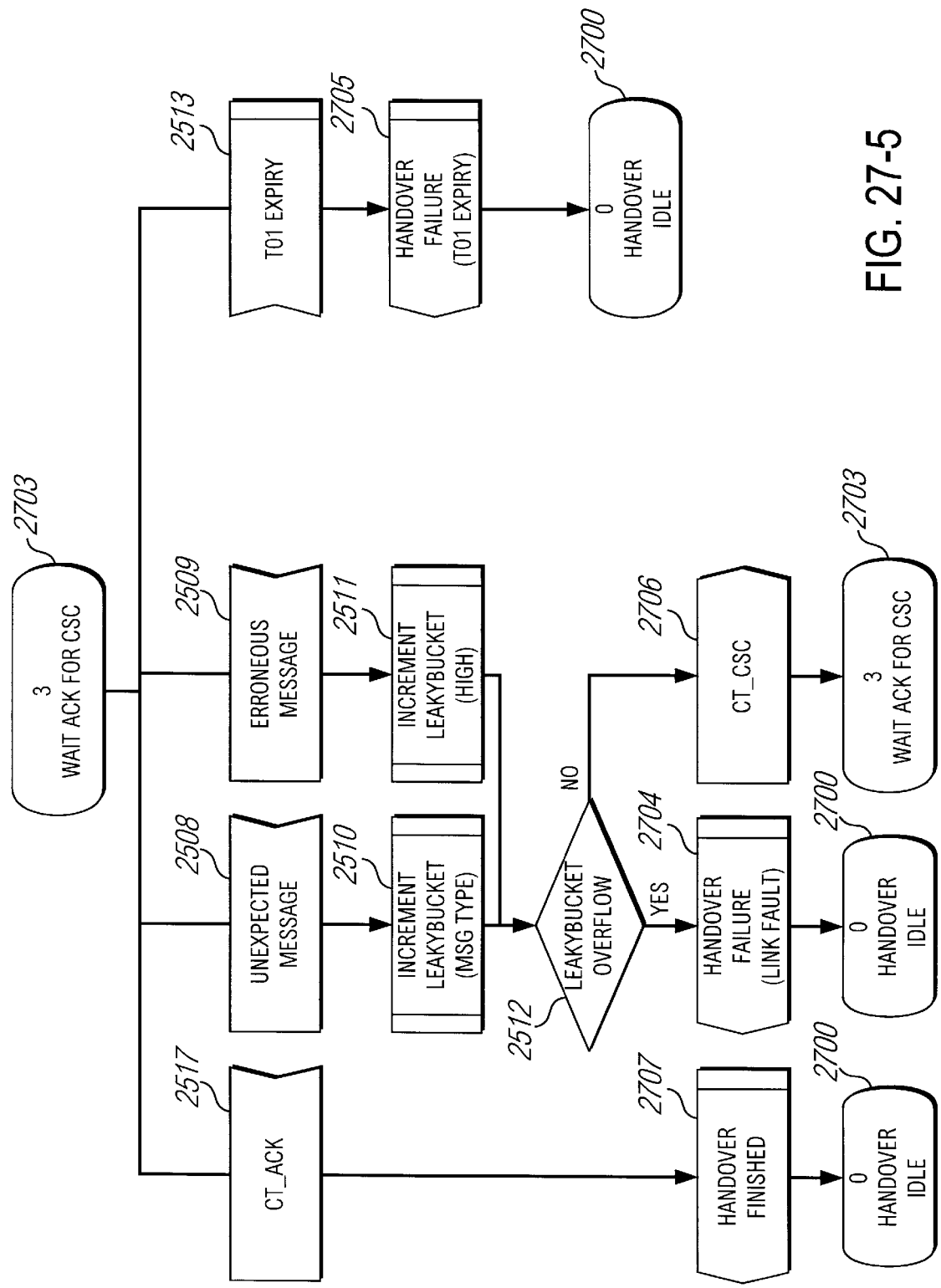

In the BS_C(2) state 2210, if the BS_C task 2101 receives a Handover Request message 2412 from the BS_SPA task 2103, it activates the BS_H task 2111 for the channel, depicted in FIG. 27, by sending it a Start Handover message 2224. The BS_C task 2101 then transitions to the BS_C(20) state 2226 for the channel, depicted in FIG. 22u.

If a base station receives a CT_RRQ (Registration Request) message 2407 while processing in the BS_SPA task 2103 for a channel, the base station is being requested to perform a registration protocol sequence with the mobile station, whereby the mobile station registers with the base station, and, thus, the communication system 101 in general.

Figure 22D:
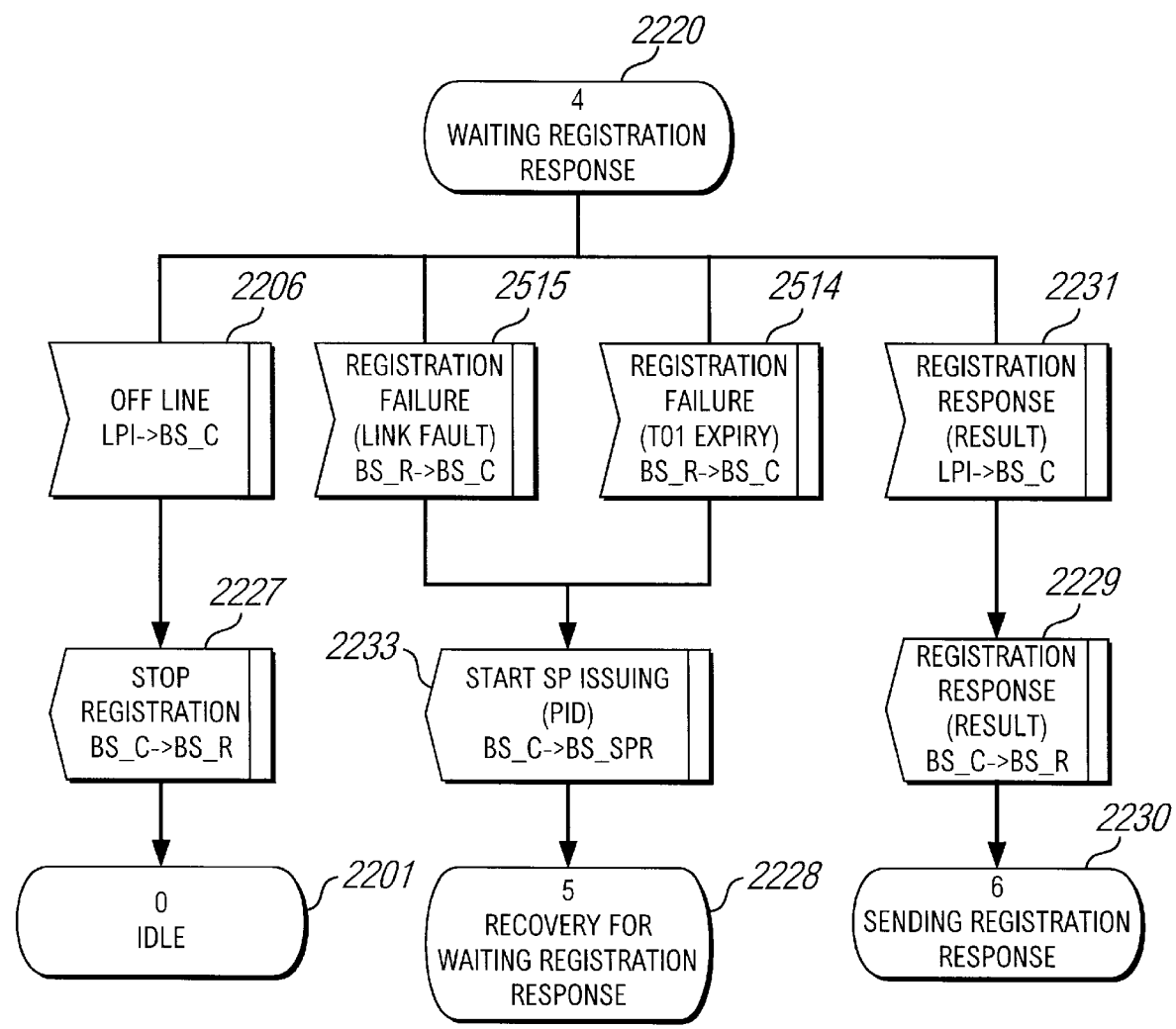

The BS_C task 2101 transitions to the BS_C(4) state 2220 for a channel, depicted in FIG. 22d, when the base station is to perform a registration protocol sequence with a mobile station on the channel. The BS_R task 2104, depicted in FIG. 25, is activated from the BS R(0) ("Idle") state 2500 for a channel when the BS_C task 2101 sends it a Start Registration message 2218. The BS_R task 2104, upon being activated, transmits a CT_ACK message 2505 to the mobile station requesting to register. The BS_R task 2104 also activates a timer T01 2504, for the maximum time it will wait for a CT_HLD message from the mobile station. The BS_R task 2104 then transitions to the BS R(1) state 2501, where it waits for a CT_HLD message from the mobile station. The base station and the mobile station transmit CT_HLD messages to each other when they are executing a protocol sequence, such as the registration protocol sequence currently being described, and have no other message to transmit to the other.

In the BS_R(1) state 2501, if T01 expires 2513, the BS_R task 2104 sends the BS_C task 2101 a Registration Failure (T01 Expiry) message 2514. The BS_R task 2104 then terminates processing for the channel, re-transitioning to the BS_R(0) state 2500.

Upon receiving the expected CT_HLD message 2506, the BS_R task 2104 re-enables timer T01 2504, transmits its own CT_HLD message 2507 to the mobile station, and transitions to the BS_R(2) state 2502, where it continues to process the transmission 2507 and reception 2506 of CT_HLD messages to/from the mobile station. If timer T01 expires 2513 in the BS_R(2) state 2502, the BS_R task 2104 sends the BS_C task 2101 a Registration Failure (T01 Expiry) message 2514. The BS_R task 2104 then terminates processing for the channel, re-transitioning to the $BS_{13}$ R(0) state 2500.

While executing in the BS_C(4) state 2220 of the BS_C task 2101, depicted in FIG. 22d, the base station may receive a Register Response message from the system controller 103; the LPI task 2112 sends the BS_C task 2101 this Register Response message 2231. Upon receiving this Register Response message, the BS_C task 2101 sends the BS_R task 2104 a Registration Response message 2229. The BS_C task 2101 then transitions to the BS_C(6) state 2230, depicted in FIG. 22e.

The BS_R task 2104, upon receiving the Registration Response 2229, transmits a CT_RCP (Registration Complete) message 2516 to the mobile station requesting to register. The CT_RCP message informs the mobile station of the system controller 103's response to its registration request. The BS_R task 2104 also enables a timer T01 2504, for the maximum time it will wait for a CT_ACK message response from the mobile station. The BS_R task 2104 then transitions to the BS_R(3) state 2503, where it waits for the CT_ACK message response from the mobile station.

If timer T01 expires 2513 in the BS_R(3) state 2503, the BS_R task 2104 sends the BS_C task 2101 a Registration Failure (T01 Expiry) message 2514. The BS_R task 2104 then terminates processing for the channel, re-transitioning to the BS_R(0) state 2500.

Upon receiving the expected CT_ACK message 2517 from the mobile station, the BS_R task 2104 sends the BS_C task 2101 a Registration Finished message 2518. The BS_R task 2104 then terminates processing for the channel, re-transitioning to the BS_R(0) state 2500.

In the BS_R(1) state 2501, the BS_R(2) state 2502, or the BS_R(3) state 2503, the base station may receive an unexpected 2508 or erroneous 2509 message on the O-Interface (as previously described). Upon receiving an unexpected or erroneous message at this time, the BS_R task 2104 increments the appropriate LeakyBucket counter (2510 or 2511). The BS_R task 2104 then checks 2512 if either LeakyBucket counter indicates a maximum error count has been reached. If no, the BS_R task 2104 re-transmits the last message it transmitted to the mobile station, and continues processing in the current BS_R state. If the BS_R task 2104 is in the BS_R(1) state 2501, the last message transmitted was a CT_ACK message 2505. If the BS_R task 2104 is in the BS_R(2) state 2502, the last message transmitted was a CT_HLD message 2507. If the BS_R task 2104 is in the BS_R(3) state 2503, the last message transmitted was a CT_RCP message 2516.

If, however, the BS_R task 2104 checks 2512 its Leaky-Bucket counters and finds that either indicates a maximum error count, it sends the BS_C task 2101 a Registration Failure (Link Fault) message 2515, and then terminates processing for the channel, re-transitioning to the BS_R(0) state 2500.

Figure 22E:
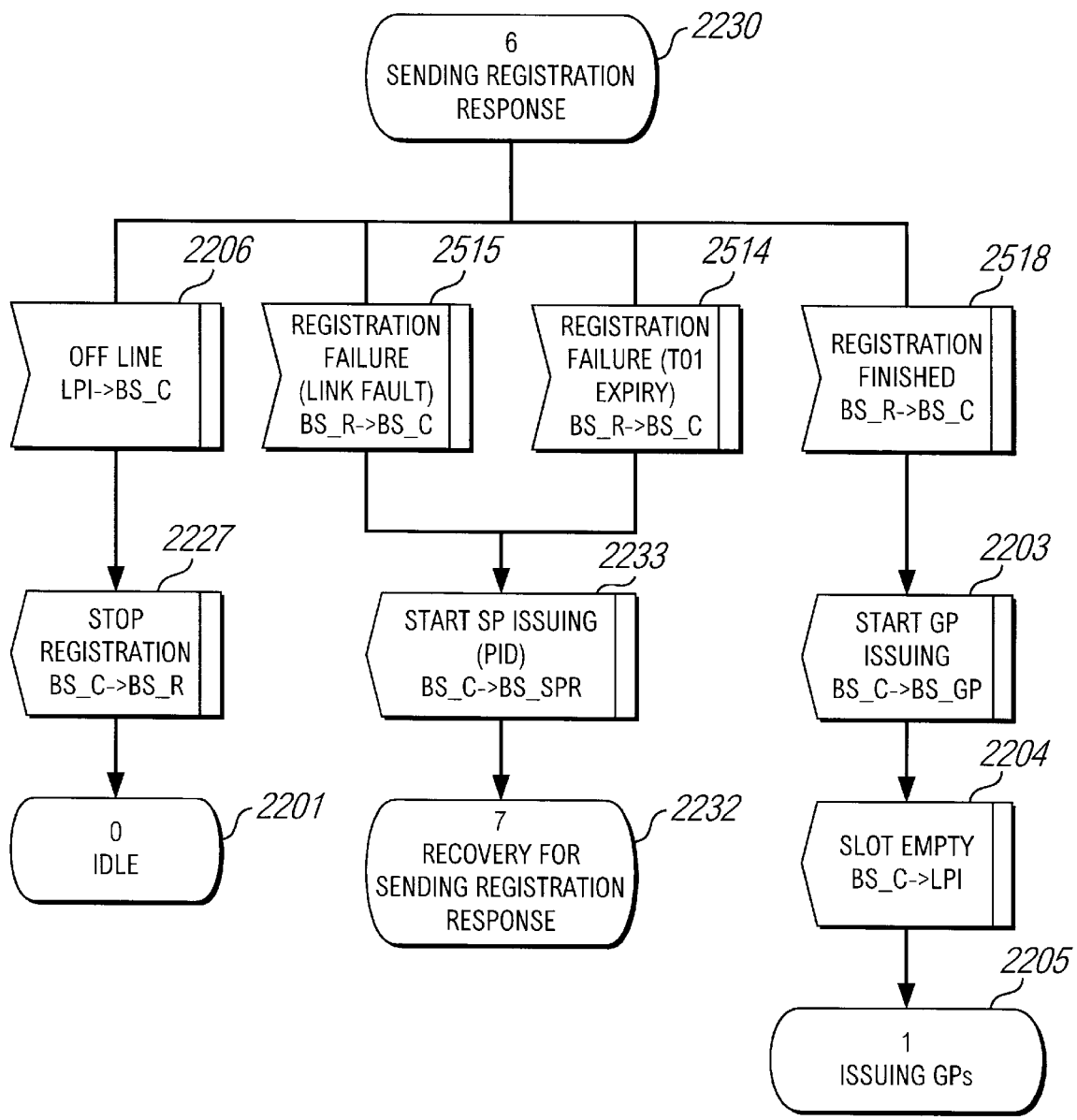

In the BS_C(6) state 2230, depicted in FIG. 22e, if the BS_C task 2101 receives a Registration Finished message 2518 from the BS_R task 2104, the base station registration protocol processing for the mobile station is complete. At this time, the BS_C task 2101 activates the BS_GP task 2102, by sending it a Start GP Issuing message 2203 for the channel, as previously described, and depicted in FIG. 23. The BS_C task 2101 also at this time sends a Slot Empty message 2204 for the channel to the LPI task 2112. The BS_C task 2101 then transitions to the BS_C(1) state 2205 for the channel, depicted in FIG. 22b.

In the BS C(4) state 2220, FIG. 22d, or the $BS_{13}$ C(6) state 2230, FIG. 22e, if the BS_C task 2101 receives an Off Line message 2206 from the LPI task 2112 for the channel, the BS_C task 2101 sends the BS_R task 2104 a Stop Registration message 2227 for the channel, and transitions to the BS_C(0) state 2201 for the channel, previously described, and depicted in FIG. 22a. The BS_R task 2104, for its part, upon receiving a Stop Registration message 2227 from the BS_C state 2101 for a channel, terminates processing for the channel, re-transitioning to the BS_R(0) state 2500.

As previously described, if the BS_R task 2104 checks 2512 its LeakyBucket counters and finds that either indicates a maximum error count, it sends the BS_C task 2101 a Registration Failure (Link Fault) message 2515. The BS_C task 2101, for its part, if it receives a Registration Failure (Link Fault) message 2515 while processing in the BS_C(4) state 2220 or the BS_C(6) state 2230, activates the BS_SPR task 2108, depicted in FIG. 28, by sending it a Start SP Issuing message 2233 for the channel. The BS_C task 2101, if in the BS_C(4) state 2220, then transitions to the BS_C(5) state 2228, depicted in FIG. 22f. Else, if in the BS_C(6) state 2230, the BS_C task 2101 transitions to the BS_C(7) state 2232, depicted in FIG. 22g. At this time, the base station software is attempting to resynchronize ("resync") the mobile station with the base station, by transmitting the mobile station one or more Specific Poll messages for it to resync off of.

Figures 1, 28:
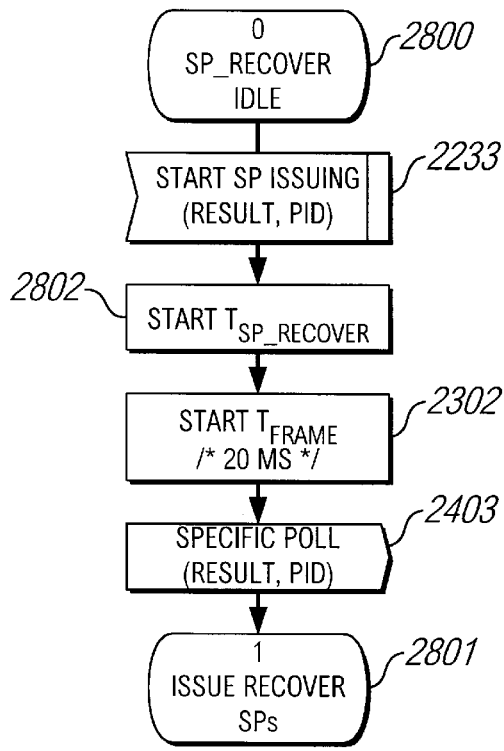
FIG. 28 is a state diagram of the BS software Specific Poll Recover (BS_SPR) task.
Figures 2, 28:
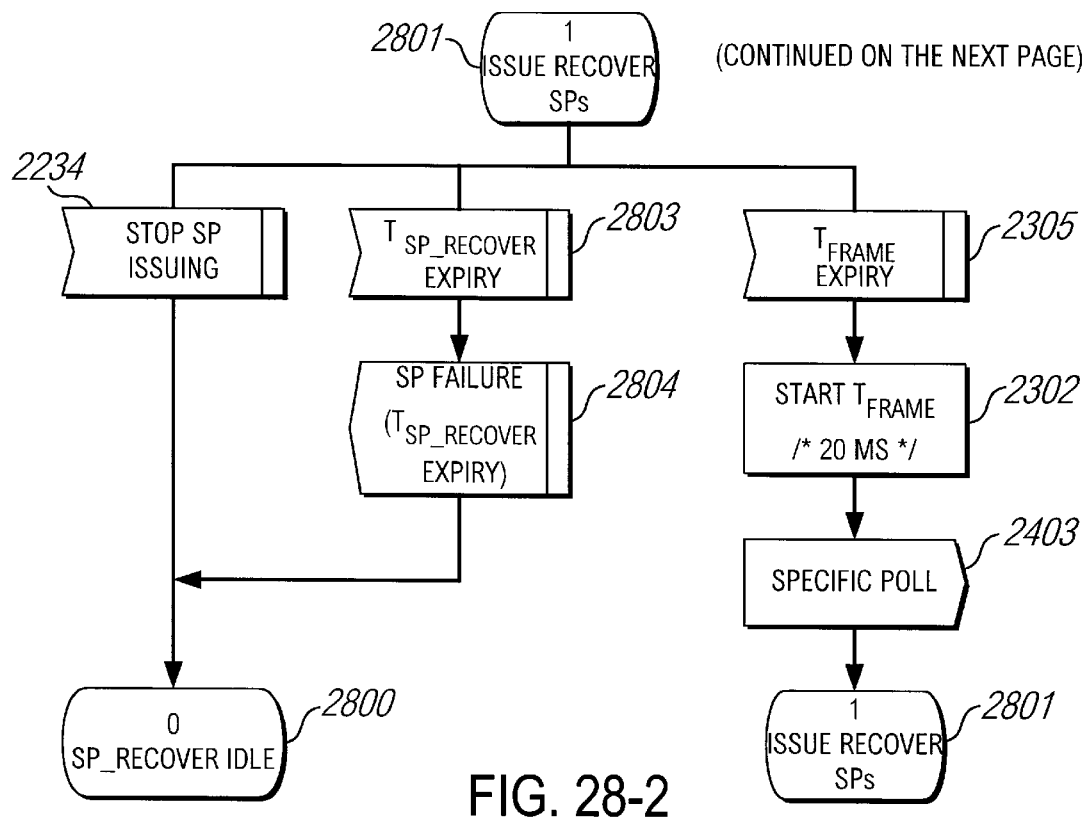
Figures 3, 28:
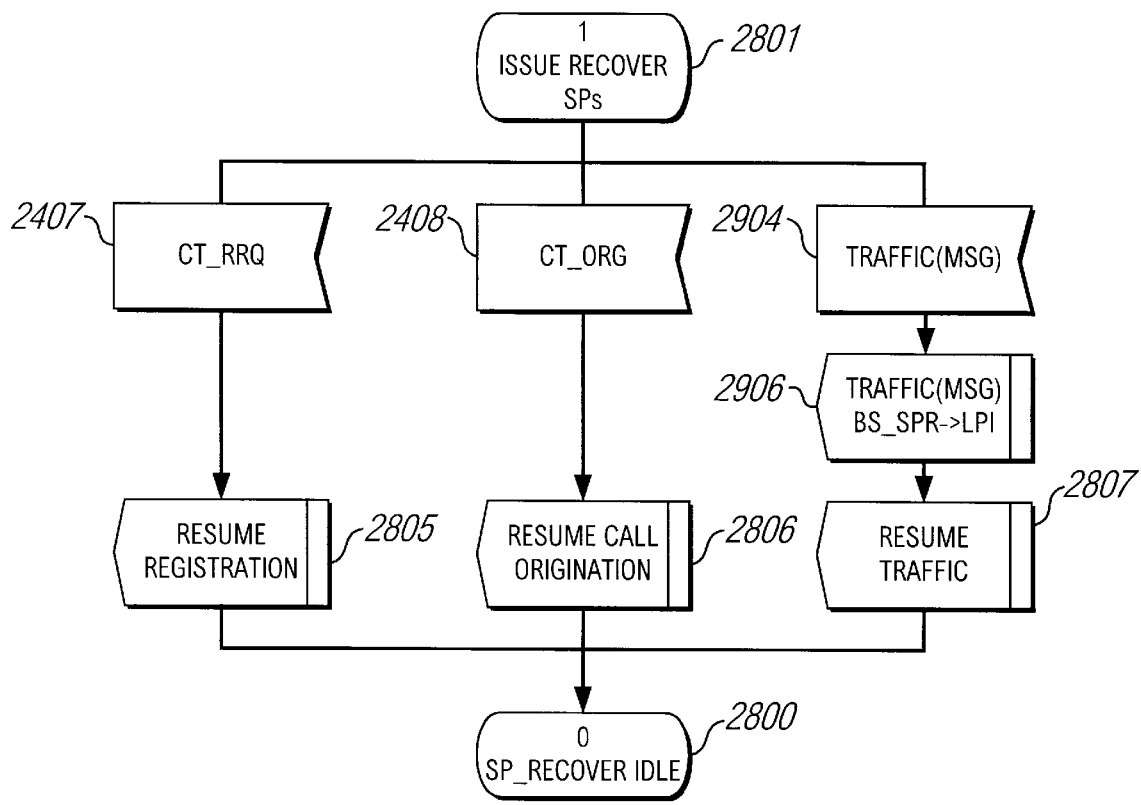

The BS_SPR task 2108, depicted in FIG. 28 is very similar to the previously described BS_SPA task 2103, depicted in FIG. 24. The BS_SPR task 2108 is activated from the BS_SPR(0) ("Idle") state 2800 when the BS_C task 2101 sends it a Start SP Issuing message 2233 for a channel. The BS_SPR task 2108 may be activated by various BS_C states, when the BS_C task 2101 determines to attempt to resync the mobile station with the base station.

The BS_SPR task 2108 transmits one or more Specific Poll messages 2403 for the mobile station, to provide the mobile station a transmission to resync off of. Upon being activated, the BS_SPR task 2108 transmits a Specific Poll message 2403 for the mobile station, and enables a timer T(frame) 2302. Thereafter, in the BS_SPR(1) state 2801, when T(frame) elapses 2305, the BS_SPR task 2108 re-enables T(frame) 2302, and transmits another Specific Poll message 2403 for the mobile station. In a preferred embodiment, T(frame) is a 20-millisecond timer.

The BS_SPR task 2108 also enables a timer T(sp_recover) 2802, for the maximum time it will continue executing for the channel, transmitting Specific Poll messages 2403 to the mobile station, and waiting for a valid mobile station response. The BS_SPR task 2108 then transitions to the BS_SPR(1) state 2801. If T(sp_recover) expires 2803 in the BS_SPR(1) state 2801, the BS_SPR task 2108 sends the BS_C task 2101 an SP Failure (T(sp_recover) Expiry) message 2804, and terminates processing for the channel, retransitioning to the BS_SPR(0) state 2800.

Figure 22F:
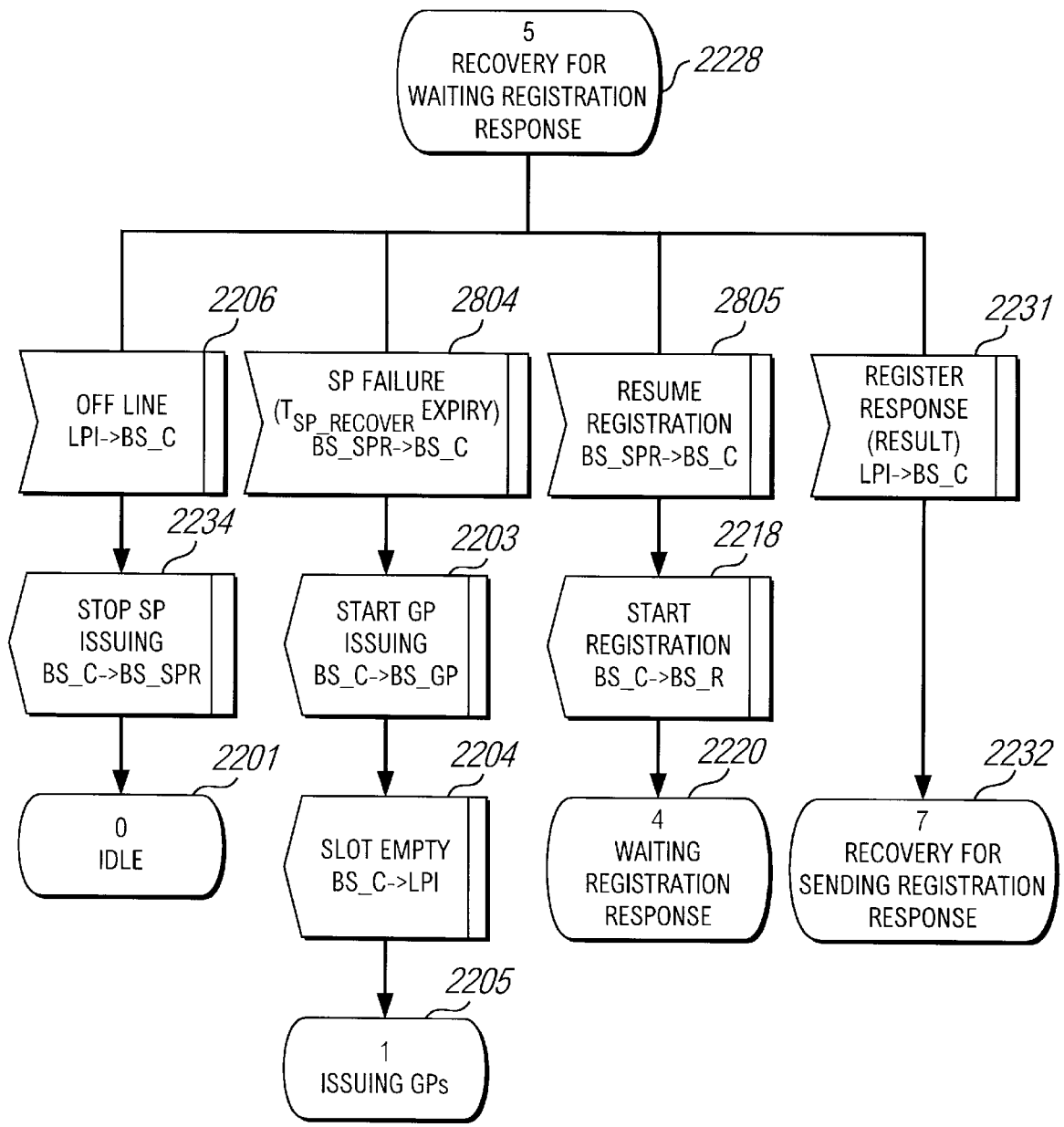
Figure 22G:
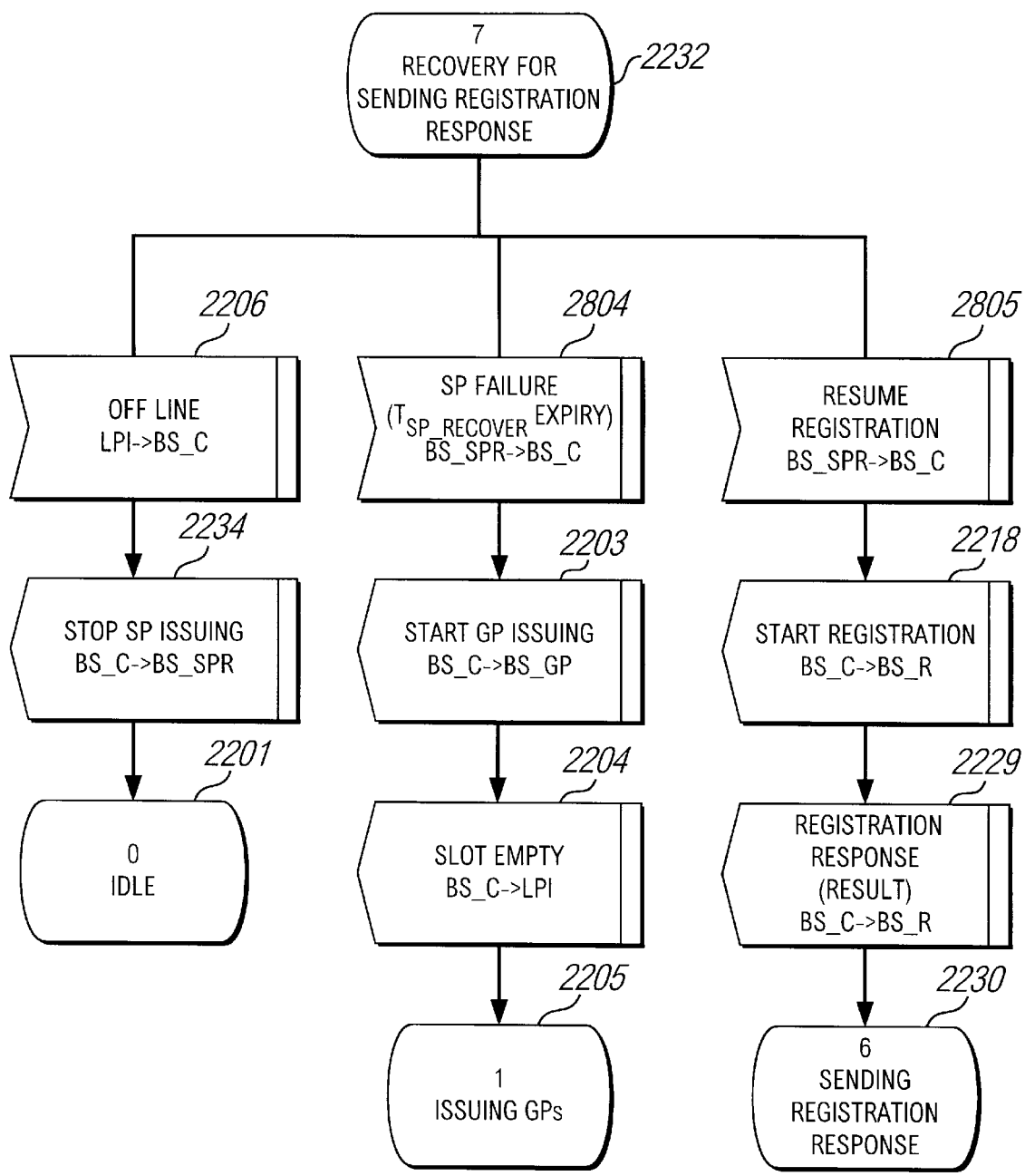

In the BS_C(5) state 2228, depicted in FIG. 22f, or the BS_C(7) state 2232, depicted in FIG. 22g, if the BS_C task receives an SP Failure (T(sp_recover) Expiry) message 2804 from the BS_SPR task 2108, it activates the BS_GP task 2102, by sending it a Start GP Issuing message 2203 for the channel, as previously described, and depicted in FIG. 23. The BS_C task 2101 also sends a Slot Empty message 2204 for the channel to the LPI task 2112. The BS_C task 2101 then transitions to the $BS_{13}$ C(1) state 2205 for the channel, depicted in FIG. 22b.

In the BS_C(5) state 2228, or the BS_C(7) state 2232, if the BS_C task 2101 receives an Off Line message 2206 from the LPI task 2112 for the channel, it sends the BS_SPR task 2108 a Stop SP Issuing message 2234 for the channel, and transitions to the BS_C(0) state 2201 for the channel, previously described, and depicted in FIG. 22a. The BS_SPR task 2108, for its part, upon receiving a Stop SP Issuing message 2234 from the BS_C task 2101, terminates processing for the channel, re-transitioning to the BS_SPR (0) state 2800.

If the base station receives a CT_RRQ (Registration Request) message 2407 from the mobile station, in response to its Specific Poll message transmissions to the mobile station, the BS_SPR task 2108 sends the BS_C task 2101 a Resume Registration message 2805, and then terminates processing for the channel, re-transitioning to the BS_SPR (0) state 2800.

If the base station receives a CT_ORG (Call Originate) message 2408 from the mobile station, in response to its Specific Poll message transmissions to the mobile station, the BS_SPR task 2108 sends the BS_C task 2101 a Resume Call Origination message 2806, and then terminates processing for the channel, re-transitioning to the BS_SPR(0) state 2800.

If the base station receives a Traffic message 2904 (i.e., bearer data) from the mobile station, in response to its Specific Poll message transmissions to the mobile station, the BS_SPR task 2108 forwards the message to the LPI task 2112. In another embodiment, the BS_SPR task 2108 may forward the message to the BS_C task 2102, which will then forward it to the LPI task 2112. The BS_SPR task 2108 also sends the BS_C task 2101 a Resume Traffic message 2807, and then terminates processing for the channel, re-transitioning to the BS_SPR(0) state 2800.

As previously noted, in the BS_C(5) state 2228, FIG. 22f, or the BS_C(7) state 2232, FIG. 22g, the BS_C task 2101 is waiting for the BS_SPR task 2108 to send it a Resume Registration message. Upon receiving a Resume Registration message 2805 in any of these BS_C states, the BS_C task 2101 activates the BS_R task 2104 once again, by sending it a Start Registration message 2218. If the BS_C task 2101 is in the BS_C(5) state 2228 at this time, it then transitions to the BS_C(4) state 2220, previously discussed, and depicted in FIG. 22d. If, on the other hand, the BS_C task 2101 is in the BS_C(7) state 2232 at this time, the base station has already received a registration response from the system controller 103, for the mobile station's previous registration request. Thus, the BS_C task 2101 sends the BS_R task 2104 a Registration Response message 2229, and transitions to the BS_C(6) state 2230, previously discussed, and depicted in FIG. 22e.

While the BS_C task 2101 is in the BS_C(5) state 2228, waiting to recover synchronization with the mobile station, the base station may receive a Register Response message from the system controller 103; the LPI task 2112 sends the BS_C task 2101 this Register Response message 2231. Upon receiving a Register Response message at this time, the BS_C task 2101 transitions to the BS_C(7) state 2232, previously described, and depicted in FIG. 22g.

As previously discussed, and depicted in FIG. 22c, in the BS_C(2) state 2210, if the BS_C task 2101 receives a Call Origination Request message 2411 from the BS_SPA task 2103, it activates the BS_CO task 2109 for a channel, depicted in FIG. 26, by sending it a Start Call Origination message 2221. The BS_C task 2101 also sends the LPI task 2112 a Setup message 2222 to transmit on the backhaul interface. The BS_C task 2101 then transitions to the BS_C(8) state 2223 for the channel, depicted in FIG. 22h.

If the base station receives a CT_ORG (Call Originate) message 2408 while processing in the BS_SPA task 2103 for a channel, the base station is being requested to perform a call originate protocol sequence with the mobile station, whereby the mobile station establishes a call link on the communication system 101, to place a call with another.

The BS_CO task 2109, depicted in FIG. 26, is activated from the BS_CO(0) ("Idle") state 2600 for a channel when the BS_C task 2101 sends it a Start Call Origination message 2221. The BS_CO task 2109, upon being activated, transmits a CT_ACK message 2505 to the mobile station requesting to place the call. The BS_CO task 2109 then transitions to the BS_CO(1) state 2601, where it waits for a CT_HLD message from the mobile station. As previously described, in regards to the registration protocol processing, the base station and the mobile station transmit CT_HLD messages to each other when they are executing a protocol sequence and have no other message to transmit to the other.

The BS_CO task 2109 also enables a timer T01 2504, prior to transitioning to the BS_CO(1) state 2601, for the maximum time that it will wait for the expected CT_HLD message. If T01 expires 2513, the BS_CO task 2109 sends the BS_C task 2101 a Call Origination Failure (T01 Expiry) message 2607. The BS_CO task 2109 then terminates processing for the channel, re-transitioning to the BS_CO (0) state 2600.

Upon receiving the expected CT_HLD message 2506, the BS_CO task 2109 re-enables timer T01 2504, transmits its own CT_HLD message 2507 to the mobile station, and transitions to the BS_CO(2) state 2602, where it continues to process the transmission 2507 and reception 2506 of CT_HLD messages to/from the mobile station, re-enabling T01 2504 each time it receives a CT_HLD message 2506 from the mobile station. If timer T01 expires 2513 in the BS_CO(2) state 2602, the BS_CO task 2109 sends the BS_C task 2101 a Call Origination Failure (T01 Expiry) message 2607. The BS_CO task 2109 then terminates processing for the channel, re-transitioning to the BS_CO (0) state 2600.

Figures 1, 22H:
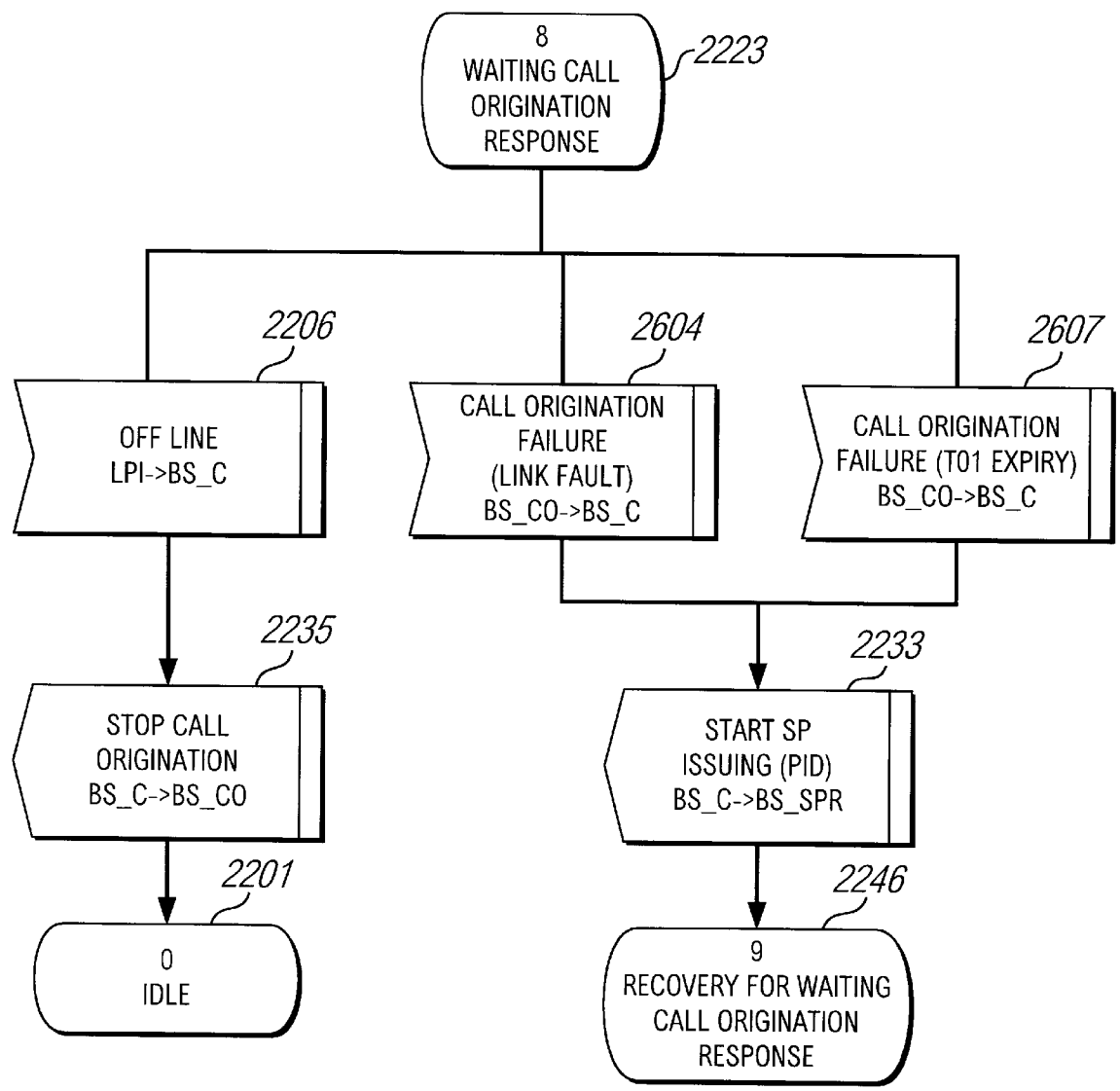
Figures 2, 22H:
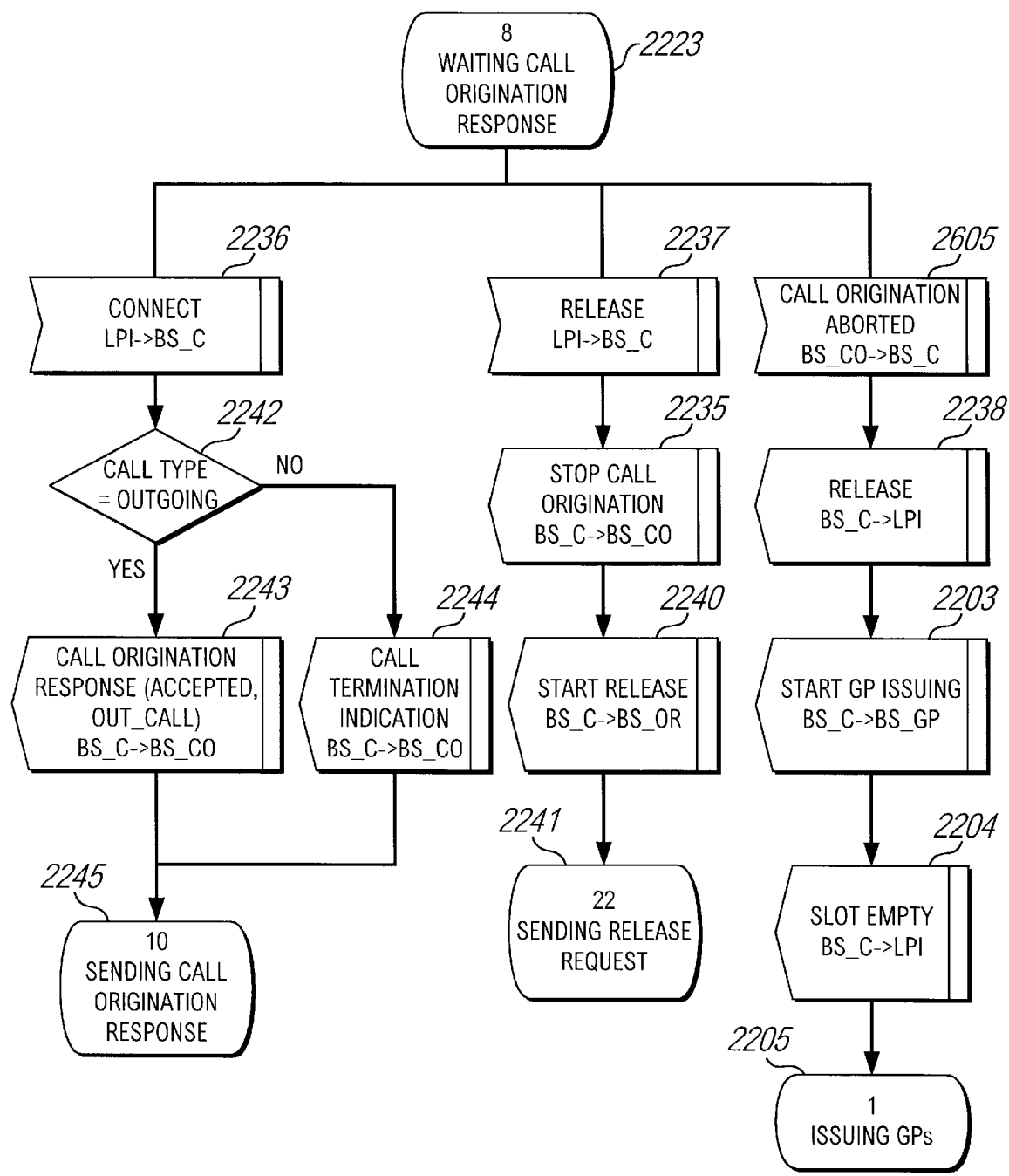

While executing in the BS_C(8) state 2223 of the BS_C task 2101, depicted in FIG. 22h, the base station may receive a Connect message from the system controller 103; the LPI task 2112 sends the BS_C task 2101 this Connect message 2236. The Connect message indicates that the system controller 103 has established a call link for the mobile station. The BS_C task 2101, upon receiving this Connect message, checks 2242 the call type of the Connect message, and sends the BS_CO task 2109 a Call Origination Response message 2243 if the call type is outgoing, meaning that the call link is for the call the mobile station placed. If, however, the call type is not outgoing, meaning the call link is for a call placed by another, the BS_C task 2101 sends the BS_CO task 2109 a Call Termination Indication message 2244. The BS_C task 2101 then transitions to the BS_C(10) state 2245, depicted in FIG. 22i.

The BS_CO task 2109, upon receiving a Call Origination Response message 2243, transmits a CT_CNC (Call Connect) message 2606 to the mobile station. The BS_CO task 2109 re-enables timer T01 2504, for the maximum time it will wait for a CT_ACK message response from the mobile station. The BS_CO task 2109 then transitions to the BS_CO(3) state 2603, where it waits for a CT_ACK message from the mobile station.

The BS_CO task 2109, upon receiving the Call Termination Indication message 2244, transmits a CT_CNC message 2609 to the mobile station. The BS_CO task 2109 re-enables timer T01 2504, for the maximum time it will wait for a CT_ACK message response from the mobile station. The BS_CO task 2109 then transitions to the BS_CO(3) state 2603, where it waits for a CT_ACK message from the mobile station.

If timer T01 expires 2513 in the BS_CO(3) state 2603, the BS_CO task 2109 sends the BS_C task 2101 a Call Origination Failure (T01 Expiry) message 2607. The BS_CO task 2109 then terminates processing for the channel, re-transitioning to the BS_CO(0) state 2600.

In the BS_CO(3) state 2603, upon receiving the expected CT_ACK message 2517 from the mobile station, the BS_CO task 2109 sends the BS_C task 2101 a Call Origination Finished message 2610. The BS_CO task 2109 then terminates processing for the channel, re-transitioning to the BS_CO(0) state 2600.

Figures 1, 22I:
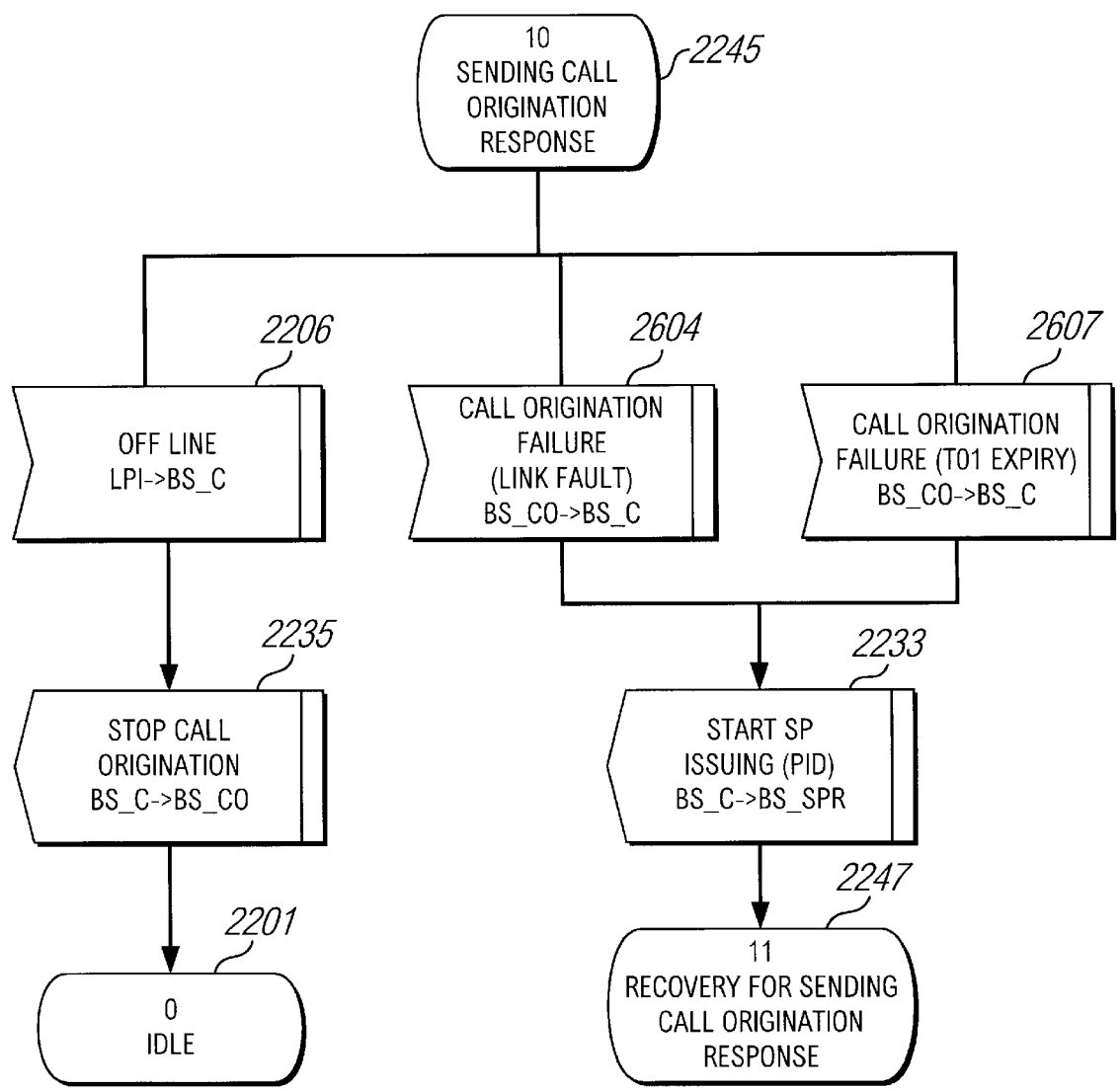
Figures 2, 22I:
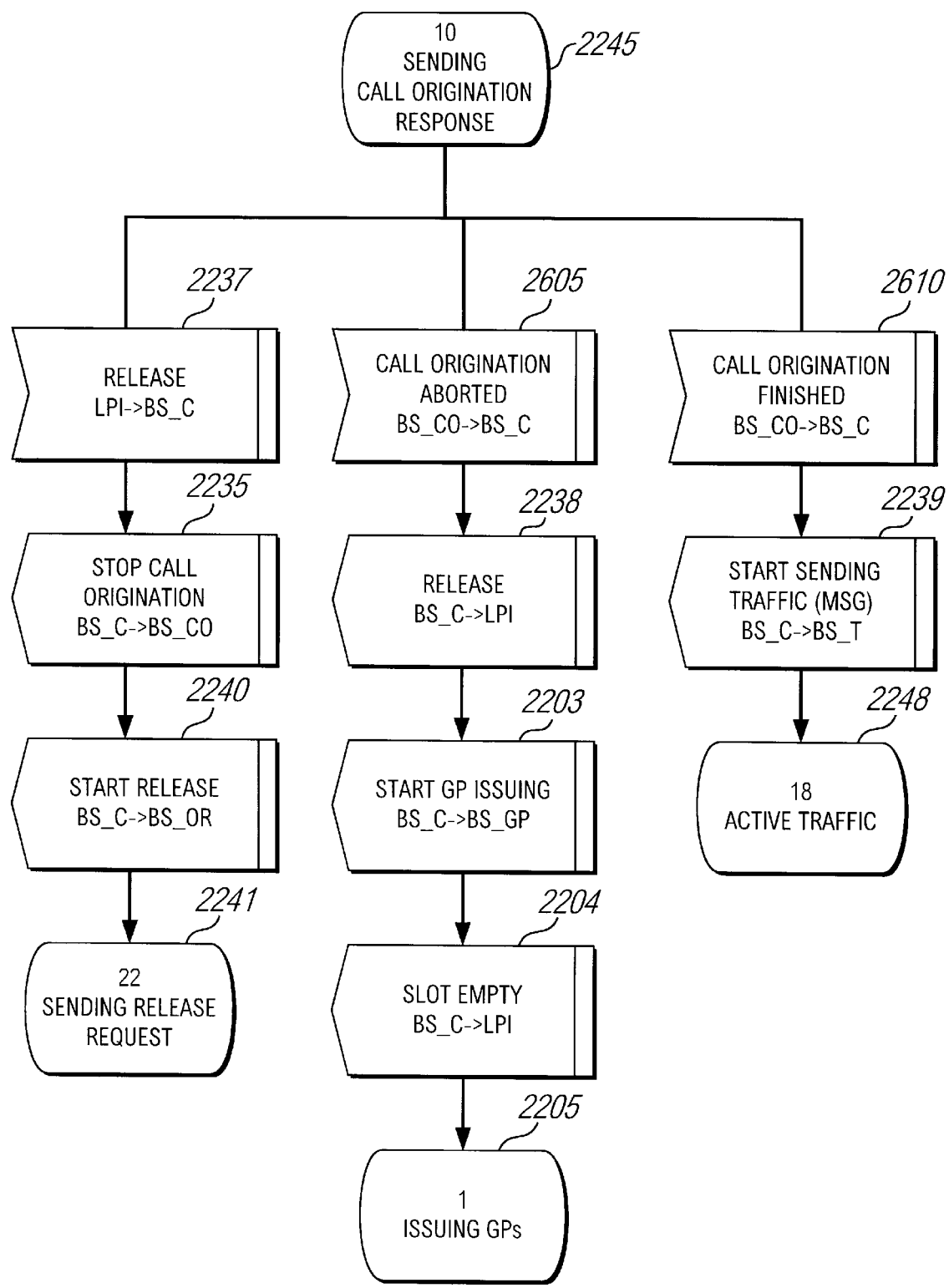

In the $BS_{13}$ C(10) state 2245, depicted in FIG. 22i, if the BS_C task 2101 receives a Call Origination Finished message 2610 from the BS_CO task 2109, the base station call origination protocol processing for the mobile station is complete. At this time, a call link has been established for the mobile station to communicate with another in the communication system 101. The BS_C task 2101, therefore, activates the BS_T task 2106 for the channel the mobile station has used to establish the call link on, depicted in FIG. 29, by sending it a Start Sending Traffic message 2239. The BS_C task 2101 then transitions to the BS_C (18) state 2248, depicted in FIG. 22s.

In the BS_C(8) state 2223, FIG. 22h, or the BS_C(10) state 2245, FIG. 22i, the base station may receive a Release message from the system controller 103; the LPI task 2112 sends the BS_C task 2101 this Release message 2237. The Release message informs the base station that the mobile station's call link on the communication system 101 is being (or has been) released. Upon receiving this Release message, the BS_C task 2101 sends the BS_CO task 2109 a Stop Call Origination message 2235. The BS_C task 2101 then activates the BS_OR task 21 1 0 for the channel used to communicate with the mobile station, depicted in FIG. 30, by sending it a Start Release message 2240, and then transitions to the BS_C(22) state 2241, depicted in FIG. 22w.

The BS_CO task 2109, for its part, upon receiving a Stop Call Origination message 2235 from the BS_C task 2101, terminates processing, re-transitioning to the BS_CO(0) state 2600.

In the BS_C(8) state 2223, FIG. 22h, or the BS_C(10) state 2245, FIG. 22i, if the BS_C task 2101 receives an Off Line message 2206 from the LPI task 2112 for the channel, it sends the BS_CO task 2109 a Stop Call Origination message 2235 for the channel. The BS_C task 2101 then transitions to the BS_C(0) state 2201 for the channel, previously described, and depicted in FIG. 22a. The BS_CO task 2109, for its part, as previously described, upon receiving a Stop Call Origination message 2235 from the BS_C task 2101, terminates processing for the channel, re-transitioning to the BS_CO(0) state 2600.

The BS_CO task 2109, while in the BS_CO(3) state 2603, waiting for a CT_ACK message response from the mobile station, may, instead, receive a CT_REL message 2608 from the mobile station. Upon receiving a CT_REL message 2608 from the mobile station at this time, the BS_CO task 2109 transmits a CT_ACK message 2505 to the mobile station, acknowledging the CT_REL message. The BS_CO task 2109 then sends the BS_C task 2101 a Call Origination Aborted message 2605, and terminates processing for the channel, re-transitioning to the BS_CO (0) state 2600.

In the BS_C(8) state 2223, FIG. 22h, or the BS_C(10) state 2245, FIG. 22i, if the BS_C task 2101 receives a Call Origination Aborted message 2605 from the BS_CO task 2109, the BS_C task 2101 sends the LPI task 2112 a Release message 2238 to transmit on the backhaul interface. The BS_C task 2101 also activates the BS_GP task 2102, previously described, and depicted in FIG. 23, by sending it a Start GP Issuing message 2203 for the channel. The BS_C task 2101 sends a Slot Empty message 2204 for the channel to the LPI task 2112. The BS_C task 2101 then transitions to the BS_C(1) state 2205 for the channel, previously described, and depicted in FIG. 22b.

In the BS_CO(1) state 2601, BS_CO(2) state 2602 or the BS_CO(3) state 2603, the base station may receive an unexpected 2508 or erroneous 2509 message on the O-Interface (as previously described). Upon receiving an unexpected or erroneous message while in any of these states, the BS_CO task 2109 increments the appropriate LeakyBucket counter (2510 or 2511). The BS_CO task 2109 then checks 2512 if either LeakyBucket counter indicates a maximum error count has been reached. If not, the BS_CO task 2109 re-transmits the last message it transmitted to the mobile station, and continues processing in the current BS_CO state. If the BS_CO task 2109 is in the BS_CO(1) state 2601, the last message transmitted was a CT_ACK message 2505. If the BS_CO task 2109 is in the BS_CO(2) state 2602, the last message transmitted was a CT_HLD message 2507. If the BS_CO task 2109 is in the BS_CO(3) state 2603, the last message transmitted was a CT_CNC message (2606 or 2609).

If, however, the BS_CO task 2109 checks 2512 its LeakyBucket counters and finds that either indicates a maximum error count, it sends the BS_C task 2101 a Call Origination Failure (Link Fault) message 2604. The BS_CO task 2109 then terminates processing for the channel, re-transitioning to the BS_CO(0) state 2600.

In the BS_C(8) state 2223, FIG. 22h, or the BS_C(10) state 2245, FIG. 22i, if the BS_C task 2101 receives a Call Origination Failure (Link Fault) message 2604 or a Call Origination Failure (T01 Expiry) message 2607, it activates the BS_SPR task 2108 for the channel it is currently communicating with the mobile station on, previously described, and depicted in FIG. 28, by sending it a Start SP Issuing message 2233. The BS_C task 2101, if in the BS_C(8) state 2223, then transitions to the BS_C(9) state 2246, depicted in FIG. 22j. Else, if in the BS_C(10) state 2245, the BS_C task 2101 now transitions to the BS_C(11) state 2247, depicted in FIG. 22k. At this time, the BS software is attempting to resync the mobile station to the base station, by transmitting the mobile station one or more Specific Poll messages for it to resync off of.

Figures 1, 22J:
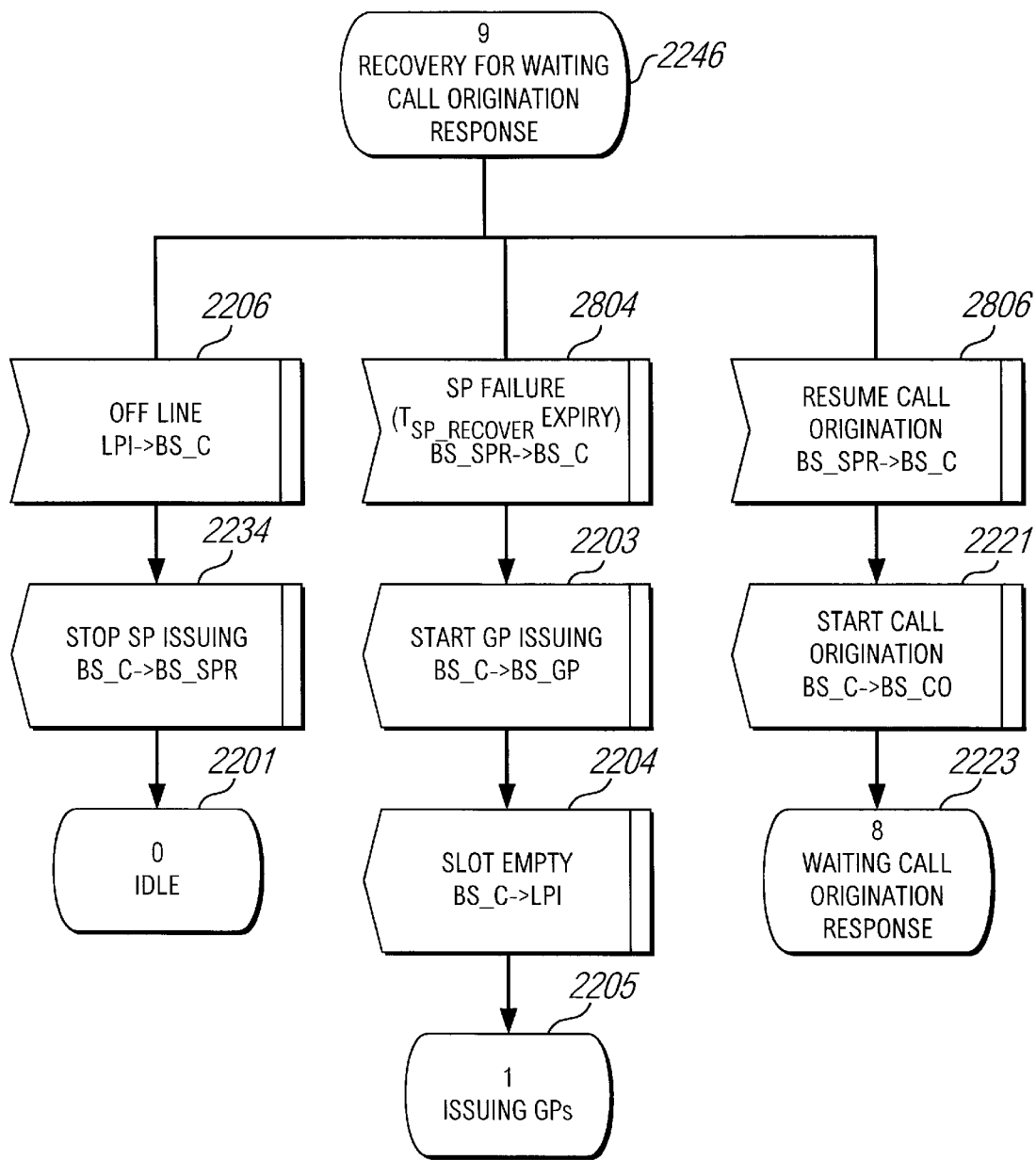
Figures 2, 22J:
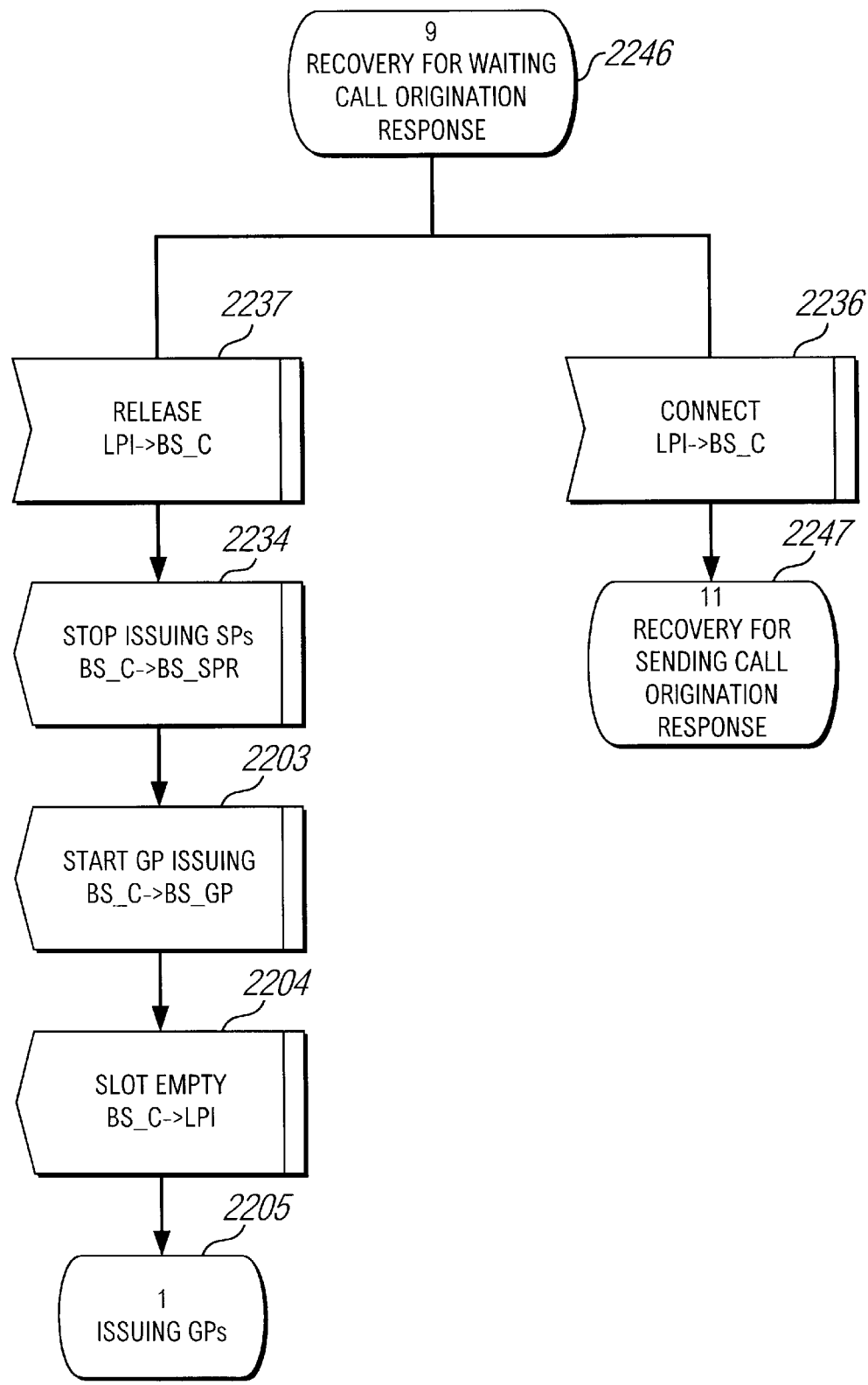
Figure 22K:
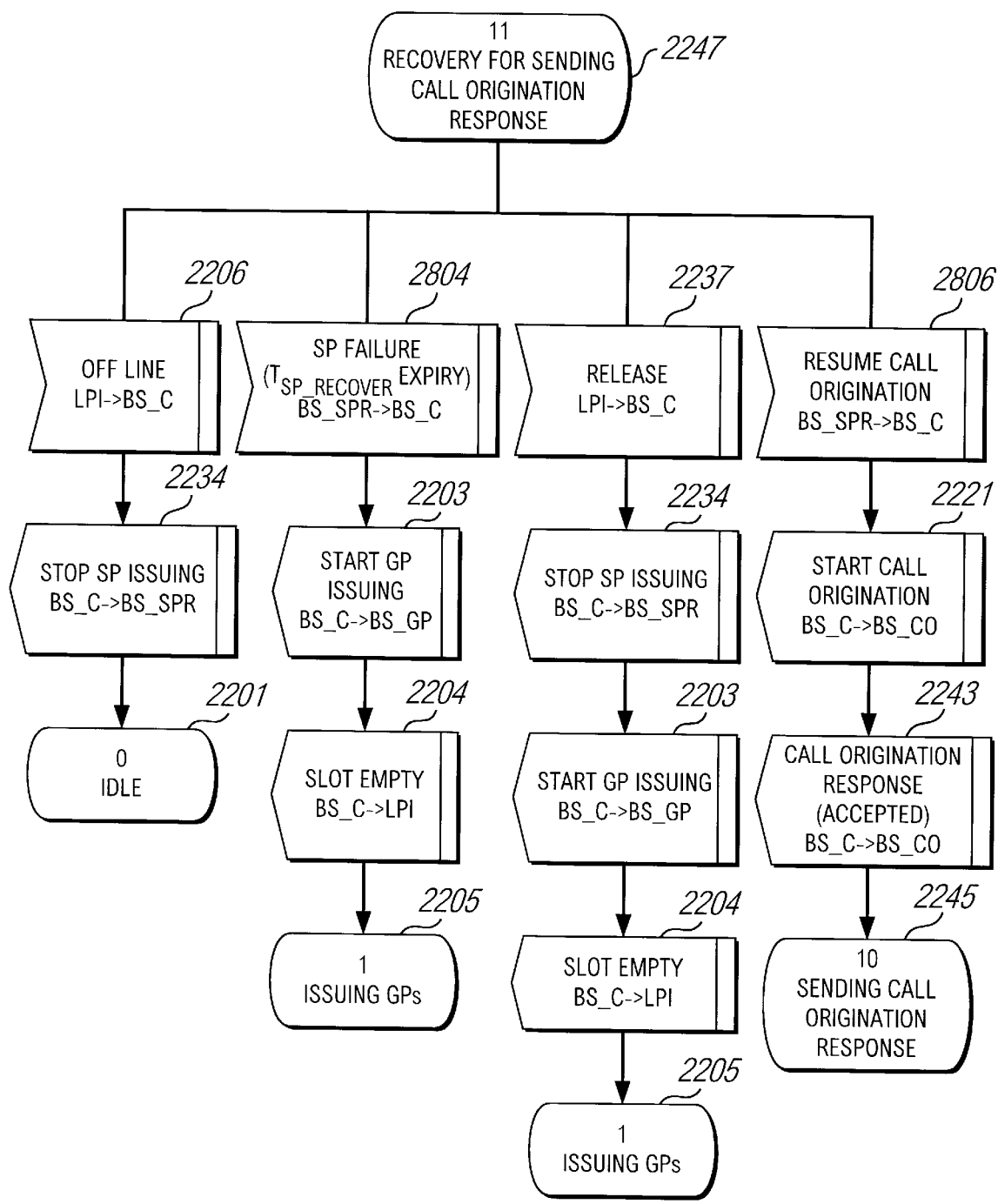

In the BS_C(9) state 2246, FIG. 22j, or the BS_C(11) state 2247, FIG. 22k, if the BS_C task 2101 receives an SP Failure (T(sp_recover) Expiry) message 2804 from the BS_SPR task 2108, the BS software assumes the mobile station was unsuccessful in resyncing to the base station. Thus, the BS_C task 2101 activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

In the BS_C(9) state 2246 or the BS C(11) state 2247, if the BS_C task 2101 receives an Off Line message 2206 for the channel from the LPI task 2112, it sends the BS_SPR task 2108 a Stop SP Issuing message 2234 for the channel, and transitions to the BS_C(0) state 2201 for the channel, previously described, and depicted in FIG. 22a. The BS_SPR task 2108, as previously noted, upon receiving a Stop SP Issuing message 2234 from the BS_C task 2101, terminates processing for the channel, re-transitioning to the BS_SPR(0) state 2800.

In the BS_C(9) state 2246 or the BS_C(11) state 2247, the base station may also receive a Release message from the system controller 103; the LPI task 2112 sends the BS_C task 2101 this Release message 2237. The Release message informs the base station that the mobile station's call link on the communication system 101 is being (or has been) released. Upon receiving this Release message, the BS_C task 2101 sends the BS_SPR task 2108 a Stop SP Issuing message 2234 for the channel. The BS_C task 2101 also activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

As previously described, if the base station receives a CT_ORG (Call Originate) message 2408 from the mobile station, while executing the BS_SPR task 2108 for a channel, the BS_SPR task 2108 sends the BS_C task 2101 a Resume Call Origination message 2806. The BS_C task 2101, in the BS_C(9) state 2246, FIG. 22*j*, or the BS_C(11) state 2247, FIG. 22*k*, is waiting for the BS_SPR task 2108 to send it a Resume Call Origination message. Upon receiving a Resume Call Origination message 2806 in these BS_C states, the BS_C task 2101 activates the BS_CO task 2109 for the channel once again, by sending it a Start Call Origination message 2221. If the BS_C task 2101 is in the BS_C(9) state 2246 at this time, it then transitions to the BS_C(8) state 2223, previously discussed, and depicted in FIG. 22*h*. If, on the other hand, the BS_C task 2101 is in the BS_C(11) state 2247 at this time, the base station has already received a Connect message from the system controller 103, for the mobile station's previous call origination request. Thus, the BS_C task 2101 sends the BS_CO task 2109 a Call Origination Response message 2243. In an embodiment, as previously discussed regarding the BS_C (8) state 2223, depicted in FIG. 22*i*, the Connect message may be for either an outgoing or an incoming (call from another) call. In this embodiment, the BS_C task 2101 sends the BS_CO task 2109 a Call Origination Response message 2243 if the call type is outgoing, and a Call Termination Indication message 2244, if the call type is incoming. The BS_C task 2101 then transitions to the BS_C(10) state 2245, depicted in FIG. 22*i*.

While the BS_C task 2101 is in the BS_C(9) state 2246, FIG. 22*j*, waiting to recover synchronization with the mobile station, the base station may receive a Connect message from the system controller 103; the LPI task 2112 sends the BS_C task 2101 this Connect message 2236. Upon receiving a Connect message at this time, the BS_C task 2101 transitions to the BS_C(11) state 2247, previously described, and depicted in FIG. 22*k*.

A paging protocol sequence is executed by the BS software when the system controller 103 transmits the base station a Page message. While in the BS_C(1) state 2205 for a channel, depicted in FIG. 22*b*, the base station may receive a Page message from the system controller 103; the LPI task 2112 sends the BS_C task 2101 this Page message 2211. Upon receiving this Page message, the BS_C task 2101 sends the BS_GP task 2102, previously described, and depicted in FIG. 23, a Stop GP Issuing message 2212 for a particular channel. The BS_C then activates the BS_SPP task 2107 for the channel, depicted in FIG. 31, by sending it a Start SP Issuing message 2213 for a specific mobile station. The BS_C task 2101 also sends a Slot Reserved message 2214 for the channel to the LPI task 2112. The BS_C task 2101 then transitions to the BS_C(3) state 2215 for the channel, depicted in FIG. 22*l*, where it waits for the mobile station to respond to the page.

Figures 1, 31:
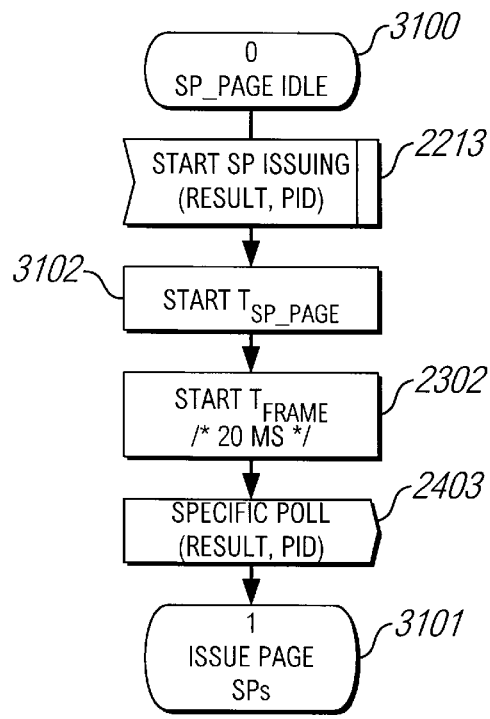
FIG. 31 is a state diagram of the BS software Specific Poll Page (BS_SPP) task.
Figures 2, 31:
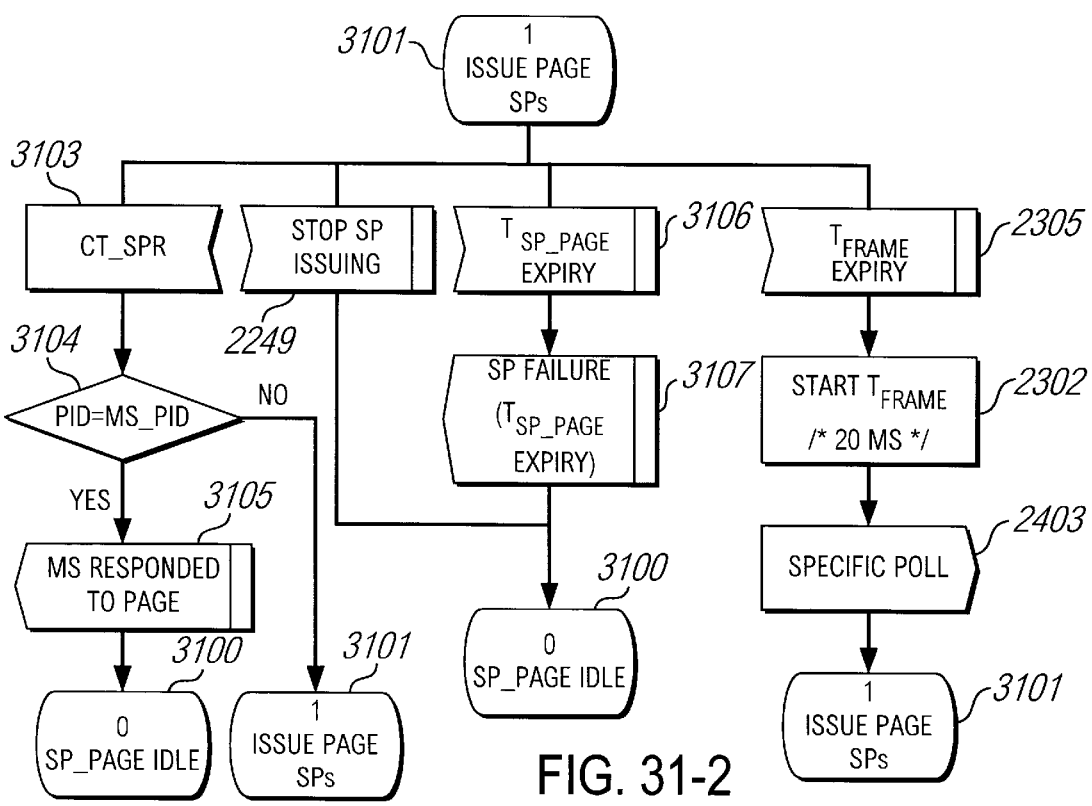

The BS_SPP task 2107, depicted in FIG. 31, is activated for a channel from the BS_SPP(0) ("Idle") state 3100 when the BS_C task 2101 sends it a Start SP Issuing message 2213 for a specified mobile station. The BS_SPP task 2107 transmits one or more Specific Poll messages 2403 for the mobile station it is paging. A Specific Poll message transmitted at this time is an indication to the mobile station that there is a call on the communication system 101 for it. The BS_SPP task 2107, upon being activated, enables a timer T(frame) 2302, and transmits a Specific Poll message 2403 for the mobile station. Thereafter, in the BS_SPP(1) state 3101, whenever T(frame) expires 2305, the BS_SPP task 2107 re-enables T(frame) 2302, and transmits another Specific Poll message 2403 for the mobile station. In a preferred embodiment, T(frame) is a 20-millisecond timer.

The BS_SPP task 2107 also enables a timer T(sp_page) 3102, for the maximum time it will continue executing for the channel, transmitting Specific Poll messages to the mobile station, and waiting for a CT_SPR (Specific Poll Response) message in return. The BS_SPP task 2107 then transitions to the BS_SPP(1) state 3101. If T(sp_page) expires 3106 in the BS_SPP(1) state 3101, the BS_SPP task 2107 sends the BS_C task 2101 an SP Failure (T(sp_page) Expiry) message 3107, and terminates processing for the channel, re-transitioning to the BS_SPP(0) state 3100.

Figure 22L:
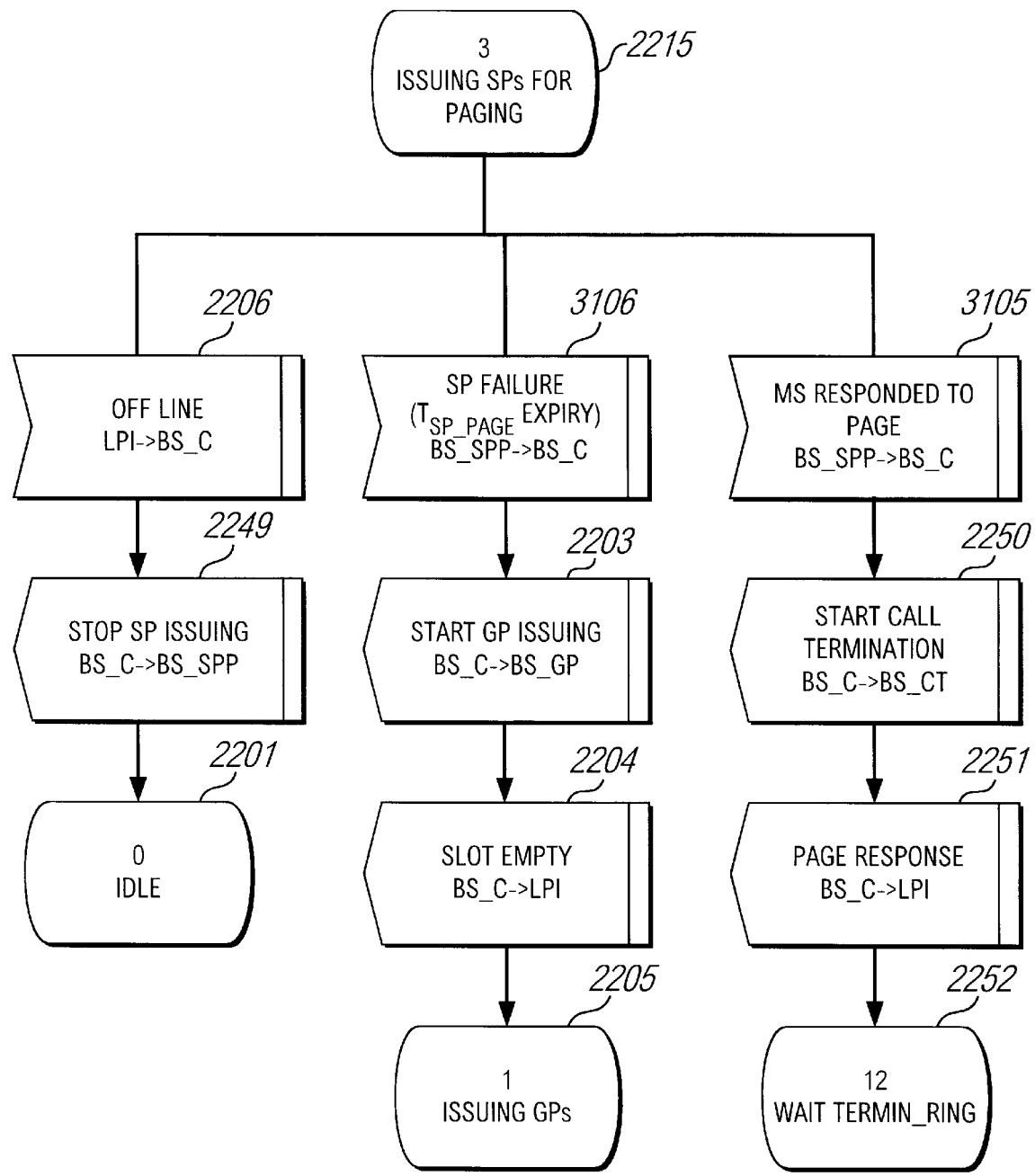

In the BS_C(3) state 2215, depicted in FIG. 22*l*, while the BS_SPP task 2107 is activated for a channel, if the BS_C task 2101 receives an SP Failure (T(sp_page) Expiry) message 3107 from the BS_SPP task 2107, the BS_C task 2101 activates the BS_GP task 2102, previously discussed, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, previously discussed, and depicted in FIG. 22*b*.

In the BS_C(3) state 2215, if the BS_C task 2101 receives an Off Line message 2206 from the LPI task 2112 for the channel, the BS_C task 2101 sends the BS_SPP task 2107 a Stop SP Issuing message 2249 for the channel, and transitions to the BS_C(0) state 2201 for the channel, previously described, and depicted in FIG. 22*a*. The BS_SPP task 2107, for its part, upon receiving the Stop SP Issuing message 2249, terminates processing for the channel, re-transitioning to the BS_SPP(0) state 3100.

If the base station receives a CT_SPR message 3103 in the BS_SPP(1) state 3101, the BS_SPP task 2107 checks 3104 the identification of the mobile station transmitting the CT_SPR message. If the CT_SPR message is from the mobile station the base station is paging on the channel, the BS_SPP task 2107 sends the BS_C task 2101 an MS Responded To Page message 3105, and terminates processing for the channel, re-transitioning to the BS_SPP(0) state 3100. If, however, the CT_SPR message received in the channel is not from the mobile station being paged in that channel, the BS_SPP task 2107 simply ignores the CT_SPR message, and continues transmitting a Specific Poll message 2403 for the paged mobile station each T(frame) time.

Figures 1, 32:
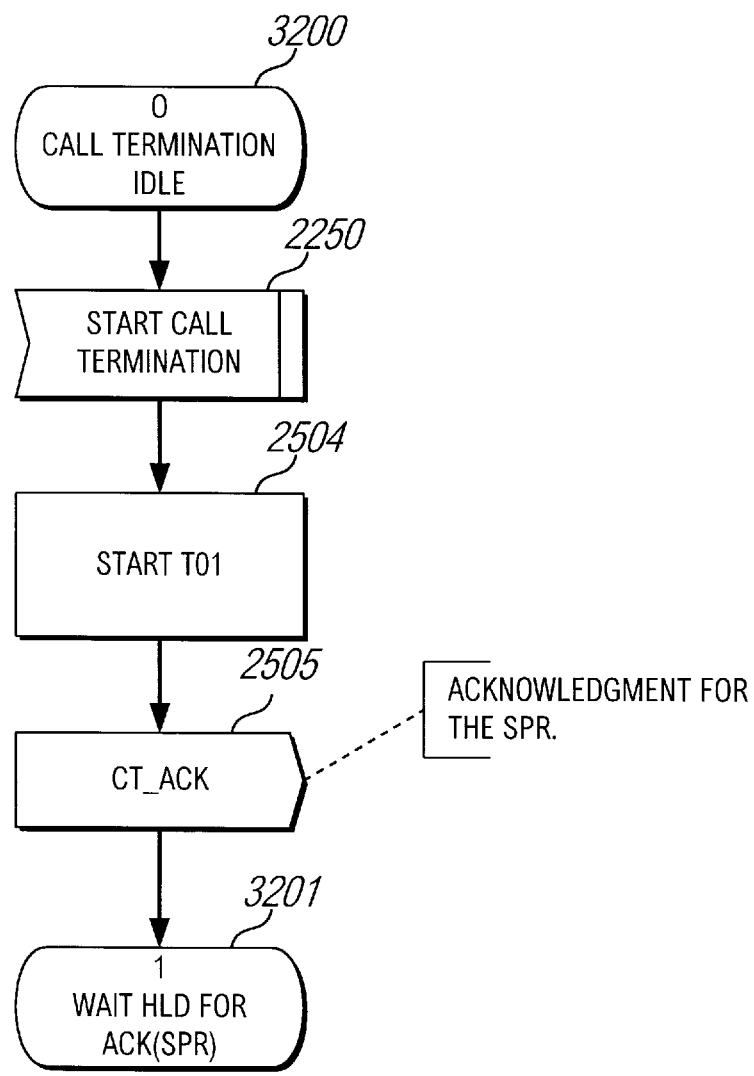
FIG. 32 is a state diagram of the BS software Call Termination (BS_CT) task.
Figures 2, 32:
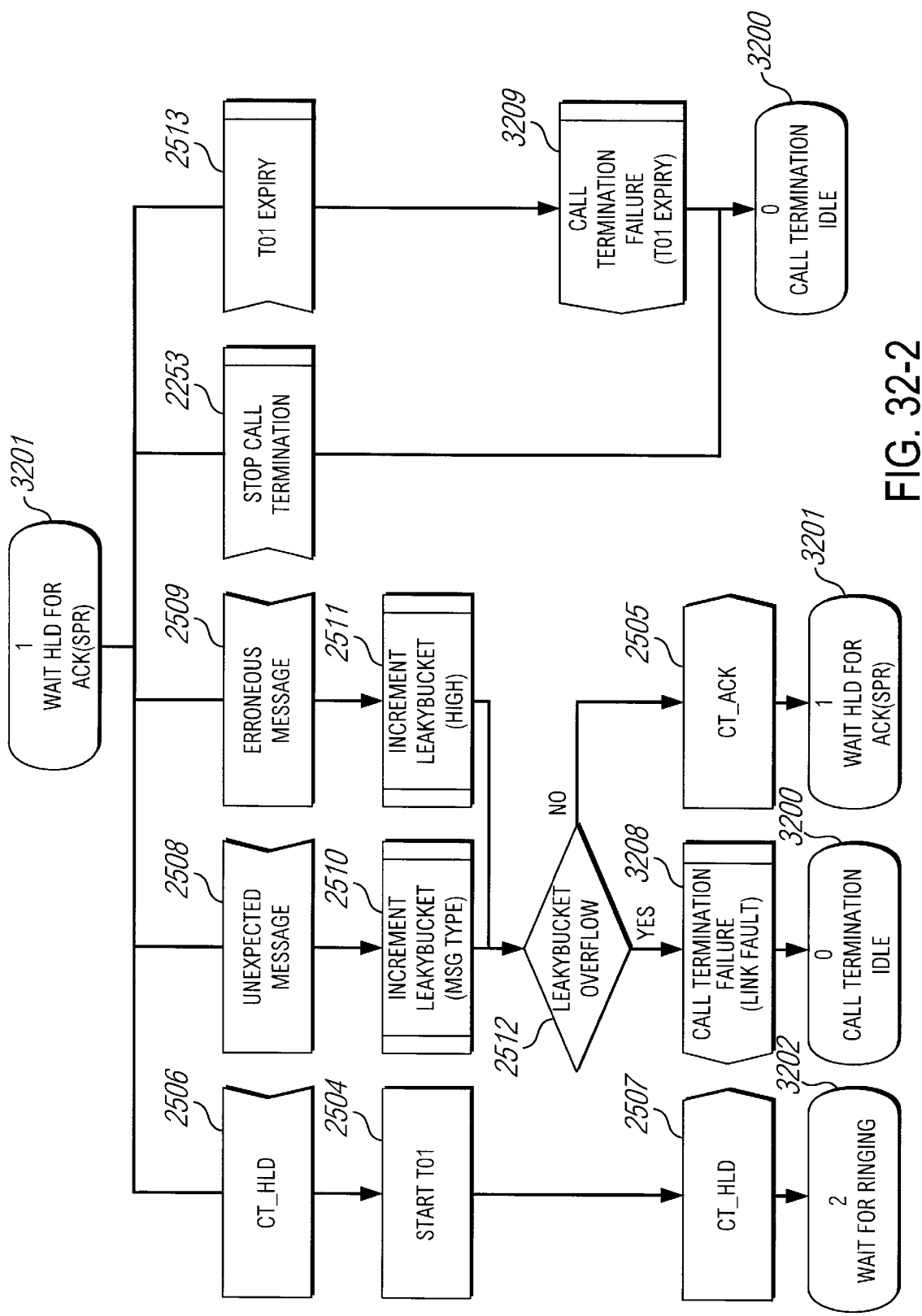
Figures 3, 32:
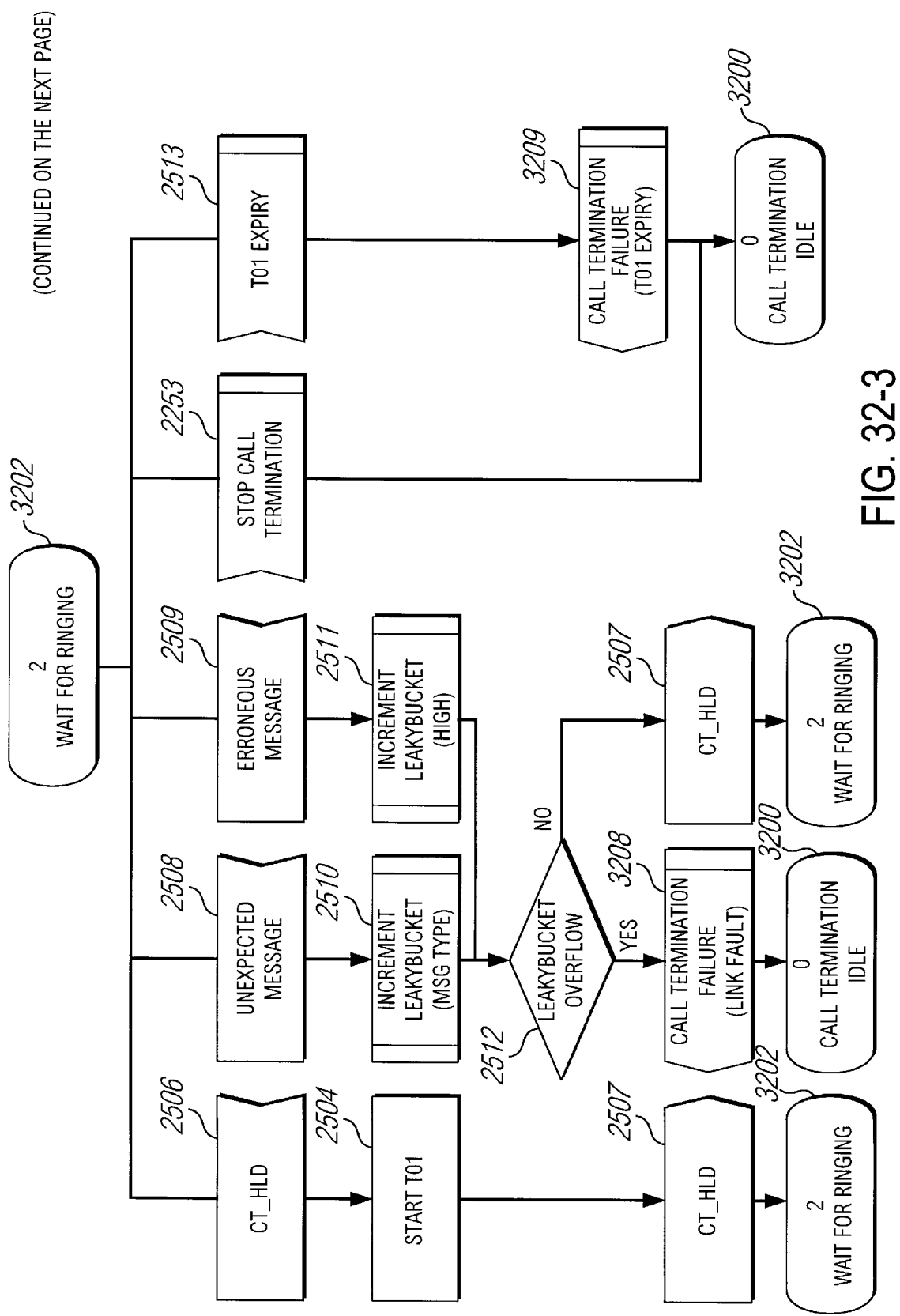
Figures 4, 32:
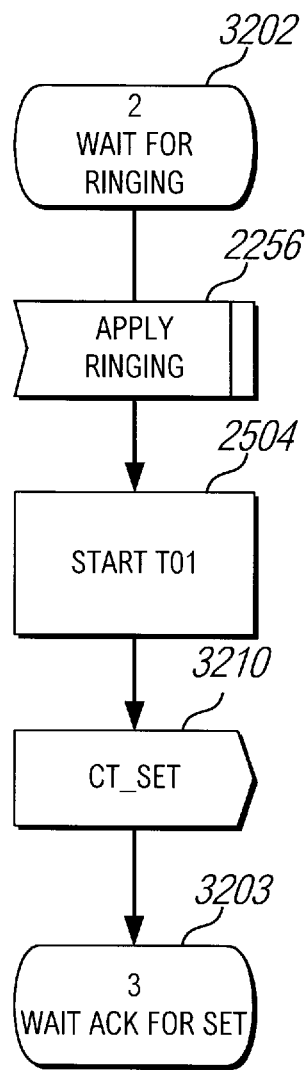
Figures 5, 32:
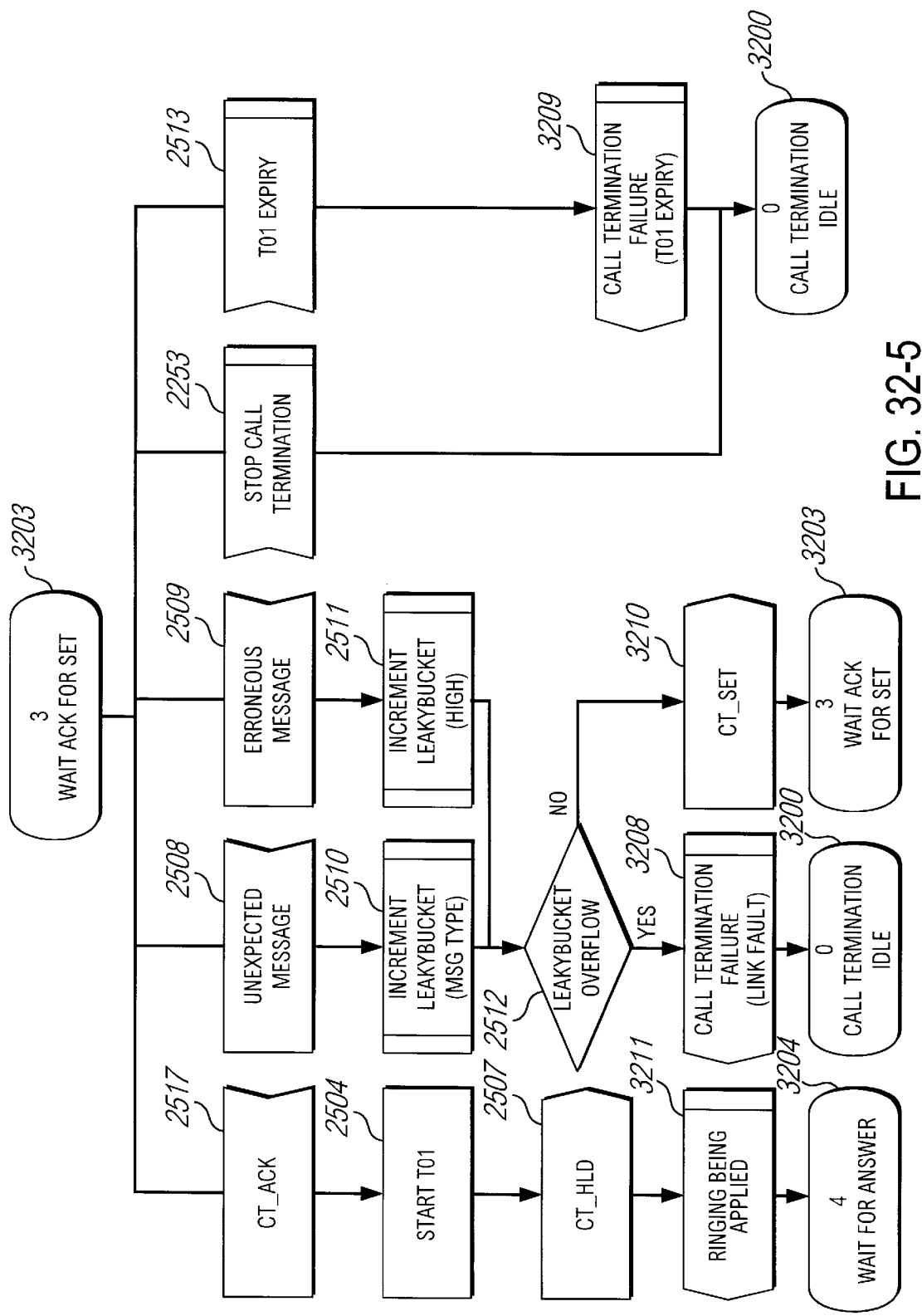
Figures 6, 32:
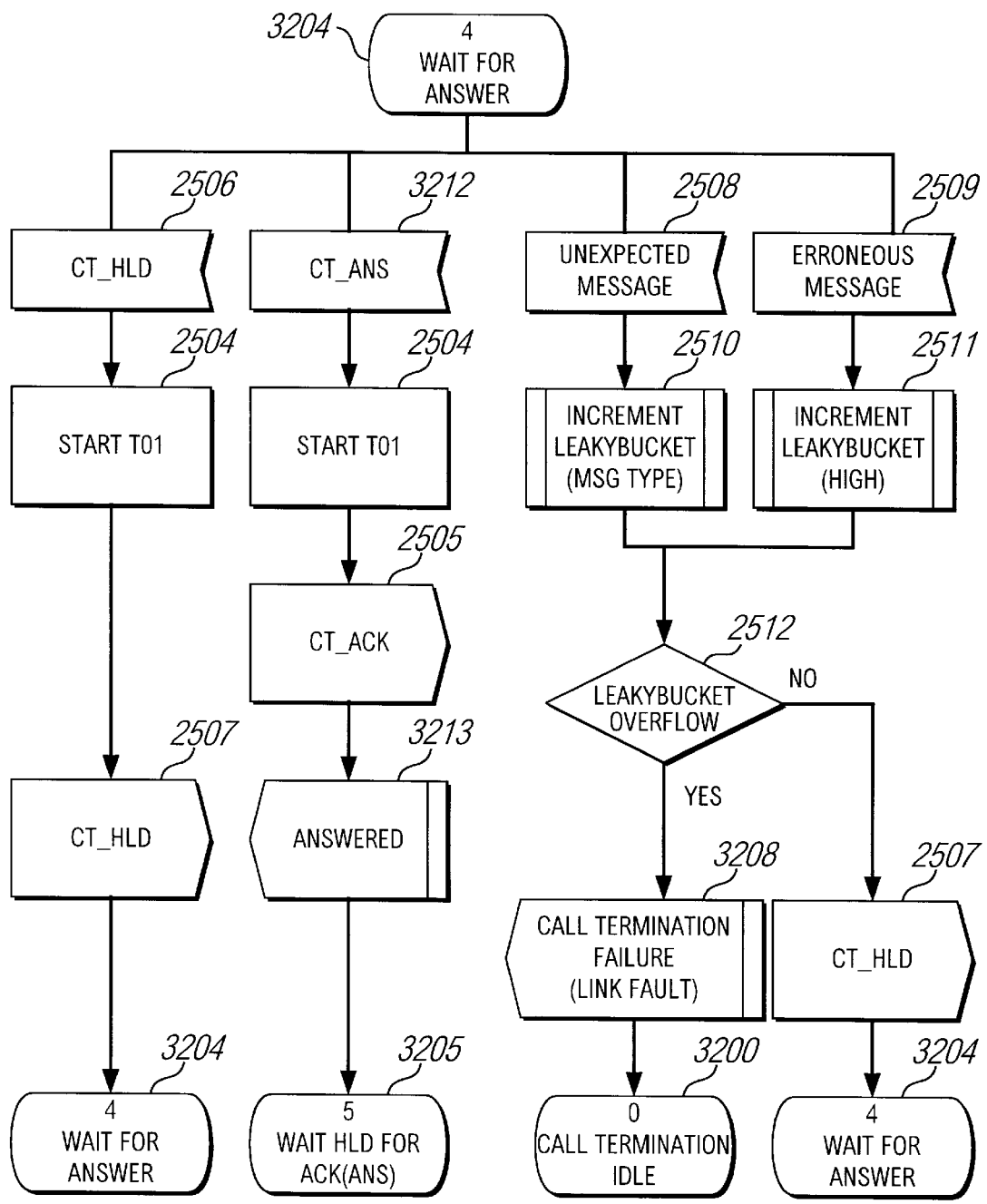
Figures 7, 32:
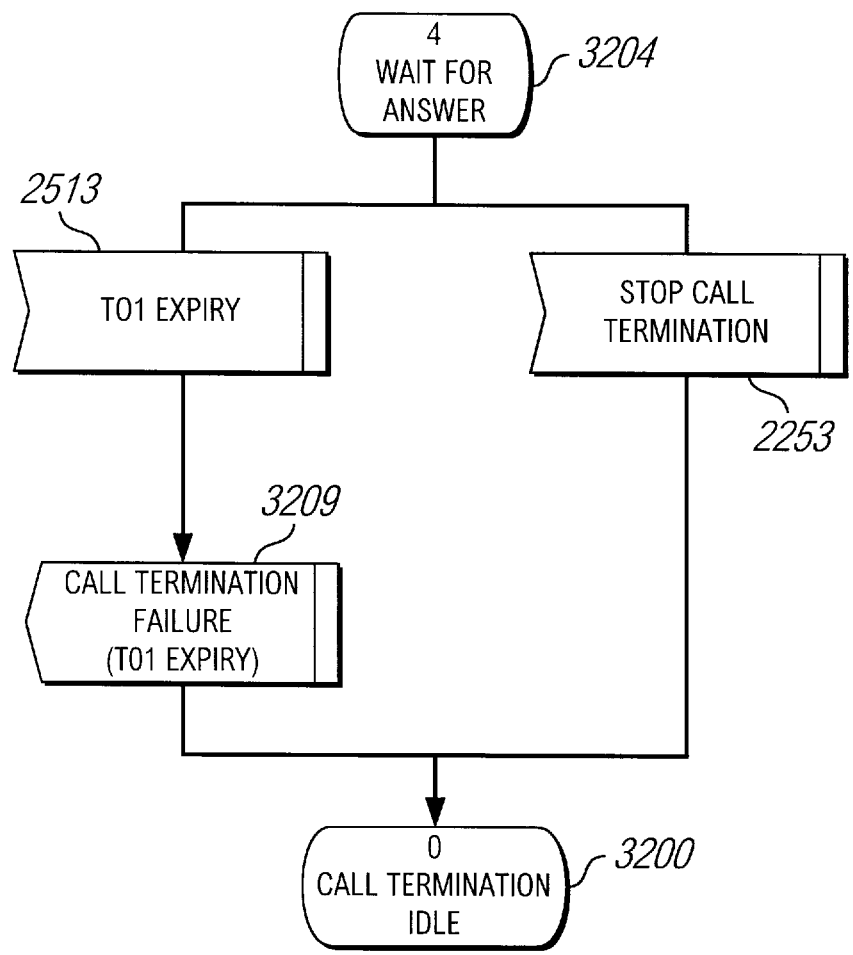
Figures 8, 32:
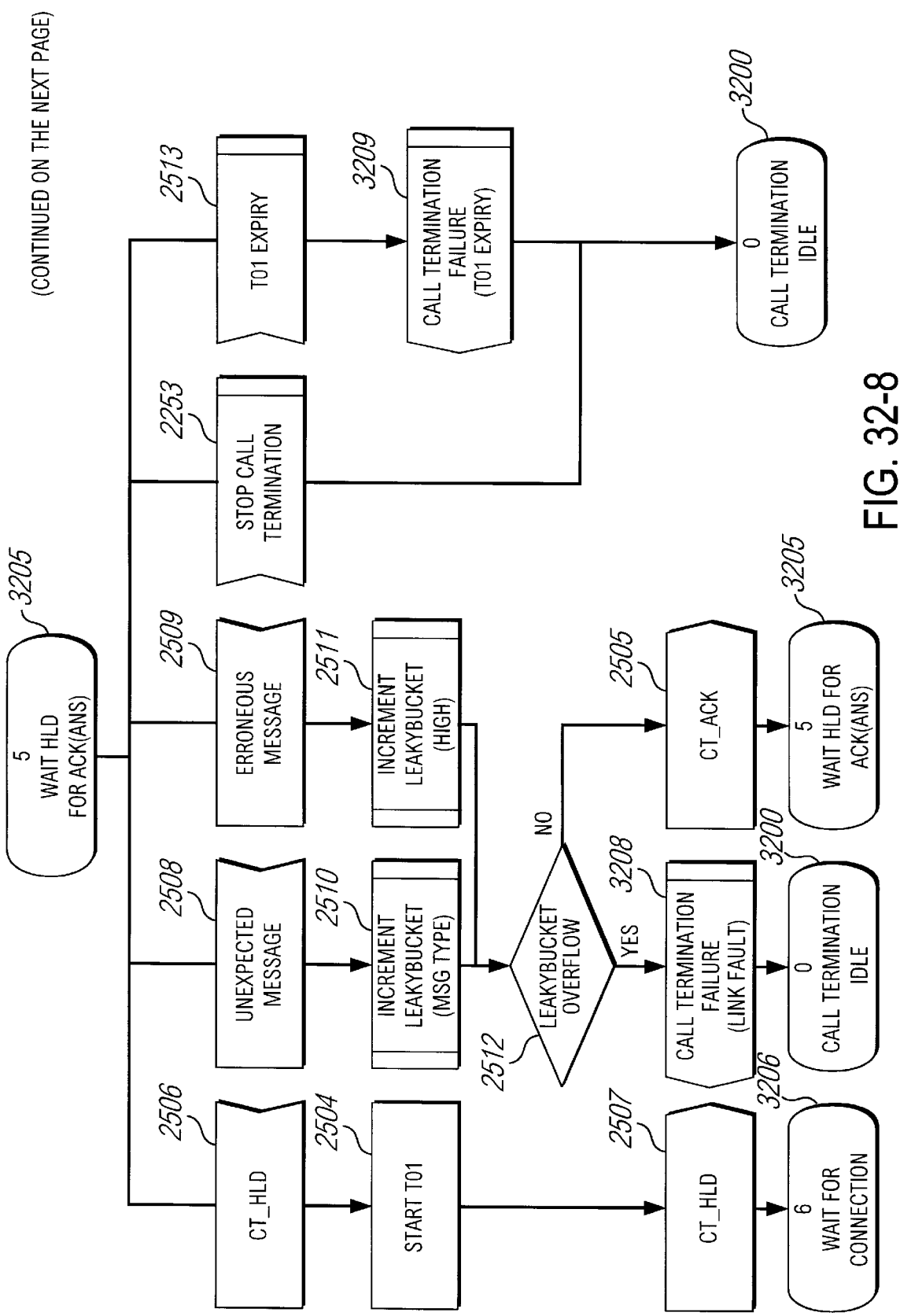
Figures 9, 32:
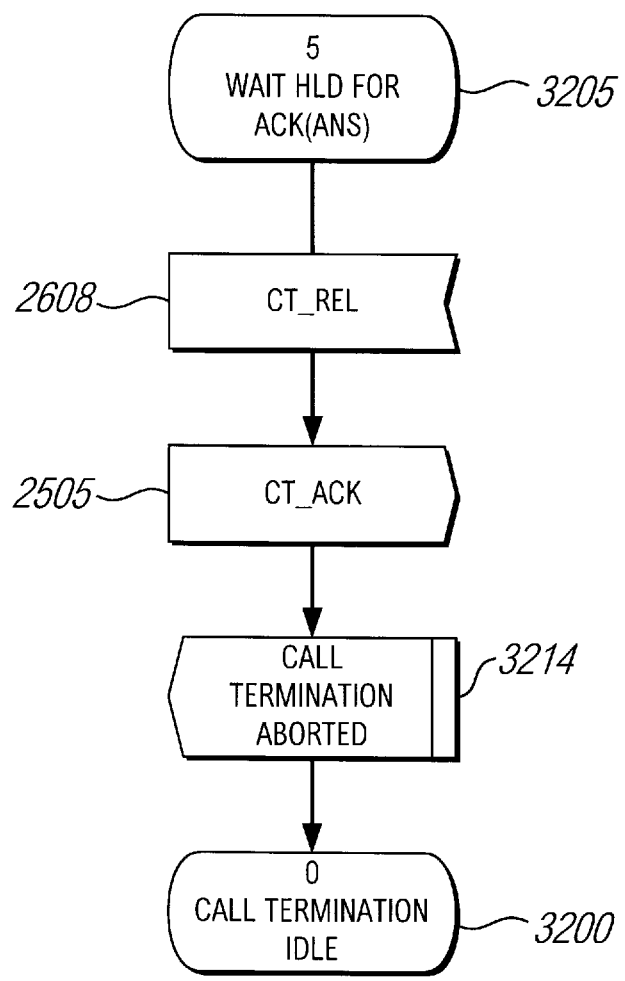
Figures 10, 32:
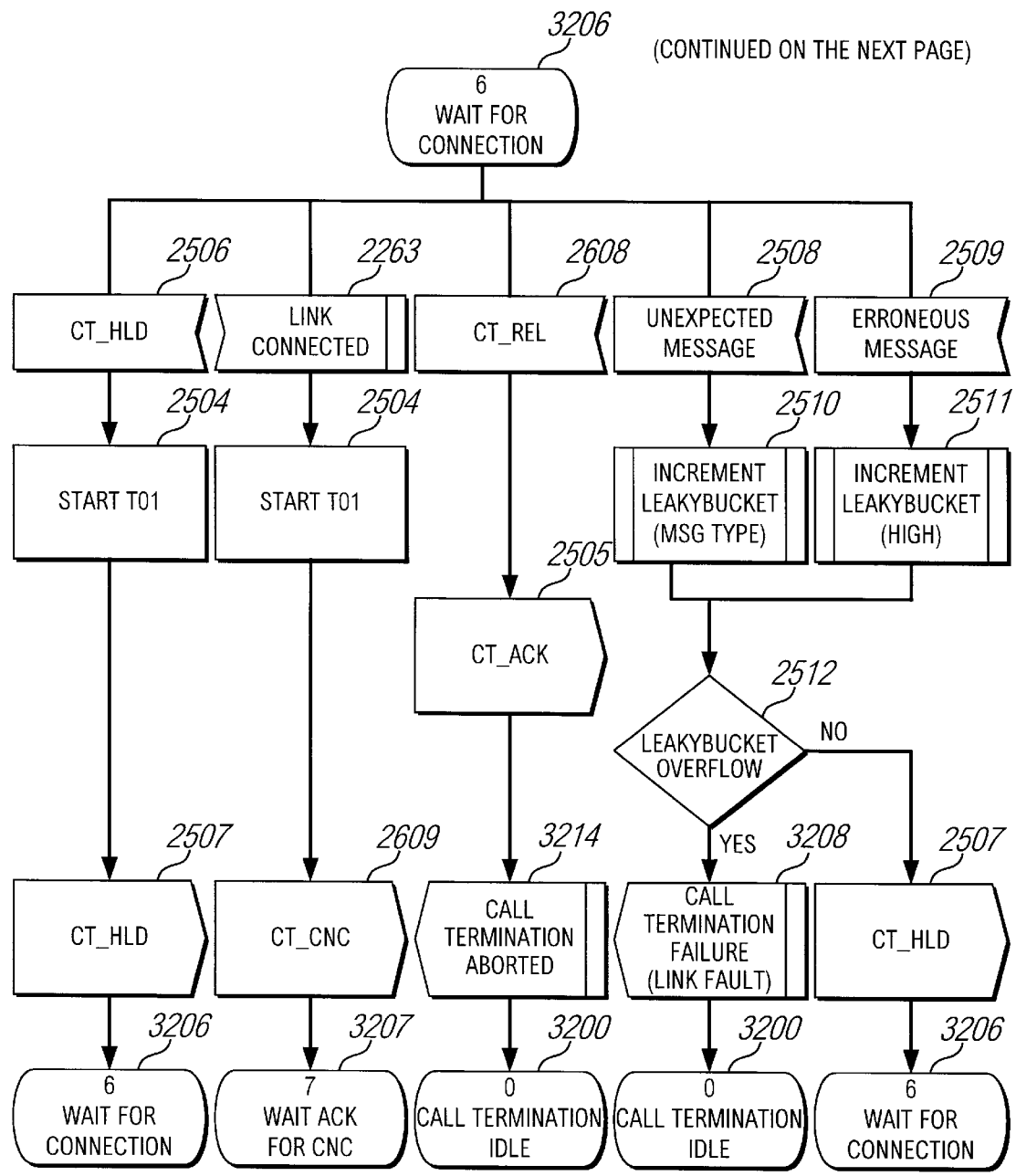
Figures 11, 32:
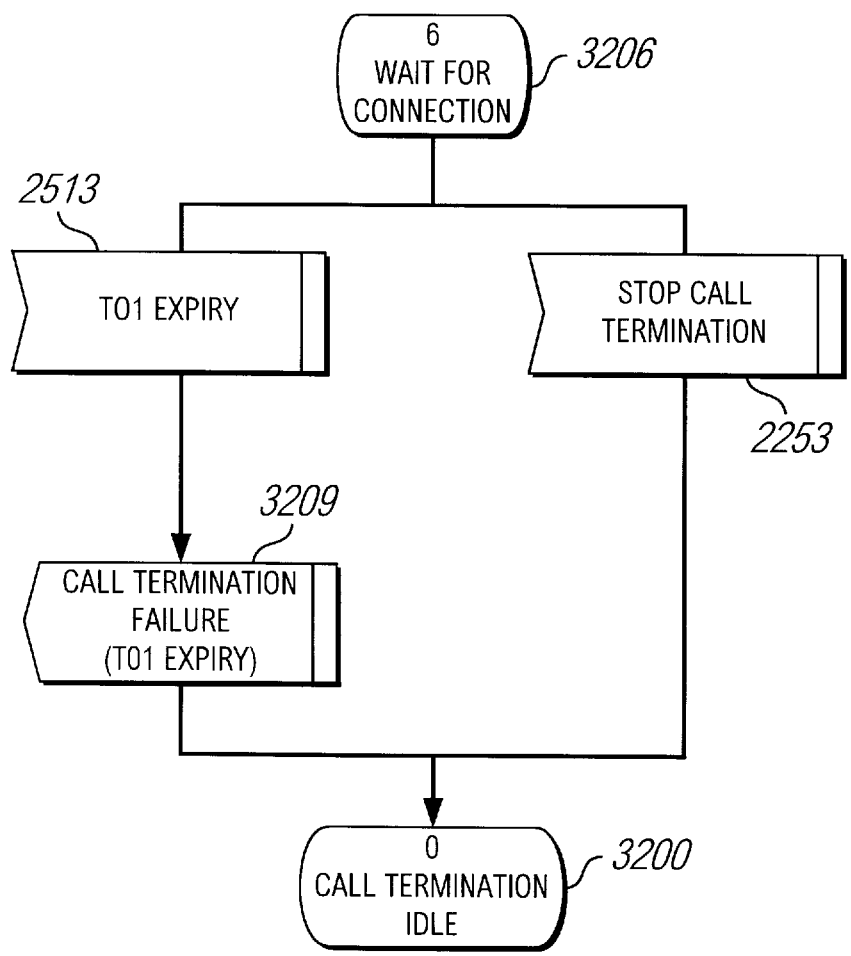
Figures 12, 32:
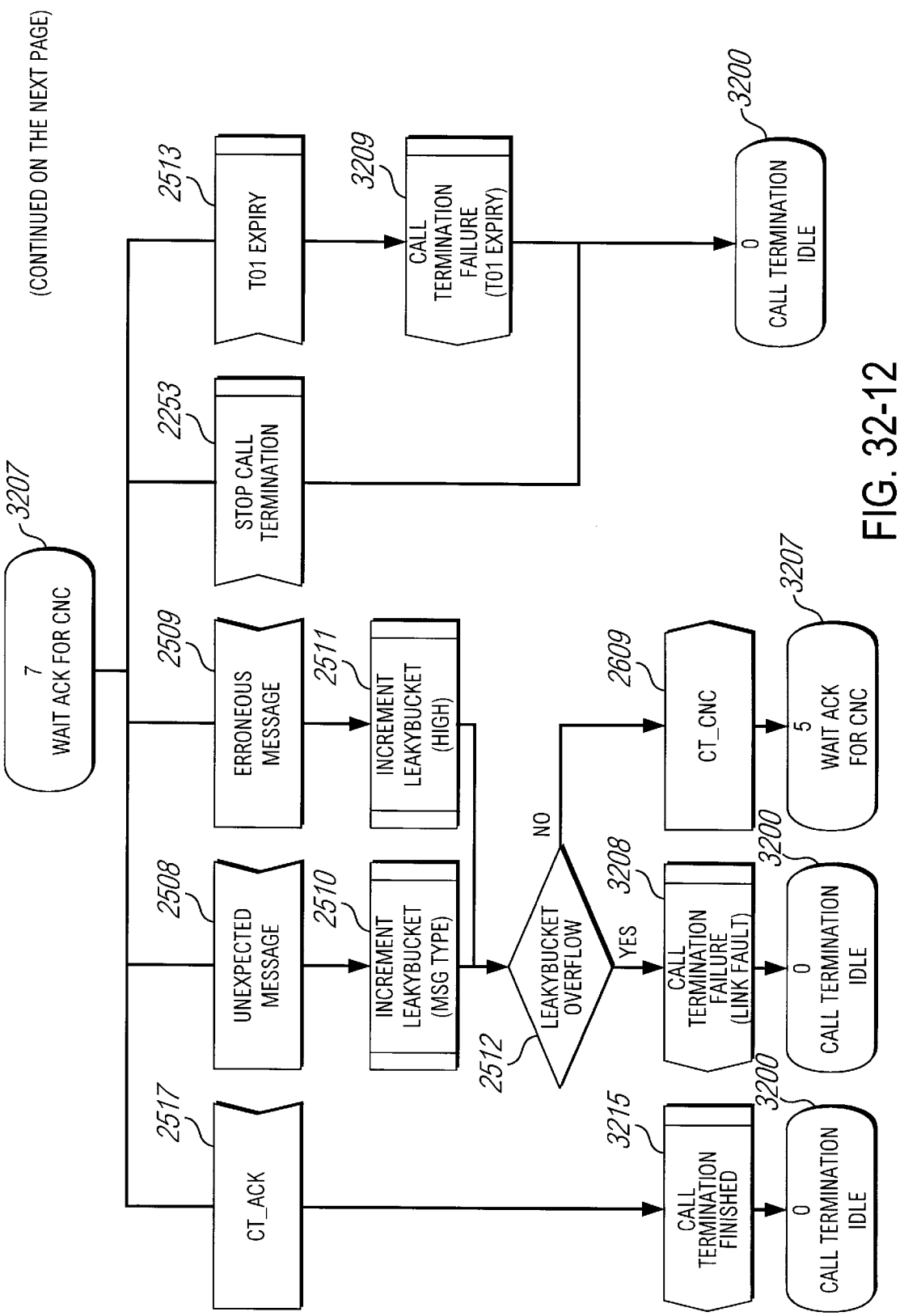
Figures 13, 32:
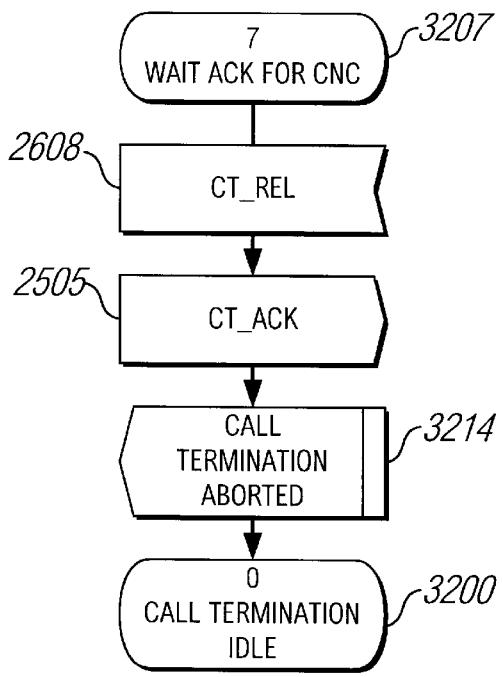

In the BS_C(3) state 2215, if the BS_C task 2101 receives an MS Responded To Page message 3105 from the BS_SPP task 2107, it activates the BS_CT task 2105 for the channel, depicted in FIG. 32, by sending it a Start Call Termination message 2250. The BS_C task 2101 also sends the LPI task 2112 a Page Response message 2251 to transmit on the backhaul interface. The BS_C task 2101 then transitions to the BS_C(12) state 2252 for the channel, depicted in FIG. 22*m*.

The BS_CT task 2105, depicted in FIG. 32, is activated for a channel from the BS_CT(0) ("Idle") state 3200 when the BS_C task 2101 sends it a Start Call Termination message 2250. The BS_CT task 2105, upon being activated, transmits a CT_ACK message 2505 to the mobile station being called. The BS_CT task 2105 also enables a timer T01 2504, for the maximum time it will wait to receive a CT_HLD message from the mobile station. The BS_CT task 2105 then transitions to the BS_CT(1) state 3201, where it waits for a CT_HLD message from the mobile station. As previously described, in regards to the registration protocol processing, the base station and the mobile station transmit CT_HLD messages to each other when they are executing a protocol sequence and have no other message to transmit to the other.

If T01 expires 2513 in the BS_CT(1) state 3201, the BS_CT task 2105 sends the BS_C task 2101 a Call Termination Failure (T01 Expiry) message 3209. The BS_CT task 2105 then terminates processing for the channel, re-transitioning to the BS_CT(0) state 3200.

In the BS_CT(1) state 3201, upon receiving the expected CT_HLD message 2506, the BS_CT task 2105 re-enables timer T01 2504, transmits its own CT_HLD message 2507 to the mobile station, and transitions to the BS_CT(2) state 3202. In the BS_CT(2) state 3202, the BS_CT task 2105 continues to process the transmission 2507 and reception 2506 of CT_HLD messages to/from the mobile station, re-enabling timer T01 2504 each time it receives a CT_HLD message 2506 from the mobile station. If timer T01 expires 2513 in the BS_CT(2) state 3202, the BS_CT task 2105 sends the BS_C task 2101 a Call Termination Failure (T01 Expiry) message 3209. The BS_CT task 2105 then terminates processing for the channel, re-transitioning to the BS_CT(0) state 3200.

Figures 1, 22M:
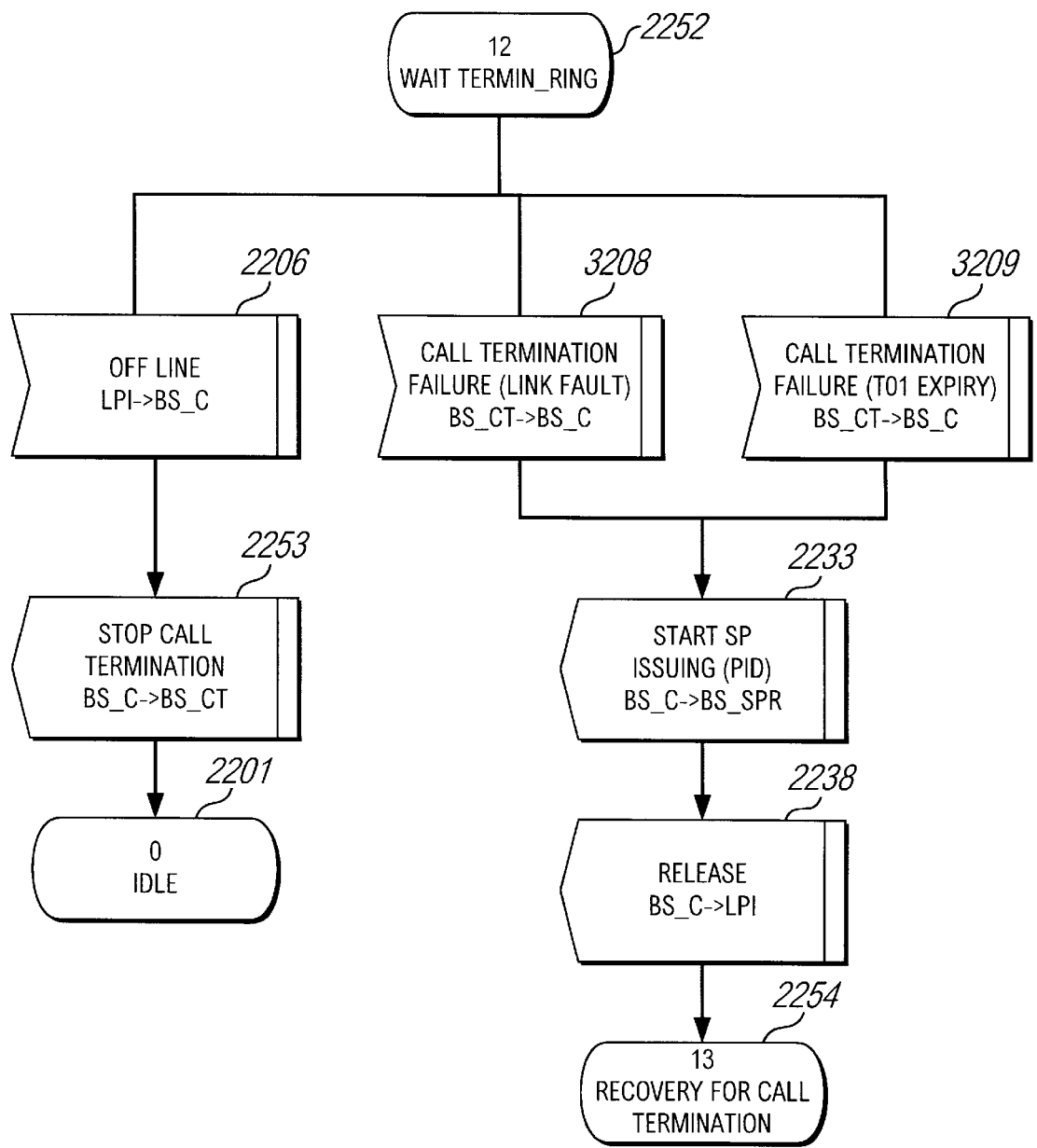
Figures 2, 22M:
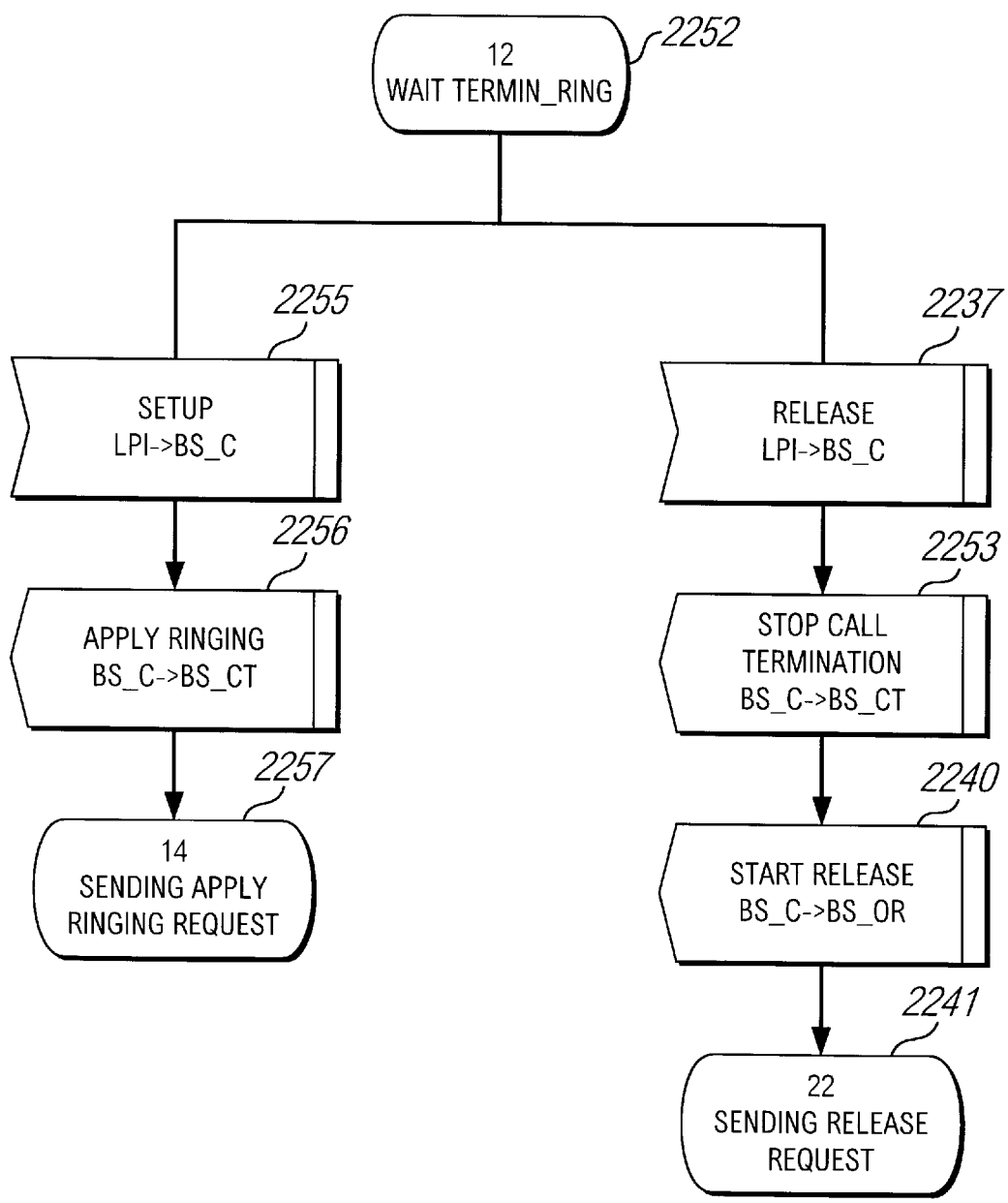

While in the BS_C(12) state 2252 for a channel, depicted in FIG. 22m, the base station may receive a Setup message from the system controller; the LPI task 2112 sends the BS_C task 2101 this Setup message 2255. The Setup message indicates that the communication system 101 is attempting to establish a call link between two mobile stations. The BS_C task 2101, upon receipt of this Setup message, sends the BS_CT task 2105 an Apply Ringing message 2256, and then transitions to the BS_C(14) state 2257, depicted in FIG. 22n.

The BS_CT task 2105, upon receiving an Apply Ringing message 2256, transmits a CT_SET message 3210 to the mobile station. The BS_CT task 2105 also re-enables timer T01 2504, and transitions to the BS_CT(3) state 3203, where it waits for a CT_ACK message response from the mobile station. Timer T01 is enabled for the maximum time that the BS_CT task 2105 will wait for the expected CT_ACK message. If T01 expires 2513 in the BS_CT(3) state 3203, the BS_CT task 2105 sends the BS_C task 2101 a Call Termination Failure (T01 Expiry) message 3209. The BS_CT task 2105 then terminates processing for the channel, re-transitioning to the BS_CT(0) state 3200.

Upon receiving the expected CT_ACK message 2517 from the mobile station, the BS_CT task 2105 transmits a CT_HLD message 2507 to the mobile station, and sends the BS_C task 2101 a Ringing Being Applied message 3211. The BS_CT task 2105 also re-enables timer T01 2504, for the maximum time it will wait for a CT_HLD message from the mobile station. The BS_CT task 2105 then transitions to the BS_CT(4) state 3204, where it continues to process the transmission 2507 and reception 2506 of CT_HLD messages to/from the mobile station, re-enabling T01 2504 each time it receives a CT_HLD message 2506 from the mobile station. If timer T01 expires 2513 in the BS_CT(4) state 3204, the BS_CT task 2105 sends the BS_C task 2101 a Call Termination Failure (T01 Expiry) message 3209. The BS_CT task 2105 then terminates processing for the channel, re-transitioning to the BS_CT(0) state 3200.

Figure 22N:
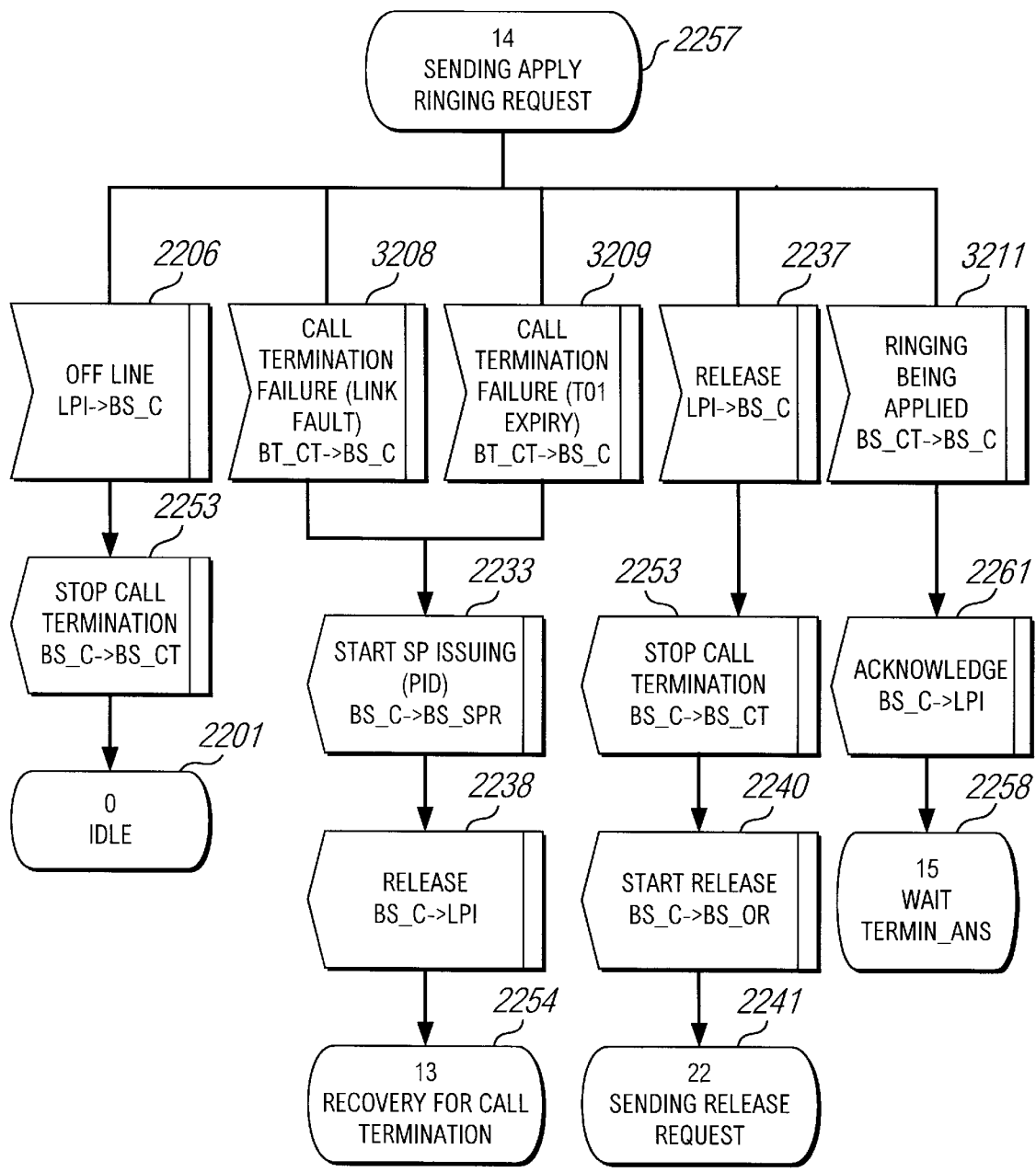
Figure 220:
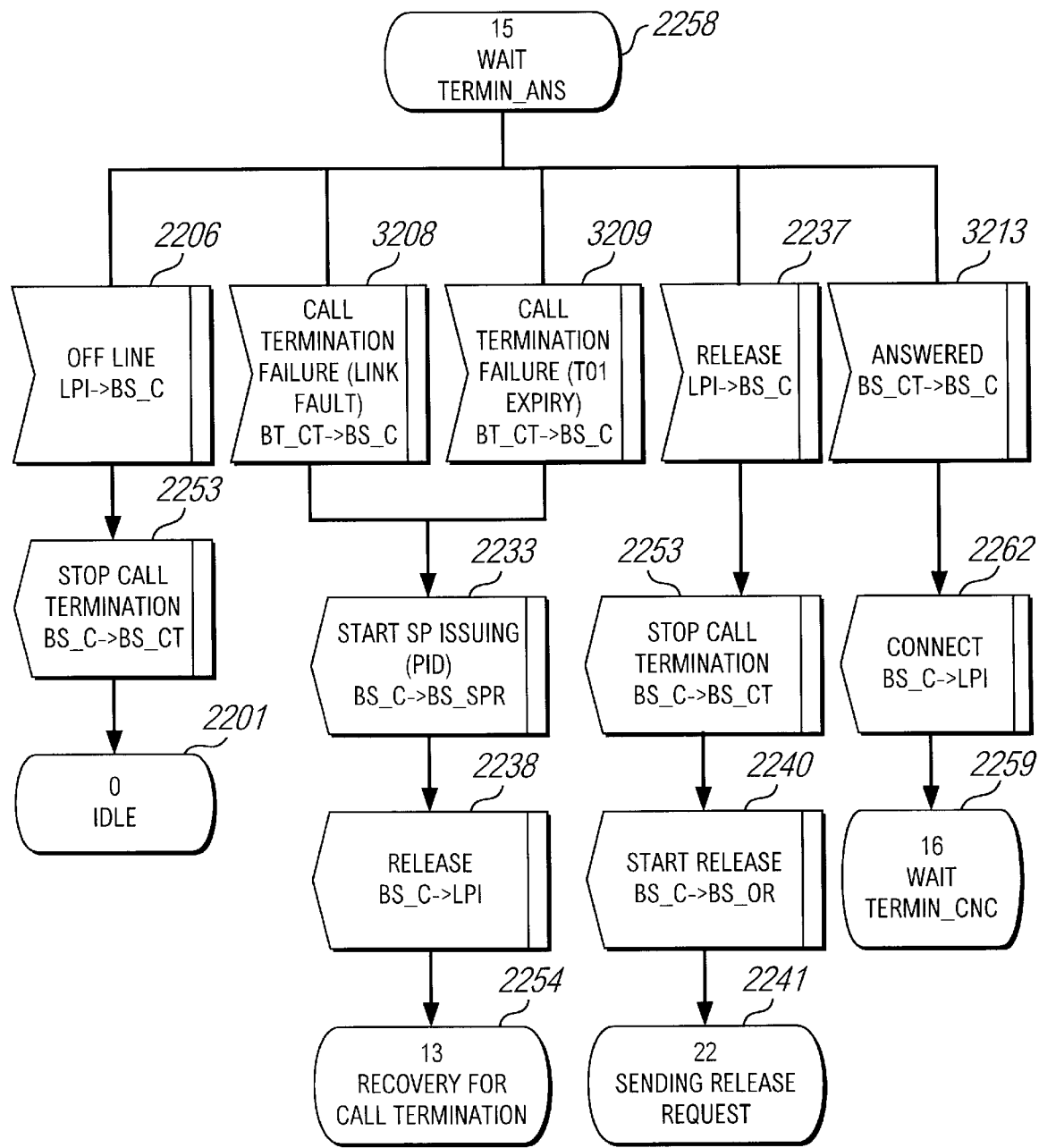

The BS_C task 2101, in the BS_C(14) state 2257, FIG. 22n, upon receiving the Ringing Being Applied message 3211 from the BS_CT task 2105, sends the LPI task 2112 an Acknowledge message 2261 to transmit on the backhaul interface, to inform the system controller 103 that the mobile station acknowledged the request to ring its end user for a call. The BS_C task 2101 then transitions to the BS_C(15) state 2258, depicted in FIG. 22o.

While in the BS_CT(4) state 3204, the base station may receive the expected CT_ANS message 3212 from the mobile station. The BS_CT task 2105, upon receiving a CT_ANS message from the mobile station at this time, transmits a CT_ACK message 2505 to the mobile station, acknowledging receipt of the CT_ANS message. The BS_CT task 2105 also sends the BS_C task 2101 an Answered message 3213. The BS_CT task 2105 re-enables timer T01 2504, for the maximum time it will wait for a CT_HLD message from the mobile station, and then transitions to the BS_CT(5) state 3205. In the BS_CT(5) state 3205, if the base station receives the expected CT_HLD message 2506 from the mobile station, it re-enables timer T01 2504, transmits a CT_HLD message 2507 to the mobile station, and transitions to the BS_CT(6) state 3206. In the BS_CT(6) state 3206, the BS_CT task 2105 continues processing the transmission 2507 and reception 2506 of CT_HLD messages to/from the mobile station, re-enabling T01 2504 each time it receives a CT_HLD message 2506 from the mobile station. If timer T01 expires 2513 while the BS_CT task 2105 is executing in the BS_CT(5) state 3205 or the BS_CT(6) state 3206, the BS_CT task 2105 sends the BS_C task 2101 a Call Termination Failure (T01 Expiry) message 3209. The BS_CT task 2105 then terminates processing for the channel, re-transitioning to the BS_CT(0) state 3200.

The BS_C task 2101, in the BS_C(15) state 2258, FIG. 22o, upon receiving the Answered message 3213 from the BS_CT task 2105, sends the LPI task 2112 a Connect message to transmit 2262 on the backhaul interface, to inform the system controller 103 that the mobile station end user has answered the phone for the call. The BS_C task 2101 then transitions to the BS_C(16) state 2259, depicted in FIG. 22p, where it waits for a Connect message to be received on the backhaul interface, from the system controller 103.

Upon receiving the expected Connect message 2236 from the LPI task 2112, the BS_C task 2101 sends the BS_CT task 2105 a Link Connected message 2263. The BS_C task 2101 then transitions from the BS_C(16) state 2259 to the BS_C(17) state 2260, depicted in FIG. 22q, where it waits for a Call Termination Finished message 3215 from the BS_CT task 2105.

The BS_CT task 2105, in the BS_CT(6) state 3206, upon receiving the Link Connected message 2263 from the BS_C task 2101, transmits a CT_CNC (Call Connect) message 2609 to the mobile station. The BS_CT task 2105 re-enables timer T01 2504, for the maximum time it will wait for an expected CT_ACK message response from the mobile station. The BS_CT task 2105 then transitions to the BS_CT(7) state 3207.

If timer T01 expires 2513 in the BS_CT(7) state 3207, the BS_CT task 2105 sends the BS_C task 2101 a Call Termination Failure (T01 Expiry) message 3209. The BS_CT task 2105 then terminates processing for the channel, re-transitioning to the BS_CT(0) state 3200.

Upon receiving the expected CT_ACK message 2517 from the mobile station, the BS_CT task 2105 sends the BS_C task 2101 a Call Termination Finished message 3215. The BS_CT task 2105 then terminates processing for the channel, re-transitioning to the BS_CT(0) state 3200.

Figures 1, 22P:
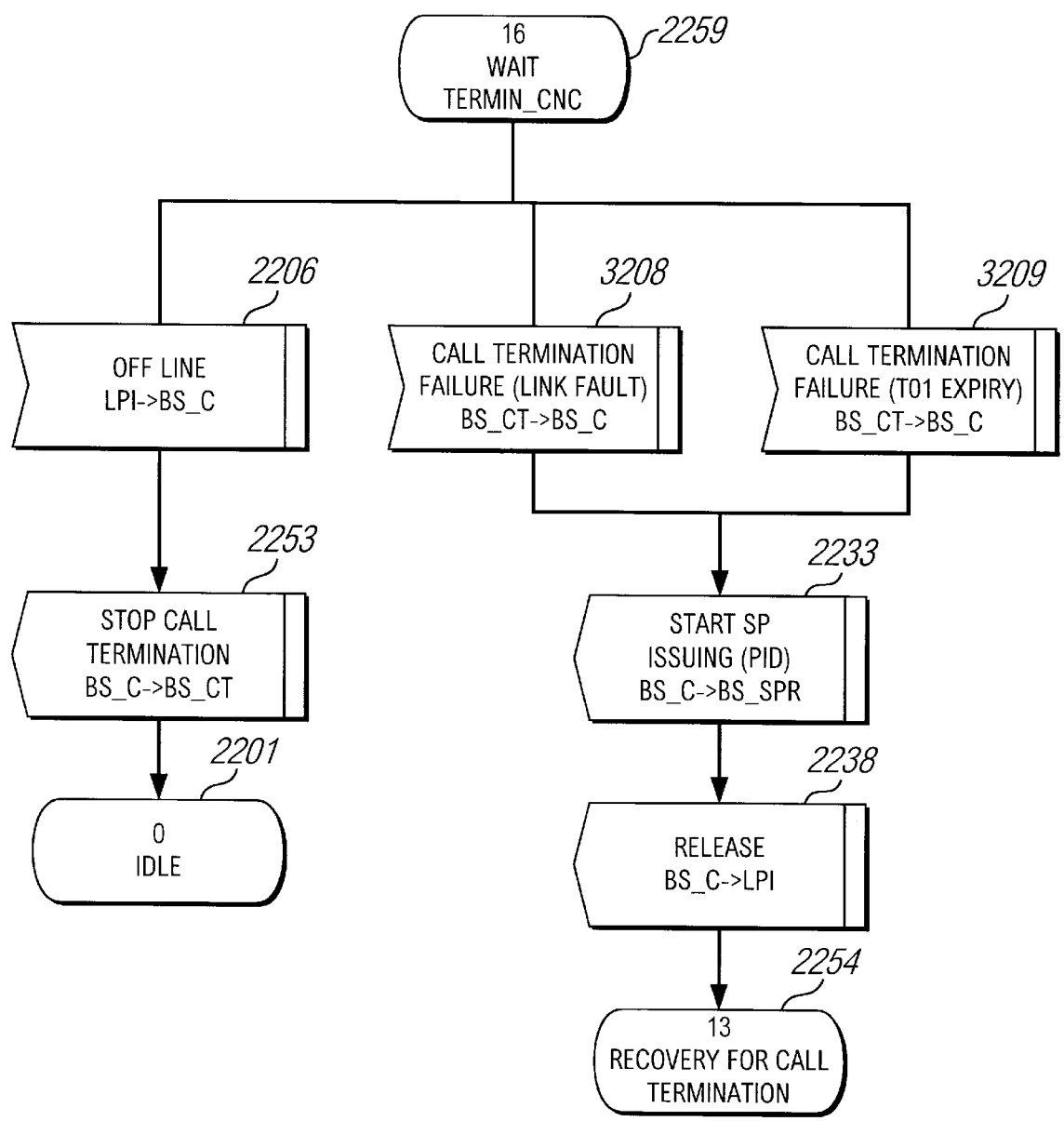
Figures 2, 22P:
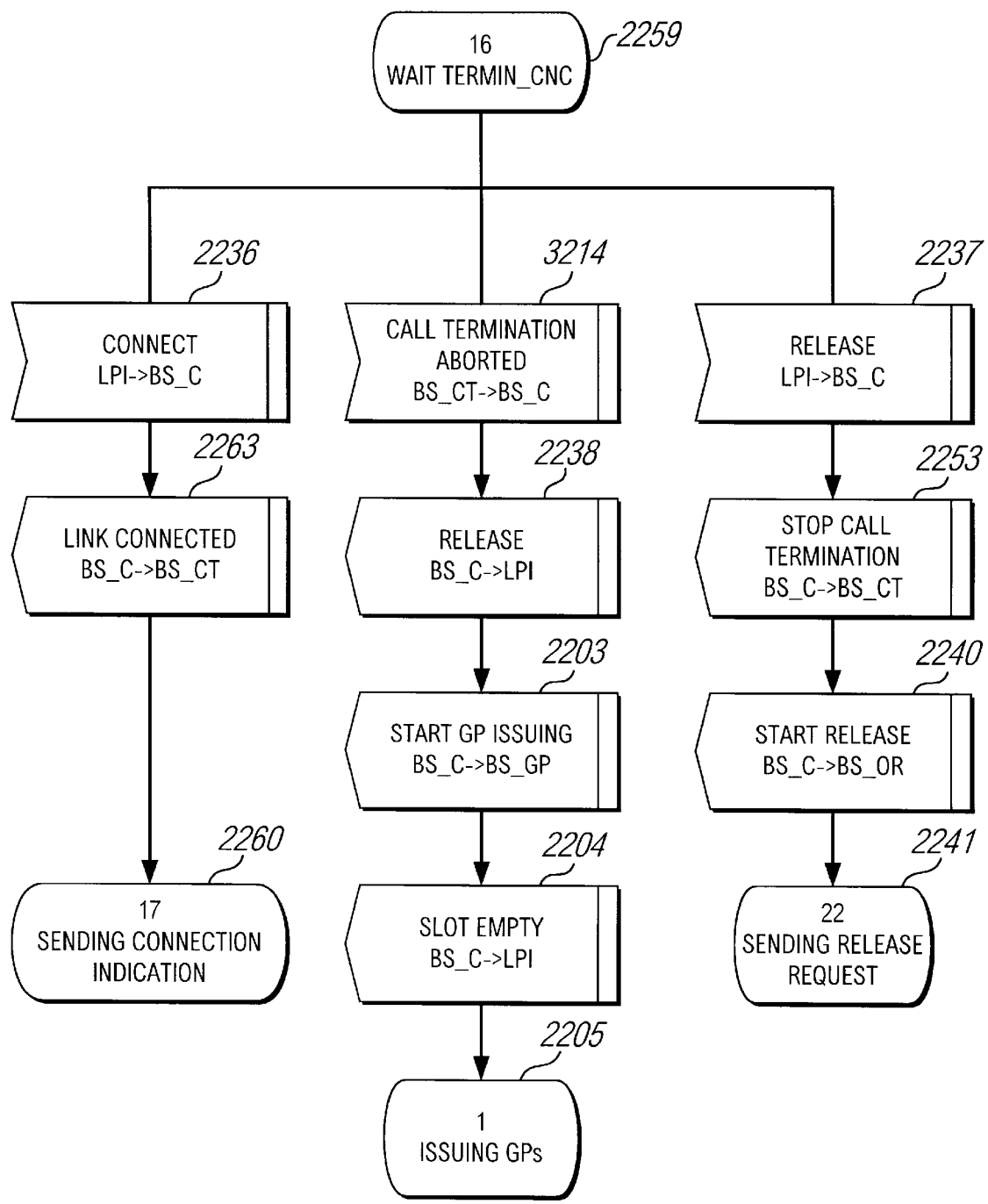
Figures 1, 22Q:
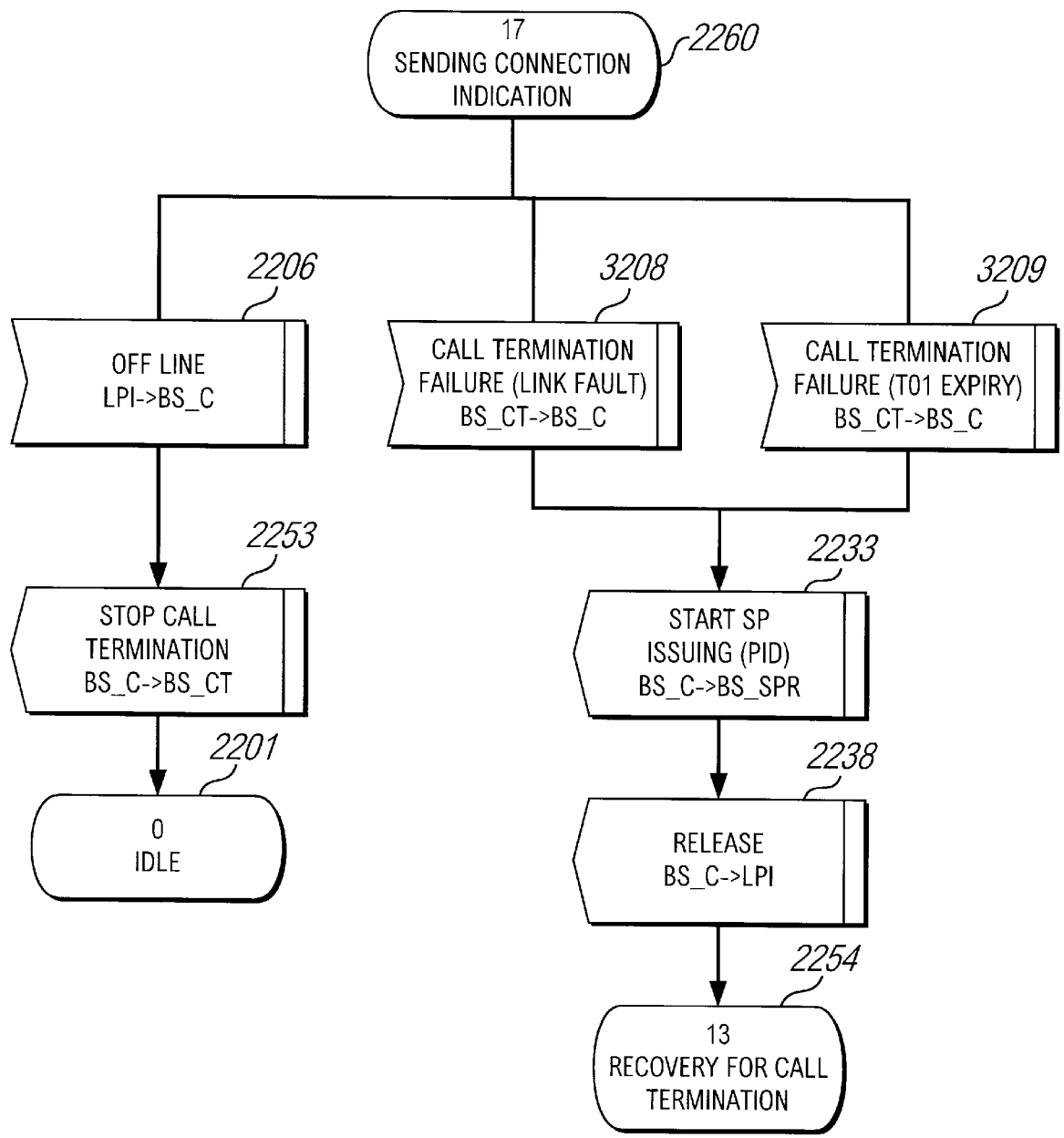
Figures 2, 22Q:
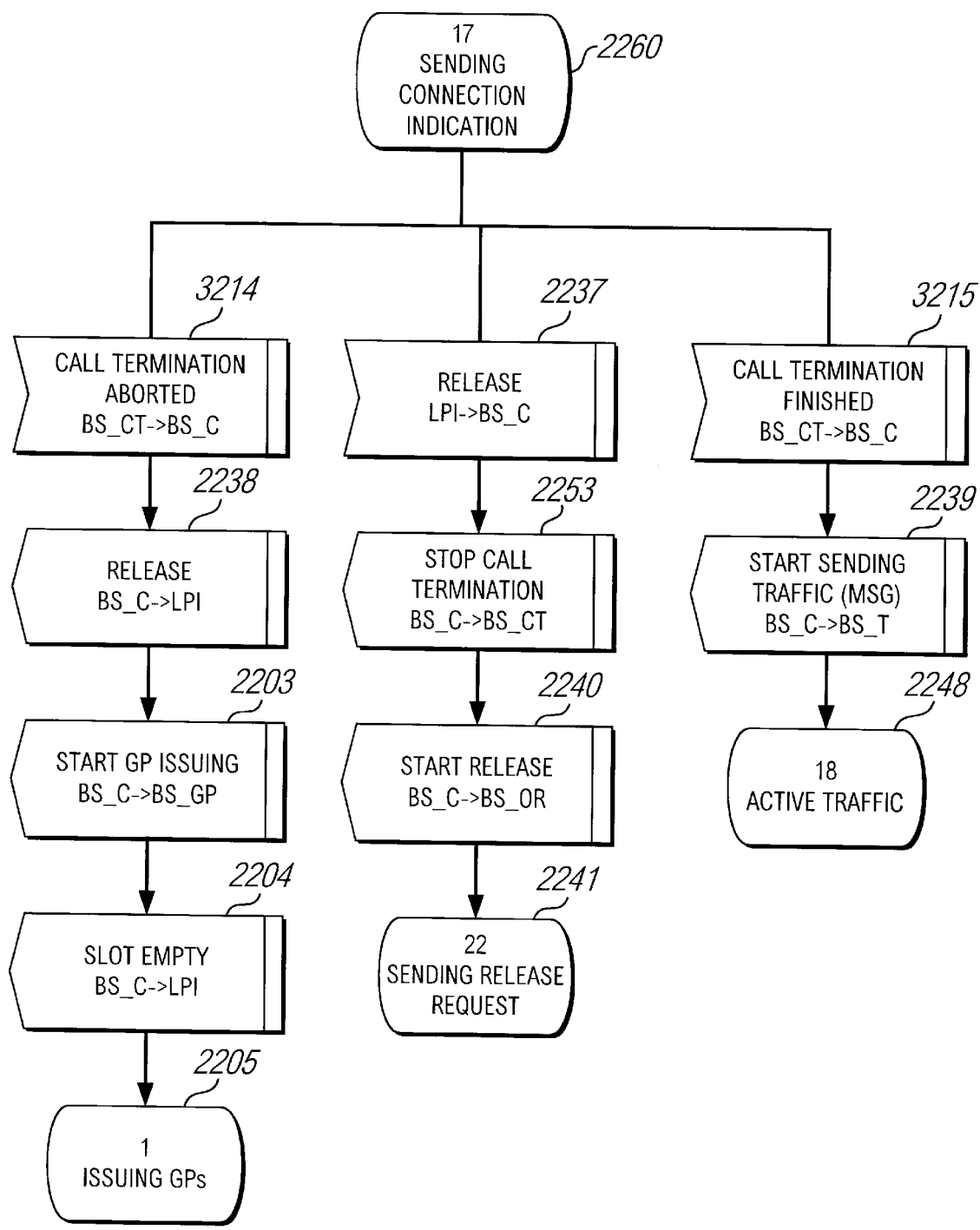

In the BS_C(17) state 2260, depicted in FIG. 22q, if the BS_C task 2101 receives a Call Termination Finished message 3215 from the BS_CT task 2105, the base station call termination protocol processing for the mobile station is complete. At this time, a call link has been established between two mobile stations on the communication system 101. The BS_C task 2101, therefore, activates the BS_T task 2106 for the channel used to communicate with the mobile station, depicted in FIG. 29, by sending it a Start Sending Traffic message 2239. The BS_C task 2101 then transitions to the BS_C(18) state 2248 for the channel, depicted in FIG. 22*s*.

While in the BS_C(12) state 2252, FIG. 22*m*, the BS_C(14) state 2257, FIG. 22*n*, the BS_C(15) state 2258, FIG. 22*o*, the BS_C(16) state 2259, FIG. 22*p*, and the BS_C(17) state 2260, FIG. 22*q*, the base station may receive a Release message from the system controller 103; the LPI task 2112 sends the BS_C task 2101 this Release message 2237. The Release message informs the base station that the mobile station's call link on the communication system 101 is being (or has been) released. Upon receiving this Release message, the BS_C task 2101 sends the BS_CT task 2105 a Stop Call Termination message 2253. The BS_C task 2101 then activates the BS_OR task 2110 for the channel, depicted in FIG. 30, by sending it a Start Release message 2240. The BS_C task 2101 then transitions to the BS_C(22) state 2241, depicted in FIG. 22*w*. The BS_CT task 2105, for its part, upon receiving the Stop Call Termination message 2253 from the BS_C task 2101, terminates processing for the channel, re-transitioning to the BS_CT(0) state 3200.

While in the BS_C(12) state 2252, the BS_C(14) state 2257, the BS_C(15) state 2258, the BS_C(16) state 2259, or the BS_C(17) state 2260, if the BS_C task 2101 receives an Off Line message 2206 from the LPI task 2112 for the channel, it sends the BS_CT task 2105 a Stop Call Termination message 2253 for the channel. The BS_C task 2101 then transitions to the BS_C(0) state 2201 for the channel, previously described, and depicted in FIG. 22*a*. The BS_CT task 2105, for its part, as previously noted, upon receiving the Stop Call Termination message 2253 from the BS_C task 2101, terminates processing for the channel, re-transitioning to the BS_CT(0) state 3200.

The BS_CT task 2105, while in the BS_CT(5) state 3205, the BS_CT(6) state 3206, or the BS_CT(7) state 3207, having received a CT_ANS message 3212 from the mobile station, may receive a CT_REL message 2608 from the mobile station. Upon receiving a CT_REL message 2608 from the mobile station in one of these states, the BS_CT task 2105 transmits a CT_ACK message 2505 to the mobile station, acknowledging the CT_REL message. The BS_CT task 2105 then sends the BS_C task 2101 a Call Termination Aborted message 3214, and terminates processing for the channel, re-transitioning to the BS_CT(0) state 3200.

In the BS C(16) state 2259, FIG. 22*p*, or the BS_C(17) state 2260, FIG. 22*q*, if the BS_C task 2101 receives a Call Termination Aborted message 3214 from the BS_CT task 2105, it sends the LPI task 2112 a Release message 2238 to transmit on the backhaul interface. This Release message informs the system controller 103 that the mobile station has terminated the call. The BS_C task 2101 also activates the BS_GP task 2102, previously discussed, and depicted in FIG. 23, by sending it a Start GP Issuing message 2203 for the channel. The BS_C task 2101 sends a Slot Empty message 2204 for the channel to the LPI task 2112. The BS_C task 2101 then transitions to the BS_C(1) state 2205 for the channel, previously described, and depicted in FIG. 22*b*.

In the BS_CT(1) state 3201, the BS_CT(2) state 3202, the BS_CT(3) state, the BS_CT(4) state 3204, the BS_CT(5) state 3205, the BS_CT(6) state 3206, and the BS_CT(7) state 3207, the base station may receive an unexpected 2508 or erroneous 2509 message on the O-Interface (as previously described). Upon receiving an unexpected or erroneous message while in any of these states, the BS_CT task 2105 increments the appropriate LeakyBucket counter (2510 or 2511). The BS_CT task 2105 then checks 2512 if either LeakyBucket counter indicates a maximum error count has been reached. If not, the BS_CT task 2105 re-transmits the last message it transmitted to the mobile station, and continues processing in the current BS_CT state for the channel. If the BS_CT task 2105 is in the BS_CT(1) state 3201, the last message transmitted was a CT_ACK message 2505. If the BS_CT task 2105 is in the BS_CT(2) state 3202, the last message transmitted was a CT_HLD message 2507. If the BS_CT task 2105 is in the BS_CT(3) state 3203, the last message transmitted was a CT_SET message 3210. If the BS_CT task 2105 is in the BS_CT(4) state 3204, the last message transmitted was a CT_HLD message 2507. If the BS_CT task 2105 is in the BS_CT(5) state 3205, the last message transmitted was a CT_ACK message 2505. If the BS_CT task 2105 is in the BS_CT(6) state 3206, the last message transmitted was a CT_HLD message 2507. If the BS_CT task 2105 is in the BS_CT(7) state 3207, the last message transmitted was a CT_CNC message 2609.

If, however, the BS_CT task 2105 checks 2512 its LeakyBucket counters and finds that either indicates a maximum error count, it sends the BS_C task 2101 of a Call Termination Failure (Link Fault) message 3208. The BS_CT task 2105 then terminates processing for the channel, re-transitioning to the BS_CT(0) state 3200.

In the BS_C(12) state 2252, FIG. 22*m*, the BS_C(14) state 2257, FIG. 22*n*, the BS_C(15) state 2258, FIG. 22*o*, the BS_C(16) state 2259, FIG. 22*p*, or the BS_C(17) state 2260, FIG. 22*q*, if the BS_C task 2101 receives a Call Termination Failure (Link Fault) message 3208 or a Call Termination Failure (T01 Expiry) message 3209, it activates the BS_SPR task 2108, previously described, and depicted in FIG. 28, by sending it a Start SP Issuing message 2233 for the channel. The BS_C task 2101 also sends the LPI task 2112 a Release message 2238 to transmit on the backhaul interface. The BS_C task 2101 then, from each of these BS_C states, transitions to the BS_C(13) state 2254, depicted in FIG. 22*r*. At this time, the base station software is attempting to resync the mobile station to the base station, by transmitting the mobile station one or more Specific Poll messages for it to resync off of.

Figure 22R:
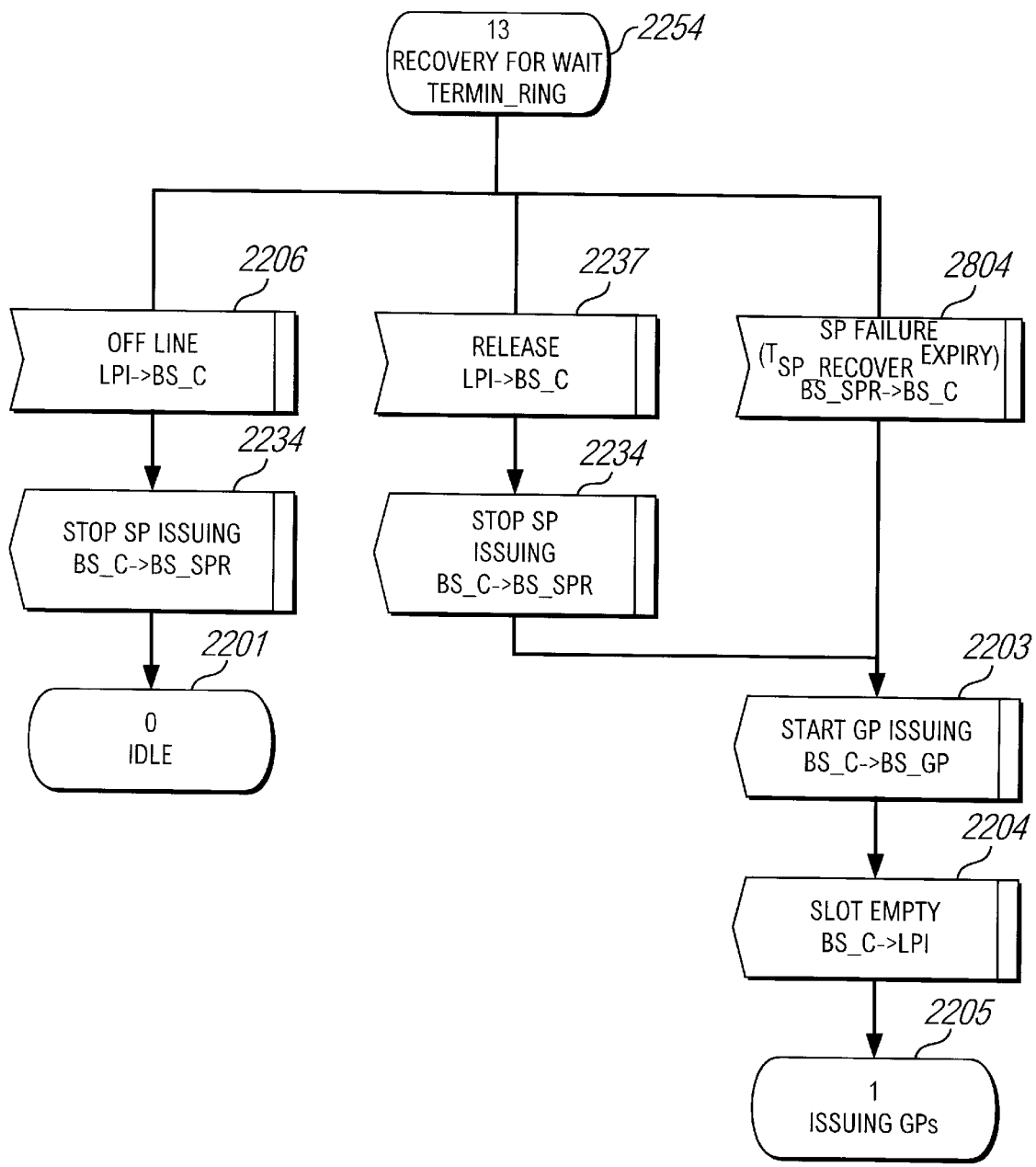

In the BS_C(13) state 2254, FIG. 22*r*, if the BS_C task 2101 receives an SP Failure (T(sp_recover) Expiry) message 2804 from the BS_SPR task 2108, FIG. 28, the BS_C task 2101 activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22*b*.

In the BS_C(13) state 2254, if the BS_C task 2101 receives an Off Line message 2206 from the LPI task 2112 for the channel, it sends the BS_SPR task 2108 a Stop SP Issuing message 2234 for the channel, and transitions to the BS_C(0) state 2201 for the channel, previously described, and depicted in FIG. 22*a*. The BS_SPR task 2108, as previously noted, upon receiving from the BS_C task 2101 a Stop SP Issuing message 2234, terminates processing for the channel, re-transitioning to the BS_SPR(0) state 2800.

In the BS_C(13) state 2254, the base station may also receive a Release message from the system controller 103;

the LPI task 2112 sends the BS__C task 2101 this Release message 2237. The Release message informs the base station the mobile station's call link on the communication system 101 is being (or has been) released. Upon receiving this Release message, the BS__C task 2101 sends the BS__SPR task 2108 a Stop SP Issuing message 2234. The BS__C task 2101 also activates the BS__GP task 2102, previously described, and depicted in FIG. 23, by sending it a Start GP Issuing message 2203 for the channel. The BS__C task 2101 also at this time sends a Slot Empty message 2204 for the channel to the LPI task 2112. The BS__C task 2101 then transitions to the BS__C(1) state 2205 for the channel, depicted in FIG. 22*b*.

Figures 1, 22S:
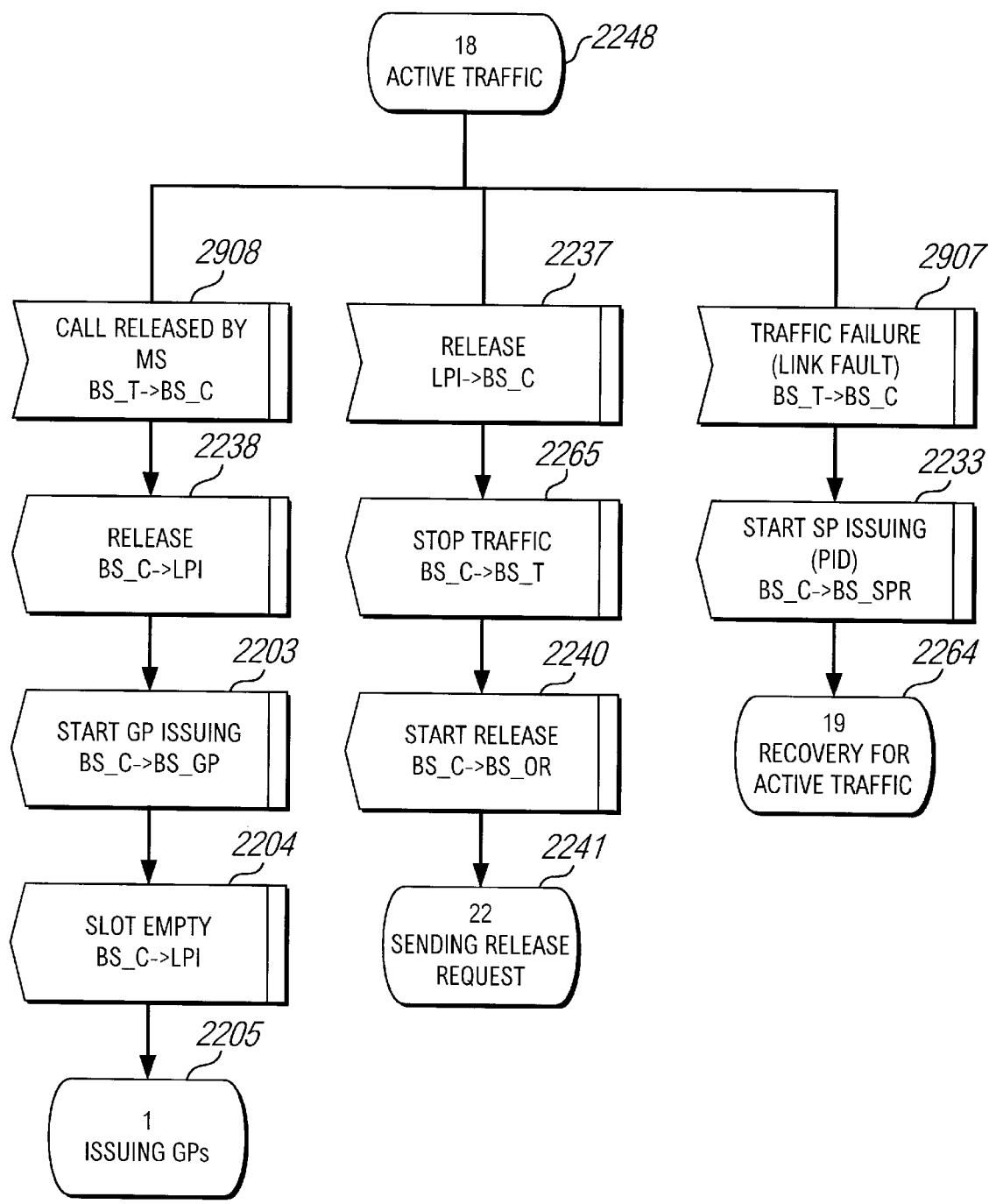
Figures 2, 22S:
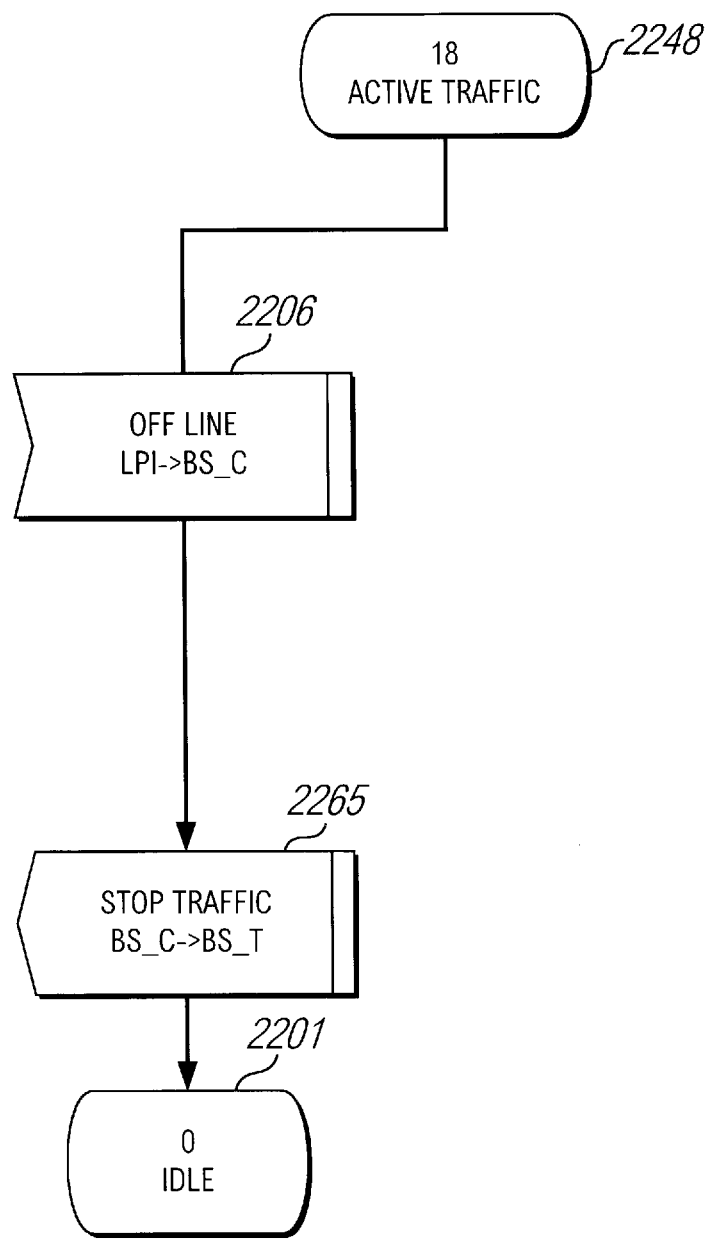

As previously described, the BS__C task 2101 transitions to the BS__C(18) state 2248, depicted in FIG. 22*s*, when a call link has been established for the mobile station, for either an outbound or incoming call, and the mobile station can transmit and receive bearer data on the communication system 101. Thus, while in the BS__C(18) state 2248, the BS software is processing an active traffic protocol sequence. In an active traffic protocol sequence, the base station receives bearer data in the user portion 205 of the time frames of the channel dedicated to the mobile station, from the mobile station, which it then transmits on the backhaul interface to the system controller 103. The base station also receives bearer data on the backhaul interface, which it then transmits on the O-Interface to the mobile station in the base portion 206 of the time frames of the dedicated channel.

Bearer data transmitted between a base station and a mobile station is organized into sequential data packets, called Traffic messages, in order that any one Traffic message can be transmitted in a base or user portion of a time frame.

Figures 1, 29:
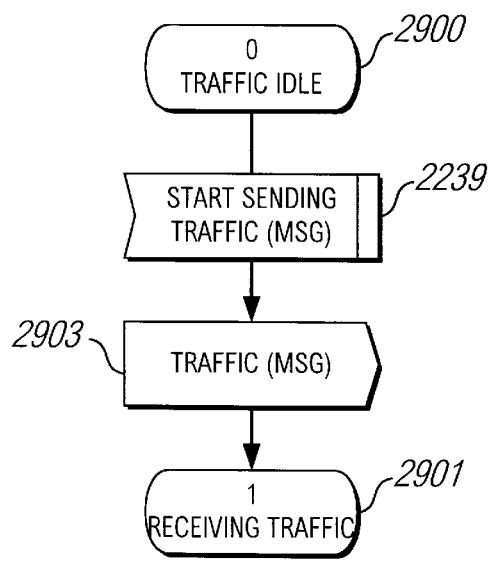
FIG. 29 is a state diagram of the BS software Traffic (BS_T) task.
Figures 2, 29:
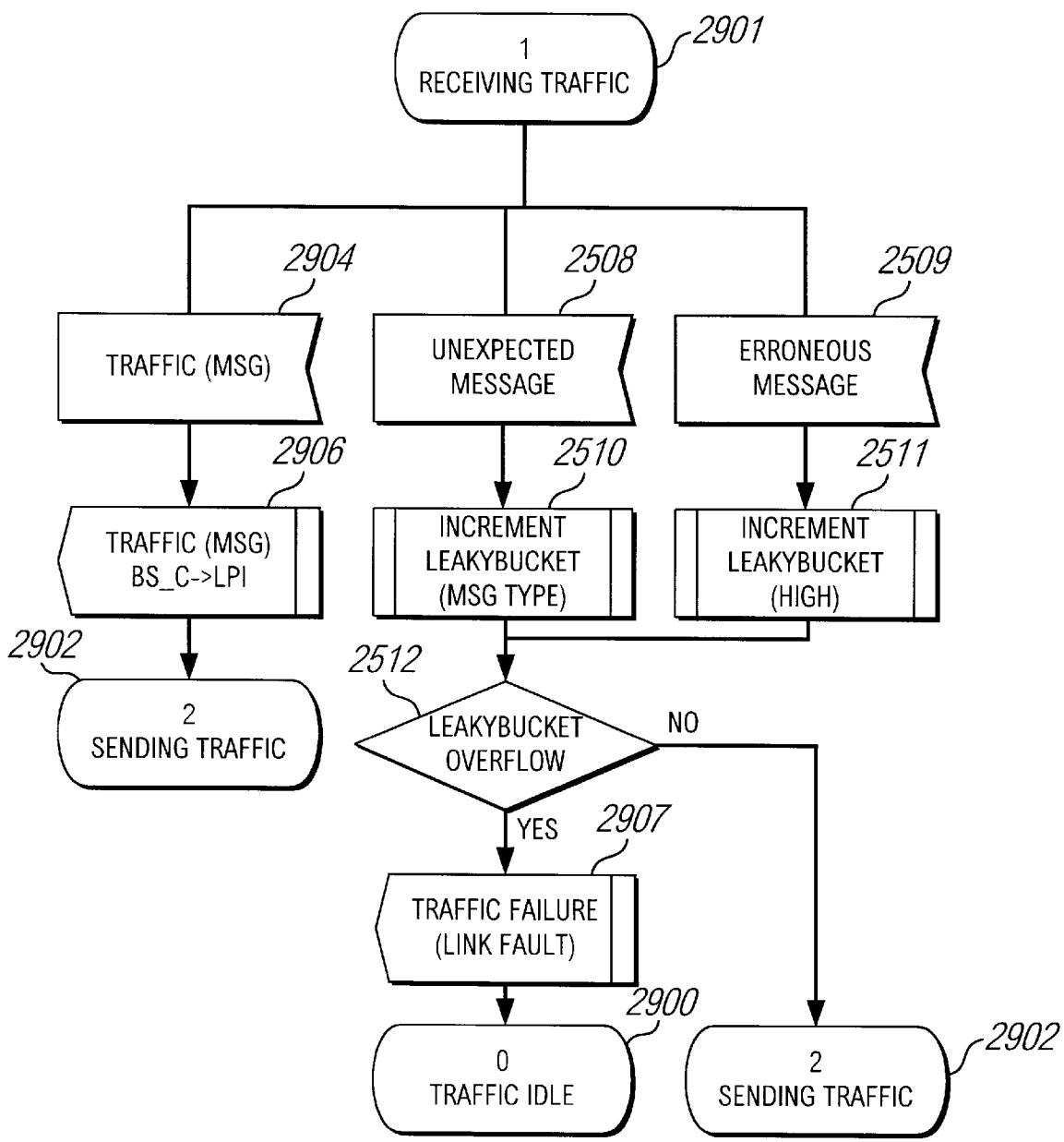
Figures 3, 29:
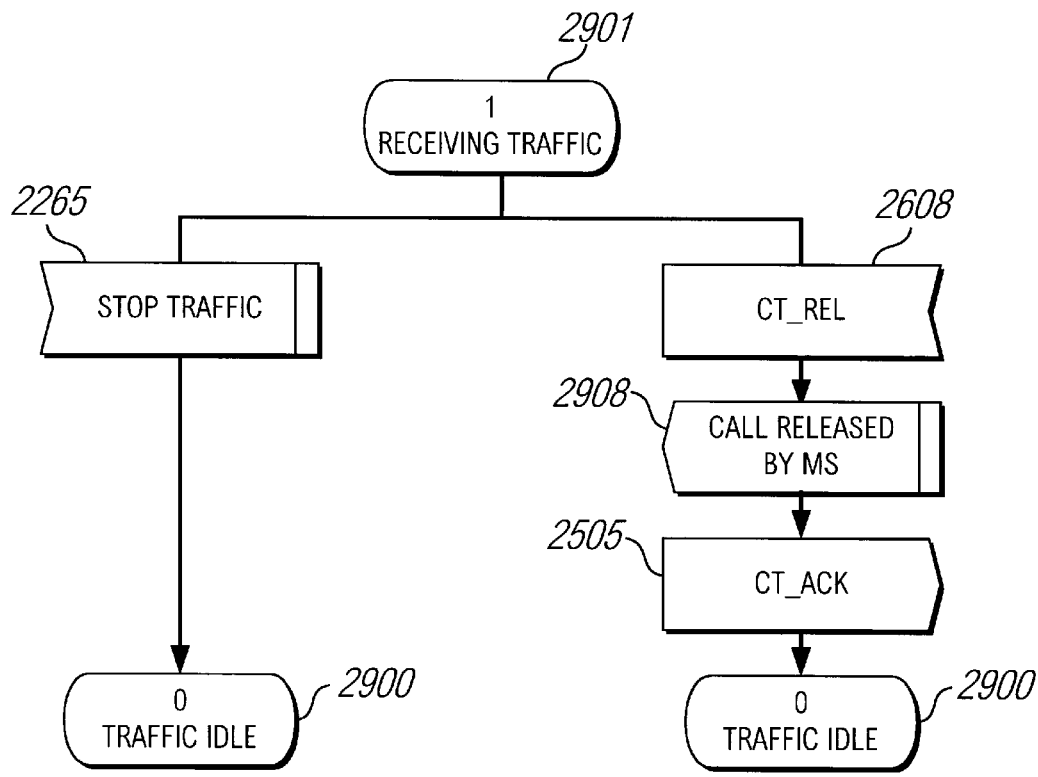
Figures 4, 29:
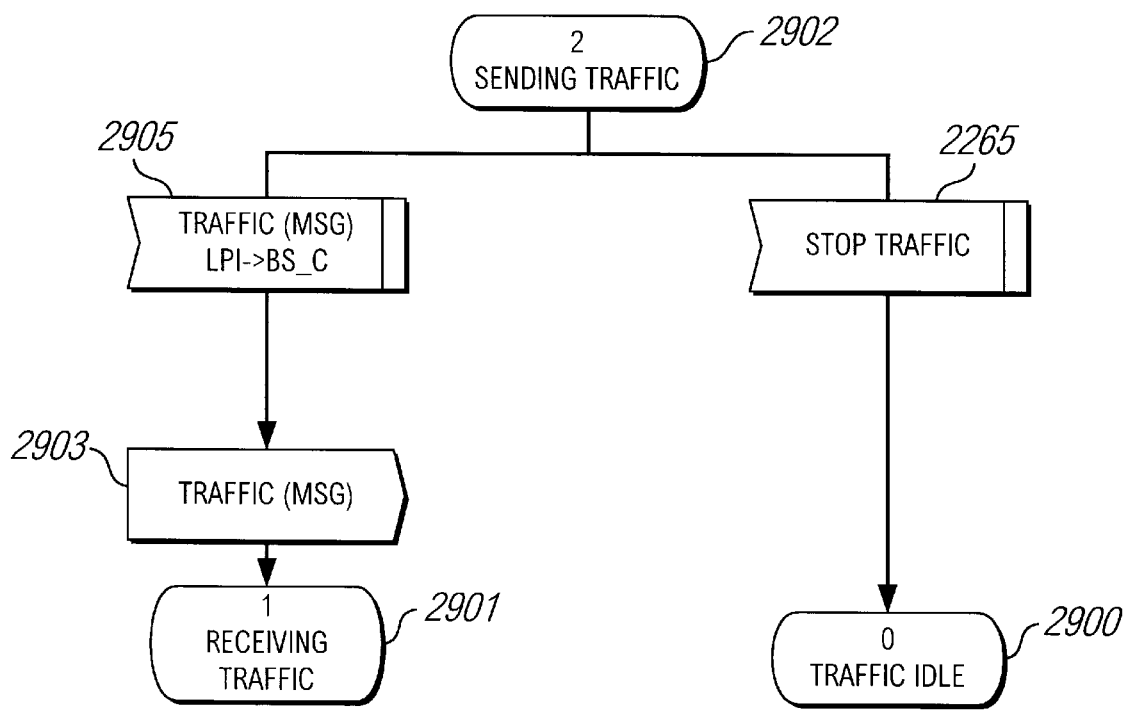

The BS__T task 2106, depicted in FIG. 29, is activated for a channel from the BS__T(0) ("Idle") state 2900 when the BS__C task 2101 sends it a Start Sending Traffic message 2239. Upon being activated, the BS__T task 2106 transmits a Traffic message 2903 to the mobile station. The BS__T task 2106 then transitions to the BS__T(1) state 2901, where it processes receiving a Traffic message 2904 from the mobile station. Upon receiving a Traffic message from the mobile station, the BS__T task 2106 forwards it 2906 to the LPI task 2112. The BS__T 2106 task then transitions to the BS__T(2) state 2902, where it processes transmitting the next Traffic message 2903 received 2905 from the LPI task 2112 to the mobile station. Upon transmitting this next Traffic message 2903 to be output to the mobile station, the BS__T task 2106 re-transitions to the BT__T(1) task 2901, where it once again processes receiving a Traffic message 2904 from the mobile station, which it then forwards 2906 to the LPI task 2112. The BS__T task 2106 continues to transition between the BS__T(1) state 2901 and the BS__T(2) state 2902, as it continues to handle a call for the mobile station, transmitting 2903 and receiving 2904 Traffic messages to/from the mobile station. In another embodiment, the BS__T task 2106 may forward received 2906 Traffic messages to the BS__C task 2101, which then forwards them to the LPI task 2112. The LPI task 2112 may also forward Traffic messages to be transmitted 2905 to the BS__C task 2101, which then forwards them to the BS__T task 2106, to be output.

In the BS__T(1) state 2901, the base station may receive an unexpected 2508 or erroneous 2509 message on the O-Interface (as previously described). Upon receiving an unexpected or erroneous message at this time, the BS__T task 2106 increments the appropriate LeakyBucket counter (2510 or 2511). The BS__T task 2106 then checks 2512 if either LeakyBucket counter indicates a maximum error count has been reached. If no, the BS__T task 2106 transitions to the BS__T(2) state 2902, where it processes transmitting 2903 the next Traffic message received from the LPI task 2905 to be output to the mobile station.

If, however, the BS__T task 2106 checks 2512 its Leaky-Bucket counters and finds that either indicates a maximum error count, it sends the BS__C task 2101 a Traffic Failure (Link Fault) message 2907. The BS__T task 2106 then terminates processing for the channel, re-transitioning to the BS__T(0) state 2900.

In the BS__C(18) state 2248, FIG. 22*s*, if the BS__C task 2101 receives an Off Line message 2206 from the LPI task 2112 for the channel, it sends the BS__T task 2106 a Stop Traffic message 2265 for the channel, and then transitions to the BS__C(0) state 2201 for the channel, previously described, and depicted in FIG. 22*a*. The BS__T task 2106, on receiving a Stop Traffic message 2265 from the BS__C task 2101, terminates processing for the channel, re-transitioning to the BS__T(0) state 2900.

In the BS__C(18) state 2248, the base station may also receive a Release message from the system controller 103; the LPI task 2112 sends the BS__C task 2101 this Release message 2237. The Release message informs the base station that the mobile station's call link on the communication system 101 is being (or has been) released. Upon receiving this Release message, the BS__C task 2101 sends the BS__T task 2106 a Stop Traffic message 2265. The BS__C task 2101 also activates the BS__OR task 2110, depicted in FIG. 30, by sending it a Start Release message 2240, and then transitions to the BS__C(22) state 2241, depicted in FIG. 22*w*.

The BS__T task 2106, for its part, as previously noted, on receiving a Stop Traffic message 2265 from the BS__C task 2101, terminates processing for the channel, re-transitioning to the BS__T(0) state 2900.

The BS__T task 2106, while waiting in the BS__T(1) state 2901 to receive a Traffic message from the mobile station, may, instead, receive a CT__REL message 2608 from the mobile station. Upon receiving a CT__REL message from the mobile station at this time, the BS__T task 2106 transmits a CT__ACK message 2505 to the mobile station, acknowledging the CT__REL message. The BS__T task 2106 also sends the BS__C task 2101 a Call Released By MS message 2908 (mobile station), and terminates processing for the channel, re-transitioning to the BS__T(0) state 2900.

In the BS__C(18) state 2248, FIG. 22*s*, if the BS__C task 2101 receives a Call Released By MS message 2908 from the BS__T task 2106, it sends the LPI task 2112 a Release message 2238 to transmit on the backhaul interface. The BS__C task 2101 also activates the BS__GP task 2102, previously described, and depicted in FIG. 23, by sending it a Start GP Issuing message 2203 for the channel. The BS__C task 2101 sends a Slot Empty message 2204 for the channel to the LPI task 2112. The BS__C task 2101 then transitions to the BS__C(1) state 2205 for the channel, previously described, and depicted in FIG. 22*b*.

In the BS__C(18) state 2248, if the BS__C task 2101 receives a Traffic Failure (Link Fault) message 2907, it activates the BS__SPR task 2108, previously described, and depicted in FIG. 28, by sending it a Start SP Issuing message 2233 for the channel. The BS__C task 2101 then transitions to the BS C(19) state 2264, depicted in FIG. 22*t*. At this time, the BS software is attempting to resync the mobile station to the base station, by transmitting the mobile station one or more Specific Poll messages for it to resync off of.

Figure 22T:
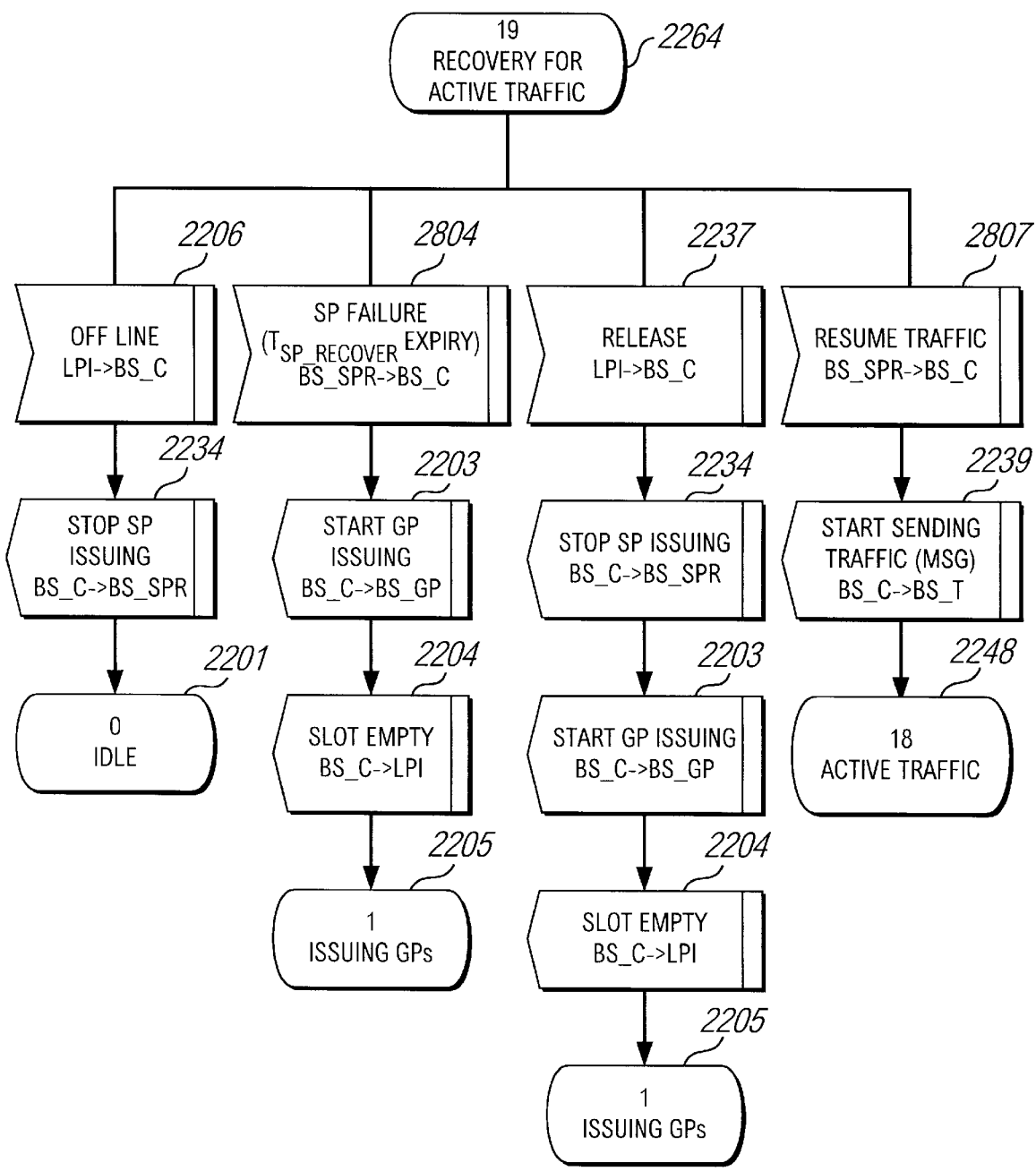

In the BS__C(19) state 2264, FIG. 22*t*, if the BS__C task 2101 receives an SP Failure (T(sp_recover) Expiry) message 2804 from the BS_SPR task 2108, the BS_C task 2101 activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

In the BS_C(19) state 2264, if the BS_C task 2101 receives an Off Line message 2206 from the LPI task 2112 for the channel, it sends the BS_SPR task 2108 a Stop SP Issuing message 2234 for the channel, and transitions to the BS_C(0) state 2201 for the channel, previously described, and depicted in FIG. 22a. The BS_SPR task 2108, as previously noted, on receiving a Stop SP Issuing message 2234 from the BS_C task 2101, terminates processing for the channel, re-transitioning to the BS_SPR(0) state 2800.

In the BS_C(19) state 2264, the base station may also receive a Release message from the system controller 103; the LPI task 2112 sends the BS_C task 2101 this Release message 2237. The Release message informs the base station that the mobile station's call link on the communication system 101 is being (or has been) released. Upon receiving this Release message, the BS_C task 2101 sends the BS_SPR task 2108 a Stop SP Issuing message 2234. The BS_C task 2101 also activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

As previously described, if the base station receives a Traffic message 2904 from the mobile station while executing the BS_SPR task 2108 for a channel, the BS_SPR task 2108 sends the Traffic message 2906 to the LPI task 2112, and sends the BS_C task 2101 a Resume Traffic message 2807. The BS_C task 2101, on receiving a Resume Traffic message 2807 from the BS_SPR task 2108, activates the BS_T task 2106 for the channel, previously described, and depicted in FIG. 29, by sending it a Start Sending Traffic message 2239. The BS_C task 2101 then re-transitions to the BS_C(18) state 2248 for the channel, previously described and depicted in FIG. 22s.

As previously discussed, and depicted in FIG. 22c, in the BS_C(2) state 2210, if the BS_C task 2101 receives a Handover Request message 2412 from the BS_SPA task 2103, the BS_C task 2101 activates the BS_H task 2111 for the channel, depicted in FIG. 27, by sending it a Start Handover message 2224. The BS_C task 2101 also sends the LPI task 2112 a Terminating Handover message 2225 to transmit on the backhaul interface. The BS_C task 2101 then transitions to the BS_C(20) state 2226, depicted in FIG. 22u.

The BS_H task 2111, depicted in FIG. 27, is activated for a channel from the BS_H(0) ("Idle") state 2700 when the BS_C task 2101 sends it a Start Handover message 2224. The BS_H task 2111, upon being activated, transmits a CT_ACK message 2505 to the mobile station requesting the handover. The BS_H task 2111 also enables a timer T01 2504, for the maximum time it will wait for a CT_HLD message from the mobile station. The BS_H task 2111 then transitions to the BS_H(1) state 2701, where it waits for a CT_HLD message from the mobile station. As previously described, in regards to the registration protocol processing, the base station and the mobile station transmit CT_HLD messages to each other when they are executing a protocol sequence and have no other message to transmit to the other.

If T01 expires 2513 in the BS_H(1) state 2701, the BS_H task 2111 sends the BS_C task 2101 a Handover Failure (T01 Expiry) message 2705. The BS_H task 2111 then terminates processing for the channel, re-transitioning to the BS_H(0) state 2700.

Upon receiving the expected CT_HLD message 2506, the BS_H task 2111 re-enables timer T01 2504, transmits its own CT_HLD message 2507 to the mobile station, and transitions to the BS_H(2) state 2702. In the BS_H(2) state 2702, the BS_H task 2111 continues to process the transmission 2507 and reception 2506 of CT_HLD messages to/from the mobile station, re-enabling T01 2504 each time it receives a CT_HLD message 2506 from the mobile station. If timer T01 expires 2513 in the BS_H(2) state 2702, the BS_H task 2111 sends the BS_C task 2101 a Handover Failure (T01 Expiry) message 2705. The BS_H task 2111 then terminates processing for the channel, re-transitioning to the BS_H(0) state 2700.

Figure 22U:
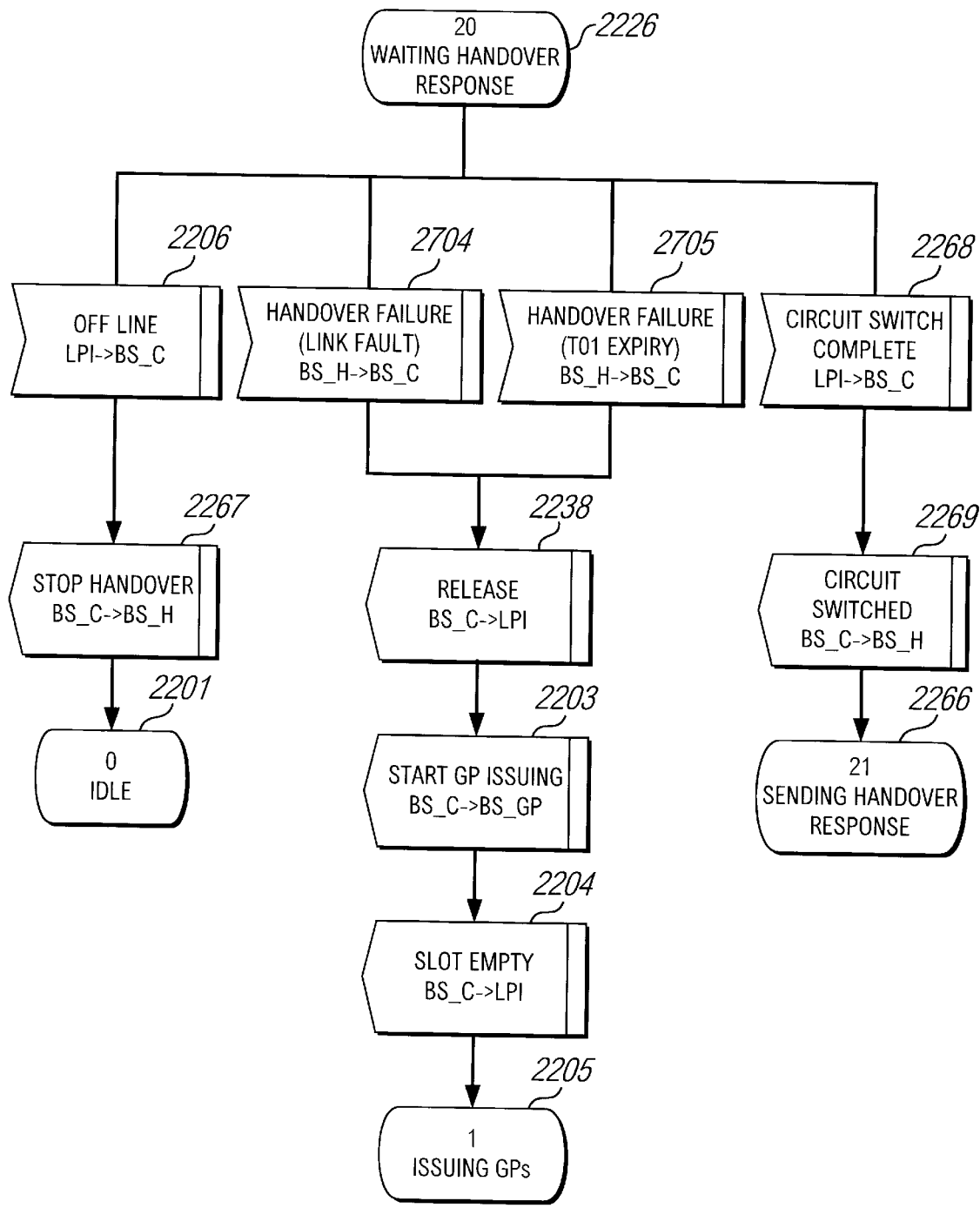

While executing in the BS_C(20) state 2226 of the BS_C task 2101, depicted in FIG. 22u, the base station may receive a Circuit Switch Complete message from the system controller 103; the LPI task 2112 sends the BS_C task 2101 this Circuit Switch Complete message 2268. The Circuit Switch Complete message indicates that a call link has been established on the communication system 101 for this base station to now handle the mobile station's call. The BS_C task 2101, upon receiving this Circuit Switch Complete message, sends the BS_H task 2111 a Circuit Switched message 2269, and then transitions to the BS_C(21) state 2266, depicted in FIG. 22v.

The BS_H task 211 1, upon receiving a Circuit Switched 2269 message, transmits a CT_CSC (Circuit Switch Complete) message 2706 to the mobile station. The BS_H task 2111 re-enables timer T01 2504, for the maximum time it will wait for a CT_ACK message response from the mobile station. The BS_H task 2111 then transitions to the BS_H(3) state 2703, where it waits for a CT_ACK message from the mobile station.

If T01 expires 2513 in the BS_H(3) state 2703, the BS_H task 2111 sends the BS_C task 2101 a Handover Failure (T01 Expiry) message 2705. The BS_H task 2111 then terminates processing for the channel, re-transitioning to the BS_H(0) state 2700.

Upon receiving the expected CT_ACK message 2517 from the mobile station, the BS_H task 2111 sends the BS_C task 2101 a Handover Finished message 2707. The BS_H task 2111 then terminates processing for the channel, re-transitioning to the BS_H(0) state 2700.

Figure 22V:
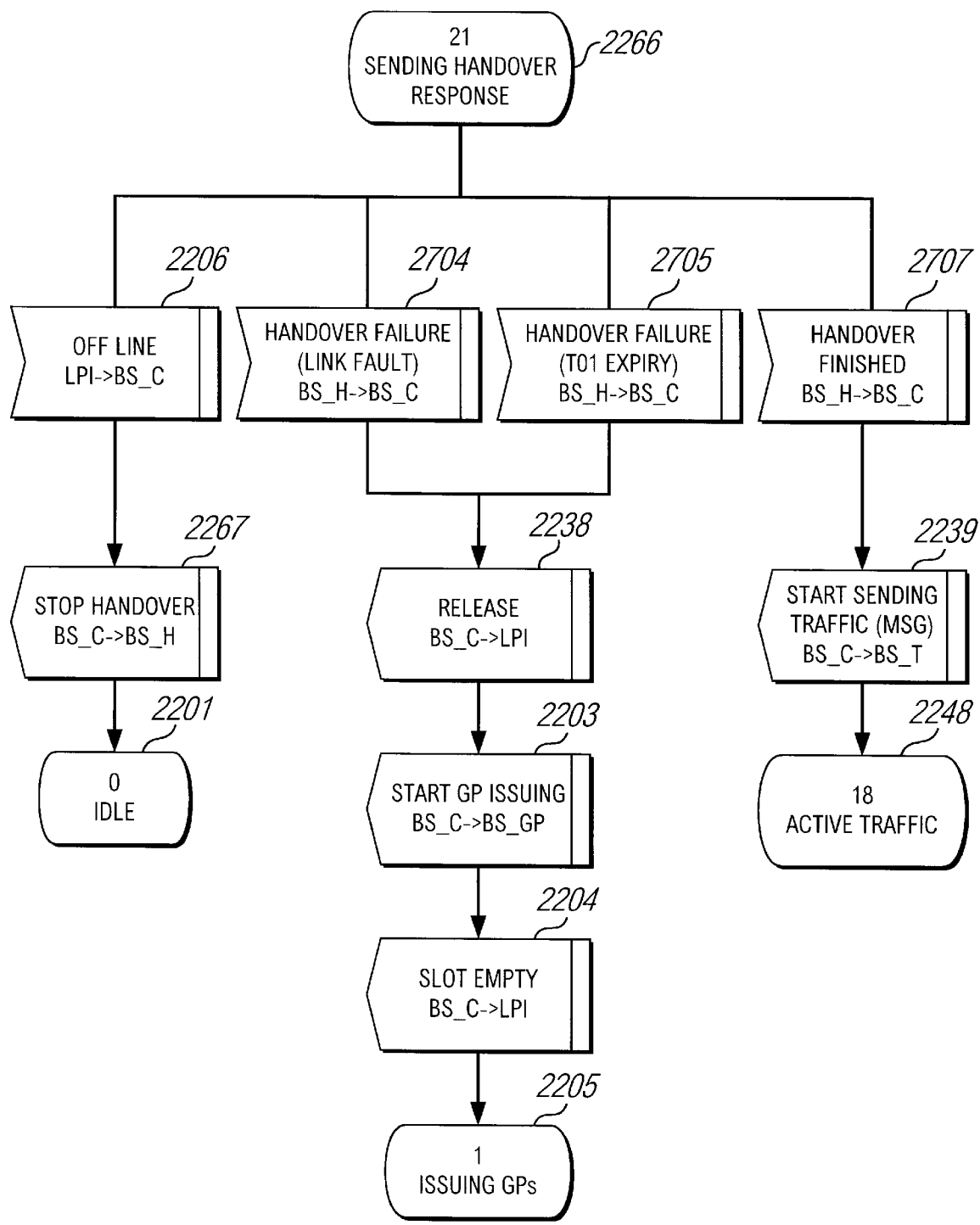

In the BS_C(21) state 2266, depicted in FIG. 22v, if the BS_C task 2101 receives a Handover is Finished message 2707 from the BS_H task 2111, the base station terminating handover protocol processing for the mobile station is complete. At this time, the mobile station's call link on the communication system 101 has been established on this base station. The BS_C task 2101, therefore, activates the BS_T task 2106 for the channel, previously described, and depicted in FIG. 29, by sending it a Start Sending Traffic message 2239. The BS_C task 2101 then transitions to the BS_C(18) state 2248, previously described, and depicted in FIG. 22s.

In the BS_C(20) state 2226, FIG. 22u, or the BS_C(21) state 2266, FIG. 22v, if the BS_C task 2101 receives an Off Line message 2206 from the LPI task 2112 for the channel, it sends the BS_H task 2111 a Stop Handover message for the channel 2267. The BS_C task 2101 then transitions to the BS_C(0) state 2201 for the channel, previously described, and depicted in FIG. 22a. The BS_H task 2111, for its part, upon receiving a Stop Handover message 2267, terminates processing for the channel, re-transitioning to the BS_H(0) state 2700.

In the BS_H(1) state 2701, the BS_H(2) state 2702, or the BS_H(3) state 2703, the base station may receive an unexpected 2508 or erroneous 2509 message on the O-Interface (as previously described). Upon receiving an unexpected or erroneous message while in any of these states, the BS_H task 2111 increments the appropriate LeakyBucket counter (2510 or 2511). The BS_H task 2111 then checks 2512 if either LeakyBucket counter indicates a maximum error count has been reached. If not, the BS_H task 2111 re-transmits the last message transmitted to the mobile station, and continues processing in the current BS_H state. If the BS_H task 2111 is in the BS_H(1) state 2701, the last message transmitted was a CT_ACK message 2505. If the BS_H task 2111 is in the BS_H(2) state 2702, the last message transmitted was a CT_HLD message 2507. If the BS_H task 2111 is in the BS_H(3) state 2703, the last message transmitted was a CT_CSC (Circuit Switch Complete) message 2706.

If, however, the BS_H task 2111 checks 2512 its LeakyBucket counters and finds that either indicates a maximum error count, it sends the BS_C task 2101 a Handover Failure (Link Fault) message 2704. The BS_H task 2111 then terminates processing for the channel, re-transitioning to the BS_H(0) state 2700.

In the BS_C(20) state 2226, FIG. 22u, or in the BS_C(21) state 2266, FIG. 22v, if the BS_C task 2101 receives a Handover Failure (Link Fault) message 2704 or a Handover Failure (T01 Expiry) message 2705 from the BS_H task 2111, it sends the LPI task 2112 a Release message 2238 to transmit on the backhaul interface. The BS_C task 2101 also activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

Figures 1, 30:
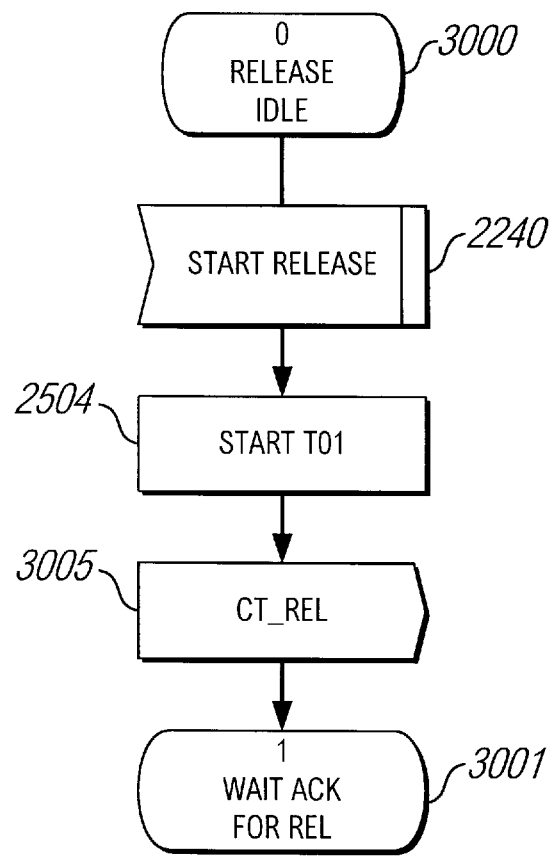
FIG. 30 is a state diagram of the BS software Originated Release (BS_OR) task.
Figures 2, 30:
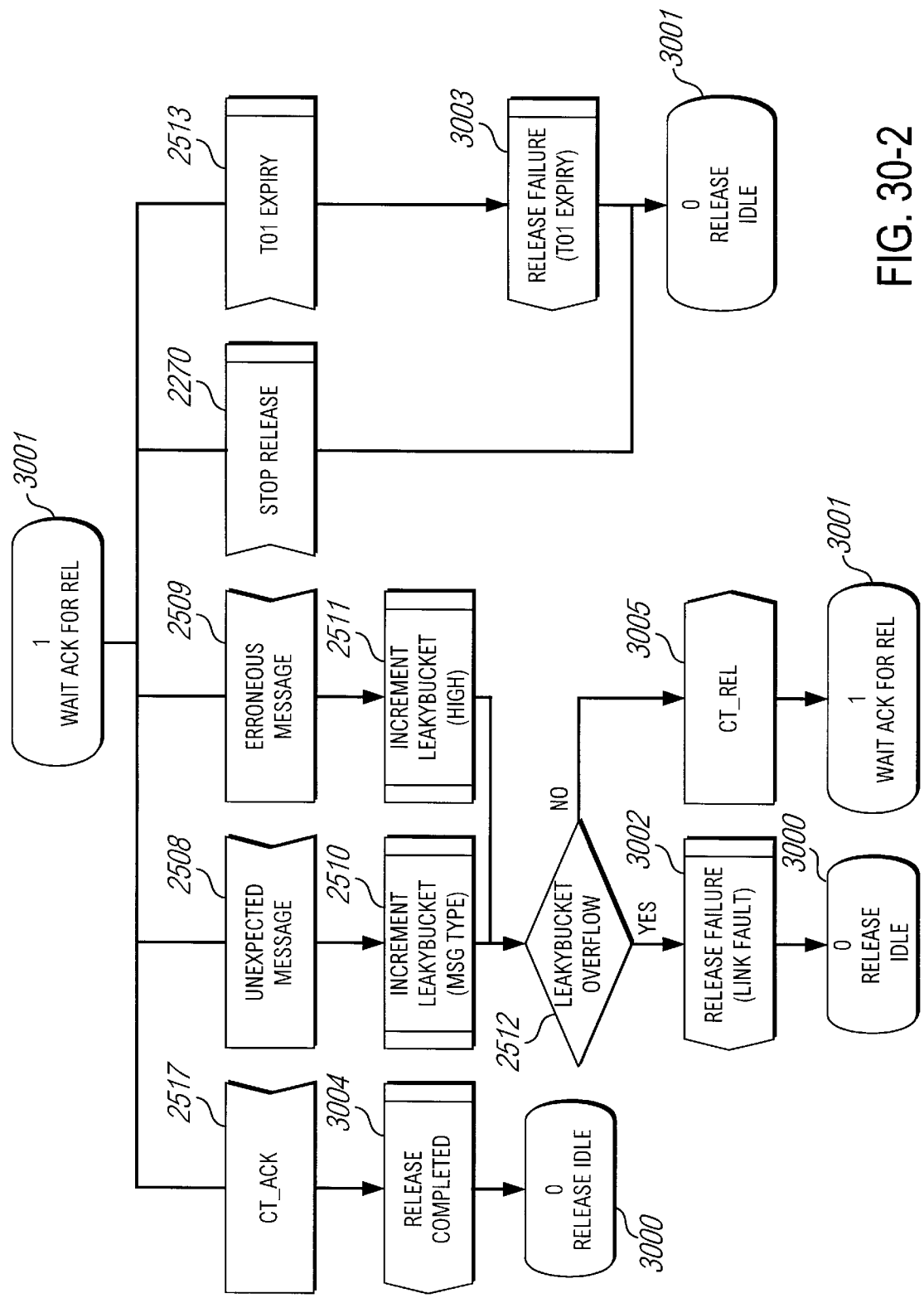

As previously discussed, on receiving a Release message 2237 while executing in the BS_C(8) state 2223, FIG. 22h, the BS_C(10) state 2245, FIG. 22i, the BS_C(12) state 2252, FIG. 22m, the BS_C(14) state 2257, FIG. 22n, the BS_C(15) state 2258, FIG. 22o, the BS_C(16) state 2259, FIG. 22p, the BS_C(17) state 2260, FIG. 22q, or the BS_C(18) state 2248, FIG. 22s, the BS_C task 2101 may activate the BS_OR task 2110, depicted in FIG. 30, by sending it a Start Release message 2240. The BS_C task 2101 then transitions to the BS_C(22) state 2241, depicted in FIG. 22w.

The BS_OR task 2110, depicted in FIG. 30, is activated from the BS_OR(0) ("Idle") state 3000 when the BS_C task 2101 sends it a Start Release message 2240. The BS_OR task 2110, upon being activated, transmits a CT_REL (Release) message 3005 to the mobile station. The BS_OR task 2110 also enables a timer T01 2504, for the maximum time it will wait for a CT_ACK message response from the mobile station. The BS_OR task 2110 then transitions to the BS_OR(1) state 3001, where it waits for a CT_ACK message from the mobile station.

If T01 expires 2513 in the BS_OR(1) state 3001, the BS_OR task 2110 sends the BS_C task 2101 a Release Failure (T01 Expiry) message 3003. The BS_OR task 2110 then terminates processing for the channel, re-transitioning to the BS_OR(0) state 3000.

Upon receiving the expected CT_ACK message 2517 from the mobile station, the BS_OR task 2110 sends the BS_C task 2101 a Release Completed message 3004. The BS_OR task 2110 then terminates processing for the channel, re-transitioning to the BS_OR(0) state 3000.

Figure 22W:
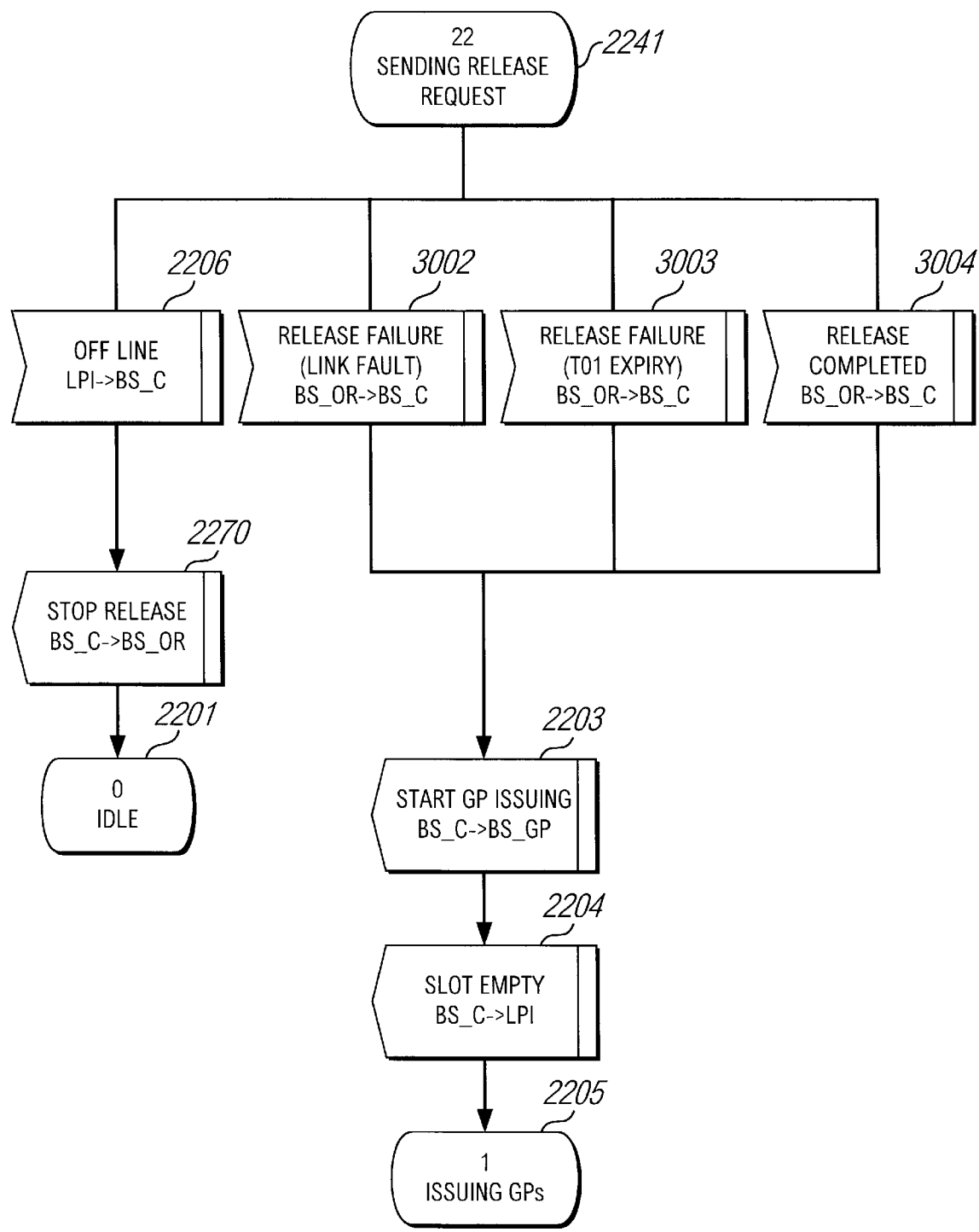

In the BS_C(22) state 2241, depicted in FIG. 22w, if the BS_C task 2101 receives a Release Completed message 3004 from the BS_OR task 2110, it activates the BS_GP task 2102, previously discussed, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

In the BS_C(22) state 2241, if the BS_C task 2101 receives an Off Line message 2206 from the LPI task 2112 for the channel, it sends the BS_OR task 2110 a Stop Release message 2270 for the channel. The BS_C task 2101 then transitions to the BS_C(0) state 2201 for the channel, previously described, and depicted in FIG. 22a. The BS_OR task 2110, for its part, upon receiving a Stop Release message 2270 from the BS_C task 2101, terminates processing for the channel, re-transitioning to the BS_OR(0) state 3000.

In the BS_OR(1) state 3001, the base station may receive an unexpected 2508 or erroneous 2509 message on the O-Interface (as previously described). Upon receiving an unexpected or erroneous message at this time, the BS_OR task 2110 increments the appropriate LeakyBucket counter (2510 or 2511). The BS_OR task 2110 then checks 2512 if either LeakyBucket counter indicates a maximum error count has been reached. If not, the BS_OR task 2110 re-transmits the last message it transmitted to the mobile station, in this case, a CT_REL (Release) message 3005, and continues processing in the BS_OR(1) state 3001.

If, however, the BS_OR task 2110 checks 2512 its LeakyBucket counters and finds that either indicates a maximum error count, it sends the BS_C task 2101 a Release Failure (Link Fault) message 3002. The BS_OR task 2110 then terminates processing for the channel, re-transitioning to the BS_OR(0) state 3000.

In the BS_C(22) state 2241, if the BS_C task 2101 receives a Release Failure (Link Fault) message 3002 or a Release Failure (T01 Expiry) message 3003, it activates the BS_GP task 2102, previously described, and depicted in FIG. 23, by sending it a Start GP Issuing message 2203 for the channel. The BS_C task 2101 also at this time sends a Slot Empty message 2204 for the channel to the LPI task 2112. The BS_C task 2101 then transitions to the BS_C(1) state 2205 for the channel, depicted in FIG. 22b.

Figures 1, 33:
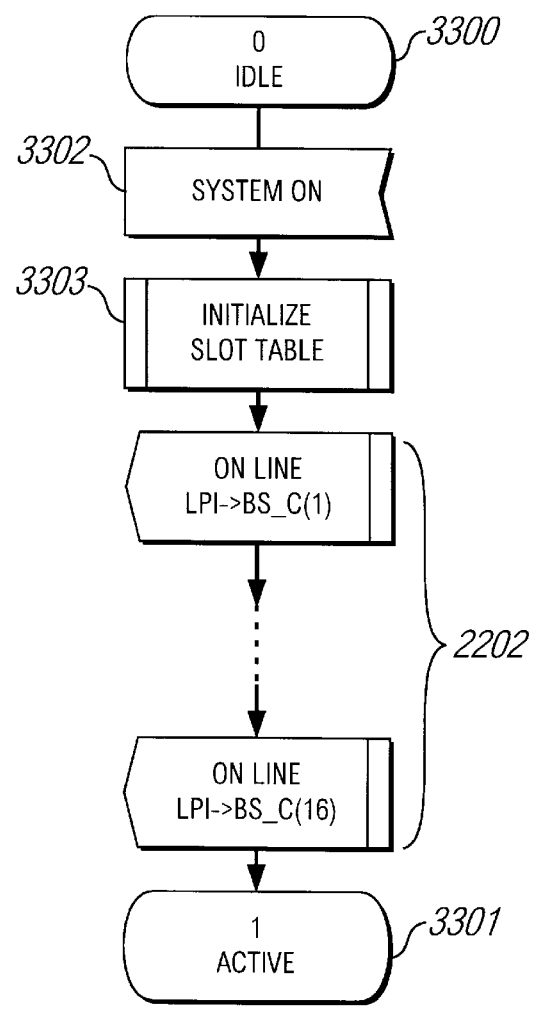
FIG. 33 is a state diagram of the BS software Line Processor Interface (LPI) task.
Figures 2, 33:
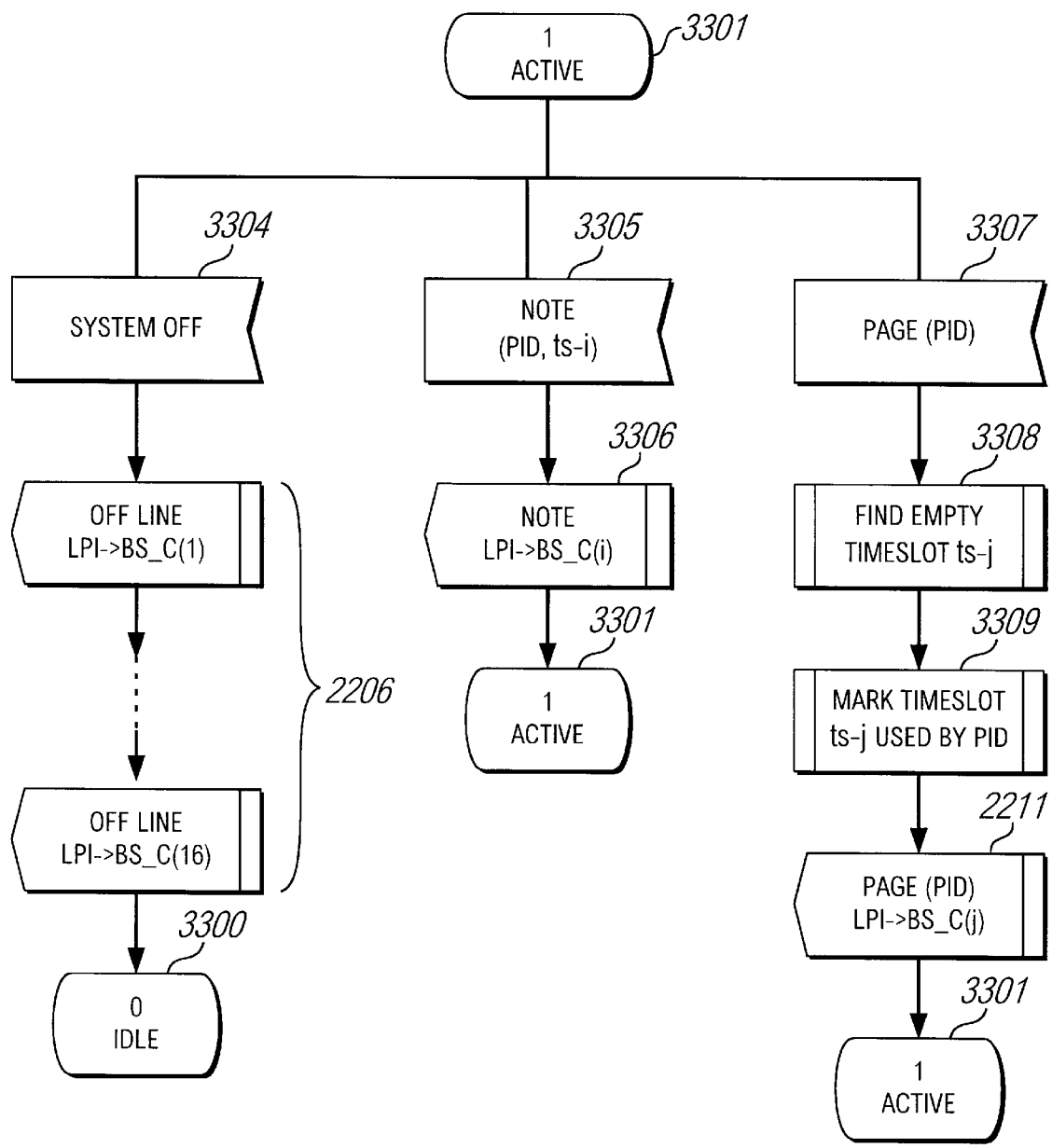
Figures 3, 33:
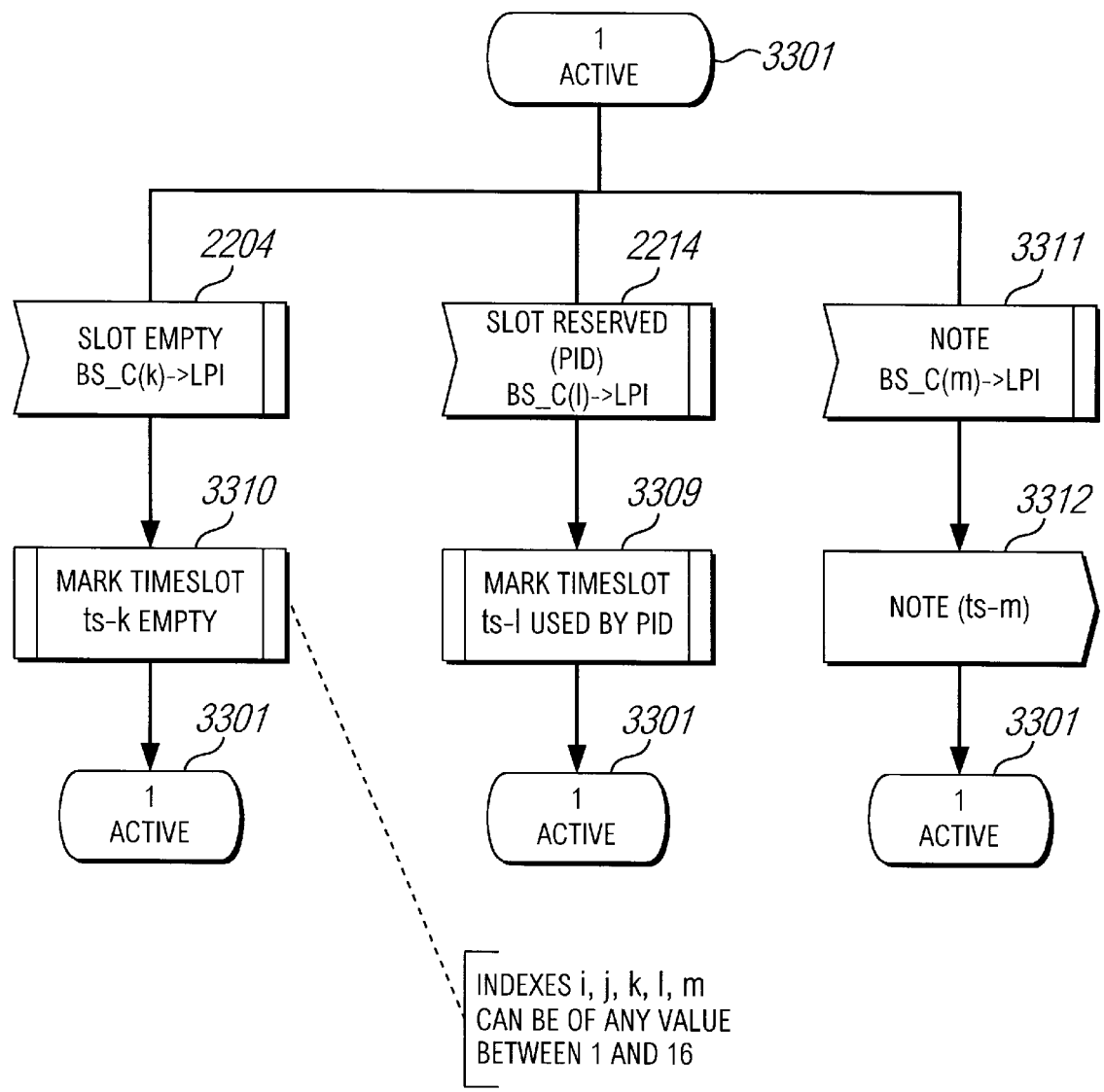

The LPI task 2112, depicted in FIG. 33, is activated from the LPI(0) ("Idle") state 3300 when the base station system is put on line 3302 (i.e., powered on). The LPI task 2112 initializes the Slot Table 3303 used to keep track of the base station channel usage. The LPI task 2112 then sends the BS_C task 2101 an On Line message 2202. In a preferred embodiment, the LPI task 2112 sends an On Line message 2202 to the BS_C task 2101 for each of the base station's channels. The LPI task 2112 then transitions to the LPI(1) state 3301.

In the LPI(1) state 3301, the LPI task 2112 may receive a Slot Empty message 2204 for a channel from the BS_C task 2101. On receiving a Slot Empty message 2204 for a channel, the LPI task 2112 updates the Slot Table 3310 to indicate that the channel is non-dedicated (i.e., unused).

In the LPI(1) state 3301, the LPI task 2112 may also receive a Slot Reserved message 2214 for a channel from the BS__C task 2101. On receiving a Slot Reserved message 2214 for a channel, the LPI task 2112 updates the Slot Table 3309 to indicate that the channel is dedicated to (i.e., used by) a particular mobile station.

In the LPI(1) state 3301, the LPI task 2112 may also receive a Page message 3307 on the backhaul interface. Prior to sending this Page message to the BS__C task 2101, the LPI task 2112 finds 3308 a channel that is currently non-dedicated, and updates the Slot Table 3309 to indicate it is now dedicated to a particular mobile station (indicated in a field in the Page message). The LPI task 2112 then, along with sending the BS__C task 2101 the Page message 2211, indicates which channel the paging protocol is to be processed with the mobile station on.

In the LPI(1) state 3301, the LPI task 2112 may receive a message, also called a "Note," 3305 on the backhaul interface, for the base station. The LPI task 2112 then sends the BS__C task 2101 this message 3306.

In the LPI(1) state 3301, the LPI task 2112 may also be activated by the BS__C task 2101 to transmit a message (also called a "Note") 3311 on the backhaul interface. The LPI task 2112 transmits the message 3312 to the system controller 103, on the backhaul interface.

In the LPI(1) state 3301, the LPI task 2112 may receive a System Off message 3304. The LPI task 2112 then sends the BS__C task 2101 an Off Line message 2206. In a preferred embodiment, the LPI task 2112 sends an Off Line message 2206 to the BS__C task 2101 for each of the base station's channels. The LPI task 2112 then transitions to the LPI(0) state 3300.

Alternative Embodiments

While preferred embodiments are disclosed herein, many variations are possible which remain within the spirit and scope of the invention. Such variations would become clear to one of ordinary skill in the art after inspection of the specification, drawings and claims herein. The invention therefore is not to be restricted except by the scope of the appended claims.

What is claimed is as follows:

1. A computer program for use in a base station in a wireless communication system comprising a main task and a plurality of independent subtasks;

each of said subtasks capable of being activated only by said main task;

each of said subtasks capable of performing a discrete communication function for said communication system;

said main task activating only one of said subtasks for a selected channel of the base station at a time and only one said subtask being active for said selected channel at said time;

at least some of said plurality of subtasks capable of notifying a physical layer of the base station that there is information to be transmitted by the base station;

at least some of said plurality of subtasks capable of being notified by said physical layer that information has been received by the base station; and, each of said plurality of subtasks capable of being modified to alter the functionality of said computer program without modification of said other subtasks.

2. The computer program of claim 1 wherein each of said plurality of subtasks are capable of being modified to alter the functionality of said physical layer without modification of the other subtasks.

3. The computer program of claim 1 wherein each of said plurality of subtasks are capable of being modified to alter the software functionality of said computer program without modification of the other subtasks.

4. The computer program of claim 1 wherein said main task and each of said independent subtasks may be remotely loaded on the base station across a line processor interface between a network and said main task.

5. The computer program of claim 4 wherein one of said independent subtasks may be remotely loaded on the base station across the line processor interface without re-loading any other of said independent subtasks on said base station.

6. The computer program of claim 1 wherein said main task posts a message to a said subtask to activate said subtask.

7. The computer program of claim 6 wherein said main task posts a first set of one or more messages to one of said subtasks to pass information to said subtask and said subtask posts a second set of one or more messages to said main task to pass information to said main task.

8. The computer program of claim 1 wherein multiple ones of said subtasks may be active at the same time.

9. The computer program of claim 8 wherein each of said multiple subtasks activated at said same time is activated for a separate selected channel of said base station.

10. The computer program of claim 1, wherein said plurality of subtasks comprise:

a general poll task;

a specific poll acquire task;

a registration task;

a call termination task;

a traffic task; and, a call origination task.

11. The computer program of claim 10 wherein said general poll task comprises a BS__GP task;

said specific poll acquire task comprises a BS__SPA task;

said registration task comprises a BS__R task;

said call termination task comprises a BS__CT task;

said traffic task comprises a BS__T task; and, said call origination task comprises a BS__CO task.

12. A computer program for use in a base station in a wireless communication system comprising a main task and a plurality of independent subtasks;

each of said subtasks capable of being activated by said main task;

each of said subtasks capable of performing a communication function for said communication system;

said main task activating only one of said subtasks for a selected channel of the base station at a time and only one said subtask being active for said selected channel at said time;

at least some of said plurality of subtasks capable of notifying a physical layer of the base station that there is information to be transmitted by the base station;

at least some of said plurality of subtasks capable of being notified by said physical layer that information has been received by the base station; and, one of said plurality of subtasks comprising a registration task, said registration task comprising a leaky bucket routine for handling the receipt of erroneous and unexpected messages during the registration process.

13. The computer program of claim 12 further comprising a call termination task, said call termination task comprising a leaky bucket routine for handling the receipt of erroneous and unexpected messages during the call termination process.

14. The computer program of claim 12 further comprising a traffic task, said traffic task comprising a leaky bucket routine for handling the receipt of erroneous and unexpected messages during the active traffic process.

15. The computer program of claim 12 further comprising a call origination task, said call origination task comprising a leaky bucket routine for handling the receipt of erroneous and unexpected messages during the call origination process.

16. The computer program of claim 12 further comprising a specific poll recover task, said specific poll recover task, on being activated for a selected channel of said base station, comprising the steps of:

enabling a timer;

periodically notifying said physical layer to transmit a message;

terminating processing when said timer expires; and, terminating processing when notified by said physical layer of a message received by said base station, said message received comprising a valid message.

17. The computer program of claim 16 wherein said physical layer is notified to transmit a message in each time frame of said selected channel.

18. A computer program for use in a base station in a wireless communication system comprising a main task and a plurality of subtasks, said plurality of subtasks comprising a general poll task, a specific poll acquire task, a registration task, a call termination task, a traffic task, a specific poll page task, a specific poll recover task, a call origination task, an originated release task, and a handover task.

19. The computer program of claim 18 further comprising a line processor interface task.

20. The computer program of claim 18 wherein said general poll task comprises a BS_GP task;

said specific poll acquire task comprises a BS_SPA task;

said registration task comprises a BS_R task;

said call termination task comprises a BS_CT task;

said traffic task comprises a BS_T task;

said specific poll page task comprises a BS_SPP task;

said specific poll recover task comprises a BS_SPR task;

said call origination task comprises a BS_CO task;

said originated release task comprises a BS_OR task; and, said handover task comprises a BS_H task.

* * * * *